United States Patent Office 3,719,759
Patented Mar. 6, 1973

3,719,759
ANTIPROTOZOAL COMPOSITIONS CONTAINING NITROIMIDAZOLES
Lewis H. Sarett, Princeton, and Dale R. Hoff, Basking Ridge, N.J., and David W. Henry, Menlo Park, Calif., assignors to Merck & Co., Inc., Rahway, N.J.
No Drawing. Application Aug. 2, 1966, Ser. No. 569,595, which is a continuation-in-part of application Ser. No. 350,639, Mar. 10, 1964. Divided and this application July 22, 1969, Ser. No. 843,749
Int. Cl. A61k 27/00
U.S. Cl. 424—273        13 Claims

ABSTRACT OF THE DISCLOSURE

Compositions containing a 1-substituted -2-aryl-5- nitroimidazole, 1-substituted-2-aryl-4-nitroimidazole or a related isoindole or dihydroisoquinoline compound as the active ingredient are prepared. The compositions are utilized as antiprotozoals, antibacterials, anthelmintics and the like.

---

This is a division of U.S. Ser. No. 569,595, filed Aug. 2, 1966, now abandoned which is in turn a continuation-in-part of U.S. Ser. No. 350,639, filed Mar. 10, 1964, now U.S. Pat. No. 3,399,211, issued Aug. 27, 1968.

This invention relates generally to new imidazoles and more particularly to new 2-aryl nitroimidazoles and to methods for their preparation. Still more specifically, it is concerned with 1-substituted -2-aryl-5-nitroimidazoles, 1-substituted-2-aryl-4-nitroimidazoles, and structurally related isoindoles and dihydroisoquinolines, with the chemical synthesis of these new heterocyclic compounds, with compositions of such compounds and a carrier, and with the use of such compounds and compositions as parasiticides. More particularly, the invention is concerned with 1-substituted-2-aryl - 5 - nitroimidazoles, 1 - substituted-2-aryl-4-nitroimidazoles, and related isoindoles and dihydroisoquinolines and their use as antiprotozoals, antibacterials, anthelmintics and the like. The invention is further concerned with novel nitroimidazoles useful as intermediates in the preparation of the active parasiticides and with methods for their preparation.

The compounds of this invention are effective against protozoal infections such as histomoniasis, trichomoniasis, amoebiasis, trypanosomiasis; helminths such as Heterakis and Ascarid species; bacteria such as Salmonella sp., Streptococcus sp. and *Escherichia coli;* and pleuro pneumonia like organisms (PPLO).

Histomoniasis is a poultry disease due to the protozoan parasite *Histomonias maleagridis.* This disease, also known as turkey blackhead or enterohepatitis, is a serious economic problem in the turkey-raising industry. The infestation frequently spreads rapidly in turkey flocks and high mortality rates due to the disease are common. The compounds now commercially available for treating turkey blackhead are somewhat beneficial, but none have proven entirely satisfactory because they permit development of resistant strains of the infecting organism or lead to undesired side effects when ingested by the birds in quantities sufficient to treat the disease.

The protozoan disease trichomoniasis caused by T. vaginalis primarily infests the human vagina and is the etiological agent of a very troublesome and prevalent form of vaginal infestation known as *T. vaginalis* vaginitis. Drugs heretofore available for treating this condition, like those used for treating enterohepatitis, have certain limitations and disadvantages.

One object of the present invention is to provide a new class of chemical compounds which have a high degree of antiparasitic activity. Another object is to provide new 1-substituted-2-aryl - 5 - nitroimidazoles, 1 - substituted-2-aryl-4-nitroimidazoles, and structurally related isoindoles and dihydroisoquinolines. A further object is to provide processes for the preparation of the novel compounds. Still another object is the provision of new nitroimidazoles which are intermediates in the synthesis of such compounds. A further object is provision of processes for the preparation of these intermediates. A still further object is provision of antiparasitic compositions containing the novel compounds of this invention as active ingredients thereof. Further objects will become clear from the following description of the invention.

According to this invention, it has now been found that certain 1-substituted-2-aryl-5-nitroimidazoles and 1-substituted-2-aryl-4-nitroimidazoles are highly effective parasiticides. Generally, the 1-substituted-2-aryl-5-nitroimidazoles are more effective parasiticides than the corresponding 1-substituted-2-aryl-4-nitroimidazoles, but both types of nitroimidazoles are particularly effective against the above-mentioned parasites and infections. An important feature of the compounds of this invention is that the substituent attached to the 2-position on the imidazole moiety of the active compounds be an aryl group. The aryl substituent may be unsubstituted or substituted at one or more of the positions on the ring. Ortho, meta and para substitution and combinations thereof are contemplated by the present invention. Hereafter, when the term aryl is used in referring to a substituent on the 2-position of the imidazole moiety such term is intended to embrace substituted aryl radicals, i.e., those having attached to the aryl nucleus groups other than hydrogen.

The novel 2-aryl-nitroimidazoles of this invention may be represented by the structural formula

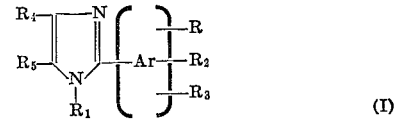

(I)

where

Ar represents phenyl or naphthyl;
R is hydrogen, chloro, bromo, loweralkyl, nitro, loweralkoxy or amino;
$R_1$ is hydrogen, loweralkyl, substituted loweralkyl wherein the substituent is carboxy, $CONR_6R_7$ where
   $R_6$ and $R_7$ are hydrogen or loweralkyl, and $NR_6R_7$ represent morpholino, piperidino, or pyrrolidino, loweralkoxycarbonyl, cyano or Z-phenyl where Z represents hydrogen, nitro, halo, loweralkyl or loweralkoxy,
formyl alkyl, wherein alkyl has 1–3 carbon atoms, $(CH_2)_nX'$ where
   $n$ is 2–4,
      $X'$ is halo, hydroxy, loweralkoxy, lower alkylthio, loweralkylsulfonyl, loweralkylsulfinyl, or $NR_6R_7$ where $R_6$, $R_7$ and $NR_6R_7$ are as defined above,

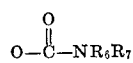

where $R_6$, $R_7$ and $NR_6R_7$ are as defined above, $(CH_2)_mCH=CH(CH_2)_mH$ wherein $m$ is 0–2, or $(CH_2)BC_d(CH_2)_eH$ where $d$ is 1–2, B is =O or

and $e$ is 1–4;
$R_2$ represents
   hydrogen, halo, nitro, cyano, or loweralkoxy,
   loweralkyl,
   formyl,
   loweralkanoyl,
   carboxy, loweralkoxycarbonyl,

where M is O and $R_6$, $R_7$ and $NR_6R_7$ are as defined above,
substituted amino wherein the substituent is loweralkanoyl, L-benzoyl where L is hydrogen, halo, nitro, or loweralkyl,
substituted thio wherein the substituent is loweralkyl,
loweralkylsulfonyl, loweralkylsulfoxyl,
$SO_2NR_6R_7$ where $R_6$, $R_7$ and $NR_6R_7$ are as defined above, or
L-phenylsulfonamido where L is as defined above;
$R_3$ represents
hydrogen, halo, nitro, cyano, hydroxy, loweralkoxy,
substituted loweralkoxy wherein the substituent is carbamoyl, loweralkylcarbamoyl, thiocarbamoyl, loweralkylthiocarbamoyl, or $-O(CH_2)_nT$ where T is halo and $n$ is 2–4,

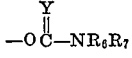

where Y is O or S and $R_6$, $R_7$ and $NR_6R_7$ are as defined above,

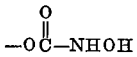

cyanato,
hydroxypseudoureido,
L-phenylpseudoureido where L is hydrogen, halo, nitro or loweralkyl,
loweralkyl,
substituted loweralkyl wherein the substituent is loweralkanoylamino, loweralkanoyl, hydroxy, halo, cyano, carboxy, $NR_6R_7$,

where Y, $R_6$, $R_7$ and $NR_6R_7$ are as defined above.
L-benzoylamino, L-phenoxycarbonyloxy or
L-phenoxythiocarbonyloxy where L is as defined above,
formyl,
loweralkanoyl,

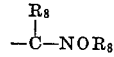

where $R_8$ is hydrogen or loweralkyl,

where $R_8$ is as defined above, M is O, S or NH, and $R_9$ and $R_{10}$ are hydrogen, loweralkyl or phenyl,

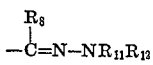

where $R_8$ is as defined above and $R_{11}$ and $R_{12}$ are hydrogen, loweralkyl, phenyl, nitrophenyl, halophenyl, thiazolyl, pyridinyl, imidazolyl, thienyl, pyrimidinyl, loweralkanoyl, benzoyl, nitrobenzoyl, halobenzoyl, loweralkoxycarbonyl, thiazolecarbonyl, pyridinecarbonyl, imidazolecarbonyl, thenoyl, or pyrimidinecarbonyl, and $NR_{11}R_{12}$ represents oxo-oxazolidinyl, oxo-imidazolidinyl, dioxo-imidazolidinyl, piperidinyl, piperazinyl, morpholinyl or thiamorpholinyl,
diloweralkanoyloxymethyl,
carboxy,
loweralkoxycarbonyl,

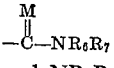

where M, $R_6$, $R_7$ and $NR_6R_7$ are as defined above, imidazolinyl, N-loweralkylimidazolinyl, tetrahydropyrimidinyl, N - loweralkyltetrahydropyrimidinyl,

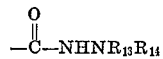

where $R_{13}$ and $R_{14}$ are hydrogen, loweralkyl, phenylloweralkyl or phenyl,
phenyl,
substituted phenyl wherein the substituent is halo, nitro, carboxamido or cyano,
amino,
substituted amino wherein the substituent is loweralkyl, diloweralkyl, loweralkanoyl, haloloweralkanoyl, formyl, L-benzoyl where L is an defined above, carbamoyl or cyano,

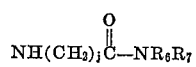

where $j$ is 1–6 and $R_6$, $R_7$ and $NR_6R_7$ are as defined above,
guanidino, biguanido,
mercapto,
substituted thio wherein the substituent is loweralkyl, cyano, loweralkoxythiocarbonyl,

where $R_6$, $R_7$ and $NR_6R_7$ are as defined above,

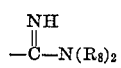

where each $R_8$ is hydrogen or loweralkyl,
loweralkylsulfonyl, loweralkylsulfoxyl,
sulfinyl, sulfonyl,
$SO_2NR_6R_7$ where $R_6$, $R_7$ and $NR_6R_7$ are as defined above,
L-phenylsulfonamido where L is as defined above,
phosphondiamido, phosphonyl, loweralkylsulfonylamino,
$-CH=CHJ$ where J is bromo or chloro,
thienyl, furyl,
substituted diazo wherein the substituent is
A-phenylamino where A represents hydrogen, halo or loweralkyl,
D-phenyl where D represents hydroxy or diloweralkylamino:

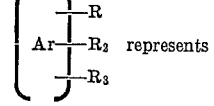

tetrahydronaphthyl, indanyl, indenyl,
quinolinyl or quinoxalinyl; and
$R_4$ and $R_5$ represent
hydrogen and nitro, provided one and only one of $R_4$ and $R_5$ is nitro.

The loweralkyl and loweralkoxy groups which R represents are preferably methyl, ethyl, methoxy, ethoxy and the like.

The symbol $R_1$ may be hydrogen or a loweralkyl radical such as methyl, ethyl, n-propyl, isopropyl and the like; substituted loweralkyl such as carboxymethyl, carboxyethyl and the like; carboxamidomethyl, carboxamidoethyl, N-ethylcarboxamidomethyl, pyrrolidinocarbonylmethyl, methoxycarbonylmethyl, ethoxycarbonylmethyl, n-propoxycarbonylmethyl, methoxycarbonylethyl, ethoxycarbonylethyl, methoxycarbonyl-n-propyl, and the like; cyano loweralkyl such as cyano methyl, cyano ethyl, cyano n-propyl, cyano isobutyl, and the like; phenylloweralkyl such as benzyl, phenethyl, and the like; substituted phenylloweralkyl such as p-nitrobenzyl, m-nitrophenethyl, p-chlorobenzyl, p-fluorobenzyl, o-chlorophenethyl, loweralkylphenylloweralkyl such as p-ethylbenzyl and the like, or loweralkoxyphenylloweralkyl such as p-methoxybenzyl, and the like.

$R_1$ also represents formylloweralkyl such as formylmethyl, formylethyl, formyl n-propyl, and the like; halo loweralkyl such as 2-chloroethyl, 2-fluoroethyl, 2-bromoethyl, 3-chloro-n-propyl, and the like; hydroxyloweralkyl such as 2-hydroxyethyl, 3-hydroxypropyl, and the like.

$R_1$ also represents loweralkoxyloweralkyl such as 2-methoxyethyl, 3-methoxy-n-propyl, 3-ethoxy-n-propyl, and the like; loweralkylthioloweralkyl such as 2-methylthioethyl, 4-methylthio-n-butyl, and the like; loweralkylsulfonylloweralkyl such as 2-methylsulfonylethyl, 2-ethylsulfonylethyl, and the like; loweralkylsulfinylloweralkyl such as 2-methylsulfinylethyl, 3-methylsulfinyl-n-propyl, and the like; aminoloweralkyl such as 2-aminoethyl, 3-amino-n-propyl, and the like; substituted aminoloweralkyl such as 2-N-ethylaminoethyl, 2-N-N-dimethylaminoethyl, morpholino-n-propyl, piperidino-n-propyl, pyrrolidinoethyl, and the like; carbamoyloxy loweralkyl such as carbamoyloxyethyl, carbamoyloxy-n-propyl, carbamoyloxyisobutyl, and the like; or substituted carbamoyloxy loweralkyl such as 2-N,N-dimethylcarbamoyloxyethyl, 3-morpholino-carbonyloxy-n-propyl, 2-piperidinocarbonyloxyethyl, 2-N-ethylcarbamoyloxyethyl, and the like.

The substituent at the 1-position of these imidazoles also represents a loweralkenyl group such as allyl, methallyl, and the like; loweralkylcarbonylloweralkyl such as methylcarbonylmethyl, ethycarbonyethyl, and the like; or hydroxyloweralkyl such as 2-hydroxy-n-propyl, 2-hydroxy-n-butyl, and the like.

The substituent $R_3$ represents hydrogen; halo such as bromo, chloro and fluoro; nitro; hydroxy; loweralkoxy such as methoxy, ethoxy, n-propoxy, and the like; substituted loweralkoxy such as chloroethoxy, bromoethoxy, chloropropoxy, carbamoylmethoxy, carbamoylethoxy, N-methylcarbamoylethoxy, thiocarbamoylethoxy, N-ethylthiocarbamoylethoxy, and the like; cyanato; hydroxypseudoureido; phenylpseudoureido; substituted phenylpseudoureido such as nitrophenylpseudoureido, halophenylpseudoureido, e.g., chlorophenylpseudoureido and the like, and loweralkylphenylpseudoureido such as tolylpseudoureido, ethylphenylpseudoureido, and the like; carbamoyloxy; substituted carbamoyloxy such as N-hydroxycarbamoyloxy, N-methylcarbamoyloxy, N,N-dimethylcarbamoyloxy, pyrrolidinocarbonyloxy, piperidinocarbonyloxy, morpholinocarbonyloxy, and the like; thiocarbamoyloxy such as N-methylthiocarbamoyloxy, N,N-dimethylcarbamoyloxy, piperidinothiocarbonyloxy, pyrrolidinothiocarbonyloxy, morpholinothiocarbonyloxy, and the like; loweralkyl such as methyl, ethyl, n-propyl, isopropyl, n-butyl and the like; substituted loweralkyl such as loweralkanoylaminoloweralkyl, i.e. acetylaminomethyl, acetylaminoethyl, propionylaminoethyl and the like; cyanoloweralkyl such as cyanoethyl, cyanomethyl and the like; carboxyloweralkyl such as carboxymethyl, carboxyethyl, carboxy-n-propyl and the like; haloloweralkyl such as trifluoromethyl, trifluoroethyl, chloroethyl and the like; loweralkanoylloweralkyl such as acetylmethyl, acetylethyl, propionylmethyl, propionyl-n-butyl and the like; diloweralkanoylloweralkyl such as diacetylmethyl, and the like; or hydroxyloweralkyl such as hydroxymethyl, hydroxyethyl and the like.

Further substituted loweralkyl groups representing $R_3$ include aminoloweralkyl such as aminomethyl, aminoethyl and the like; substituted aminoloweralkyl such as N-isopropylaminomethyl, diethylaminoethyl, pyrrolidino-ethyl, morpholinomethyl, piperidino-n-propyl and the like; carboxamidoloweralkyl such as carboxamidomethyl, carboxamidoethyl and the like; substituted carboxamidoloweralkyl such as N-ethylcarboxamidomethyl, N,N-dimethylcarboxamido - n - propyl, piperidinocarbonylethyl, morpholinocarbonylethyl, pyrrolidinocarbonylethyl and the like; carbamoyloxyloweralkyl such as carbamoyloxyethyl, carbamoyloxymehtyl and the like; substituted carbamoyloxyloweralkyl such as N-ethylcarbamoyloxyethyl, N,N-diethylcarbamoyloxyethyl, N-hydroxycarbamoyloxymethyl, pyrrolidinocarbonyloxymethyl, piperidinocarbonyloxy-n-propyl, morpholinocarbonyloxyethyl, and the like; thiocarbamoyloxyloweralkyl such as thiocarbamoyloxymethyl, thiocarbamoyloxyethyl and the like; subtsituted thiocarbamoyloxyloweralkyl such as N-n-propylthiocarbamoyloxyethyl, N,N - diethylthiocarbamoyloxymethyl, N-hydroxythiocarbamoyloxyethyl, piperidinothiocarbonyloxy-n-propyl, morpholinothiocarbonyloxymethyl, pyrrolidinothiocarbonylethyl, and the like; benzoylaminoloweralkyl such as benzoylaminomethyl, benzoylaminoethyl and the like; substituted benzoylaminoloweralkyl such as p-chlorobenzoylaminoethyl, p-fluorobenzoylaminomethyl, o-nitrobenzoylamino-n-propyl, toluolylaminomethyl, and the like; phenoxycarbonyloxyloweralkyl such as phenoxycarbonyloxyethyl, phenoxycarbonyloxymethyl, and the like; substituted phenoxycarbonyloxyloweralkyl such as p-fluorophenoxycarbonyloxymethyl, m-chlorophenoxycarbonyloxyethyl, p-nitrophenoxycarbonyloxy-n-propyl, p-ethylphenoxycarbonyloxyethyl, and the like.

Further substituents representing $R_3$ in the above formula include phenyl; substituted phenyl such as nitrophenyl, halophenyl, such as chlorophenyl and fluorophenyl, cyanophenyl, carboxamidophenyl, and the like; formyl; carboxy; loweralkanoyl such as acetyl, propionyl and the like; or carboxyhydrazido and substituted carboxyhydrazido such as loweralkylcarboxyhydrazido, e.g., methylcarboxyhydrazido and the like, phenylloweralkylcarboxyhydrazido such as benzylcarboxyhydrazido and the like, or phenylcarboxyhydrazido.

Additional substituents represented by the symbol $R_3$ have the structural formulae:

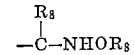

where $R_8$ is hydrogen or loweralkyl, such as methyl, ethyl, or propyl;

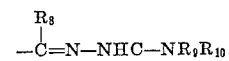

where $R_8$ is as defined above, N is O, S or NH, and $R_9$ and $R_{10}$ are hydrogen, loweralkyl such as methyl or ethyl and the like, or phenyl; and

where $R_8$ is as defined above and $R_{11}$ and $R_{12}$ are hydrogen, loweralkyl such as methyl, ethyl and the like, phenyl, nitrophenyl, halophenyl such as chlorophenyl or bromophenyl, heteroaryl such as thiazolyl, pyridinyl, imidazolyl, thienyl, pyrimidinyl and the like, loweralkanoyl such as acetyl or propionyl, benzoyl, nitrobenzoyl, halobenzoyl, such as chlorobenzoyl and the like, loweralkoxy carbonyl such as methoxycarbonyl, ethoxycarbonyl and the like, heteroaroyl such as thiazolecarbonyl, pyridinecarbonyl, thenoyl, or pyrimidinecarbonyl and the like, and $N_{11}R_{12}$ represents oxo-oxazolidinyl, oxo-imidazolidinyl, dioxoimidazolidinyl, piperidinyl, piperazinyl, morpholinyl or thiamorpholinyl, and the like.

The substituent on the aryl group designated $R_3$ also represents amino; substituted amino such as N-methylamino, N-ethylamino, N-isopropylamino, N,N-dimethylamino, N,N-diethylamino, morpholino, piperidino, pyrrolidino, and the like; ureido; loweralkanoylamino such as acetylamino, propionylamino and the like; haloalkanoylamino such as chloroacetylamino, dichloropropionamido, fluoropropionamido, bromopropionamido, and the like; carbamoylloweralkylamino; substituted carbamoylloweralkylamino such as carbamoylmethylamino, carbamoylethylamino, N-ethylcarbamoylethylamino, N-methylcarbamoylethylamino, pyrrolidinocarbonyl - n-propylamino, piperidinocarbonyl-n-propylamino, morpholinocarbonyl-n-propylamino, and the like; guanidino; biguanido; cyanoamino; formylamino; benzoylamino; substituted benzoylamino such as p-fluorobenzoylamino, p-chlorobenzoylamino, o-nitrobenzoylamino, p-toluoylamino, and the like; pseudothiourea; loweralkyl pseudothiourea such as N-methylpseudothiourea, $N^1,N^3$-diethylpseudothiourea, and the like.

$R_3$ further represents cyano; phosphondiamido; phosphonyl; halo alkylene such as 2-bromoethylene and 2-chloroethylene; thienyl; furyl; carboxamido; substituted carboxamido such as N-methylcarboxamido, N,N-dimethyl carboxamido, N,N-diethylcarboxamido, piperidinocarbonyl, morpholinocarbonyl, and the like; thiocarbamoyl; substituted thiocarbamoyl such as N-methylthiocarbamoyl, N,N-dimethylthiocarbamoyl, N,N-diethylthiocarbamoyl, morpholinothiocarbonyl, piperidinothiocarbonyl, pyrrolidinothiocarbonyl, and the like; amidino, substituted amidino such as N-methylamidino and the like; imidazolinyl, N-loweralkylimidazolinyl such as N-methylimidazolinyl and the like, tetrahydropyrimidinyl, N-loweralkyltetrahydropyrimidinyl such as N-ethyltetrahydropyrimidinyl, and the like; phenylaminodiazo; substituted phenylaminodiazo such as p-chlorophenylaminodiazo, p-bromophenylaminodiazo, p-tolylaminodiazo, and the like; substituted phenyldiazo such as hydroxyphenyldiazo, N,N-dimethylaminodiazo, and the like.

Furthermore, the symbol $R_3$ on the aryl moiety of the nitroimidazole described above represents mercapto, substituted thio such as loweralkylthio, e.g., ethylthio, methylthio, isopropylthio, and the like; cyanothio; loweralkylcarbamoylthio such as methylthiocarbamoylthio, ethylthiocarbamoylthio, and the like; diloweralkylthiocarbamoylthio such as N,N-dimethylthiocarbamoylthio, N,N-diethylthiocarbamoylthio, and the like; thiocarbamoylthio; loweralkoxythiocarbonylthio such as methoxythiocarbonylthio, ethoxythiocarbonylthio, and the like; pyrrolidinothiocarbonylthio, morpholinothiocarbonylthio, and the like.

$R_3$ also represents a loweralkylsulfonyl such as methylsulfonyl, ethylsulfonyl, n-propylsulfonyl, and the like; loweralkyl sulfoxyl such as methylsulfoxyl, ethylsulfoxyl, and the like; sulfinyl; sulfonyl; sulfonamido; substituted sulfonamido such as N-methylsulfonamido, N-ethylsulfonamido, N,N-di-n-propylsulfonamido, morpholinosulfonyl, piperidinosulfonyl, pyrrolidinosulfonyl, and the like; phenylsulfonamido; substituted phenylsulfonamido such as p-chlorophenylsulfonamido, p-nitrophenylsulfonamido, p-tolylsulfonamido, and the like.

The groups in the definition of $R_2$ as set out earlier correspond with some of the substituents represented by the symbol $R_3$. The above detailed description of the $R_3$ substituents is applicable to the corresponding groups represented by $R_2$.

It should be understood that the 1-unsubstituted nitroimidazoles discussed herein are compounds in which the nitro substituent is at either the 4- or 5-position on the imidazole nucleus. The hydrogen atom on a nitrogen in the imidazole ring is in the state of tautometric equilibrium and the result is an imidazole in which the 4- and 5-positions are equivalent. For convenience, these compounds are herein designated 4-nitroimidazoles.

In accordance with this invention, one method for preparing the novel 1-loweralkyl-2-aryl-5-nitroimidazoles described herein is depicted in the following flow diagram. $R_1$, $R_2$ and $R_3$ are as hereinabove defined and $R_{15}$ is loweralkyl.

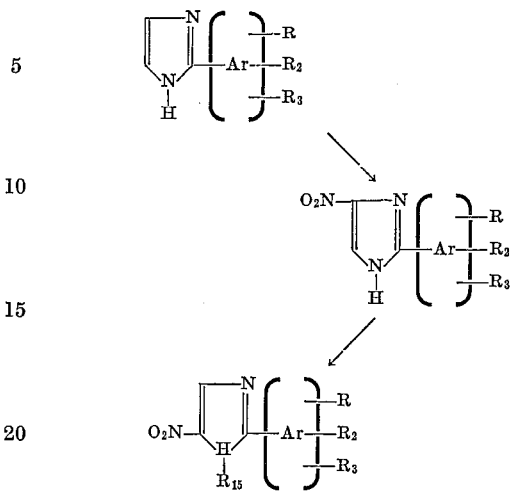

An important feature of the present invention is concerned with the manner of nitrating the 2-aryl imidazole starting compounds. Selective introduction of a nitro substituent onto the imidazole moiety and substantial elimination of aryl radical nitration is usually desired. Certain reactants and reaction conditions have been found desirable in nitrating the starting compounds in the manner preferred. When nitration of a 2-aryl imidazole is carried out on a compound having an electronegative group on the aryl moiety thereof, it has been found that the use of a slight excess of concentrated nitric acid in sulfuric acid solvent affords a compound substituted only on the imidazole ring. For example, nitration using sulfuric and nitric acids produces a nitro-substituted imidazole when a chloro, nitro or carboxamido substituent is affixed to the aryl radical of the starting aryl imidazole. Depending upon the particular reactants employed, reaction temperatures of the nitration may vary from about room temperature to a temperature as high as the reflux temperature of the acid mixture (about 150-160° C.). The reaction is normally completed in less than an hour and a 20- to 30-minute reaction time is often found to be sufficient. Temperature and reaction time are not critical when preparing these compounds according to the method described and it is only generally desirable to heat the reaction mixture in order that the rate of reaction be conveniently increased. When the formation of the desired nitroimidazole is complete, the product may be isolated and purified by known methods such as by filtration, extraction, removal of solvent under reduced pressure and crystallization of the residual heterocyclic compound.

The compounds which may be prepared according to the foregoing nitration procedure may be represented by the formula

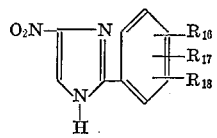

where $R_{16}$ represents
    chloro, bromo or nitro;
$R_{17}$ represents
    halo, nitro, cyano,
    formyl,
    loweralkanoyl,
    carboxy,
    loweralkoxycarbonyl,

where $R_6$, $R_7$ and $NR_6R_7$ are as defined above,
loweralkylsulfonyl, loweralkylsulfoxyl,
$SO_2N(R_{19})_2$ where $R_{19}$ is loweralkyl and $N(R_{19})_2$ is pyrrolidino, piperidino or morpholino;

$R_{18}$ represents
halo, nitro, cyano,
formyl,
loweralkanoyl,
carboxy,
loweralkoxycarbonyl,

where Y, $R_6$, $R_7$ and $NR_6R_7$ are as defined above,
loweralkylsulfonyl, loweralkylsulfoxyl,
sulfinyl, sulfonyl,
$SO_2N(R_{19})_2$ where $R_{19}$ and $N(R_{19})_2$ are as defined above, and

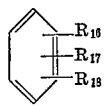

represents quinolinyl or quinoxalinyl.

When in particular instances it is desired that nitration be effected on both the aryl and imidazole moieties, concentrated sulfuric acid and concentrated nitric acid are employed. The reaction conditions are similar to those used when nitrating only the imidazole moiety except that at least 2 moles of nitric acid per mole of imidazole is preferably utilized. For example, when 2-phenyl imidazole or 2-(4'-fluorophenyl)-imidazole is treated with sufficient nitric and sulfuric acids, there is obtained 2-(4'-nitrophenyl)-4-nitroimidazole or 2 - (3'-nitro-4'-fluorophenyl)-4-nitroimidazole, respectively.

When a loweralkanoic acid or an anhydride thereof, such as acetic acid, propionic acid, butyric acid, acetic anhydride, propionic anhydride, butyric anhydride and the like is used in place of sulfuric acid as reaction medium in the above-described nitration reaction, these compounds, the aryl moiety of which would otherwise be nitrated, are selectively nitrated on the imidazole ring. Accordingly, the above-mentioned organic acids and anhydrides may be utilized when sulfuric acid as nitration solvent permits nitro substitution on the aryl moiety of the 2-aryl imidazole starting compounds. This change in reaction media permits a surprising degree of control over introduction of the nitro substituent to the imidazole ring. Substantially the same reaction conditions as those desired for the sulfuric acid medium are preferred. The tendency of a nitro group to attach to the imidazole rather than the aryl moiety is consequently effectively increased by the use of loweralkyl carboxylic acids or anhydrides thereof as solvents during nitration. It has been found that the organic compounds particularly useful as selective nitration solvents are acetic acid and acetic anhydride.

The compounds which may be prepared according to the above nitration procedure in which a lower alkanoic acid or a lower alkanoic anhydride is used as reaction medium may be represented by the formula

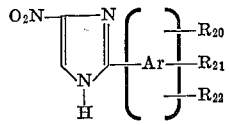

where Ar represents phenyl or naphthyl;
$R_{20}$ is
hydrogen, chloro, bromo, nitro, loweralkoxy or loweralkyl;
$R_{21}$ represents
hydrogen, halo, nitro, cyano, loweralkoxy,
loweralkyl,
formyl,
loweralkanoyl,
carboxy,
loweralkoxycarbonyl,

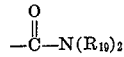

where $R_{19}$ and $N(R_{19})_2$ are as defined above,
substituted amino wherein the substituent is loweralkanoyl, L-benzoyl where L is as defined above,
loweralkylsulfonyl, loweralkylsulfoxyl,
$SO_2N(R_{19})_2$ where $R_{19}$ and $N(R_{19})_2$ are as defined above;

$R_{22}$ represents
hydrogen, halo, nitro, cyano, loweralkoxy, substituted loweralkoxy wherein the substituent is carbamoyl, loweralkylcarbamoyl, or $-O(CH_2)_nT$ where T is halo and $n$ is 2-4,
loweralkyl,
substituted loweralkyl wherein the substituent is loweralkanoylamino, loweralkanoyl, hydroxy, halo, carboxy, $N(R_{19})_2$,

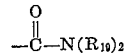

where $R_{19}$ and $N(R_{19})_2$ are as defined above,
L-benzoylamino where L is as defined above;
formyl,
loweralkanoyl,
diloweralkanoyloxymethyl,
carboxy,
loweralkoxycarbonyl

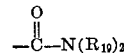

where $R_{19}$ and $N(R_{19})_2$ are as defined above,
phenyl,
substituted phenyl wherein the substituent is as defined above,
substituted amino wherein the substituent is diloweralkyl, loweralkanoyl, haloloweralkanoyl, L-benzoyl where L is as defined above,
substituted thio wherein the substituent is loweralkyl, loweralkylsulfonyl, loweralkylsulfoxyl,
sulfinyl, sulfonyl,
$SO_2N(R_{19})_2$ where $R_{19}$ and $N(R_{19})_2$ are as defined above,
phosphonyl,
$-CH=CHJ$ where J is as defined above; and

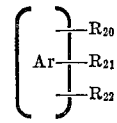

represents tetrahydronaphthyl, indanyl, indenyl, quinolinyl or quinoxalinyl.

According to an additional aspect of the invention, nitronium perchlorate and certain nitronium metal fluorides have been found useful as nitrating agents in that they too cause nitro addition on the imidazole moiety in preference to the aryl ring. Nitronium salts comprising anions in a high oxidation state such as nitronium tetrafluoborate, nitronium hexafluorophosphate, nitronium hexafluoroarsenate, nitronium hexafluorosilicate, nitronium hexafluoroantimonate, nitronium perchlorate and the like, preferably nitronium tetrafluoborate, are useful for this purpose. The use of an inert solvent to bring the imidazole into solution is preferred. Solvents such as acetonitrile, chloroform, nitromethane, dichloroethane, tetramethylenesulfone and the like are suitable for this purpose. The nitration may be conducted at temperatures between about 0° C. and room temperature and above, preferable at about 10–20° C.

The general formula below represents those compounds which are preparable according to the nitronium salt nitration procedure discussed above.

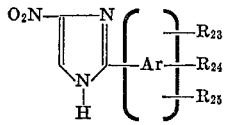

where Ar represents phenyl or naphthyl;
$R_{23}$ is hydrogen, chloro, bromo, nitro or loweralkyl;
$R_{24}$ represents
 hydrogen, halo, nitro, cyano,
 loweralkyl,
 formyl,
 loweralkanoyl,
 carboxy,
 loweralkoxycarbonyl,

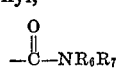

where $R_6$, $R_7$ and $NR_6R_7$ are as defined above,
 substituted amino wherein the substituent is loweralkanoyl or L-benzoyl where L is as defined above,
 loweralkylsulfonyl, loweralkylsulfoxyl,
 $SO_2N(R_{19})_2$ where $R_{19}$ is loweralkyl and $N(R_{19})_2$ is pyrrolidino, piperidino or morpholino;
$R_{25}$ represents
 hydrogen, halo, nitro, cyano, loweralkoxy,
 loweralkyl,
 substituted loweralkyl wherein the substituent is loweralkanoylamino, loweralkanoyl, halo, cyano, carboxyl, $NR_6R_7$,

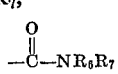

where $R_6$, $R_7$ and $NR_6R_7$ are as defined above,
 formyl,
 loweralkanoyl,
 diloweralkanoylmethyl,
 carboxy,
 loweralkoxycarbonyl

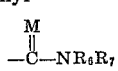

where M is O or S and $R_6$, $R_7$ and $NR_6R_7$ are as defined above,
 phenyl,
 substituted phenyl wherein the substituent is halo, nitro, carboxamido or cyano,
 substituted amino wherein the substituent is loweralkanoyl, haloloweralkanoyl, L-benzoyl where L is as defined above,
 substituted thio wherein the substituent is loweralkyl, loweralkylsulfonyl, loweralkylsulfoxyl,
 sulfinyl, sulfonyl,
 $SO_2N(R_{19})_2$ where $R_{19}$ is loweralkyl and $N(R_{19})_2$ is pyrrolidino, piperidino or morpholino,
 phosphonyl,
 —CH=CHJ where J is as defined above,
 thienyl, furyl; and

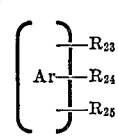

represents tetrahydronaphthyl, indanyl, indenyl, quinolinyl or quinoxalinyl.

As illustrative of the compounds which may be prepared according to the foregoing nitration procedures, there may be mentioned 2-(4'-chlorophenyl)-4-nitroimidazole, 2-(2'-nitrophenyl)-4-nitroimidazole, 2-(3',5'-dinitrophenyl)-4-nitroimidazole, 2-(4'-fluorophenyl)-4-nitroimidazole, N',N'-dimethyl-2-(4'-carboxamidophenyl)-4-nitroimidazole, 2 - (4'-nitrophenyl)-4-nitroimidazole, 2-phenyl-4-nitroimidazole, 2-(2',4'-dichlorophenyl)-4-nitroimidazole, 2-(3'-nitro-4'-chlorophenyl)-4-nitroimidazole, 2-(2'-fluorophenyl)-4-nitroimidazole, 2-(3'-nitrophenyl)-4-nitroimidazole, N',N'-dimethyl - 2 - (4'-sulfonamidophenyl)-4-nitroimidazole, 2-(4'-acetylphenyl) - 4 - nitroimidazole, 2-(3'-cyanophenyl)-4-nitroimidazole and 2-(2'-ethoxycarbonylphenyl)-4-nitroimidazole.

Certain of the compounds of the present invention are substituted at the 1-position on the imidazole moiety with a lower alkyl group by alkylating the 1-unsubstituted imidazoles with agents found useful for this purpose. Alkyl sulfates, preferably lower alkyl sulfates such as dimethyl sulfate, diethyl sulfate and the like, alkyl sulfonates, preferably lower alkyl sulfonates such as methyl benzenesulfonate, ethyl toluenesulfonate, methyl ethanesulfonate, and the like, and diazoalkanes, preferably diazoloweralkanes such as diazomethane, diazoethane and the like may be used in this regard. When preparation of 1-substituted-2-aryl-5-nitroimidazoles rather than 1-substituted-2-aryl-4-nitroimidazoles is desired using these reactants, the conditions under which the reaction is run is critical. It has now been found that 1-substituted-2-aryl-5-nitroimidazoles may be prepared in substantial yields with the above reagents only when the reaction medium is substantially neutral or acidic. Accordingly, when dimethylsulfate is utilized to methylate 2-(2'-nitrophenyl)-4-nitroimidazole, the reaction is conducted under neutral conditions in order that the 5-nitroimidazole be obtained. The alkylation reactions using alkyl sulfate or alkyl sulfonate are generally conducted at temperatures of from about 100–200° C., either with or in the absence of solvent.

When solvent is used during alkylation with alkyl sulfonate, the solvent is preferably inert with respect to the particular reactants employed. Typical examples of solvents useful for such alkylation reactions are loweralkanoic acids such as formic acid, acetic acid and the like, or mixed solvents such as loweralkanoic acid and dimethylformamide and the like.

When a loweralkyl sulfate or loweralkyl sulfonate is employed to obtain 1-loweralkyl-2-aryl-4-nitroimidazole, the reaction is run under basic conditions. The same considerations apply also when the substituent at the 1-position is to be other than 1-loweralkyl, e.g. hydroxyloweralkyl, loweralkoxyalkyl. Inasmuch as the 1-substituted-2-aryl-5-nitroimidazoles of this invention display somewhat greater parisiticidal properties than the corresponding 1-substituted-2-aryl-4-nitroimidazoles, a choice of reaction conditions is an important aspect of this invention.

The 1-loweralkyl-2-aryl-nitroimidazoles which may be prepared according to the above-described alkylation processes have the general formulae

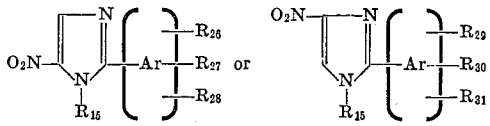

where
Ar is as previously defined;
$R_{15}$ is loweralkyl;
$R_2$ is hydrogen, chloro, bromo, nitro, loweralkoxy or loweralkyl;
$R_{27}$ is hydrogen, halo, nitro, cyano, loweralkoxy, loweralkyl, formyl, loweralkanoyl, loweralkoxycarbonyl,

where $R_6$, $R_7$ and $NR_6R_7$ are as defined above,
 substituted amino wherein the substituent is loweralkanoyl, L-benzoyl where L is as defined above loweralkylsulfonyl, $SO_2N(R_{19})_2$ where $R_{19}$ and $N(R_{19})_2$ are as defined above;

$R_{28}$ is
hydrogen, halo, nitro, cyano, loweralkoxy, substituted loweralkoxy wherein the substituent is carbamoyl, loweralkylcarbamoyl or $-O(CH_2)_nT$ where T is halo and $n$ is 2–4,
loweralkyl,
substituted loweralkyl wherein the substituent is loweralkanoylamino, loweralkanoyl, hydroxy, halo, cyano,

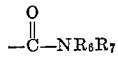

where $R_6$, $R_7$ and $NR_6R_7$ are as defined above,
L-benzoylamino where L is as defined above,
formyl,
loweralkanoyl,
diloweralkanoyloxymethyl,
loweralkoxycarbonyl,

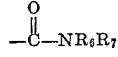

where $R_6$, $R_7$ and $NR_6R_7$ are as defined above,
phenyl,
substituted phenyl wherein the substituent is as defined above,
substituted amino wherein the substituent is loweralkanoyl, haloloweralkanoyl, formyl, L-benzoyl where L is as defined above, and carbamoyl,
substituted thio wherein the substituent is loweralkyl, loweralkoxythiocarbonyl,

where $R_{19}$ and $N(R_{19})_2$ are as defined above,
loweralkylsulfonyl, loweralkylsulfoxyl,
$SO_2N(R_{19})_2$ where $R_{19}$ and $N(R_{19})_2$ are as defined above,
—CH=CHJ where J is as defined above,
thienyl, furyl;

$R_{29}$ is chloro, bromo, loweralkyl, loweralkoxy or nitro;

$R_{30}$ represents
hydrogen, halo, nitro, cyano, loweralkoxy,
loweralkyl,
formyl,
loweralkanoyl,
loweralkoxycarbonyl,

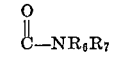

where $R_6$, $R_7$ and $NR_6R_7$ are as defined above,
substituted amino wherein the substituent is loweralkanoyl, L-benzoyl where L is as defined above,
substituted thio wherein the substituent is loweralkyl, loweralkylsulfonyl,
$SO_2N(R_{19})_2$ where $R_{19}$ and $N(R_{19})_2$ are as defined above;

$R_{31}$ represents
hydrogen, halo, nitro, cyano, loweralkoxy,
substituted loweralkoxy wherein the substituent is carbamoyl, loweralkylcarbamoyl or $-O(CH_2)_nT$ where T and $n$ are as defined above,
cyanato,
loweralkyl,
substituted loweralkyl wherein the substituent is loweralkanoylamino, loweralkanoyl, hydroxy, halo, cyano, $NR_6R_7$,

wherein Y, $R_6$, $R_7$ and $NR_6R_7$ are as defined above,
L-benzoylamino or L-phenoxycarbonyl where L is as defined above,
formyl,
loweralkanoyl,
diloweralkanoyloxymethyl,
loweralkoxycarbonyl,

where Y, $R_6$, $R_7$ and $NR_6R_7$ are as defined above,
phenyl,
substituted phenyl wherein the substituent is as defined above,
amino,
substituted amino wherein the substituent is loweralkyl, diloweralkyl, loweralkanoyl, haloloweralkanoyl, formyl, L-benzoyl wherein L is as defined above, and carbamoyl or cyano,

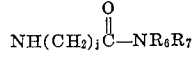

where J, $R_6$, $R_7$ and $NR_6R_7$ are as defined above,
substituted thio wherein the substituent is loweralkyl, cyano, loweralkoxythiocarbonyl,

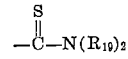

where $R_{19}$ and $N(R_{19})_2$ are as defined above,
loweralkylsulfonyl, loweralkylsulfoxyl,
phosphondiamido,
—CH=CHJ where J is as defined above,
thienyl, furyl,
substituted diazo wherein the substituent is
A-phenylamino where A is as defined above,
D-phenylamino where D is as defined above; and

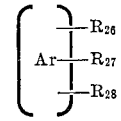

and

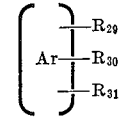

represent tetrahydronaphthyl, indanyl, or indenyl.

It has also now been discovered that 1-loweralkyl-2-aryl-5-nitroimidazoles are prepared in neutral medium from 1-unsubstituted-2-aryl-4-nitroimidazoles when diazoalkane, preferably lower diazoalkane such as diazomethane, diazoethane and the like is used as alkylating agent. The reagent may be dissolved in inert organic solvent such as ethers, for example diethyl ester, 1,2-dimethoxyethane, tetrahydrofuran and the like, hydrocarbons such as benzene, toluene, xylene and the like, halogenated hydrocarbons such as chloroform and the like, and lower alkanols such as ethanol, propanol and the like. The nitroimidazole is then conveniently treated with the resulting solution at a temperature preferably from about 0° C. to about room temperature in order that 1-loweralkyl-2-aryl-5-nitroimidazole be produced.

The compounds which may be prepared according to the foregoing alkylation procedure may be represented by the formula

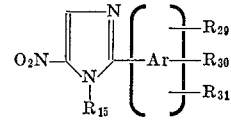

where

Ar, $R_{15}$, $R_{30}$ and $R_{31}$ are as defined above,
$R_{29}$ represents hydrogen, chloro, bromo, loweralkyl, loweralkoxy or nitro; and

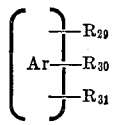

represent tetrahydronaphthyl, indanyl, indenyl, quinolinyl or quinoxalinyl.

The following compounds are illustrative of those which may be prepared according to the foregoing processes:

1-methyl-2-phenyl-5-nitroimidazole,
1-methyl-2-(4'-tolyl)-5-nitroimidazole,
1-methyl-2-(3'-tolyl)-4-nitroimidazole,
1-methyl-2-(2-β-chloroethylphenyl)-5-nitroimidazole,
1-methyl-2-(3-β-fluoropropylphenyl)-5-nitroimidazole,
1-methyl-2-(3'-nitrophenyl)-4-nitroimidazole,
1-methyl-2-(2'-cyanophenyl)-5-nitroimidazole,
1-methyl-2-(4'-formylphenyl)-5-nitroimidazole,
1,N'-dimethyl-2-(2'-aminomethylphenyl)-5-nitroimidazole,
1,N',N'-trimethyl-2-(3'-sulfonamidophenyl)-4-nitroimidazole,
1-methyl-2-(4'-bromophenyl)-5-nitroimidazole,
1-methyl-2-(3'-acetylaminophenyl)-5-nitroimidazole,
1-n-propyl-2-(4'-biphenylyl)-4-nitroimidazole,
1-methyl-2-(4'-methylsulfonylphenyl)-5-nitroimidazole,
1-methyl-2-(2'-aminophenyl)-5-nitroimidazole,
1-methyl-2-(3'-aminophenyl)-5-nitroimidazole,
1-ethyl-2-(4'-aminophenyl)-5-nitroimidazole,
1-methyl-2-(3'-fluorophenyl)-5-nitroimidazole,
1-methyl-2-(2'-chlorophenyl)-5-nitroimidazole,
1-methyl-2-(4'-chlorophenyl)-4-nitroimidazole,
1-methyl-2-(4'-morpholinomethylphenyl)-5-nitroimidazole,
1-methyl-2-(3'-methylthiophenyl)-5-nitroimidazole,
1-methyl-2-(2'-carboxamidophenyl)-5-nitroimidazole,
1-methyl-2-(2'-iodophenyl)-5-nitroimidazole,
1-methyl-2-(4'-nitrophenyl)-4-nitroimidazole,
1-ethyl-2-(2'-nitrophenyl)-5-nitroimidazole,
1-isopropyl-2-(4'-fluorophenyl)-5-nitroimidazole,
1-methyl-2-(3'-piperidinomethyl)-5-nitroimidazole,
1-methyl-2-(4'-acetylaminoethyl)-4-nitroimidazole,
1-methyl-2-(3'-ethoxyphenyl)-5-nitroimidazole,
1-methyl-2-(2'-nitro-3'-chlorophenyl)-5-nitroimidazole,
1-ethyl-2-(2'-chloro-4'-methylphenyl)-5-nitroimidazole,
1-ethyl-2-(4'-nitrophenyl)-5-nitroimidazole,
1-ethyl-2-(4'-chloro-2'-aminophenyl)-5-nitroimidazole,
1-propyl-2-(3'-methoxyphenyl)-5-nitro-imidazole,
1-methyl-2-(2'-chloro-4'-pyrrolidinomethylphenyl)-5-nitroimidazole,
1-methyl-2-(3'-methyl-4'-carboxamidophenyl)-5-nitroimidazole,
1,N'-dimethyl-2-(4'-carboxamidophenyl)-5-nitroimidazole,
1-methyl-2-(4'-ethoxycarbonylphenyl)-5-nitroimidazole,
1-methyl-2-(2',4'-dichlorophenyl)-5-nitroimidazole,
1-methyl-2-(2',4'-difluorophenyl)-5-nitroimidazole,
1-methyl-2-(2'-aminopropylphenyl)-4-nitroimidazole,
1,N'-diethyl-2-(4'-aminophenyl)-5-nitroimidazole,
1,N',N'-trimethyl-2-(4'-sulfonamidophenyl)-5-nitroimidazole,
1,N',N'-trimethyl-2-(4'-aminophenyl)-5-nitroimidazole,
1-methyl-2-(3'-acetylphenyl)-5-nitroimidazole,
1-methyl-2-(3'-ethylphenyl)-5-nitroimidazole,
1-methyl-2-(2'-propylphenyl)-5-nitroimidazole,
1-ethyl-2-(4'-β-fluoroethylphenyl)-5-nitroimidazole,
1-methyl-2-(2'-chloronaphthyl)-5-nitroimidazole,
1-methyl-2-(3'-fluoronaphthyl)-5-nitroimidazole,
1-methyl-2-(5'-fluoronaphthyl)-5-nitroimidazole,
1-methyl-2-(3'-nitronaphthyl-5-nitroimidazole,
1-methyl-2-(2'-aminonaphthyl)-4-nitroimidazole,
1-ethyl-2-(2',3'-dichloronaphthyl)-5-nitroimidazole,
1-ethyl-2-(2'-methylnaphthyl)-5-nitroimidazole,
1-methyl-2-(3'-carboxamidonaphthyl)-5-nitroimidazole,
and 1-ethyl-2-naphthyl-5-nitroimidazole.

When the 1-haloloweralkyl-2-aryl-5-nitroimidazoles defined by Formula I above are prepared by haloalkylation of a 2-arylnitroimidazole, substantially identical reaction conditions as those used for the alkylation reactions earlier disclosed are satisfactory. No significant difference between use of the alkylating or haloalkylating agent is necessary to achieve a corresponding result. Consequently, when a haloloweralkylsulfate such as 2-chloroethyl sulfate, 3-chloropropylsulfate and the like, or a haloloweralkyl sulfonate such as 2-chloroethyltoluenesulfonate and the like, or a halodiazolower alkane such as 2-chloro-1-diazoethane and the like is used in treating the 2-aryl-4-nitroimidazole of the invention, a 1-haloloweralkyl-2-aryl-5-nitroimidazole or 1 - haloloweralkyl-2-aryl-4-nitroimidazole will result.

The 1-haloloweralkyl-2-aryl-nitroimidazoles capable of preparation according to the foregoing have the formula

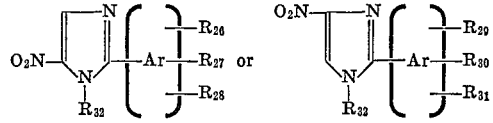

where Ar, $R_{26}$, $R_{27}$, $R_{28}$, $R_{30}$, and $R_{31}$ are as defined above; $R_{29}$ is
hydrogen, chloro, bromo, loweralkyl, loweralkoxy or nitro;
$R_{32}$ is haloalkyl; and

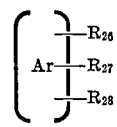

and

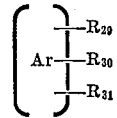

represent tetrahydronaphthyl, indanyl, or indenyl.

The 1-loweralkoxyloweralkyl or 1-hydroxyloweralkyl-2-aryl-5-nitroimidazoles defined by Formula I above may be prepared by reacting a 2-aryl-4-nitroimidazole and an appropriately substituted aryl sulfonate such as a loweralkoxyloweralkyl toluene sulfonate or the like at moderate temperature, preferably about 150° C. to about 200° C. Loweralkoxyloweralkyl sulfates are also useful reagents in this regard. Standard extraction methods may then be utilized to obtain the 1-loweralkoxyloweralkyl-2-aryl-5-nitroimidazole. Hydrolysis of the 1-loweralkoxyloweralkyl-2-aryl-5-nitroimidazoles by treatment, for example, with a strong mineral acid such as sulfuric acid converts that compound to the corresponding 1-hydroxyloweralkyl-5-nitroimidazole. The 1-substituted - 2 - aryl-4-nitroimidazoles are obtained when the reaction medium is basic. As illustrative of the aryl sulfonates useful in the above reaction, there may be mentioned methoxyethyltoluenesulfonate, ethoxyethyltoluenesulfonate, propoxyethyltoluenesulfonate, ethoxypropylbenzenesulfonate and the like, whereas among the loweralkoxyloweralkyl sulfates useful as reagents in the above-described process, there may be mentioned di(ethoxyethyl)sulfate, di(ethoxypropyl)sulfate, di(methoxyethyl)sulfate and the like. Loweralkoxydiazoloweralkanes such as methoxydiazoethane, ethoxydiazoethane and the like are also useful in preparing the 1-loweralkoxyloweralkyl and 1-hydroxyloweralkyl-2-aryl-5-nitroimidazole in accordance with the above-described process.

The compounds prepared according to the loweralkoxy-alkylation and hydroxyalkylation processes described above may be represented by the formulae

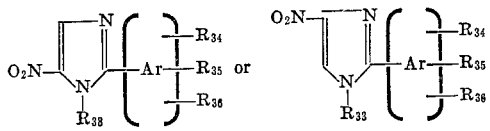

where

Ar is as defined above;

$R_{33}$ is
  $(CH_2)_nE$ where E is hydroxy or loweralkoxy;

$R_{34}$ is
  hydrogen, chloro, bromo, nitro or loweralkyl;

$R_{35}$ represents
  hydrogen, halo, nitro, loweralkoxy,
  loweralkyl,
  formyl,
  loweralkanoyl,
  loweralkylsulfonyl;

$R_{36}$ represents
  hydrogen, halo, nitro, hydroxy, loweralkoxy,
  loweralkyl,
  substituted loweralkyl wherein the substituent is
    loweralkanoyl, hydroxy, halo, carboxy,
    formyl,
    loweralkanoyl,
    phenyl,
    substituted phenyl wherein the substituent is halo or nitro,
  substituted thio wherein the substituent is loweralkyl, loweralkylsulfonyl, loweralkylsulfoxyl,
  $SO_2N(R_{19})_2$ where $R_{19}$ and $N(R_{19})_2$ are as defined above; and

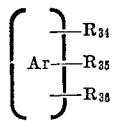

represents tetrahydronaphthyl, indanyl, indenyl, quinolinyl or quinoxalinyl.

As illustrative of some specific compounds which may be prepared according to the processes described above, there may be mentioned:

1-(2'-chloroethyl)-2-(4'-chlorophenyl)-5-nitroimidazole,
1-(2'-hydroxyethyl)-2-(4'-nitrophenyl)-5-nitroimidazole,
1-(2'-chloroethyl)-2-phenyl-5-nitroimidazole,
1-(3'-hydroxypropyl)-2-(3'-methylthiophenyl)-4-nitroimidazole,
1-(2'-bromoethyl)-2-(biphenylyl)-5-nitroimidazole,
1-(2'-hydroxyethyl)-2-(3',4'-dichlorophenyl)-5-nitroimidazole,
1-(2'-fluoroethyl)-2-(4'-fluorophenyl)-5-nitroimidazole,
1-(2'-hydroxyethyl)-2-(3'-tolyl)-5-nitroimidazole,
1-(2'-hydroxyethyl)-2-(2'-nitrophenyl)-4-nitroimidazole,
1-(2'-fluoroethyl)-2-(3'-ethoxycarbonylphenyl)-5-nitroimidazole,
1-(2'-hydroxyethyl)-2-(4'-methylsulfonylphenyl)-5-nitroimidazole,
1-(2'-chloroethyl)-2-(4'-acetylaminomethylphenyl)-5-nitroimidazole,
1-(2'-chloroethyl)-2-(4'-carboxyphenyl)-5-nitroimidazole, and
1-(2'-hydroxyethyl)-2-(3'-formylphenyl)-4-nitroimidazole.

The 1-hydroxyalkyl-2-aryl-4-nitroimidazoles are also obtainable from the corresponding 1-unsubstituted-2-aryl-nitroimidazoles under basic conditions by use of a loweralkylene oxide as a reactant. This product is obtained when the reaction is conducted at a temperature of about 0–100° C., but temperatures from about room temperature to about 50° C. are more convenient and are accordingly preferred.

This reaction is carried out in solvent and water and organic solvents such as aromatic hydrocarbons, ethers, loweralkanols, dimethylformamide and the like may be used. Any base strong enough to form a salt with the nitroimidazole would be adequate and basic alkali metal and alkaline earth metal salts such as potassium carbonate, sodium carbonate, sodium hydroxide, sodium hydride and the like in particular are useful in the process.

The nitroimidazoles prepared according to this hydroxyalkylation process have the formula

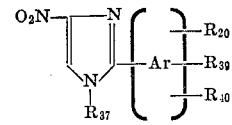

where

Ar and $R_{20}$ are as previously defined;

$R_{37}$ is
  $(CH_2)_nOH$ where $n$ is 2–4,
  $(CH_2)BC_d(CH_2)_eH$ where $d$ is 1–2, B is =O or
  $\langle \begin{matrix} H \\ OH \end{matrix}$
  and $e$ is 1–4;

$R_{39}$ represents
  hydrogen, halo, nitro, cyano, loweralkoxy,
  loweralkyl,
  formyl,
  loweralkanoyl,
  loweralkoxycarbonyl,

where $R_6$, $R_7$ and $NR_6R_7$ are as defined above,
  substituted amino wherein the substituent is loweralkanoyl, L-benzoyl where L is as defined above,
  substituted thio wherein the substituent is loweralkyl,
  loweralkylsulfonyl,
  $SO_2N(R_{19})_2$ where $R_{19}$ and $N(R_{19})_2$ are as defined above;

$R_{40}$ represents
  hydrogen, halo, nitro, cyano, loweralkoxy,
  substituted loweralkoxy wherein the substituent is carbamoyl, loweralkylcarbamoyl, thiocarbamoyl, loweralkylthiocarbamoyl, or $-O(CH_2)_nT$ where T and $n$ are as previously defined,

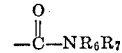

where Y, $R_6$, $R_7$ and $NR_6R_7$ are as defined above,
  cyanato,
  loweralkyl,
  substituted loweralkyl wherein the substituent is loweralkanoylamino, loweralkanoyl, hydroxy, halo, cyano, $NR_6R_7$,

where Y, $R_6$, $R_7$ and $NR_6R_7$ are as defined above,
  L-benzoylamino or L-phenoxycarbonyl where L is as defined above,
  formyl,
  loweralkanoyl,
  diloweralkanoyloxymethyl,
  loweralkoxycarbonyl,

where M, $R_6$, $R_7$ and $NR_6R_7$ are as defined above, imidazolinyl, N-loweralkylimidazolinyl, tetrahydropyrimidinyl, N-loweralkyltetrahydropyrimidinyl,

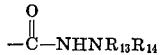

where $R_{13}$ and $R_{14}$ are hydrogen, loweralkyl, phenylloweralkyl or phenyl,
phenyl,
substituted phenyl wherein the substituent is as defined above,
substituted amino wherein the substituent is diloweralkyl, loweralkanoyl, haloloweralkanoyl, formyl, carbamoyl or L-benzoyl where L is as defined above,

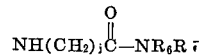

where $j$, $R_6$, $R_7$ and $NR_6R_7$ are as defined above,
substituted thio wherein the substituent is loweralkyl, cyano, loweralkoxythiocarbonyl,

where $R_6$, $R_7$ and $NR_6R_7$ are as defined above,

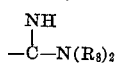

where each $R_8$ is hydrogen or loweralkyl,
loweralkylsulfonyl, loweralkylsulfoxyl
$SO_2N(R_{19})_2$ where $R_{19}$ and $N(R_{19})_2$ are as defined above,
phosphondiamido,
—CH=CHJ where J is as defined above,
thienyl, furyl,
substituted diazo wherein the substituent is A-phenylamino where A is as defined above; and

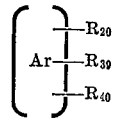

represents tetrahydronaphthyl, indanyl, indenyl, quinolinyl or quinoxalinyl.

The 1-unsubstituted nitroimidazoles are, by virtue of this invention, converted to the corresponding 1-loweralkcxycarbonylloweralkyl nitroimidazoles by treating the former with an appropriate diazo compound such as ethyldiazoacetate, methyldiazoacetate and the like. The reaction is preferably carried out at 100–200° C. in the presence of a catalyst such as copper and the like.

These products are obtainable also from the 1-unsubstituted nitroimidazole by treatment with a 1-loweralkoxycarbonylloweralkyl halide in the presence of a strong base such as an alkali metal hydroxide or hydride, e.g. sodium hydride, sodium hydroxide, and the like. The product obtained, namely the 1-loweralkoxy-carbonylloweralkyl-2-aryl nitroimidazole, may then be converted to the corresponding 1 - carboxyloweralkyl - 2-aryl-nitroimidazole by hydrolysis with, for example, strong base in alcoholic solution, conveniently at ambient temperature. The 1-carboxyloweralkyl derivative is converted to the acid halide by treatment, for example, with oxalyl chloride; the acid halide is then converted to a 1-carboxamidoloweralkyl-2-aryl-5-nitroimidazole by treatment with ammonia or an appropriate primary or secondary amine, e.g. ethyl amine, dimethyl amine, piperidine, pyrrolidine, morpholine, and the like. The 1-carboxamidoloweralkyl-2-aryl-nitroimidazoles provide the corresponding 1-cyanoloweralkyl derivative by treatment with a thionyl halide such as thionyl chloride at temperatures of from about 50–200° C. and neutralizing the cooled reaction mixture.

A haloalkyl group such as chloroethyl, 3 - bromopropyl, and the like may be added to the 1-unsubstituted nitroimidazole at the 1-position by treatment with a diazohaloloweralkane, in accordance with the procedure earlier described. The phenylloweralkyl or substituted phenylloweralkyl derivative is obtainable in much the same way by treating the 1-unsubstituted nitroimidazole with phenyldiazoloweralkane or a substituted phenyldiazoloweralkane. In this way, the 1-position may be substituted with such groups as benzyl, phenethyl, chlorobenzyl, fluorobenzyl, ethylbenzyl, and the like.

A ketone moiety is substituted on the 1-position by treating the 2-aryl-4-nitroimidazole with a diazoketone such as diazoacetone, 1-diazo-2-butanone and the like. The resulting loweralkanone is converted to the corresponding alcohol function by treating the nitroimidazole with an alkali metal borohydride such as sodium borohydride in solvent such as a loweralkanol, e.g. ethanol.

An aminoloweralkyl group is added to the 1-position on the 1-hydroxyloweralkyl-2-aryl-4-nitroimidazoles by treating the latter, preferably at $-10°$ to $20°$ C., with an aryl or alkyl sulfonyl halide such as p-toluene sulfonyl chloride, benzene sulfonyl chloride, or methane sulfonyl chloride and the like, and treating the resutling sulfonate ester, preferably at $50°–150°$ C., with ammonia or an appropriate amine such as ethylamine, dimethylamine, diethylamine, morpholine, piperidine or pyrrolidine, and the like. The above sulfonate ester is also convertible to the 1-loyeralkylthioloweralkyl nitroimidazole by treatment with an alkali metal salt of a loweralkanethiol such as methanethiol, ethanethiol, n-propanethiol, and the like. The sulfonate ester above mentioned is also converted to the corresponding 1-loweralkylsulfonylloweralkyl nitroimidazole by treatment at about $50°–150°$ C. with an alkali metal sulfinate such as sodium methylsulfinate, potassium ethylsulfinate, sodium isopropylsulfinate, and the like. The corresponding 1 - loweralkylsulfinylloweralkyl nitroimidazole is obtained by oxidizing the earlier described 1-loweralkylthioloweralkyl nitroimidazole with a mild reducing agent such as monoperphthalic acid, nitrogen tetroxide, hydrogen peroxide, and the like.

The 1-unsubstituted 2-aryl-nitroimidazoles of this invention are converted to the corresponding 1-loweralkenyl derivatives by treatment with an alkenylsulfate or an alkenyl sulfonate in the manner and under the conditions earlier described for alkylating with an alkyl sulfate or sulfonate.

When a 1-hydroxyloweralkyl-2-aryl imidazole is treated according to this invention with an aryl haloformate such as phenyl chloroformate and the resulting 1-aryloxycarbonyloxyloweralkyl-2-aryl nitroimidazole is treated with ammonia or an appropriate primary or secondary amine, the corresponding 1 - carbamyloxyloweralkyl - 2 - aryl nitroimidazole is obtained. The 1-hydroxyloweralkyl starting material is also converted to the corresponding 1-haloloweralkyl - 2-aryl-nitroimidazole by treatment with a thionyl halide and it is converted also to the 1-formylloweralkyl-2-aryl-nitroimidazole by treatment with a dicycloalkylcarbodiimide such as dicyclohexylcarbodiimide in the presence of dimethyl sulfoxide and an acid catalyst such as trifluoroacetic acid or ortho-phosphoric acid. The above-mentioned 1-haloloweralkyl-2-aryl-nitroimidazole, when treated with an alkali metal tertiary butoxide such as sodium tertiary butoxide or potassium tertiary butoxide, provides the corresponding 1 - alkenyl-2-aryl-nitroimidazole.

In accordance with the present invention, there are prepared 2-aminoaryl nitroimidazoles of the formula

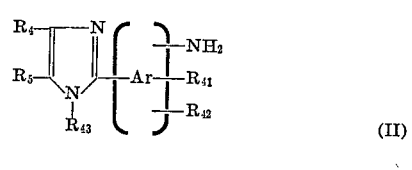

where Ar, $R_4$ and $R_5$ are as previously defined;
$R_{41}$ represents
hydrogen, halo, nitro, cyano, hydroxy, loweralkoxy, substituted loweralkoxy wherein the substituent is thiocarbamoyl or —O(CH$_2$)$_n$T where T and $n$ are as defined above,
loweralkyl,
substituted loweralkyl wherein the substituent is carboxy, or NR$_6$R$_7$ where R$_6$, R$_7$ and NR$_6$R$_7$ are as defined above,
formyl,
loweralkanoyl,
carboxy,
phenyl,
substituted phenyl wherein the substituent is halo or nitro,
amino,
substituted amino wherein the substituent is loweralkyl, diloweralkyl, loweralkanoyl, haloloweralkanoyl, L-benzoyl where L is as defined above,
substituted thio wherein the substituent is loweralkyl, loweralkylsulfonyl, loweralkylsulfoxyl,
SO$_2$NR$_6$R$_7$ where R$_6$, R$_7$ and NR$_6$R$_7$ are as defined above,
L-phenylsulfonamido where L is as defined above;

R$_{42}$ represents
hydrogen, halo, nitro, cyano, hydroxy, loweralkoxy,
substituted loweralkoxy wherein the substituent is —O(CH$_2$)$_n$T where T and $n$ are as defined above,
loweralkyl,
substituted loweralkyl wherein the substituent is loweralkanoylamino, loweralkanoyl, hydroxy, halo, carboxy, NR$_6$R$_7$,

where R$_6$, R$_7$ and NR$_6$R$_7$ are as defined above,
L-benzoylamino where L is as defined above,
formyl,
loweralkanoyl,
carboxy,
loweralkoxycarbonyl,

where R$_6$, R$_7$ and NR$_6$R$_7$ are as defined above,

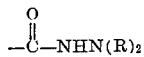

where R is hydrogen, loweralkyl, phenylloweralkyl or phenyl,
phenyl,
substituted phenyl wherein the substituent is halo or nitro,
amino,
substituted amino wherein the substituent is loweralkyl, diloweralkyl, loweralkanoyl, L-benzoyl where L is as defined above,

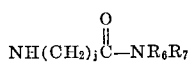

where $j$, R$_6$, R$_7$ and NR$_6$R$_7$ are as defined above,
guanidino,
mercapto,
substituted thio wherein the substituent is loweralkyl, loweralkylsulfonyl, loweralkylsulfoxyl,
sulfinyl, sulfonyl,
SO$_2$NR$_6$R$_7$ where R$_6$, R$_7$ and NR$_6$R$_7$ are as defined above,
L-phenylsulfonamido where L is as defined above,
phosphonyl,
—CH=CHJ where J is bromo or chloro; and R$_{43}$ represents
hydrogen,
loweralkyl,
substituted loweralkyl wherein the substituent is carboxy or Z-phenyl where Z represents hydrogen, nitro, halo, or loweralkyl or loweralkoxy,
formylalkyl, wherein alkyl has 1–3 carbon atoms,
(CH$_2$)$_n$X' where $n$ is as defined above and X' is
halo, hydroxy, loweralkoxy, loweralkylthio, loweralkylsulfonyl, loweralkylsulfinyl, or NR$_6$R$_7$ wherein R$_6$, R$_7$ and NR$_6$R$_7$ are as defined above,
(CH$_2$)$_m$CH=CH(CH$_2$)$_m$H wherein $m$ is as defined above, or
(CH$_2$)BC$_d$(CH$_2$)$_e$H where $d$ is 1–2, B is =O or

and $e$ is 1–4.

When the preparation of a 1-unsubstituted 2-(aminoaryl)-4-nitroimidazole of Formula II is undertaken, it is obtained from a corresponding 2-(nitroaryl)-4-nitroimidazole by treatment with hydrogen sulfide and ammonia. The reaction temperature is not critical but a reaction temperature above about 50° C. is preferred to reduce reaction time. The reaction mixture is then acidified by convenient means preferably by addition of a strong mineral acid such as hydrochloric acid. The sulfur precipitate is then removed by filtration and the product is extruded by conventional means such as by use of inert organic solvent such as ethyl acetate. When this product is then to be substituted at the 1-position, the amino group is acylated by use of a loweralkanoic acid or anhydride. The 1-substituted-2-(aminoaryl)-nitroimidazole is then conveniently obtained by hydrolyzing the acylated aminoaryl compound with a mineral acid such as hydrochloric acid. The 1-substituted and 1-unsubstituted-2-aminoaryl nitroimidazoles of Formula II above are particularly valuable as intermediates in the preparation of additional novel active nitroimidazoles, as will be seen from the following discussion.

The 2-aminoaryl-nitroimidazole is, according to this invention, converted to a corresponding 2-cyanoaryl nitroimidazole by diazotization, preferably at 0–10° C. by use of sodium nitrate and treatment of the resulting 2-diazonium aryl nitroimidazole salt with a cyanide salt. This 2-cyanoaryl nitroimidazole is converted to the corresponding thiocarbamoylaryl nitroimidazole by treatment with an amide of the formula

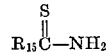

where
R$_{15}$ is as defined above. Examples of the amides useful in the above process are thioacetamide, thiopropionamide, and the like. The 2-cyanoaryl nitroimidazole is converted to the carboxamide aryl compound by standing in concentrtaed sulfuric acid overnight and pouring the mixture into ice water.

The 2-carboxamidoaryl-nitroimidazole which is obtained by the above-described procedure is converted to the corresponding 2-cyanoaryl nitroimidazole by treatment with a thionyl halide such as thionyl chloride at a temperature of about 50–200° C., preferably 80–150° C.

The 2-diazonium aryl nitroimidazole salt obtainable from the 2-aminoaryl nitroimidazole depicted by Formula II above may be converted to the corresponding phenyl or substituted phenyl diazoaryl nitroimidazole by treatment with an approriate aromatic compound, e.g., phenol or N,N-di-loweralkyl aniline. The diazonium salt may also be converted to a 2-phenyl or 2-substituted phenylaminodiazoaryl nitroimidazole by treatment with aniline or a substituted aniline such as p-fluoroaniline, o-chloroaniline, p-bromoaniline, p-methylaniline, p-isopropylaniline, and the like.

A 2-holoaryl nitroimidazole is also obtainable from the diazonium salt of the compound of Formula II by treatment with phosphorous trihalide and the like in the presence of catalyst such as cuprous bromide and cuprous chloride. When a hydrohalic acid is used in place of the phosphorous trihalide, the corresponding 2-haloaryl nitroimidazole is again prepared. The 2-diazonium aryl nitroimidazole salt is also converted to the 2-chloroethylaryl or 2-bromoethylaryl nitroimidazole by treatment with acetylene, preferably at temperatures between about 0° C. to 50° C. in the presence of cupric halide. This process is also useful in obtaining the 2-furylaryl and 2-thienylaryl nitroimidazoles by replacing acetylene with furan or thiophene, respectively.

When a 2-aminoaryl nitroimidazole of Formula II is diazotized and the diazonium salt treated with a phosphorous trihalide, such as phosphorous trichloride, in the presence of catalyst such as cuprous bromide, cuprous chloride, and the like, and the resulting product hydrolyzed, e.g. with water, there is obtained the corresponding phosphonylaryl nitroimidazole. The reaction is preferably conducted at a temperature of 60–180° C. When the phosphorous trihalide reaction product is treated with ammonium hydroxide, the 2-phosphondiamidoaryl nitroimidazole is obtained.

The 2-aminoaryl nitroimidazole earlier described is converted to the 2-formylaminoaryl nitroimidazole by treatment with formic acid at about 50–100° C. The 2-aminoaryl compound is also converted to the corresponding ureidoarylnitroimidazole by treatment with cyanate salt such as an alkali metal cyanato, e.g. potassium cyanate or sodium cyanate, at 0–100° C. Said aminoaryl nitroimidazole is also converted to the loweralkanoylaminoaryl or haloloweralkanoylaminoaryl nitroimidazole by treatment witht a compound of the formula $$CX_m'H_{3-m'}(CH_2)_n'COT$$

where T is chloro, fluoro or bromo, $n'$ is 2–6 and $m'$ is 0–3, e.g. acetylchloride, dichloroacetylchloride, trifluoroacetylchloride, chloroacetylbromide, and the like. The reaction is preferably conducted at $-10°$ to $-50°$ C.

N-methylated and N,N-dimethylated 2-aminoaryl nitroimidazoles are derived from the 2-aminoaryl compound of Formula II by treatment with formic acid and formaldehyde at 50–150° C.

The 2-aminoaryl nitroimidazoles of Formula II are converted to the corresponding 2-diloweralkylaminoaryl nitroimidazoles by treatment with a triloweralkylphosphate at a temperature of about 100–250° C.

The 2-aminoaryl nitroimidazoles may additionally be converted to the cyanamidoaryl derivatives thereof by treatment with cyanogen chloride in the presence of triloweralkylamine such as triethylamine and the like. The reaction is preferably carried out at $-10°$ C. to 30° C.

When the aminoaryl starting compound (II) is treated with a compound of the formula

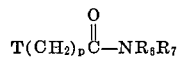

where T is halo, $p$ is 1–5, and $NR_6R_7$ and $R_6R_7$ are as defined previously, there is obtained the corresponding 2-amino or substituted amino carbonylloweralkylaminoaryl nitroimidazole. Temperatures from 20°–100° C. are conveniently employed during this reaction.

The 2-guanidinoaryl derivative of a 2-aminoaryl nitroimidazole is obtained either by treatment of the latter with a methylisothiourea salt, such as the sulfate, at temperatures from about 50–200° C. or by treating the 2-aminoaryl nitroimidazole with cyanamide at about 50°–200° C. When dicyandiamide is used in place of cyanamide, the product obtained is the corresponding 2-biguanidoaryl nitroimidazole.

When a 2-cyanoarylnitroimidazole mentioned above is treated with a hydrohalide such as hydrogen chloride, and loweralkanol such as ethanol, the hydrohalic salt of the corresponding 2-lower alkoxyiminocarbonylaryl nitroimidazole is obtained. This compound may be converted to the amidinoaryl derivative by treatment with ammonia or an amine.

When the aryl nitroimidazole diazonium salt mentioned above is treated with an alkali metal loweralkyl xanthate, the corresponding loweralkoxythiocarbonylthioaryl nitroimidazole is obtained. Reactants useful in this process include potassium methyl xanthate, sodium ethyl xanthate, and the like. The reaction is successfully carried out at cold temperatures, preferably at $-10°$ to 10° C. The above thiocarbonylthioaryl nitroimidazole may be converted to the corresponding 2-thioaryl nitroimidazole by hydrolysis with alkali metal hydroxide and neutralization with, for example, sulfuric acid.

The 2-thioaryl nitroimidazole may be converted to the corresponding 2-loweralkylthioaryl nitroimidazole by treatment with a loweralkylsulfate or sulfonate in basic medium. The reaction is conveniently carried out at room temperature. This loweralkylthioaryl nitroimidazole may be converted to two kinds of products within the scope of this invention. First, it may be converted to the corresponding loweralkylsulfoxylaryl compound by treatment with substantially a molar equivalent amount of mild oxidizing agent such as hydrogen peroxide, preferably at temperatures below room temperature. Secondly, it is converted to a loweralkylsulfonylaryl nitroimidazole by treatment with a substantial excess of mild oxidizing agent, such as hydrogen peroxide. This process is preferably conducted at about 0° C. to about room temperature. The 2-thioarylnitroimidazole, when treated with halogen such as bromine or chlorine in acidic medium, is converted to the corresponding sulfonyl halide which, when hydrolyzed, such as by treatment with base and strong acid, is converted to the 2-sulfonylaryl nitroimidazole.

According to the present invention, it has now been found that 2-sulfonamidoaryl-4-nitroimidazole is prepared from 2-aryl-4-nitroimidazole by treating the latter with chlorosulfonic acid at a temperature preferably above room temperature for a time greater than about 24 hours to get the chlorosulfonylaryl nitroimidazole intermediate. This intermediate is also obtained from the 2-diazoniumaryl nitroimidazole salt by treatment with sulfur dioxide and copper chloride at a temperature preferably of about 0° C. to 100° C. The chlorosulfonylaryl intermediate is then treated with a source of ammonia, at a temperature of about $-30°$ C. to about 100° C., preferably about 0° C. to about 10° C. to obtain the desired 2-sulfonamidoaryl-4-nitroimidazole. Ammonium hydroxide, anhydrous ammonia and the like, preferably ammonium hydroxide are useful to supply the necessary ammonia. The use of loweralkyl substituted amines, e.g. dimethylamine or secondary amines such as morpholine, in place of an ammonia source give the corresponding 2-substituted sulfonylaminoaryl-4-nitroimidazole.

The phenyl or substituted phenylsulfonylaminoarylnitroimidazoles of this invention are prepared by treating the aminoarylnitroimidazole with a benzenesulfonyl halide or an appropriately substituted benzenesulfonylhalide such as p-toluene sulfonylchloride, o-chlorobenzene sulfonylchloride, p-nitrobenzene sulfonylchloride, and the like. The reaction is preferably conducted at temperatures of about $-10°$ to about 10° C. in solvents such as pyridine, dimethylformamide and the like. Corresponding loweralkylsulfonylaminoaryl compounds are prepared from the loweralkylsulfonyl halide.

When the above described phenyl or substituted phenyl sulfonylaminoaryl nitroimidazoles are treated with diloweralkylsulfate or halide, the corresponding phenyl or substituted phenyl sulfonyl N-loweralkylaminoarylnitroimidazole is obtained. This reaction is preferably carried out at 50–200° C. in the presence of a strong base such as an alkali metal hydroxide. This compound is then converted to the loweralkylaminoaryl nitroimidazole by hydrolysis with strong mineral acid, e.g. sulfuric acid.

The 2-diazonium arylnitroimidazole salt discussed above is also converted to the corresponding thiocyanate by treatment with an alkali metal thiocyanate such as potassium or sodium thiocyanate in the presence of cuprous thiocyanate. The reaction is preferably performed below room temperature over a period of several hours.

The diazonium salt is converted to a thiocarbamoylthioarylnitroimidazole or an N-substituted thiocarbamoylthioarylnitroimidazole by treatment with an appropriate alkali metal dithiocarbamate such as sodium dithiocarbamate, potassium dithiocarbamate, sodium-N,N-diethyldithiocarbamate and the like. The reaction is preferably conducted at between −10° and 10° C.

An additional method for obtaining the thiocarbamoylthioarylnitroimidazoles is by treating a thioaryl nitroimidazole with thiophosgene and treating the intermediate with ammonia or a primary or secondary amine such as ethylamine, dimethylamine, morpholine, piperidine, pyrrolidine, and the like. The preferred reaction temperature is near room temperature for both steps of the reaction but lower temperatures may be used, particularly during the thiophosgene reaction. A still further method for obtaining the loweralkylthiocarbamoylthioarylnitroimidazoles is by treating the corresponding thioarylnitroimidazole with a loweralkylisothiocyanate at about 50°–180° C. for about 1–20 hours in a suitable solvent.

The diazonium 2-aryl nitroimidazole salt (usually the sulfate), a derivative of the 2-aminoarylnitroimidazole of Formula II above, is converted to the corresponding 2-hydroxyaryl nitroimidazole by heating an aqueous solution at a temperature above 50° C. and preferably below 200° C. This 2-hydroxyaryl nitroimidazole having the formula

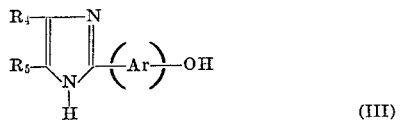

(III)

where Ar, $R_4$ and $R_5$ are as previously defined and the 1-position and the Ar group may be substituted further, is then converted to the loweralkoxyaryl derivative by treatment with the appropriate loweralkylating agent such as diazoloweralkane such as diazomethane, diazoethane, and the like or by treating the sodium salt of the 2-hydroxyaryl derivative with an alkyl sulfate or halide at room temperature. This diazoalkane process is conducted below room temperature and preferably at between −10° to about 10° C. Said hydroxyaryl nitroimidazole of Formula III is also converted to the corresponding 2-cyanatoaryl nitroimidazole by treatment with a cyanogen halide such as cyanogen chloride, preferably at temperatures of about −15° to about 15° C. When this 2-cyanatoaryl nitroimidazole is treated with aniline or an aniline substituted with a halo, loweralkyl or nitro group, the corresponding phenyl or substituted phenyl pseudoureidoaryl nitroimidazole is obtained. The reaction is preferably carried out between 0–100° C. The 2-hydroxypseudoureidoaryl nitroimidazole is obtainable from the 2-cyanatoaryl compound by treatment at about −10° to about 15° C. with hydroxylamine.

The 2-hydroxyarylnitroimidazole of Formula III above is also converted to its corresponding 2-loweralkylcarbamoyloxyaryl nitroimidazole by treatment in solvent at less than room temperature, preferably −10° to 10° C., with a loweralkylisocyanate. The corresponding thiocarbamoyl compound is obtained by using an appropriate loweralkylisothiocyanate. Said hydroxyaryl nitroimidazole is converted to a carbamoyl or thiocarbamoylloweralkoxyarylnitroimidazole derivative by treatment with a halo-loweralkanoylamide or halothioloweralkanoylamide such as chloroacetamide and the like at a temperature of about 0°–100° C. in the presence of a base such as sodium hydroxide.

The 2-carboxyaryl nitroimidazoles of this invention are obtained by treating a corresponding 2-methylaryl nitroimidazole with an oxidizing agent such as an alkali metal dichromate or permangonate such as potassium dichromate, sodium dichromate or potassium permangonate and strong acid, preferably a strong mineral acid such as sulfuric acid, hydrochloric acid, phosphoric acid, and the like. The reaction is preferably carried out between room temperature and 150° C. Chromium oxide in acetic acid may also be used. This carboxylaryl product is converted to the corresponding carboxamide by conversion to the acid halide by use of a halogenating agent such as thionylchloride, oxalyl chloride and the like, and treating said carboxylic acid halide with ammonia or the appropriate primary or secondary amide to obtain the corresponding carboxamide. Amines useful in this process include methylamine, dimethylamine, diethylamine, morpholine, piperidine, pyrrolidine, and the like. The halogenating step is performed at temperatures of about 50–200° C. whereas the aminating step is conveniently carried out at generally lower temperatures, e.g. room temperature. When hydrazine is used in place of ammonia in the above described process, the 2-carboxyhydrazidoarylnitroimidazole is obtained.

The 2-carboxamidoarylnitroimidazole described above is converted to the 2-carboxyarylnitroimidazole by hydrolysis with strong acid such as mineral acid, e.g. hydrochloric acid and sulfuric acid, at temperatures above room temperature.

When a methylaryl nitroimidazole is treated with a loweralkanoic anhydride in the presence of the oxidizing agent, chromium oxide, the corresponding 2-diloweralkanoylmethylarylnitroimidazole, is obtained. The reaction is preferably performed at a temperature of −20° to 15° C. This product is then converted to the corresponding formylaryl nitroimidazole by hydrolysis with strong acid, preferably strong mineral acid such as hydrochloric or sulfuric acids. The 2-loweralkanoylaryl and 2-formylaryl nitroimidazoles prepared according to the above described procedures may be represented by the formula

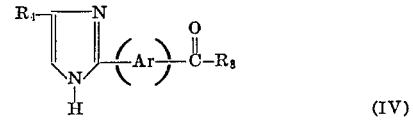

(IV)

where Ar, $R_4$, $R_5$ and $R_8$ are as earlier defined and the 1-position and the aromatic moiety on the nitroimidazole may be further substituted.

The 2-formylaryl and 2-loweralkanoylaryl nitroimidazoles of Formula IV are particularly valuable as intermediates in the preparation of additional novel nitroimidazoles of this invention.

Additional compounds of our invention are obtained by reaction of the novel 2-formylaryl or 2-loweralkanoylarylnitroimidazoles of Formula IV with hydroxylamine or alkoxylamine and the substituent on the aryl moiety may be represented by the structural formula

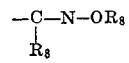

where $R_8$ above is hydrogen or loweralkyl. These nitroimidazoles are produced by reacting together a 2-formylaryl or 2-loweralkanoylaryl nitroimidazole of Formula IV above with hydroxylamine or alkoxylamine. These reagents are normally used in the form of acid addition salts, with the hydrohalide salts, and in particular the hydrochloride being preferred. Formation of the desired product takes place rapidly at temperatures in the range of 40–85° C.

An additional type of aldehyde and ketone derivative within the scope of this invention is those having the following group on the aryl moiety:

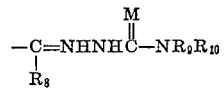

where $R_8$, $R_9$ and $R_{10}$ are as defined above and M is oxygen,, sulfur or =NH. These compounds are obtained by the reaction of the aldehydes and ketones described in Formula IV and a semicarbazide having the formula

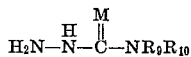

where M, $R_9$, $R_{10}$ and $NR_9R_{10}$ are as defined above. The reaction is preferably conducted at about 50°–90° C.

A further group of 2-formylaryl and 2-alkanoylaryl nitroimidazole derivatives provided by the present invention are those having the following substituent on the aryl group

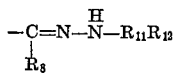

where $R_8$ has the same meaning as above and $N-R_{11}R_{12}$ may be a 5- or 6-membered saturated heterocyclic ring in which the nitrogen is in the ring, while $R_{11}$ and $R_{12}$ together represent the remainder of the ring. Examples of compounds of this type are those where $-NR_{11}R_{12}$ represents a morpholinyl, thiamorpholinyl, piperidyl, piperazinyl, oxazolidinyl or imidazolidinyl ring, which rings may be substituted as with alkyl, or keto radicals. Those compounds where $-NR_{11}R_{12}$ is a 2-oxo-oxaolidinyl or 2-oxo-imidazolidinyl moiety represent preferred embodiments of this aspect of the invention. Alternatively, $R_{11}$ and $R_{12}$ may be hydrogen, loweralkyl, phenyl, nitrophenyl, halophenyl, thiazolyl, pyridinyl, imidazolyl, thienyl, pyrimidinyl, loweralkanoyl, benzoyl nitrobenzoyl, halobenzoyl, loweralkoxycarbonyl, thiazolecarbonyl, pyridinecarbonyl, imidazolecarbonyl, thenoyl, or pyrimidinecarbonyl. The reaction for obtaining these compounds is between an aldehyde or ketone and a compound of the formula

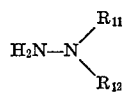

where $R_{11}$ and $R_{12}$ are as described above. The products are obtained in from 5–60 minutes at temperatures of about 20–100° C. It is preferred to use a moderate excess of the amine reactant, from 3–25% excess being satisfactory, and to carry out the reaction in a solvent such as a loweralkanol or an aqueous alkanol in the presence of a catalytic amount of mineral acid.

The 2-formaylaryl nitroimidazoles of Formula IV are also converted to the corresponding hydroxymethylaryl nitroimidazole. This is accomplished by treatment with a mild reducing agent such as alkali metal borohydride, e.g. sodium borohydride or potassium borohydride, diborane and the like.

When the 2-hydroxyloweralkylaryl nitroimidazole described above is treated with halogenating agent such as thionyl halide, e.g. thionyl chloride, and then cyanide salt or ion, it is readily converted to the corresponding 2-cyanoloweralkylaryl nitroimidazole. This reaction is conveniently carried out at room temperature. The corresponding carboxamidoloweralkylaryl nitroimidazole is obtained upon hydrolysis with strong mineral acid such as hydrochloric acid, sulfuric acid and the like. Depending upon the strength of the acid, the time of hydrolysis and the temperature at which hydrolysis is conducted, the 2-carboxyloweralkylaryl nitroimidaozle also is obtained by this process.

The intermediate formed upon treatment of the hydroxyloweralkylaryl nitroimidazole with thionyl halide is the haloloweralkylaryl nitroimidazole. This compound is converted to the aminoloweralkylaryl nitroimidazole by treatment with an alkali metal phthalimide such as potassium phthalimide, and reaction of the product with hydrazine. Both steps of this process may be carried out conveniently at room temperature.

A 2-hydroxyloweralkylaryl nitroimidazole derived from a 2-carboxyloweralkylaryl nitroimidazole is obtainable by treating the latter with a mild reducing agent such as diborane in ether solvent such as tetrahydrofuran or 1,2-dimethoxyethane. The reduction is conveniently carried out at room temperature.

This 2-hydroxyloweralkylaryl nitroimidazole is converted to the corresponding substituted aminoloweralkylaryl nitroimidazole by treatment in solvent with halogenating agent such as thionyl cholride, and the appropriate primary or secondary amine, e.g. ethylamine, diethylamine, morpholine, pyrrolidine, and the like. The temperature of the reaction is preferably maintained at about 0–100° C. This procedure provides nitroimidazole having at the 2-position a substituted loweralkyl group, the substituent on the loweralkyl group being represented by the formula $$N(R_{19})_2$$

where $R_{19}$ and $N(R_{19})_2$ are as earlier defined.

The hydroxyloweralkylaryl nitroimidazoles described earlier are converted to nitroimidazoles substituted on the aryl group at the 2-position by a radical represented by the structure

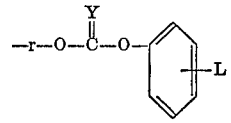

where $r$ is loweralkalene, and L and Y are as earlier defined by treating said hydroxyloweralkylaryl nitroimidazole with a phenyl or substituted phenyl haloformate such as phenylchloroformate, p - nitrophenylchloroformate, o-chlorophenylchloroformate or a corresponding thioformate, and the like. The reaction is preferably maintained at least than ambient temperature, e.g. $-10°$ to $10°$ C. This product is in turn converted to the corresponding 2-carbamoyloxyloweralkylaryl nitroimidazole or thiocarbamoyloxyloweralkylaryl nitroimidazole by treatment with ammonia or an appropriate primary or secondary amine, such as ethylamine, dimethylamine, morpholine, pyrrolidine, piperidine or hydroxylamine and the like. The reaction is preferably carried out at a temperature of $-20°$ to $50°$ C.

When a 2-trifluoromethylaryl nitroimidazole is desired, the compound is preparable from the corresponding 2-carboxyaryl or 2-carboxyloweralkyl compound by treatment with sulfur tetrafluoride in the presence of liquid anhydrous hydrogen fluoride at 70–200° C. under pressure (e.g. in an autoclave). The corresponding 2-trichloromethylaryl nitroimidazole is obtained from the 2-loweralkylaryl compound by treatment with N-chlorosuccinimide in trifluoroacetic acid.

Those 2-aryl imidazoles employed as starting materials in the present invention may be prepared according to synthetic methods presently known in the literature. One method for preparing those compounds involves reaction of an appropriately substituted aromatic nitrile such as benzonitrile with a loweralkanol and a strong mineral acid. This reaction is preferably conducted at about 0–10° C. for up to about 14 days depending on the reactants used. The resulting product, a loweralkyl aryl imidate hydrochloride, is then treated with an amino acetaldehyde acetal in a suitable solvent, preferably a loweralkanol such as methanol at temperatures ranging from about 0° C. to room temperature. These temperatures are determined according to the particular reactants used. This reaction may be generally represented as follows:

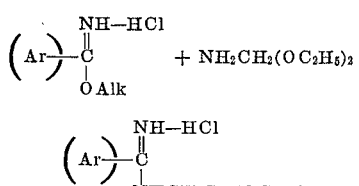

Treatment of the resulting amidine with acid such as a concentrated mineral acid and then with a base such as a lower alkali or a lower alkaline earth metal hydroxide produces the 2-aryl imidazole desired.

As an additional aspect of the invention, it has now been found that compounds having the general Formula V below are prepared from aromatic starting materials having two ortho positioned cyano groups.

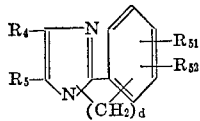

(V)

where Ar, $R_4$ and $R_5$ are as defined above;
$R_{51}$ represents
hydrogen, halo, nitro, cyano, loweralkoxy, loweralkyl,

where $R_6$, $R_7$ and $NR_6R_7$ are as defined above,
$SO_2N(R_{19})_2$ where $R_{19}$ and $N(R_{19})_2$ are as defined above; and $R_{52}$ represents hydrogen, halo, nitro, cyano, loweralkoxy, loweralkyl,
formyl,
loweralkanoyl,
carboxy,

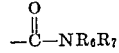

where $R_6$, $R_7$ and $NR_6R_7$ are as defined above,
phenyl,
substituted amino wherein the substituent is loweralkanoyl, L-benzoyl where L is as defined above,
substituted thio wherein the substituent is loweralkyl, loweralkylsulfonyl, loweralkylsulfonyl,
$SO_2N(R_{19})_2$ where $R_{19}$ and $N(R_{19})_2$ are as defined above.

The first step in preparing the above compounds involves reaction with a loweralkanol and hydrogen chloride. The reaction is preferably conducted at about 0–10° C. The resulting product is a loweralkyl o-cyanoaryl imidate hydrochloride which is then treated with amino acetal in solvent, preferably a loweralkanol such as methanol. The temperature is not critical but room temperature is preferred. The resulting o-cyanoaryl amidine is then converted to the corresponding 2-(o-carboxyaryl) imidazole by treatment with a strong acid, preferably concentrated mineral acid such as sulfuric acid. This product is then nitrated on the imidazole ring using a nitrating agent such as fuming nitric acid in a mineral acid, preferably sulfuric acid. The process conditions are like those previously described for the nitric acid-sulfuric acid nitration. The carboxylic acid on the substituent is then reduced to hydroxymethyl by the use of a selective reducing agent such as diborane. Treatment of the 2-(2'-hydroxymethylaryl)-4-nitroimidazole product with a halogenating agent such as thionyl chloride produces a 2-(2'-halomethylaryl)-4-nitroimidazole which is then converted to the desired isoindole by heating at about 100° C. to 160° C. for about 1–30 minutes. Addition of a cyano substituent to the 2-halomethylaryl nitroimidazole intermediate according to procedures established in the art and further treatment according to the method above described produces 2 - (2' - haloethylaryl) - 4 - nitroimidazole which upon cyclization gives a corresponding dihydroisoquinoline.

As illustrative of some of the isoindoles and dihydroisoquinolines preparable according to the above procedure, there may be mentioned 3-nitro-7(or 8)-fluoroimidazo-[2,1:a]-isoindole,
3-nitro-7(or 8)-chloroimidazo-[2,1:a]-isoindole,
3,7(or 8)-dinitroimidazo-[2,1:a]-isoindole,
3-nitroimidazo-[2,1:a]-isoindole,
3-nitro-7(or 8)-carboxamidoimidazo-[2,1:a]-isoindole,
3-nitro-7(or 8)-formylimidazo-[2,1:a]-isoindole,
3nitro-7(or 8)-methylimidazo-[2,1:a]-isoindole,
3-nitro-7(or 8)-sulfonamidoimidazo-[2,1:a]-isoindole,
3-nitro-5,6-dihydroimidazo-[2,1:a]-isoquinoline,
3-nitro-5,6-dihydro-8(or 9)-fluoroimidazo-[2,1:a]-isoquinoline,
3-nitro-5,6-dihydro-8(or 9)-nitroimidazo-[2,1:a]-isoquinoline, and
3-nitro-5,6-dihydro-8(or 9)-phenylimidazo-[2,1:a]-isoquinoline.

The 1 - substituted - 2 - aryl-5-nitroimidazoles, 1-substituted-2-aryl-4-nitroimidazoles, and structurally related isoindoles and dihydroisoquinolines of this invention are effective in the control of enterohepatitis in turkeys. For this purpose they may be administered to turkeys mixed with an element of turkey sustenance, e.g. feed or drinking water. Good control of the disease is obtained when the imidazole compounds of the invention are incorporated in a turkey feed ration at levels of from about 0.003% to about 0.1% by weight and preferably from about 0.006% to 0.05% by weight of the feed. The optimum concentration will depend to a large extent on the age of the birds, the severity of the infection and the particular compound employed. With these feed levels good control of the disease is obtained with no or minimal side effects or growth retardation of the turkeys.

When the poultry feed or poultry ration is employed as carrier for the active compounds of the present invention, it is desired that the drug be uniformly mixed throughout the feed. This may be accomplished by first preparing a premix or feed supplement composition wherein the active ingredient is present in concentrations of from about 1% to about 50% by weight and wherein the carrier or diluent is a nontoxic orally ingestible carrier. It is preferred that the carrier be a nutritive one, for example corn distillers dried grains, corn gluten feed, corn cob meal, edible vegetable substances, condensed fish solubles, brewers yeast, whey, alfalfa, citrus meal, molasses solubles, soybean mill feed, antibiotic mycelia, toasted dehulled soya flour, soya grits, wheat shorts, wheat middlings, soybean meal, fermentation residues or corn meal. The supplements or premixes are then intimately and uniformly mixed with the remainder of the poultry ration by conventional techniques such as grinding or milling.

When the active compounds are administered by way of drinking water of the poultry which method is preferred when the birds are severely infected (the birds will normally continue to drink after they have stopped eating solid food), somewhat higher dose levels are employed than when administered with solid feed. The quantities of active agent which are useful are those in which from about 0.01% to about 0.1% by weight of water are utilized. Some of the nitroimidazoles of the invention are not highly water soluble and when such compounds are added to drinking water it is desirable that suspending or emulsifying agents also be used to render the compound more effective in such form. A water soluble form of the drug may be utilized in a similar fashion.

The feed levels at which representative members of the compounds of the invention are active in controlling histomoniasis in turkeys are as follows:

| Compound: | Percent by weight in feed |
|---|---|
| 1-methyl-2-phenyl-5-nitroimidazole | .025 |
| 1-methyl-2-(2'-nitrophenyl)-5-nitroimidazole | .0125 |
| 1-methyl-2-(3'-nitrophenyl)-5-nitroimidazole | .0125 |
| 1-methyl-2-(4'-nitrophenyl)-5-nitroimidazole | .006 |

| Compound: | |
|---|---|
| 1-methyl-2-(4'-chlorophenyl)-5-nitroimidazole | .025 |
| 1-methyl-2-(4'-aminophenyl)-5-nitroimidazole | .025 |
| 1-methyl-2-(3'-sulfonamidophenyl)-5-nitroimidazole | .025 |
| 1-methyl-2-(4'-fluorophenyl)-5-nitroimidazole | .006 |
| 1-methyl-2-(3',5'-dinitrophenyl)-5-nitroimidazole | .025 |

As previously stated, the 1-substituted -2-aryl-5-nitroimidazoles, 1-substituted - 2 - aryl-4-nitroimidazoles, and structurally related isoindoles and dihydroisoquinolines described herein also have a significant degree of antitrichomonal activity. When employed in treating trichomoniasis, they may be administered orally in unit dosage form, for instance as tablets or capsules. Such unit dosage forms containing from about 100 to about 500 mg. of active antitrichomonal ingredient are quite satisfactory and are prepared by techniques known to those skilled in the pharmaceutical art. Thus, these unit dosage forms will contain the normal diluents, excipients, lubricating agents and extenders regularly employed in compounding such forms.

Alternatively, the drugs may be suspended or dissolved in liquid vehicles designed for oral administration. The final preparation may be in the form of a solution, emulsion, suspension, syrup or the like and may be adapted for ultimate use by known methods with conventional excipients, diluents, wetting agents or other additives.

The 1-substituted-2-aryl-5(or 4)-nitroimidazoles of the present invention are also useful as topical trichomonacides. When employing the compounds in this manner, one or more of the active agents are uniformly distributed in a suitable chemotherapeutic vehicle that is chemically compatible with the particular compound selected, noninhibiting with respect to the action of the effective agent upon *Trichomonas vaginalis* and essentially noninjurious to body tissue under the conditions of use. The vehicle is preferably a semi-liquid or semi-solid type and the final preparation may be in the form of a suppository, if desired.

Oil and water types of emulsions or creams as well as aqueous jellies such as those prepared with the aid of any of a number of commercially used jelling agents including acacia, tragacanth, bentonite, alginic acid and the like are suitable vehicles. The vehicle may also be a viscous aqueous jell containing one or more cellulose derivatives such as methyl cellulose, hydroxyethyl cellulose, and sodium carboxy methyl cellulose. Jelling agents such as pectin, gum tragacanth, sodium alginate and other vegetable jelling agents are also useful vehicles in this regard.

The compounds preferred for use against *T. vaginalis* vaginitis are set forth below. The activity indicated is that displayed in vivo in mice infested with the protozoal infection. Activity is expressed in terms of mg./kg. as determined by the method described in Cuckler, Kupferberg and Millman, "Chemotherapeutic and Tolerance Studies on Amino-nitro Thiazoles," Antibiotics & Chemotherapy, 10, 540–550, 1955.

| Compound: | Activity (mg./kg.) |
|---|---|
| 1-methyl-2-phenyl-5-nitroimidazole | 40 |
| 1-methyl-2-(2'-nitrophenyl)-5-nitroimidazole | 10 |
| 1-methyl-2-(3'-nitrophenyl)-5-nitroimidazole | 10 |
| 1-methyl-2-(4'-nitrophenyl)-5-nitroimidazole | 20 |
| 1-methyl-2-(4'-chlorophenyl)-5-nitroimidazole | 20 |
| 1-methyl-2-(4'-aminophenyl)-5-nitroimidazole | 60 |
| 1-methyl-2-(3'-sulfonamidophenyl) - 5 - nitroimidazole | 40 |
| 1,N',N'-trimethyl - 2 - (4'-sulfonamidophenyl)-5-nitroimidazole | 40 |
| 1 - methyl - 2 - (2',4' - dinitrophenyl))-5-nitroimidazole | 100 |
| 1-methyl-2-(4'-fluorophenyl)-5-nitroimidazole | 5 |
| 1-methyl-2-(4'-carboxamidophenyl) - 5 - nitroimidazole | 10 |
| 1 - methyl-2-(3',4'-dichlorophenyl) - 5 - nitroimidazole | 33 |
| 1-(2'-hydroxyethyl) - 2 - (4'-fluorophenyl) - 5-nitroimidazole | 15 |
| 1-methyl-2-(4'-fluorophenyl)-4-nitroimidazole | 20 |
| 3-nitroimidazo-[2,1:a]-isoindole | 20 |
| 3,7(or 8)-dinitroimidazo-[2,1:a]-isoindole | 20 |
| 1-methyl-2-(4'-cyanophenyl)-5-nitroimidazole | 5 |

The following examples are given for the purpose of illustration and not by way of limitation.

EXAMPLE 1

2-(4'-fluorophenyl)-4-nitroimidazole

To 1 l. of ethanol saturated with hydrogen chloride is added 75 gm. of p-fluorobenzonitrile. The resulting solution is allowed to stand overnight in an ice bath. The ethanol is then evaporated in vacuo giving ethyl-4-fluorobenzimidate hydrochloride.

To 10 gm. of the imino ether in 10 ml. of methanol is added 6.65 gm. of amino acetaldehyde diethyl acetal in 10 ml. of methanol. The resulting solution is allowed to stand at room temperature for 24 hours and is then evaporated in vacuo. Concentrated sulfuric acid (14.5 gm.) is added dropwise with stirring to the oil residue in an ice bath. The mixture is slowly warmed to room temperature and then quenched over ice and concentrated sodium hydroxide. The mixture is then extracted with chloroform and evaporated. The residue is dissolved in hot benzene and treated with charcoal and evaporated to dryness. The oily residue is dissolved in acetone, treated with charcoal, filtered while warm and evaporated to a small volume. Benzene is then added and evaporated and the residue is cooled on ice giving crystals of 2-(4'-fluorophenyl)-imidazole; M.P. 196–198° C.

6 gm. of 2-(4'-fluorophenyl)-imidazole is added to 1.7 ml. of concentrated nitric acid in 75 ml. of acetic anhydride in an ice bath. The reaction mixture is warmed over steam for 30 minutes, poured over crushed ice and the resulting solid is filtered. Recrystallization from acetone-ether gives 2-(4'-fluorophenyl) - 4 - nitroimidazole; M.P. 224–225° C.

When the above process is carried out using acetic acid in place of acetic anhydride, the corresponding 4-nitroimidazole is obtained.

When the above process is carried out and 2-(3'-ethoxyphenyl)-imidazole, 2-(4'-fluoroethoxyphenyl) - imidazole, or 2-(4'-carbamoylmethoxyphenyl)-imidazole is used in place of 2-(4'-fluorophenyl)-imidazole, there is obtained 2-(3'-ethoxyphenyl)-4-nitroimidazole, 2-(4'-fluoroethoxyphenyl)-4-nitroimidazole, or 2-(4' - carbamoylmethoxyphenyl)-4-nitroimidazole, respectively.

When the above process is carried out and 2-(4'-cyanophenyl)-imidazole or 2-(4'-phosphonylphenyl)-imidazole is used in place of 2-(4'-fluorophenyl)-imidazole, there is obtained 2-(4'-cyanophenyl)-4-nitroimidazole or 2 - (4'-phosphonylphenyl)-4-nitroimidazole, respectively.

When the above process is carried out using 2-(3'-fluorophenyl)-imidazole in place of 2-(4'-fluorophenyl)-imidazole, there is obtained 2-(3'-fluorophenyl)-4-nitroimidazole.

EXAMPLE 2

1-methyl-2-(4'-fluorophenyl)-5-nitroimidazole

A sample of 4 gm. of 2-(4'-fluorophenyl)-4-nitroimidazole is dissolved in 200 ml. of warm 1,2-dimethoxy ethane, treated with charcoal, filtered and cooled in an ice bath. Excess ethereal diazomethane (130 ml.) is added in small portions and the reaction mixture is allowed to cool for two hours. The excess diazomethane is boiled off in a fume hood and the solution is then evaporated to near dryness in vacuo. The residue is recrystallized from acetone-ether to give 1-methyl - 2 - (4'-fluorophenyl)-5-nitroimidazole; M.P. 166–167° C.

When the above process is carried out and 2-(3'-ethoxyphenyl)-4-nitroimidazole, 2-(4'-fluoroethoxyphenyl) - 4-nitroimidazole, 2 - (4'-carbamoylmethoxyphenyl)-4-nitroimidazole, or 2 - (4' - thiocarbamoylmethoxyphenyl)-4-nitroimidazole is used in place of 2-(4'-fluorophenyl)-4-nitroimidazole, there is obtained 1-methyl-2-(3'-ethoxyphenyl)-5-nitroimidazole, 1-methyl - 2 - (4'-fluoroethoxyphenyl)-5-nitroimidazole, 1 - methyl-2-(4'-carbamoylmethoxyphenyl)-5-nitroimidazole, or 1-methyl-2-(4'-thiocarbamoylmethoxyphenyl)-5-nitroimidazole, respectively.

When the above process is carried out and 2-(4'-cyanophenyl)-4-nitroimidazole or 2-(4'-phosphondiamidophenyl)-4-nitroimidazole is used in place of 2-(4'-fluorophenyl)-4-nitroimidazole, there is obtained 1-methyl-2-(4'-cyanophenyl)-5-nitroimidazole or 1-methyl - 2 - (4'-phosphondiamidophenyl)-5-nitroimidazole, respectively.

When 2-(3'-fluorophenyl)-4-nitroimidazole is used in the above process in place of 2-(4'-fluorophenyl)-4-nitroimidazole, there is obtained 1-methyl-2-(3'-fluorophenyl)-5-nitroimidazole.

EXAMPLE 3

2-(4'-chlorophenyl)-4-nitroimidazole

A solution of 15 ml. of p-chlorobenzaldehyde and 40 ml. of 30% aqueous glyoxal in 50 ml. of methanol is stirred during the addition of 150 ml. of concentrated ammonium hydroxide. The reaction mixture is allowed to stand at room temperature overnight. The methanol is then evaporated in vacuo and the reaction mixture made slightly alkaline by the addition of sodium hydroxide. The reaction mixture is then extracted with ethyl acetate and the ethyl acetate extracts are evaporated in vacuo. The residue is dissolved in methanol and the solution is evaporated to give 2-(4'-chlorophenyl)-imidazole which melts at 248–249° C.

A 1.78 gm. sample of 2-(4'-chlorophenyl)-imidazole is added in small portions to a well-stirred solution of 0.41 ml. of 30% fuming nitric acid in 5 ml. of 30% fuming sulfuric acid. The reaction mixture is warmed over steam for 30 minutes, cooled and poured over crushed ice. The product is isolated, washed with water and recrystallized from ethyl-acetate giving 2 - (4'-chlorophenyl)-4-nitroimidazole; M.P. 264–265° C.

When the above process is carried out and 2-(4'-cyanophenyl)-imidazole or 2-(4'-phosphonylphenyl)-imidazole is used in place of 2-(4'-chlorophenyl)-imidazole, there is obtained 2-(4'-cyanophenyl)-4-nitroimidazole or 2-(4'-phosphonylphenyl)-4-nitroimidazole, respectively.

When the above process is carried out using 2-(3'-fluorophenyl)-imidazole in place of 2 - (4' - chlorophenyl)-imidazole, there is obtained 2-(3'-fluorophenyl-4-nitroimidazole.

EXAMPLE 4

1-methyl-2-(4'-chlorophenyl)-5-nitroimidazole

A mixture of 4.46 gm. of 2-(4'-chlorophenyl)-4-nitroimidazole and 2 ml. of dimethyl sulfate is heated for 35 minutes at 155–160° C. The mixture is cooled and agitated in a mixture of 500 ml. of 0.5 N sodium hydroxide and 500 ml. of chloroform. The chloroform layer is washed with water, dried over sodium sulfate and concentrated to a residue. This residue is recrystallized from ethyl acetate to give 1-methyl-2-(4'-chlorophenyl)-5-nitroimidazole; M.P. 137–138° C.

When the above process is carried out and 2-(3'-ethoxyphenyl)-4-nitroimidazole or 2 - (4' - carbamoylmethoxyphenyl)-4-nitroimidazole is used in place of 2-(4'-chlorophenyl)-4-nitroimidazole, there is obtained 1-methyl-2-(3'-ethoxyphenyl)-5-nitroimidazole or 1-methyl-2-(4'-carbamoylmethoxyphenyl)-5-nitroimidazole, respectively.

When the above process is carried out and 2-(4'-cyanophenyl)-4-nitroimidazole is used in place of 2-(4'-chlorophenyl)-4-nitroimidazole, there is obtained 1-methyl-2-(4'-cyanophenyl)-5-nitroimidazole.

When 2-(3'-fluorophenyl)-4-nitroimidazole is used in the above process in place of 2-(4'-chlorophenyl)-4-nitroimidazole, there is obtained 1-methyl-2-(3'-fluorophenyl)-5-nitroimidazole.

EXAMPLE 5

1-methyl-2-(4'-fluorophenyl)-4-nitroimidazole 1.2 gm. of 2-(4'-fluorophenyl)-4-nitroimidazole is dissolved in 50 ml. of dry 1,2-dimethoxy ethane. 0.180 gm. of 52% sodium hydride is washed with ether to remove the mineral oil and then is added in small portions to the solution. 0.630 ml. (30% excess) of dimethylsulfate is introduced and the solution is refluxed for 3 hours. The solution is then cooled and evaporated in vacuo to about 10 ml. The residue is diluted with 50 ml. cold water and the resulting suspension is extracted with three 150 ml. portions of chloroform. The chloroform extracts are washed with a small amount of water and dried over sodium sulfate. After filtering off the drying agent, the chloroform is evaporated in vacuo and the crystalline residue is recrystallized from chloroform. A second recrystallization from chloroform affords 1-methyl-2-(4'-fluorophenyl)-4-nitroimidazole; M.P. 187–188° C.

When the above process is carried out and 2-(3-ethoxyphenyl)-4-nitroimidazole or 2-(2'-carbamoylmethoxyphenyl)-4-nitroimidazole is used in place of 2-(4'-fluorophenyl)-4-nitroimidazole, there is obtained 1-methyl-2-(3-ethoxyphenyl) - 4 - nitroimidazole or 1-methyl-2-(2'-carbamoylmethoxyphenyl)-4-nitroimidazole, respectively.

When the above process is carried out and 2-(4'-cyanophenyl)-4-nitroimidazole or 2-(4'-phosphondiamidophenyl)-4-nitroimidazole is used in place of 2-(4'-fluorophenyl)-4-nitroimidazole, there is obtained 1-methyl-2-(4'-cyanophenyl) - 4 - nitroimidazole or 1-methyl-2-(4'-phosphondiamidophenyl)-4-nitroimidazole, respectively.

When 2-(3'-fluorophenyl)-4-nitroimidazole or 2-(4'-fluorophenyl)-4-nitroimidazole is used in the above process in place of 2-(4'-fluorophenyl)-4-nitroimidazole, there is obtained 1-methyl-2-(3'-fluorophenyl)-4-nitroimidazole or 1-methyl-2-(4'-fluorophenyl)-4-nitroimidazole, respectively.

EXAMPLE 6

2-(3',4'-dichlorophenyl)-4-nitroimidazole 365 gm. of 3,4-dichlorobenzamide is refluxed for 48 hours with 2 l. of 50% thionyl chloride in benzene. The benzene-thionyl chloride mixture is then distilled off, additional benzene is added and the solution is evaporated. The resulting 3,4-dichlorobenzonitrile is dissolved in 1.5 l. of absolute ethanol and the solution is added to 4.5 l. of absolute ethanol saturated with hydrogen chloride. The resulting solution is maintained at about 5° C. for 9 days and is then evaporated in vacuo to a small volume. The residue is poured into ether, cooled, filtered and washed with ether giving ethyl-3,4-dichlorobenzimidate hydrochloride; M.P. 117–118° C.

The above benzimidate is dissolved in 125 ml. of methanol. 66 gm. of amino acetaldehyde diethyl acetal in 125 ml. of methanol is added with stirring in an ice bath. The reaction mixture is allowed to stand at room temperature for 24 hours and after removal of solvent is treated with concentrated sulfuric acid. The reaction mixture is poured into 11.7 N sodium hydroxide and ice. The crystals formed are dissolved in acetone and the solution is evaporated giving 2-(3',4'-dichlorophenyl)-imidazole; M.P. 198–199° C.

1 gm. of 2-(3',4'-dichlorophenyl)-imidazole is dissolved in 10 ml. of acetic anhydride containing 0.30 ml. concentrated nitric acid. The reaction mixture is heated over a steam cone and when the vigorous reaction is over, acetic anhydride is evaporated in vacuo. The residue is dissolved in ethyl acetate, washed with dilute sodium bicarbonate and water, and the solution is dried over magnesium sulfate. The solution is then filtered and the ethyl acetate is evaporated in vacuo. The remaining material is recrystallized from 1,2-dimethoxy ethane and 2-(3',4'-dichlorophenyl) - 4 - nitroimidazole, M.P. 221–223° C., results.

When acetic acid is used in place of acetic anhydride in the above nitration process, 2-(3',4'-dichlorophenyl)-4-nitroimidazole again results.

When 2-(3'-acetylphenyl)-imidazole is used in the above process in place of 2-(3',4'-dichlorophenyl)-imidazole, there is obtained 2-(3'-acetylphenyl)-4-nitroimidazole.

EXAMPLE 7

1-methyl-2-(3',4'-dichlorophenyl)-5-nitroimidazole 2 gm. of 2-(3',4'-dichlorophenyl)-4-nitroimidazole is dissolved in 20 ml. of 1,2-dimethoxy ethane and treated with an excess of diazomethane in ether. The reaction mixture is then heated on the steam cone and evaporated to a small volume. The residue is then dissolved in ether, passed through an alumina filtration column and evaporated to dryness in vacuo. Recrystallization from benzene gives the product, 1-methyl-2-(3',4'-dichlorophenyl)-5-nitroimidazole; M.P. 147–148° C.

When the above process is carried out and 2-(3'-acetylphenyl)-4-nitroimidazole,
2-(4'-carbamoyloxyphenyl)-4-nitroimidazole,
2-(3'-ethylcarbamoyloxyphenyl)-4-nitroimidazole,
2-(4'-pyrrolidinocarbonyloxyphenyl)-4-nitroimidazole,
2-[4'-(2''-chloroethylenephenyl)]-4-nitroimidazole,
2-(3'-cyanatophenyl)-4-nitroimidazole, or
2-[4'-(2'-furylphenyl)]-4-nitroimidazole is used in place of 2-(3',4'-dichlorophenyl)-4-nitroimidazole, there is obtained 1-methyl-2-(3'-acetylphenyl)-5-nitroimidazole,
1-methyl-2-(4'-carbamoyloxyphenyl)-5-nitroimidazole,
1-methyl-2-(3'-ethylcarbamoyloxyphenyl)-5-nitroimidazole,
1-methyl-2-(4'-pyrrolidinocarbonyloxyphenyl)]-5-nitroimidazole,
1-methyl-2-[4'-(2''-chloroethylenephenyl)]-5-nitroimidazole,
1-methyl-2-(3'-cyanatophenyl)-5-nitroimidazole, or
1-methyl-2-[4'-(2'-furylphenyl)]-5-nitroimidazole, respectively.

EXAMPLE 8

2-(2'-fluorophenyl)-4-nitroimidazole 53.1 gm. of 2-fluorobenzonitrile is cooled to 5° C. and added to an ice-cold solution of 76.8 gm. of dry hydrogen chloride in absolute ethanol. The mixture is stored in a refrigerator for three days and then concentrated to small volume in vacuo at 40–50° C. Trituration of the residue with ether gives ethyl-2-fluorobenzimidate hydrochloride; M.P. 110–111° C.

32.3 gm. of the imino ether is dissolved in 150 cc. dry methanol containing 21.1 gm. (0.158 mole) of amino acetaldehyde diethyl acetal. After 24 hours at room temperature, the reaction mixture is concentrated to an oily residue which is cooled and added dropwise with stirring to 35 cc. of cold, concentrated sulfuric acid. The resulting mixture is poured over ice, made alkaline with 47% aqueous sodium hydroxide solution, and then extracted with ethyl acetate. The ethyl acetate extracts are washed with water and concentrated to an oily residue which affords crystals upon trituration with a mixture of ethyl acetate and ether. Recrystallization from acetone gives 2-(2'-fluorophenyl)-imidazole; M.P. 196–198° C.

2-(2'-fluorophenyl)-imidazole (7.17 gm.) is added to a solution of 3.5 cc. of concentrated nitric acid in 35 cc. of acetic anhydride. The mixture is warmed on the steam bath for 5 minutes, cooled and treated with 200 ml. of water. After decomposition of the acetic anhydride is complete, the crystalline product is collected by filtration and washed with water giving 2-(2'-fluorophenyl)-4-nitroimidazole; M.P. 222–225° C.

When the above process is carried out and 2-(4'-morpholinomethylphenyl)-imidazole is used in place of 2-(2'-fluorophenyl)-imidazole, there is obtained 2-(4'-morpholinomethylphenyl)-4-nitroimidazole.

EXAMPLE 9

1-methyl-2-(2'-fluorophenyl)-5-nitroimidazole

A mixture of 2-(2'-fluorophenyl) - 4 - nitroimidazole (1.00 gm.) and dimethyl sulfate (0.4 cc.) is heated for thirty minutes at 113° C. The mixture is cooled and agitated with 0.5 N sodium hydroxide and chloroform. The chloroform extracts are washed with water and dried over sodium sulfate and concentrated to a residue which is recrystallized from ethyl acetate giving 1-methyl-2-(2'-fluorophenyl)-5-nitroimidazole; M.P. 163–165° C.

When chloroethylsulfate, bromoethylsulfate, diethylsulfate or di-n-propylsulfate is used in the above process in place of dimethylsulfate, there is obtained 1-chloroethyl-2-(2'-fluorophenyl)-5-nitroimidazole, 1-bromoethyl-2-(2'-fluorophenyl)-5-nitroimidazole, 1-ethyl-2-(2'-fluorophenyl)-5-nitroimidazole, or 1-n-propyl - 2 - (2'-fluorophenyl)-5-nitroimidazole, respectively.

EXAMPLE 10

2-(3',4',5'-trichlorophenyl)-4-nitroimidazole

A solution of 41.3 g. (0.2 mole) of 3,4,5-trichlorobenzonitrile in about 50 ml. of dry ethanol is cooled to 0° C., and dry hydrogen chloride is passed in until the solution is saturated. The reaction mixture is kept in the refrigerator for several days wherefrom ethyl-3,4,5 - trichlorobenzimidate hydrochloride crystallizes. It is filtered, washed with alcohol, with ether, and is dried.

A mixture of 28.9 g. (0.1 mole) of ethyl-3,4,5-trichlorobenzimidate hydrochloride and 13.3 g. (0.1 mole) of aminoacetaldehyde diethylacetal in 200 ml. of methanol is allowed to stand overnight. The methanol is removed at reduced pressure leaving a syrupy residue.

This syrup is cooled in an ice bath and 29 g. of cold concentrated sulfuric acid is added slowly. The reaction mixture is allowed to warm to room temperature and is poured into a mixture of crushed ice and water containing a slight excess of sodium hydroxide. The mixture is extracted with chloroform. The extract is dried and concentrated leaving a residue which is triturated with hot acetone to separate the product from an insoluble solid material. The acetone phase is diluted with an equal volume of ether and is filtered through a layer of alumina to remove some colored impurities. The filtrate is concentrated to dryness leaving a residue which is dissolved in a small amount of benzene. On cooling this benzene solution, 2-(3,4,5-trichlorophenyl)-imidazole crystallizes.

A mixture of 15 ml. of acetic anhydride and 0.7 ml. (0.011 mole) of concentrated nitric acid is stirred and 2.48 g. (0.01 mole) of 2-(3',4',5'-trichlorophenyl)-imidazole is added in several portions. The mixture is then heated for a few minutes on the stream bath and a vigorous reaction takes place which quickly and spontaneously subsides. The reaction mixture is cooled and poured into about 200 ml. of ice water. The precipitate that forms is filtered and recrystallized from a mixture of acetone and ether to provide 2-(3',4',5'-trichlorophenyl)-4-nitroimidazole.

When 2-(4'-N - morpholinocarbonyloxymethylphenyl)-imidazole or 2-(4' - N,N - dimethylcarbonyloxymethylphenyl)-imidazole is used in the above process in place of 2-(3',4',5' - trichlorophenyl) - imidazole, there is obtained 2-(4' - N - morpholinocarbonyloxymethylphenyl)-4-nitroimidazole or 2-(4' - N,N - dimethylcarbonyloxymethylphenyl)-4-nitroimidazole, respectively.

EXAMPLE 11

1-methyl-2-(3',4',5'-trichlorophenyl)-5-nitroimidazole

A mixture of 293 mg. (0.001 mol) of 2-(3',4',5'-trichlorophenyl)-4-nitroimidazole and 0.1 ml. (0.001 mol) of methyl sulfate is heated at about 140° C. for a few minutes. The reaction mixture is diluted with chloroform and the solution is washed with an excess of dilute alkali. The chloroform solution is dried and concentrated to dryness. The residue is dissolved in a mixture of methylene chloride and ether from which 1-methyl-2-(3',4',5'-trichlorophenyl)-5-nitroimidazole is isolated by chromatography on alumina.

EXAMPLE 12

1-methyl-2-(4'-chlorophenyl)-4-nitroimidazole

A solution of 223 mg. (0.001 mol) of 2-(4'-chlorophenyl)-4-nitroimidazole in 10 ml. of 1,2 - dimethoxy ethane is treated with 72 mg. (0.0015 mol) of sodium hydride (50% emulsion in petrolatum) which has been washed with n-hexane to remove the petrolatum. When evolution of hydrogen has ceased, 0.125 ml. (0.0013 mol) of methyl sulfate is added, and the mixture is refluxed for several hours. It is concentrated to a small volume at reduced pressure and the residue is diluted with several volumes of water. This mixture is extracted three times with chloroform and the extract is dried and concentrated leaving a residue of 1-methyl-2-(4'-chlorophenyl)-4-nitroimidazole.

When the above process is carried out using 2-(4'-cyanophenyl)-4-nitroimidazole,
2-(4'-phosphondiamidophenyl)-4-nitroimidazole,
2-[4'-(2''-chloroethylenephenyl)]-4-nitroimidazole or
2-[4'-(2'-furylphenyl)]-4-nitroimidazole is used in place of 2-(4'-chlorophenyl)-4-nitroimidazole, there is obtained 1-methyl-2-(4'-cyanophenyl)-4-nitroimidazole,
1-methyl-2-(4'-phosphondiamidophenyl)-4-nitroimidazole,
1-methyl-2-[4'-(2''-chloroethylenephenyl)]-4-nitroimidazole, or
1-methyl-2-[4'-(2'-furylphenyl)]-4-nitroimidazole, respectively.

When the above process is carried out and 2-(3'-acetylphenyl)-4-nitroimidazole,
2-[4'-(2-oxo-oxazolidin-3-yl-iminomethylphenyl)]-4-nitroimidazole,
2-(4'-phenoxycarbonyloxymethylphenyl)-4-nitroimidazole,
2-[4'-(4''-fluorophenoxycarbonyloxymethylphenyl)]-4-nitroimidazole,
2-[4'-(4''-nitrophenoxycarbonyloxymethylphenyl)]-4-nitroimidazole,
2-[4'-(4''-n-propylphenoxycarbonyloxymethylphenyl)]-4-nitroimidazole,
2-(4'-carbamoyloxymethylphenyl)-4-nitroimidazole,
2-(4'-thioncarbamoyloxymethylphenyl)-4-nitroimidazole,
2-(4'-N-morpholinocarbonyloxymethylphenyl)-4-nitroimidazole,
or 2-(4'-N,N-dimethylcarbamoyloxymethylphenyl)-4-nitroimidazole is used in the above process in place of 2-(4'-chlorophenyl)-4-nitroimidazole, there is obtained 1-methyl-2-(3'-acetylphenyl-4-nitroimidazole,
1-methyl-2-[4'-(2-oxo-oxazolidin-3-yl-iminomethylphenyl)]-4-nitroimidazole,
1-methyl-2-(4'-phenoxycarbonyloxymethylphenyl)-4-nitroimidazole,
1-methyl-2-[4'-(4''-fluorophenoxycarbonyloxymethylphenyl)]-4-nitroimidazole,
1-methyl-2-[4'-(4''-nitrophenoxycarbonyloxymethylphenyl)]-4-nitroimidazole,
1-methyl-2-[4'-(4'''-n-propylphenoxycarbonyloxymethylphenyl)]-4-nitroimidazole,
1-methyl-2-(4'-carbamoyloxymethylphenyl)-4-nitroimidazole,
1-methyl-2-(4'-thioncarbamoyloxymethylphenyl)-4-nitroimidazole,
1-methyl-2-(4'-N-morpholinocarbonyloxymethylphenyl)-4-nitroimidazole, or
1-methyl-2-(4'-N,N-dimethylcarbamoyloxymethylphenyl)-4-nitroimidazole, respectively.

When the above process is carried out and 2-(3'-ethoxyphenyl)-4-nitroimidazole,
2-(4'-fluoroethoxyphenyl)-4-nitroimidazole,
2-(4'-carbamoylmethoxyphenyl)-4-nitroimidazole,
2-(4-thiocarbamoylmethoxyphenyl)-4-nitroimidazole,
2-(4'-carbamoyloxyphenyl)-4-nitroimidazole,
2-(3'-ethylcarbamoyloxyphenyl)-4-nitroimidazole,
2-(4'-pyrollidinocarbonyloxyphenyl)-4-nitroimidazole, or
2-(3'-cyanatophenyl)-4-nitroimidazole is used in place of 2-(4'-chlorophenyl)-4-nitroimidazole, there is obtained 1-methyl-2-(3'-ethoxyphenyl)-4-nitroimidazole,
1-methyl-2-(4'-fluoroethoxyphenyl)-4-nitroimidazole,
1-methyl-2-(4'-carbamoylmethoxyphenyl)-4-nitroimidazole,
1-methyl-2-(4'-thiocarbamoylmethoxyphenyl)-4-nitroimidazole,
1-methyl-2-(4'-carbamoyloxyphenyl)-4-nitroimidazole,
1-methyl-2-(3'-ethylcarbamoyloxyphenyl)-4-nitroimidazole,
1-methyl-2-(4'-pyrollidinocarbonyloxyphenyl)-4-nitroimidazole, or
1-methyl-2-(3'-cyanatophenyl)-4-nitroimidazole, respectively.

When 2-(2'-chlorophenyl)-4-nitroimidazole,
2-(3'-fluorophenyl)-4-nitroimidazole,
2-(2'-4'-difluorophenyl)-4-nitroimidazole or
2-(2',3',4'-trichlorophenyl)-4-nitroimidazole is used in the above process in place of 2-(4'-chlorophenyl)-4-nitroimidazole, there is obtained 1-methyl-2-(2'-chlorophenyl)-4-nitroimidazole,
1-methyl-2-(3'-fluorophenyl)-4-nitroimidazole,
1-methyl-2-(2',4'-difluorophenyl)-4-nitroimidazole, or
1-methyl-2-(2',3',4'-trichlorophenyl)-4-nitroimidazole, respectively.

EXAMPLE 13

1-methyl-2-(4'-fluorophenyl)-5-nitroimidazole 2-(4'-fluorophenyl) - 4 - nitroimidazole (2.07 g.) and methyl p-toluenesulfonate (2.0 g.) are intimately mixed and then heated at about 150° C. for one-half hour. After cooling, chloroform (200 ml.) and 10 ml. of 2.5 N sodium hydroxide are added. The chloroform layer is separated, washed well with water and dried over sodium sulfate. Evaporation gives 1-methyl-2-(4'-fluorophenyl)-5-nitroimidazole which after recrystallization from acetone-ether has a M.P. of 166–167° C.

When the above process is carried out using 2-(4'-cyanophenyl) - 4 - nitroimidazole, 2-[4'-(2''-chloroethylenephenyl)]-4-nitroimidazole, or 2-[4'-(2' - furylphenyl)]-4-nitroimidazole in place of 2-(4'-fluorophenyl)-4-nitroimidazole, there is obtained 1-methyl-2-(4'-cyanophenyl-5-nitroimidazole, 1-methyl-2-[4'-(2'' - chloroethylenephenyl)]-5-nitroimidazole or 1-methyl-2-[4' - (2'-furylphenyl)]-5-nitroimidazole, respectively.

When the above process is carried out and 2-(3'-acetylphenyl)-4-nitroimidazole, 2-(4'-carbamoyloxymethylphenyl)-4-nitroimidazole,
2-(4'-N-morpholinocarbonyloxymethylphenyl)-4-nitroimidazole, or
2-(4'-N,N-dimethylcarbamoyloxymethylphenyl)-4-nitroimidazole is used in the above process in place of 2-(4'-fluorophenyl)-4-nitroimidazole, there is obtained 1-methyl-2-(3'-acetylphenyl)-5-nitroimidazole,
1-methyl-2-(4'-carbamoyloxymethylphenyl)-5-nitroimidazole,
1-methyl-2-(4'-N-morpholinocarbonyloxymethylphenyl)-5-nitroimidazole, or
1-methyl-2-(4'-N,N-dimethylcarbamoyloxymethylphenyl)-5-nitroimidazole, respectively.

When the above process is carried out and 2-(3'-ethoxyphenyl)-4-nitroimidazole,
2-(4'-carbamoylmethoxyphenyl)-4-nitroimidazole,
2-(4'-carbamoyloxyphenyl)-4-nitroimidazole,
2-(3'-ethylcarbamoyloxyphenyl)-4-nitroimidazole, or
2-(4'-pyrollidinocarbonyloxyphenyl)-4-nitroimidazole is used in place of 2-(4'-fluorophenyl)-4-nitroimidazole, there is obtained 1-methyl-2-(3'-ethoxyphenyl)-5-nitroimidazole,
1-methyl-2-(4'-carbamoylmethoxyphenyl)-5-nitroimidazole,
1-methyl-2-(4'-carbamoyloxyphenyl)-5-nitroimidazole,
1-methyl-2-(3'-ethylcarbamoyloxyphenyl)-5-nitroimidazole, or
1-methyl-2-(4'-pyrollidinocarbonyloxyphenyl)-5-nitroimidazole, respectively.

When 2 - (4' - chlorophenyl)-4-nitroimidazole, 2-(3'-fluorophenyl) - 4-nitroimidazole, 2-(2',4'-difluorophenyl)-4 - nitroimidazole or 2-(2',3',4'-trichlorophenyl)-4-nitroimidazole is used in the above process in place of 2-(4'-fluorophenyl)-4-nitroimidazole, there is obtained 1-methyl - 2-(4'-chlorophenyl)-5-nitroimidazole, 1-methyl-2-(3'-fluorophenyl)-5-nitroimidazole, 1-methyl-2-(2',4'-difluorophenyl)-5-nitroimidazole, or 1-methyl-2-(2',3',4'-trichlorophenyl)-5-nitroimidazole, respectively.

When methylbenzenesulfonate, ethyl-p-toluenesulfonate or methylethanesulfonate is used in place of methyl-p-toluene sulfonate in the above process, there is obtained 1 - methyl-2-(4'-fluorophenyl)-5-nitroimidazole, 1-ethyl-2 - (4'-fluorophenyl)-5-nitroimidazole, or 1-methyl-2-(4'-fluorophenyl)-5-nitroimidazole, respectively.

Similarly, when bromomethylbenzenesulfonate or β-chloroethyl-p-toluene sulfonate is used in place of methyl-p-toluenesulfonate in the above process, there is obtained 1 - bromomethyl-2-(4'-fluorophenyl)-5-nitroimidazole, or 1 - (2'-chloroethyl)-2-(4'-fluorophenyl)-5-nitroimidazole, respectively.

EXAMPLE 14

1-methyl-2-(4'-fluorophenyl)-5-nitroimidazole 2-(4'-fluorophenyl)-4-nitroimidazole (5.0 g) and 2.36 ml. of dimethylsulfate are heated at 120° C. for one-half hour. Chloroform (500 ml.) and 20 ml. of 2.5 N sodium hydroxide is added. The chloroform layer is washed several times with water, dried over sodium sulfate and then passed through a small quantity of alumina on a sintered glass funnel. The chloroform solution on evaporation yields 1 - methyl-2-(4'-fluorophenyl)-5-nitroimidazole; M.P. 163–165° C.

When the above process is carried out using 2-(2',4'-difluorophenyl) - 4-nitroimidazole or 2-(2',3',4'-trichlorophenyl)-4-nitroimidazole in place of 2-(4'-fluorophenyl)-4-nitroimidazole, there is obtained 1-methyl-2-(2',4'-difluorophenyl) - 5-nitroimidazole or 1-methyl-2-(2',3',4'-trichlorophenyl)-5-nitroimidazole, respectively.

EXAMPLE 15

1-ethyl-2-(4'-fluorophenyl)-5-nitroimidazole

To 2-(4'-fluorophenyl)-4-nitroimidazole (2.07 g.) in dimethoxyethane (40 ml.)-methanol (20 ml.) is added an excess of diazoethane in ether with ice cooling. After nitrogen evolution has ceased, the reaction mixture is evaporated to dryness at reduced presure. To the residue is added chloroform (100 ml.) and 4 N ammonium hydroxide (10 ml.). The chloroform extract is washed with water and evaporated to dryness to yield 1-ethyl-2-(4'-fluorophenyl)-5-nitroimidazole; M.P. 69–70° C.

When the above process is carried out and 2-(2',4'-difluorophenyl) - 4-nitroimidazole or 2-(2',3',4'-trichlorophenyl)-4-nitroimidazole is used in place of 2-(4'-fluorophenyl)-4-nitroimidazole, there is obtained 1-ethyl-2-(2',-4'-difluorophenyl)-5-nitroimidazole or 1-ethyl-2-(2',3',4'-trichlorophenyl)-5-nitroimidazole, respectively.

When the above process is carried out using 2-(4'-guanidinophenyl)-4-nitroimidazole,
2-(4'-diguanidinophenyl)-4-nitroimidazole,
2-(4'-aminomethylaminophenyl)-4-nitroimidazole,
2-(4'-aminophenyl)-4-nitroimidazole,
2-(3'-aminophenyl)-4-nitroimidazole,
2-(2'-aminophenyl)-4-nitroimidazole,
2-(3'-ethylaminophenyl)-4-nitroimidazole,
2-(4'-dimethylaminophenyl)-4-nitroimidazole, or
2-(4'-acetylaminophenyl)-4-nitroimidazole in place of 2-(4'-fluorophenyl)-4-nitroimidazole, there is obtained 1-ethyl-2-(4'-guanidinophenyl)-5-nitroimidazole,
1-ethyl-2-(4'-diguanidinophenyl)-5-nitroimidazole,
1-ethyl-2-(4'-aminomethylaminophenyl)-5-nitroimidazole,
1-ethyl-2-(4'-aminophenyl)-5-nitroimidazole,
1-ethyl-2-(3'-aminophenyl)-5-nitroimidazole,
1-ethyl-2-(2'-aminophenyl)-5-nitroimidazole,
1-ethyl-2-(3'-ethylaminophenyl)-5-nitroimidazole,
1-ethyl-2-(4'-dimethylaminophenyl)-5-nitroimidazole, or
1-ethyl-2-(4'-acetylaminophenyl)-5-nitroimidazole, respectively.

When the above process is carried out and diazo-n-propane or 2-chloro-1-diazoethane is used in place of diazoethane, there is obtained 1-n-propyl-2-(4'-fluorophenyl)-5-nitroimidazole or 1-(2'-chloroethyl)-2-(4'-fluorophenyl)-5-nitroimidazole, respectively.

EXAMPLE 16

1-methyl-2-(4'-chlorophenyl)-5-nitroimidazole p - (1-methyl-5-nitroimidazole-2-yl)-benzenediazonium fluoborate (.8 g.) in 4 ml. of ethyl acetate is treated with .22 ml. of phosphorous trichloride and cuprous bromide as catalyst. A slow reaction takes place over 45 minutes. The reaction mixture is diluted with 20 ml. of ethyl acetate and allowed to stand overnight. The mixture is hydrolyzed and extracted with water. The ethyl acetate is dried and evaporated to yield 1-methyl-2-(4'-chlorophenyl)-5-nitroimidazole; M.P. 137–138° C.

A mixture of 1 - methyl-2-(4'-aminophenyl)-5-nitroimidazole (7.2 g., 0.033 mole) conc. hydrochloric acid (8.5 ml.) and water (8.5 ml.) is cooled in an ice bath. There is added with stirring over 10–15 minutes a solution of 2.4 g. of sodium nitrate in 5 ml. of water. The cold mixture is added to a solution of cuprous chloride (4.5 g.) in 20 ml. of conc. hydrochloric acid. The mixture is allowed to warm to room temperature and then heated on a steam bath for one-half hour. Neutralization of the cooled reatcion mixture with dilute sodium hydroxide results in the precipitation of crude 1-methyl-2-(4'-chlorophenyl)-5-nitroimidazole. Recrystallization from acetone gives pure material, M.P. 137–138° C.

When the above process is carried out and 7.2 g. of 1-methyl-2-(4'-aminophenyl)-5-nitroimidazole is treated with hydrobromic acid or hydrofloric acid (20 ml.) in place of hydrochloric acid, there is obtained 1-methyl-2-(4'-bromophenyl)-5-nitroimidazole or 1-methyl - 2 - (4'-fluorophenyl)-5-nitroimidazole, respectively.

Similarly, when the above process is carried out and 1-methyl-2-(3'-aminophenyl) - 5 - nitroimidazole, 1-methyl-2-(2'-aminophenyl) - 5 - nitroimidazole, 1-ethyl-2-(4'-aminophenyl)-5-nitroimidazole or 1-methyl-2-(2'-aminophenyl)-4-nitroimidazole is used in place of 1-methyl-2-(4'-aminophenyl) - 5 - nitroimidazole, there is obtained 1-methyl-2-(3'-chlorophenyl) - 5 - nitroimidazole, 1-methyl-2-(2'-chlorophenyl) - 5 - nitroimidazole, 1-ethyl-2-(4'-chlorophenyl) - 5 - nitroimidazole or 1-methyl - 2 - (2'-chlorophenyl)-4-nitroimidazole, respectively.

EXAMPLE 17

2-(3'-nitro-4'-chlorophenyl)-4-nitroimidazole 17.8 gm. of 2-(4'-chlorophenyl)-imidazole is dissolved in 12.6 gm. (2 equivalents) of fuming nitric acid in an ice bath. A salt crystallizes and the solution is allowed to remain in the ice bath until it becomes colorless. Fuming sulfuric acid is then added dropwise with stirring to the reaction mixture which mixture is then heated on the steam bath for two hours. The reaction products are then poured over ice with stirring and a crystalline yellow material, 2-(3'-nitro-4'-chlorophenyl)-4-nitroimidazole, is filtered off; M.P. 213–214° C.

When 2-(4'-fluorophenyl)-imidazole is used in place of 2-(4'-chlorophenyl)-imidazole in the above process, 2-(3'-nitro-4'-fluorophenyl)-4-nitroimidazole is obtained.

EXAMPLE 18

1-methyl-2-(3'-nitro-4'-chlorophenyl)-5-nitroimidazole 5.4 gm. of 2-(3' - nitro-4'-chlorophenyl)-4-nitroimidazole is heated at 140–144° C. for two hours in the presence of 2 ml. of dimethyl sulfate. The reaction mixture is made alkaline with dilute sodium hydroxide and is then extracted with three 600 ml. portions of chloroform. The combined chloroform extracts are backwashed with two 100 ml. portions of 0.1 N sodium hydroxide and two 150 ml. portions of water. The chloroform solution is dried over sodium sulfate and is filtered. The filtrate is evaporated to dryness giving 1-methyl-2-(3'-nitro-4'-chlorophenyl)-5-nitroimidazole; M.P. 104–107° C.

When the above process is carried out and 2-(4'-acetylaminophenyl)-4-nitroimidazole,
2-(4'-benzoylaminophenyl)-4-nitroimidazole,
2-[4'-(4''-chlorobenoylaminophenyl)]-4-nitroimidazole,
2-[4'-(4''-nitrobenzoylaminophenyl)]-4-nitroimidazole,
2-[4'-(4''-ethylbenzoylaminophenyl)]-4-nitroimidazole,
or
2-(4'-formylaminophenyl)-4-nitroimidazole is used in place of 2-(3'-nitro-4'-chlorophenyl)-4-nitroimidazole, there is obtained 1-methyl-2-(4'-acetylaminophenyl)-5-nitroimidazole,
1-methyl-2-(4'-benzoylaminophenyl)-5-nitroimidazole,
1-methyl-2-[4'-(4''-chlorobenzoylaminophenyl)]-5-nitroimidazole,
1-methyl-2-[4'-(4''-nitrobenzoylaminophenyl)]-5-nitroimidazole,
1-methyl-2-[4'-(4''-ethylbenzoylaminophenyl)]-5-nitroimidazole, or
1-methyl-2-(4'-formylaminophenyl)-5-nitroimidazole,
respectively

EXAMPLE 19

1-(2'-hydroxyethyl)-2-(4'-fluorophenyl)-5-nitroimidazole 4.00 gm. (19.3 mmol) of 2-(4'-fluorophenyl)-4-nitroimidazole and 4.7 ml. β-ethoxyethyl tosylate are heated together in a 170–175° C. oil bath for 1 hour with occasional stirring until the mixture becomes homogeneous. The mixture is cooled to near room temperature and dissolved by agitating with a mixture of about 50 ml. of chloroform and 50 ml. 4 N ammonium hydroxide. The chloroform phase is extracted twice with 2 N ammonium hydroxide and dried over sodium sulfate. Evaporation to dryness in vacuo gives a black syrup which is filtered through 30 gm. of basic alumina in 1,2-dichloroethane: ether. The very plate yellow band which comes through the column fairly rapidly is collected and evaporated in vacuo to give a yellow oil which crystallizes on seeding. The crude product is recrystallized from ether-hexane giving pale brown crystals of 1-(2' - ethoxyethyl)-2-(4'-fluorophenyl)-5-nitroimidazole.

57 mg. (.20 mmol) of the above product is heated at 100° C. in .3 ml. concentrated sulfuric acid for one-half hour. The mixture is diluted with 1.5 ml. water and heated an additional hour. The solution is treated with charcoal, diluted with 1 ml. water and treated dropwise with .7 ml. of 11.7 N sodium hydroxide while cooled in ice. The crystalline precipitate which forms is filtered off, washed with water and air dried. This material is recrystallized from benzene and then with charcoal treatment from methanol-water giving 1(2'-hydroxyethyl) - 2 - (4' fluorophenyl-5-nitroimidazole; M.P. 165–167° C.

The tosylate ester is prepared by adding 36.0 gm. (.40 mol) of β-ethoxyethanol to a solution of 76.2 gm. tosylchloride (.40 mol) in 150 ml. pyridine. The mixture is cooled at interals in an ice bath to keep the temperature below 30° C. After about 2 hours at room temperature, the mixture is poured into excess dilute 1 N hydrochloric acid and the product is extracted with ether. After drying over sodium sulfate, the ether is removed in vacuo to leave the product which is used without further purification.

When di(ethoxyethyl)sulfate or 1-methoxy - 2 - diazoethane is used in place of the ethoxyethyl tosylate in the above process, 1-(2'-hydroxyethyl)-2-(4'-fluorophenyl)-5-nitroimidazole is again obtained.

When the above procedure is carried out and 5 ml. of 4 N sodium hydroxide is added to the nitroimidazole-tosylate reaction mixture before heating, 1-(2'-hydroxyethyl)-2-(4'-fluorophenyl)-4-nitroimidazole is obtained.

When 2-(4'-chlorophenyl) - 4 - nitroimidazole, 2 - (3'-fluorophenyl)-4-nitroimidazole, 2-(2',4'-difluorophenyl)-4-nitroimidazole, or 2-(2',3',4'-trichlorophenyl) - 4 - nitroimidazole is used in the above process in place of 2-(4'-fluorophenyl)-4-nitroimidazole, there is obtained 1-(2'-hydroxyethyl)-2-(4'-chlorophenyl)-5-nitroimidazole,
1-(2'-hydroxyethyl)-2-(3'-fluorophenyl)-5-nitroimidazole,
1-(2'-hydroxyethyl-2-(2'-,4'-difluorophenyl)5-nitroimidazole,
1-(2'-hydroxyethyl)-2-(2',3',4'-trichlorophenyl)-5-nitroimidazole, respectively.

When the above process is carried out using 2-(4'-bromophenyl)-4-nitroimidazole, 2-(3',5'-difluorophenyl)-4-nitroimidazole or 2-(4'-phosphonylphenyl)-4-nitroimidazole in place of 2-(4'-fluorophenyl)-4-nitroimidazole, there is obtained 1 - (2'-hydroxyethyl)-2-(4'-bromophenyl)- 5-nitroimidazole, 1-(2'-hydroxyethyl)-2-(3',5'-difluorophenyl)-5-nitroimidazole, or 1-(2'-hydroxyethyl)-2-(4'-phosphonylphenyl)-5-nitroimidazole, respectively.

EXAMPLE 20

1-(2'-hydroxyethyl)-2-(4'-chlorophenyl)-4-nitroimidazole

A solution of 233 mg. (0.001 mol) of 2-(4'-chlorophenyl)-4-nitroimidazole and 130 mg. of potassium carbonate in 5 ml. of water is stirred at about 50° C. and ethylene oxide is passed in slowly from a gas burette until 0.003 mole of the gas has been absorbed by the reaction mixture. The 1-(2'-hydroxyethyl)-2-(4'-chlorophenyl)-4-nitroimidazole crystallizes from solution.

When 2-(3'-fluorophenyl)-4-nitroimidazole, 2-(2',4'-difluorophenyl) - 4 - nitroimidazole, 2-(2',3',4'-trichlorophenyl)-4-nitroimidazole, or 2-(4'-fluorophenyl)-4-nitroimidazole is used in the above process in place of 2-(4'-chlorophenyl)-4-nitroimidazole, there is obtained 1-(2'-hydroxyethyl)-2-(3'-fluorophenyl)-4-nitroimidazole,
1-(2'-hydroxyethyl)-2-(2',4'-difluorophenyl)-4-nitroimidazole,
1-(2'-hydroxyethyl)-(2',3',4'-trichlorophenyl)-4-nitroimidazole, or
1-(2'-hydroxyethyl)-2-(4'-fluorophenyl)-4-nitroimidazole,
respectively.

When the above process is carried out and 2-(4'-dimethylaminophenyl)-4-nitroimidazole,
2-(4'-acetylaminophenyl)-4-nitroimidazole,
2-(4'-benzoylaminophenyl)-4-nitroimidazole,
2-[4'-(4''-chlorobenzoylaminophenyl)]-4-nitroimidazole,
2-[4'-(4''-nitrobenzoylaminophenyl)]-4-nitroimidazole,
2-[4'-(4''-ethylbenzoylaminophenyl)]-4-nitroimidazole, or
2-(4'-formylaminophenyl)-4-nitroimidazole
is used in place of
2-(4'-chlorophenyl)-4-nitroimidazole, there is obtained 1-(2'-hydroxyethyl)-2-(4'-dimethylaminophenyl)-4-nitroimidazole,
1-(2'-hydroxyethyl)-2-(4'-acetylaminophenyl)-4-nitroimidazole,
1-(2'-hydroxyethyl)-2-(4'-benzoylaminophenyl)-4-nitroimidazole,
1-(2'-hydroxyethyl)-2-[4'-(4''-chlorobenzoylaminophenyl)]-4-nitroimidazole,
1-(2'-hydroxyethyl)-2-[4'-(4''-nitrobenzoylaminophenyl)]-4-nitroimidazole,
1-(2'-hydroxyethyl)-2-[4'-(4''-ethylbenzoylaminophenyl)]-4-nitroimidazole, or
1-(2'-hydroxyethyl)-2-(4'-formylaminophenyl)-4-nitroimidazole,
respectively.

EXAMPLE 21

1-(2'-hydroxyethyl)-2-(4'-chlorophenyl)-5-nitroimidazole

A mixture of 233 mg. (0.001 mol) of 2-(4'-chlorophenyl)-4-nitroimidazole and 0.3 ml. (approx. 0.001 mol) of β-ethoxyethyl tosylate is heated at about 150–200° C. for several hours. The cooled reaction mixture is dissolved in about 100 ml. of chloroform and the solution is extracted several times with 4 N ammonium hydroxide. The chloroform phase is dried with sodium sulfate and is concentrated to dryness. The residue is dissolved in a mixture of one part of dichloromethane and two parts of ether, and the solution is filtered through a layer of alumina to remove the dark impurities that are present in the solution. The eluate is concentrated to dryness leaving a residue of 1-(2'-ethoxyethyl)-2-(4'-chlorophenyl)-5-nitroimidazole.

This residue is heated with 4–5 volumes of concentrated sulfuric acid on the steam bath for a short time. The mixture is cooled, diluted with water, reheated, filtered with a little charcoal, and is neutralized with concentrated sodium hydroxide solution wherefrom 1-(2'-hydroxyethyl)-2-(4'-chlorophenyl)-5-nitroimidazole precipitates.

When the above process is carried out and 2-(4'-fluorophenyl)-4-nitroimidazole,
2-(4'-bromophenyl)-4-nitroimidazole,
2-(4'-tolyl)-4-nitroimidazole,
2-(2'-nitro)-4-nitroimidazole, or
2-(4'-biphenylyl)-4-nitroimidazole
is used in place of
2-(4'-chlorophenyl)-4-nitroimidazole,
there is obtained
2-(4'-fluorophenyl)-5-nitroimidazole,
1-(2'-hydroxyethyl)-2-(4'-bromophenyl)-5-nitroimidazole,
1-(2'-hydroxyethyl)-2-(4'-tolyl)-5-nitroimidazole,
1-(2'-hydroxyethyl)-2-(2'-nitrophenyl)-5-nitroimidazole, or
1-(2'-hydroxyethyl)-2-(4'-biphenylyl)-5-nitroimidazole,
respectively.

EXAMPLE 22

1-(2'-hydroxyethyl)-2-(4'-fluorophenyl)-4-nitroimidazole

A solution of 1.03 g. (0.005 mol) of 2-(4'-fluorophenyl)-4-nitroimidazole in 10 ml. of water containing 650 mg. of potassium carbonate is stirred at 50° C. and ethylene oxide is passed slowly into the solution until 0.015 mole has been added. 1-hydroxyethyl-2-(4'-fluorophenyl)-4-nitroimidazole crystallizes from solution and is filtered, washed and dried. After being recrystallized from a mixture of ethyl acetate and benzene and again from acetone, the product melts at 158° C.

When 2-(4'-chlorophenyl) - 4 - nitroimidazole, 2-(3'-fluorophenyl)-4-nitroimidazole, 2-(2',4'-difluorophenyl)-4-nitroimidazole or 2-(2',3',4'-trichlorophenyl)-4-nitroimidazole is used in the above process in place of 2-(4'-fluorophenyl)-4-nitroimidazole, there is obtained 1-(2'-hydroxyethyl)-2-(4'-chlorophenyl)-4-nitroimidazole,
1-(2'-hydroxyethyl)-2-(3'-fluorophenyl)-4-nitroimidazole,
1-(2'-hydroxyethyl)-2-(2',4'-difluorophenyl)-4-nitroimidazole, or
1-(2'-hydroxyethyl)-2-(2',3',4'-trichlorophenyl)-4-nitroimidazole,
respectively.

When the above process is carried out using 2-(3'-acetylphenyl)-4-nitroimidazole in place of 2-(4'-fluorophenyl) - 4 - nitroimidazole, 1-(2'-hydroxyethyl)-2-(3'-acetylphenyl)-4-nitroimidazole is obtained.

When the above process is carried out and 2-(4'-carbamoyloxyphenyl)-4-nitroimidazole,
2-(3'-ethylcarbamoyloxyphenyl)-4-nitroimidazole,
2-(4'-pyrollidinocarbonyloxyphenyl)-4-nitroimidazole, or
2-(3'-cyanatophenyl)-4-nitroimidazole
is used in place of
2-(4'-fluorophenyl)-4-nitroimidazole,
there is obtained
1-(2'-hydroxyethyl)-2-(4'-carbamoyloxyphenyl)-4-nitroimidazole,
1-(hydroxyethyl)-2-(3'-ethylcarbamoyloxyphenyl)-4-nitroimidazole,
1-(2'-hydroxyethyl)-2-(4'-pyrollidinocarbonyloxyphenyl)-4-nitroimidazole, or
1-(2'-hydroxyethyl)-2-(3'-cyanatophenyl)-4-nitroimidazole,
respectively.

When 2-[4'-(2''-chloroethylenephenyl)]-4-nitroimidazole or 2-[4'-(2'-furylphenyl)]-4-nitroimidazole are used in the above process in place of 2-(4'-fluorophenyl)-4-nitroimidazole, there is obtained 1-(2'-hydroxyethyl)-2-[4'-(2''-chloroethylenephenyl)]-4-nitroimidazole or 1-(2'-hydroxyethyl) - 2 - [4'-(2'-furylphenyl)]-4-nitroimidazole, respectively.

EXAMPLE 23

1-allyl-2-(4'-fluorophenyl)-5-nitroimidazole

A mixture of 1.03 g. (0.005 mol) of 2-(4'-fluorophenyl)-4-nitroimidazole and 1.06 g. (0.005 mol) of allyl tosylate is heated at 110–160° C. for about four hours. The viscous, oily reaction mixture is cooled and is agitated with a mixture of ethylacetate and 4 N ammonium hydroxide to remove unchanged starting material. The ethyl acetate layer is then extracted three times with dilute hydrochloric acid, which extract is made slightly alkaline and re-extracted with ethyl acetate. This extract is dried with sodium sulfate and concentrated to dryness leaving an oily residue. The residue is redissolved in a minimum of ethyl acetate and the solution is charged on a column of silica gel, from which 1-allyl-2-(4'-fluorophenyl)-5-nitroimidazole is obtained by chromatography.

When the above process is carried out and 2-butylen-1-yl-tosylate is used in place of allyl tosylate, there is obtained 1 - (2'-butylen-1-yl)-2-(4'-fluorophenyl)-5-nitroimidazole.

EXAMPLE 24

1 - ethoxycarbonylmethyl - 2 - (4' - fluorophenyl)-5-nitroimidazole and 1-ethoxycarbonylmethyl - 2 - (4' - fluorophenyl)-4-nitroimidazole A solution of 517 mg. (0.0025 mol) of 2-(4'-fluorophenyl)-4-nitroimidazole in 10 ml. of 1,2-dimethoxyethane containing 125 mg. of copper powder is stirred at reflux temperature, while a solution of 290 mg. (0.0025 mol) of ethyl diazoacetate in 4 ml. of dimethoxyethane is slwoly added. Nitrogen is evolved. The reaction mixture is diluted with 100 ml. of ethylacetate and this solution is extracted with an excess of dilute sodium hydroxide. The ethyl acetate fraction is washed, dried with sodium sulfate, and concentrated to dryness at reduced pressure giving a brown, gummy residue.

Chromatography of this gummy material on silica gel yields near equal amounts of 1-ethoxycarbonylmethyl-2-(4'-fluorophenyl)-5-nitroimidazole and 1-ethoxy-carbonylmethyl-2-(4'-fluorophenyl)-4-nitroimidazole.

EXAMPLE 25

1-(2'-chloroethyl)-2-(4'-fluorophenyl)-5-nitroimidazole

An excess of 2-chlorodiazoethane in ether is added to 2-(4'-fluorophenyl)-4-nitroimidazole (2.07 g.) in 1,2-dimethoxyethane (40 ml.) containing 10 ml. of methanol at room temperature. After nitrogen evolution has ceased, the reaction mixture is evaporated to dryness under vacuum. To the residue is added chloroform (100 ml.) and 4 N ammonium hydroxide (10 ml.). After washing with water, the chloroform extract is evaporated to dryness to yield 1-(2'-chloroethyl) - 2 - (4'-fluorophenyl)-5-nitroimidazole.

EXAMPLE 26

1-benzyl-2-(4'-fluorophenyl)-5-nitroimidazole

To a mixture of 2-(4'-fluorophenyl)-4-nitroimidazole (2.07 g.) in 75 ml. dry 1,2-dimethoxyethanemethanol (50—50) is added phenyldiazomethane (1.4 g.) in 1,2-dimethoxyethane. The mixture is gently warmed in a steam bath and after nitrogen evolution has ceased, the solvents are evaporated at reduced pressure. Ethylacetate (100 ml.) and 2.5 N sodium hydroxide (15 ml.) are added to the residue. Extraction of the ethylacetate with 3 × 10 ml. 2.5 N hydrochloric acid followed by neutralization of the acid extract yields crude 1-benzyl-2-(4'-fluorophenyl)-5-nitroimidazole. This product is purified by recrystallization from ethanol.

When the above process is carried out and p-nitrophenyldiazomethane or o-chlorophenyldiazomethane is used in place of phenyldiazomethane, the corresponding 1-(substituted - phenylmethyl-2-(4'-fluorophenyl)-5-nitroimidazole is obtained.

EXAMPLE 27

1-(2-oxopropyl)-2-(4'-fluorophenyl)-5-nitroimidazole

A mixture of 517 mg. (0.0025 mol) of 2-(4'-fluorophenyl)-4-nitroimidazole and 125 mg. of copper powder in 10 ml. of 1,2-dimethoxyethane is stirred at reflux temperature and 210 mg. of diazoacetone in 5 ml. of 1,2-dimethoxyethane is added over a period of 10–15 minutes. Nitrogen is evolved. The mixture is cooled, diluted with ethyl acetate, filtered from the copper catalyst, and shaken with an excess of 4 N ammonium hydroxide to remove unreacted starting material. The ethyl acetate solution is washed with water, dried and concentrated to a small volume. The residue is charged on a column of 40 g. of silica gel suspended in hexane. The column is developed with hexane to remove impurities and the 1-(2'-oxopropyl)-2-(4'-fluorophenyl)-5-nitroimidazole is removed by elution with ethyl acetate.

When 1-diazo-2-butanone is used in the above process in place of diazoacetone, there is obtained 1-(2'-oxobutyl)-2-(4'-fluorophenyl)-5-nitroimidazole.

EXAMPLE 28

1-(2'-hydroxypropyl)-2-(4'-fluorophenyl)-5-nitroimidazole

A solution of 263 mg. (0.001 mol) of 1-(2-oxopropyl)-2-(4'-fluorophenyl)-5-nitroimidazole in 10 ml. of ethanol is added to 190 mg. (0.006 mol) of sodium borohydride. After standing overnight at room temperature, the reaction mixture is diluted with water, and the ethanol removed at reduced pressure. The residue is extracted with ethyl acetate, which extract is dried and concentrated leaving a residue of 1-(2'-hydroxypropyl)-2-(4'-fluorophenyl)-5-nitroimidazole. After recrystallization from a mixture of alcohol and water, the product melts at 139–141° C.

When the above process is carried out and 1-(2-oxobutyl) - 2 - (4'-fluorophenyl)-5-nitroimidazole is used in place of 1-(2-oxopropyl)-2-(4'-fluorophenyl)-5-nitroimidazole, there is obtained 1-(2'-hydroxybutyl)-2-(4'-fluorophenyl)-5-nitroimidazole.

EXAMPLE 29

1-(2-oxopropyl)-2-(4'-fluorophenyl)-5-nitroimidazole

A solution of 265 mg. (0.001 mol) of 1-(2'-hydroxypropyl)-2-(4'-fluorophenyl) - 5 - nitroimidazole and 635 mg. (0.001 mol) of dicyclohexylcarbodiimide in 5 ml. of dry dimethylsulfoxide is treated with 0.08 ml. (0.001 mol) of dry pyridine and 0.04 ml. (0.0005 mol) of trifluoroacetic acid. After standing overnight, the precipitate of dicyclohexylurea is removed by filtration. The filtrate is diluted with 100 ml. of ethyl acetate. The solution is washed with a slight excess of aqueous potassium bicarbonate solution, dried with sodium sulfate, and is concentrated to dryness at reduced pressure. The residue is extracted with 50–60 ml. of ether to remove any residual dicyclohexylurea and is again concentrated to dryness leaving a residue of product contaminated with dicyclohexylcarbodiimide. This impurity is removed by washing the residue with excess oxalic acid in methanol, followed by addition of water and re-extraction with ethyl acetate. This extract is dried and concentrated to dryness leaving essentially pure 1-(2-oxopropyl)-2-(4'-fluorophenyl)-5-nitroimidazole.

When anhydrous ortho-phosphoric acid is used in place of the pyridine and trifluoroacetic acid, and 1-(2'-hydroxybutyl)-2-(4'-fluorophenyl)-5-nitroimidazole is used in place of 1-(2'-hydroxypropyl)-2-(4'-fluorophenyl)-5-nitroimidazole, there is obtained 1-(2-oxobutyl)-2-(4'-fluorophenyl)-5-nitroimidazole.

EXAMPLE 30

1-(2-N-morpholinoethyl)-2-(4'-fluorophenyl)-5-nitroimidazole

A mixture of 500 mg. (0.002 mol) of 1-hydroxyethyl-2-(4'-fluorophenyl)-5-nitroimidazole and 380 mg. (0.002 mol) of p-toluenesulfonyl chloride in 5 ml. of dry pyridine is allowed to react overnight at 0° C.

The mixture is poured into an excess of cold water and the precipitated p-toluenesulfonate ester is filtered, washed and dried.

A mixture of 400 mg. (0.001 mol) of the p-toluenesulfonate ester and 174 mg. (0.002 mol) of morpholino is heated on the steam bath for 2 hours. The reaction mixture is cooled and poured into cold water. This mixture is extracted four times with ether, which extract is dried and concentrated leaving a solid residue. The residue is purified by recrystallization from a mixture of acetone and ether to yield substantially pure 1-(2-N-morpholinoethyl)-2-(4'-fluorophenyl)-5-nitroimidazole.

When the above process is carried out and ammonia or dimethylamine is used in place of morpholino, there is obtained 1-(2'-aminoethyl)-2-(4'-fluorophenyl)-5-nitroimidazole or 1-(2'-N,N-dimethylaminoethyl)-2-(4'-fluorophenyl)-5-nitroimidazole, respectively.

EXAMPLE 31

1-(2'-ethylthioethyl)-2-(4'-fluorophenyl)-5-nitroimidazole

A mixture of 405 mg. (0.001 mol) of 2-(4'-fluorophenyl)-5-nitroimidazole-1-yl ethyl p-toluenesulfonate 103 mg. (0.0012 mol) of the potassium salt of ethanethiol in 2 ml. of dimethylformamide is heated to about 100° C. and maintained at that temperature overnight. The cooled reaction mixture is poured into about 50 ml. of cold water containing a slight excess of ammonia. The mixture is extracted with ethyl acetate, which extract is dried and concentrated to a small volume. The residue is charged on a column of alumina from which 1-(β-ethylthioethyl)-2-(4'-fluorophenyl)-5-nitroimidazole is isolated by chromatography with ethyl acetate.

When the above process is carried out and n-propanethiol is used in place of ethanethiol, there is obtained 1-(2'-n-propylthioethyl)-2-(4'-fluorophenyl) - 5 - nitroimidazole.

When the above process is carried out and methanethiol is used in place of ethanethiol, there is obtained 1-(2'-methylthioethyl) - 2 - (4'-fluorophenyl) - 5 - nitroimidazole.

EXAMPLE 32

1-(methylsulfonylethyl)-2-(4'-fluorophenyl)-5-nitroimidazole

A mixture of 405 mg. (0.001 mol) of 2-(4'-fluorophenyl)-5-nitroimidazol-1-ylethyl p-toluenesulfonate and 122 mg. (0.0012 mol) of sodium methylsulfinate in 2 ml. of dry dimethylformamide is heated at about 100° C. overnight. The cooled reaction mixture is poured into an excess of cold water containing a slight excess of ammonia. The precipitate of 1-(methylsulfonylethyl-2)-5-nitroimidazole is filtered, washed and dried.

When the above process is carried out and sodium-ethylsulfinate is used in place of sodium methylsulfinate, there is obtained 1 - (ethylsulfonylethyl)-2-(4'-fluorophenyl)-5-nitroimidazole.

EXAMPLE 33

1-(2'-ethylsulfinylethyl)-2-(4'-fluorophenyl)-5-nitroimidazole

A solution of 590 mg. (0.002 mol) of 1-(2'-ethylthioethyl)-2-(4'-fluorophenyl)-5-nitroimidazole in 50 ml. of 1,2-dimethoxyethane is cooled to —30° C., and 22 ml. (0.0022 mol) of 0.1 N solution of monoperphthalic acid in 1,2-dimethoxyethane, also cooled to —20 to 30° C., is added. The mixture is allowed to stand overnight in the cold room. The precipitated phthalic acid is filtered, and the solution is concentrated to dryness at reduced pressure. The residue is extracted with chloroform to separate the product from any remaining phthalic acid, and evaporation of the extract leaves 1-(2'-ethylsulfinylethyl)-2-(4'-fluorophenyl)-5-nitroimidazole.

When the above process is carried out and 1-(2'-methylthioethyl)-2-(4'-fluorophenyl)-5-nitroimidazole is used in place of 1-(2'-ethylthioethyl)-2-(4'-fluorophenyl)-5-nitroimidazole, 1-(2'-methylsulfinylethyl)-2-(4'-fluorophenyl)-5-nitroimidazole is obtained.

EXAMPLE 34

1-(2'-ethylsulfinylethyl)-2-(4'-fluorophenyl)-5-nitroimidazole

A solution of 295 mg. (0.001 mol) of 1-(2'-ethylthioethyl)-2-(4'-fluorophenyl)-5-nitroimidazole in 25 ml. of 1,2-dimethoxyethane is cooled in a Dry Ice-acetone bath to —78° C., and an excess of nitrogen tetroxide is slowly added by careful distillation. After a time, the solvent and excess nitrogen tetroxide are removed at reduced pressure. The residue is 1-(2'-ethylsulfinylethyl)-2-(4'-fluorophenyl)-5-nitroimidazole.

When the above procedure is carried out and 1-(2'-methylthioethyl)-2-(4'-fluorophenyl)-5-nitroimidazole is used in place of 1-(2'-ethylthioethyl)-2-(4'-fluorophenyl)-5-nitroimidazole, 1-(2'-methylsulfinylethyl)-2-(4'-fluorophenyl)-5-nitroimidazole is obtained.

EXAMPLE 35

1-(2'-carbamoyloxyethyl)-2-(4'-fluorophenyl)-5-nitroimidazole

Phenyl chloroformate (0.64 g.) is added dropwise to a solution of 1.0 g. of 1-(2'-hydroxyethyl)-2-(4'-fluorophenyl)-5-nitroimidazole in 6 ml. of pyridine cooled in an ice bath. After stirring for 5 hours the medium is poured into an ice-water mixture. Extraction with chloroform (2× 30 ml.) followed by evaporation at reduced pressure gives 1.5 g. of 1-phenoxycarbonyloxyethyl-2-(4'-fluorophenyl)-5-nitroimidazole.

1-phenoxycarbonyloxyethyl - 2 - (4'-fluorophenyl)-5-nitroimidazole (1 g.) is added to 20 ml. of liquid ammonia cooled in a Dry Ice bath. After stirring for one-half hour the Dry Ice cooling is removed and the ammonia allowed to evaporate. Water (15 ml.) is added and the mixture filtered to give 1-(2'-carbamoyloxyethyl) - 2 - (4'-fluorophenyl)-5-nitroimidazole.

When the above process is carried out and ethylamine or pyrrolidine is used in place of ammonia, there is obtained 1-[2'-(N - ethylcarbamoyloxy)-ethyl]-2-(4'-fluorophenyl)-5-nitroimidazole or 1-[2'-(pyrrolidinocarbonoyloxy)-ethyl]-2-(4' - fluorophenyl)-5-nitroimidazole, respectively.

EXAMPLE 36

1-(2-chloroethyl)-2-(4'-fluorophenyl)-5-nitroimidazole 1-(2-hydroxyethyl) - 2 - (4'-fluorophenyl)-5-nitroimidazole (2.51 g.) and thionyl chloride (20 ml.) are refluxed for 8 hours. The excess thionyl chloride is evaporated under reduced pressure to leave 1-(2'-chloroethyl)-2-(4-fluorophenyl)-5-nitroimidazole.

When 1-(3'-hydroxypropyl-2-(4'-fluorophenyl)-5-nitroimidazole is used in place of 1-(2'-hydroxyethyl-2-(4-fluorophenyl)-5-nitroimidazole in the above process, there is obtained 1-(3'-chloropropyl)-2-(4'-fluorophenyl)-5-nitroimidazole.

EXAMPLE 37

1-formylmethyl-2-(4'-fluorophenyl)-5-nitroimidazole

A solution of 251 mg. (0.001 mole) of 1-(2'-hydroxyethyl)-2-(4'-fluorophenyl)-5-nitroimidazole and 635 mg. (0.001 mole) of dicyclohexylcarbodiimido in 5 ml. of dry dimethylsulfoxide is treated with 0.08 ml. (0.001 mole) of dry pyrridine and 0.04 ml. (0.0005 mole) of trifluoroacetic acid. After being allowed to stand overnight, the reaction mixture is filtered from the precipitated dicyclohexylurea and is diluted with 75 ml. of ethyl acetate. This solution is washed with 3× 20 ml. of water, is dried with sodium sulfate, and is concentrated to dryness at reduced pressure. The residue is dissolved in about 50 ml. of ether, and the solution is filtered from more dicyclohexylurea. Concentration of the ether solution yields 567 mg. of crude 1-formylmethyl-2-(4'-fluorophenyl)-5-nitroimidazole. The residue is purified from the contaminating dicyclohexylcarbodiimide, by treatment with a methanolic solution of oxalic acid, followed by addition of water, and extraction with ethyl acetate. The extract is dried with sodium sulfate and is concentrated to dryness yielding 1 - formylmethyl - 2 - (4'-fluorophenyl)-5-nitroimidazole, M.P. 107–110° C. This material yields a 2,4-dinitrophenylhydrazone, M.P. 211–212° C., on treatment with 2,4-dinitrophenylhydrazine in alcoholic solution containing some hydrochloric acid as a catalyst.

An alternative method of purification is by chromatography on alumina or silica gel, the dicyclohexylcarbodiuride being removed by elution with ether, and the product by a successive elution with ethyl acetate.

When anhydrous ortho-phosphoric acid is used as a catalyst for the above process, a similar result is obtained.

When the above process is carried out using 1-(3'-hydroxypropyl)-2-(4'-fluorophenyl)-5-nitroimidazole is used in place of 1-(2'-hydroxyethyl)-2-(4'-fluorophenyl)-5-nitroimidazole there is obtained 1-(2'-formylethyl)-2-(4'-fluorophenyl)-5-nitroimidazole.

EXAMPLE 38

1-carboxymethyl-2-(4'-fluorophenyl)-4-nitroimidazole

A mixture of 293 mg. (0.001 mole) of 1-ethoxycarbonylmethyl-2-(4' - fluorophenyl)-4-nitroimidazole and 2 ml. of a methanolic solution of potassium hydroxide (1 N with respect to the potassium hydroxide) in 10 ml. of methanol is allowed to stand overnight at room temperature. The solution is diluted with 4 volumes of ether, and the potassium salt of 1-carboxymethyl-2-(4'-fluorophenyl) - 4 - nitroimidazole precipitates. Acidification of an aqueous solution of this potassium salt causes the free 1 - carboxymethyl-2-(4'-fluorophenyl)-4-nitroimidazole to precipitate.

When 1 - (2'-ethoxycarbonylethyl)-2-(4'-fluorophenyl)-4-nitroimidazole is used in the above process in place of 1-ethoxycarbonylmethyl - 2 - (4'-fluorophenyl) - 4 - nitroimidazole, there is obtained 1-(2'-carboxyethyl)-2-(4'-fluorophenyl)-4-nitroimidazole.

EXAMPLE 39

1-carboxymethyl-2-(4'-fluorophenyl)-5-nitroimidazole

A mixture of 293 mg. (0.001 mole) of 1-ethoxycarbonylmethyl-2-(4'-fluorophenyl) - 5 - nitroimidazole and 2 ml. of 1 N potassium hydroxide in methanol is allowed to stand overnight. The solution is diluted with 4 volumes of anhydrous ether and the potassium salt of 1-carboxymethyl-2-(4' - fluorophenyl)-5-nitroimidazole precipitates.

A solution of the potassium salt in water on acidification with concentrated hydrochloric acid yields 1-carboxymethyl-2-(4'-fluorophenyl)-5-nitroimidazole.

When the above process is carried out and 1-(2'-ethoxycarbonylethyl)-2-(4'-fluorophenyl) - 5 - nitroimidazole is used in place of 1-(2'-ethoxycarbonylmethyl)-2-(4-fluorophenyl)-5-nitroimidazole, there is obtained 1-(2'-carboxyethyl)-2-(4'-fluorophenyl)-5-nitroimidazole.

EXAMPLE 40

1-carboxamidomethyl-2-(4'-fluorophenyl)-4-nitroimidazole

A mixture of 500 mg. of 1-carboxymethyl-4-(4'-fluorophenyl)-4-nitroimidazole and 5 ml. of oxalyl chloride is heated at reflux until solution is obtained. The excess oxalyl chloride is removed completely at reduced pressure. The residue is dissolved in 50 ml. of benzene, and anhydrous ammonia is passed into the solution. The benzene is removed by evaporation and the residue slurried in water. The 1-carboxamidomethyl-2-(4'-fluorophenyl)-4-nitroimidazole is removed by filtration.

When the above process is carried out and n-propylamine or piperidine is used in place of ammonia, there is obtained 1-(N-n-propylcarboxamidomethyl)-2-(4'-fluorophenyl)-4-nitroimidazole or 1-(piperidinocarbonylmethyl)-2-(4'-fluorophenyl)-4-nitroimidazole, respectively.

EXAMPLE 41

1-carboxamidomethyl-2-(4'-fluorophenyl)-5-nitroimidazole

A mixture of 1 g. of 1-carboxymethyl-2-(4'-fluorophenyl)-5-nitroimidazole and 10 ml. of oxalyl chloride is heated at reflux temperature until solution is obtained. The excess oxalyl chloride is removed at reduced pressure, the process being finished by stripping the residue with benzene. The residue is dissolved in ca. 100 ml. of benzene, and anhydrous ammonia is passed into the solution. The benzene is removed by evaporation and the residue slurried in water. The 1-carboxamidomethyl-2-(4'-fluorophenyl)-5-nitroimidazole is removed by filtration.

When dimethylamine or morpholine is used in the above process in place of ammonia, there is obtained 1-(N,N-dimethylcarboxamidomethyl) - 2-(4'-fluorophenyl)-5-nitroimidazole or 1-(morpholinocarbonylmethyl)-2-(4'-fluorophenyl)-5-nitroimidazole, respectively.

EXAMPLE 42

1-vinyl-2-(4'-fluorophenyl)-5-nitroimidazole

To a solution of 1-(2'-chloroethyl)-2-(4'-fluorophenyl)-5-nitroimidazole (2.69 g.) in dimethylsulfoxide (20 ml.) at room temperature is added solid potassium tert.-butoxide (1.12 g.). After standing for 12 hours, the solvent is removed at reduced pressure and the residue stirred with water (20 ml.). The crude 1-vinyl-2-(4'-fluorophenyl)-5-nitroimidazole is recrystallized from ethanol-water.

EXAMPLE 43

1-cyanomethyl-2-(4'-fluorophenyl)-5-nitroimidazole

A mixture of 1.23 g. of 1-carboxamidomethyl-2-(4'-fluorophenyl)-5-nitroimidazole, 20 ml. of dry benzene, and 1 g. (ca. 0.0075 mole) of thionyl chloride is heated at reflux overnight. The solvent and excess thionyl chloride are removed at reduced pressure. The residue is redissolved in chloroform, and the solution is added to an excess of crushed ice. The solution is adjusted to pH 7 by the addition of ammonium hydroxide. The layers are separated and the aqueous portion is again extracted with chloroform. The combined chloroform extracts are dried and concentrated leaving a residue of 1-cyanomethyl-2-(4'-fluorophenyl)-5-nitroimidazole, which is purified by crystallization from a mixture of ether and hexane.

When the above process is carried out and 1-(2'-carboxamidoethyl)-2-(4'-fluorophenyl) - 5-nitroimidazole is used in place of 1-carboxamidomethyl-2-(4'-fluorophenyl)-5-nitroimidazole, there is obtained 1-(2'-cyanoethyl)-2-(4'-fluorophenyl)-5-nitroimidazole.

When the procedure of Examples 23–43 are carried out and 2-(4'-fluorophenyl)-4-nitroimidazole or the 1-substituted-2-(4'-fluorophenyl)nitroimidazole a starting material is replaced by the corresponding 4-nitroimidazole or 1-substituted nitroimidazole having at the 2-position a 4'-cyanophenyl,
4'-phosphondiamidophenyl,
4'-phosphonylphenyl,
4'-thiocarbamoylphenyl,
4'-N-methylthiocarbamoylphenyl,
4'-piperidinothiocarbamoylphenyl,
4'-(2''-chloroethylenephenyl),
4'-amidinophenyl,
4'-n-propylamidinophenyl,
4'-morpholinoiminocarbonyl,
4'-(2-furylphenyl),
4'-carboxamidophenyl,
4'-aminophenyl,
3'-aminophenyl,
2'-aminophenyl,
4'-ureidophenyl,
4'-fluoroethylcarbonylaminophenyl,
4'-aminocarbonylethylaminophenyl,
4'-N-ethylaminocarbonylmethylaminophenyl,
4'-piperidinocarbonylethylamino,
4'-guanidinophenyl,
4'-biguanidophenyl, 3'-ethylaminophenyl,
4'-dimethylaminophenyl,
4'-acetylaminophenyl,
4'-benzoylaminophenyl,
4'-(4''-chlorobenzoylamino)phenyl,
4'-(4''-nitrobenzoylamino)phenyl,
4'-(4''-ethylbenzoylamino)-phenyl,
2'-cyanoaminophenyl,
4'-pseudothioureaphenyl,
4'-methylpseudothioureaphenyl,
4'-phenylaminodiazophenyl,
4'-(4''-chlorophenylaminodiazophenyl),
4'-(4''-tolylaminodiazophenyl),
4'-phenyldiazophenyl,
4'-(2''-hydroxyphenyldiazophenyl),
4'-(4''-dimethylaminophenyldiazophenyl),
4'-(2-oxo-oxazolidin-3-yl-iminomethylphenyl),
4'-biphenylyl,
3'-acetylphenyl,
4'-carbamoyloxymethylphenyl,
4'-thioncarbamoyloxymethylphenyl,
4'-N-morpholinocarbonyloxymethylphenyl,
4'-N,N-dimethylcarbamoyloxymethylphenyl,
4'-(1'''-carbamoylhydrazin-2''-yl-methylenephenyl),
4'-(1-thioncarbamoylhydrazin-2-yl-methylenephenyl),
4'-(1'''-carbamoyl-1''-methylhydrazin-2''-yl-methylenephenyl),
3'-carboxyhydrazidophenyl,
4'-(N²'',N²''-dimethylcarboxyhydrazidophenyl),
4'-dimethylcarboxamidophenyl,
4'-piperidinocarbonylphenyl,
4'-tolyl,
4'-acetylaminomethylphenyl,
4'-benzoylaminomethylphenyl,
4'-(2''-fluorobenzoylaminomethyl)phenyl,
4'-(2''-nitrobenzoylaminomethyl)phenyl,
4'-(4''-toluoylaminomethyl)-phenyl,
3'-aminomethylphenyl,
4'-N-methylaminomethylphenyl,
4'-morpholinomethylphenyl,
4'-methoxymethylphenyl,
2'-hydroxymethylphenyl,
4'-phenoxycarbonyloxymethylphenyl,
4'-(4''-fluorophenoxycarbonyloxymethyl)-phenyl,
4'-(4''-nitrophenoxycarbonyloxymethyl)phenyl,
4'-(4''-n-propylphenoxycarbonyloxymethyl)phenyl,
4'-formylphenyl,
4'-carboxyphenyl,
4'-methoxycarbonylphenyl,
4'-methoxyiminocarbonylphenyl,
4'-cyanomethylphenyl,
4'-carboxymethylphenyl,
4'-carboxamidomethylphenyl,
4'-N-methylcarboxamidomethylphenyl,
4'-hydroxyphenyl,
4'-carbamoyloxyphenyl,
3'-ethylcarbamoyloxyphenyl,
4'-pyrrolidinocarbonyloxyphenyl,
4'-hydroxpseudoureidophenyl,
3'-cyanatophenyl,
3'-ethoxyphenyl,
4'-fluoroethoxyphenyl,
4'-carbamoylmethoxyphenyl,
4'-thiocarbamoylmethoxyphenyl,
4'-ethylsulfoxylphenyl,
2'-sulfonylphenyl,
4'-thiophenyl,
3'-methylthiophenyl,
4'-cyanothiophenyl,
4'-methylthiocarbamoylthiophenyl,
4'-thiocarbamoylthiophenyl,
4'-methoxythiocarbonylphenyl,
4'-sulfonamidophenyl,
4'-methylsulfonamidophenyl,
4'-diethylsulfonamidophenyl,
4'-phenylsulfonylaminophenyl,
4'-(4''-chlorophenylsulfonylamino)phenyl,
4'-(4''-nitrophenylsulfonylamino)phenyl,
4'-(4''-ethylphenylsulfonylamino)phenyl,
4'-morpholinosulfonamidophenyl,
4'-chlorophenyl,
3'-fluorophenyl,
2',4'-difluorophenyl,
2',3',4'-trichlorophenyl,
2'-nitrophenyl,
3'-nitrophenyl,
4'-nitrophenyl,
2',4'-dinitrophenyl,
2'-naphthyl,
2-(5',6',7',8'-tetrahydronaphthyl),
5'-indanyl,
6'-quinolinyl,
6'-quinoxalinyl, or
3'-fluoro-2'-naphthyl, the corresponding 1-substituted 2-aryl or 2-substituted aryl nitroimidazole is obtained.

EXAMPLE 44

2-phenyl-4-nitroimidazole

Ethyl benzimidate hydrochloride (85.0 grams; 0.458 mole) is dissolved in 250 mls. of methanol. Aminoacetal [in 100 ml. methanol] (61.0 grams; 0.458 mole) is added and the mixture is allowed to stand 19–20 hours. The reaction mixture is concentrated to a syrup to which is added one liter of acetone. The resulting product is filtered. One liter of ether is added to the residue. The product 2-phenyl-imidazole is collected by filtration and washed with acetone; M.P. 139–140° C.

311.5 gm. (2.16 mol) of 2-phenyl-imidazole in 800 ml. of stirred, ice-cooled chloroform is treated in small portions over about one hour with 156.1 gm. (1.17 mol) of nitronium fluoborate. The rate of addition is such to maintain the temperature of the reaction mixture at 10–20° C. The mixture is further stirred for two hours at room temperature and poured into 2.5 l. of .5 N aqueous sodium hydroxide. The chloroform phase is extracted twice with 400 ml. of .5 N sodium hydroxide and the combined basic extracts are made acidic with concentrated hydrochloric acid. The precipitated material in the acidic solution is extracted three times with chloroform, leaving a clear aqueous phase and a dark viscous insoluble oil. 25.5 gm. of insoluble oil is isolated by decantation of the aqueous supernatant. This is combined in 600 ml. acetone with 31.2 gm. of partially crystalline material obtained by evaporation of the combined chloroform extracts. The acetone solution is diluted with sufficient ether to cause heavy cloudiness and is chromatographed over an intimate mixture of 120 gm. decolorizing charcoal and 120 gm. Supercel using first 1:1 (v./v.) acetone-ether and then acetone as eluting solvents. After evaporation of the eluate, the residue is recrystallized from methanol-water to give 2-phenyl-4-nitroimidazole; M.P. 235–242° C. An analytical sample obtained by recrystallization and sublimation melts at 243.5–244.5° C.

2-phenyl-4-nitroimidazole is also obtained when nitronium hexafluorophosphate, nitronium hexafluoroarsentate, nitrohexafluorosilicate, nitronium hexafluoroantimonate or nitroniumperchlorate is used in place of nitronium fluoborate in the above reaction.

When the above process is carried out using 2-(4'-chlorophenyl)imidazole, 2-(3'-fluorophenyl)imidazole, 2-(2',4'-difluorophenyl)imidazole, 2-(2',3',4'-trichlorophenyl)imidazole or 2-(4'-fluorophenyl)imidazole in place of 2-phenyl imidazole, there is obtained 2-(4'-chlorophenyl)-4-nitroimidazole, 2-(3'-fluorophenyl)-4-nitroimidazole, 2-(2',4'-difluorophenyl)-4-nitroimidazole, 2-(2',3',4'-trichlorophenyl)-4-nitroimidazole or 2-(4'-fluorophenyl)-4-nitroimidazole, respectively.

When the above process is carried out using 2-(2'- nitrophenyl)imidazole, 2 - (3' - nitrophenyl)imidazole, 2-(4'-nitrophenyl)imidazole or 2 - (2',4'-dinitrophenyl) imidazole in place of 2-phenyl imidazole, there is obtained 2-(2'-nitrophenyl)-4-nitroimidazole, 2 - (3'-nitrophenyl)-4-nitroimidazole, 2-(4'-nitrophenyl)-4-nitroimidazole or 2-(2',4'-dinitrophenyl)-4-nitroimidazole, respectively.

When the above process is carried out using 2-(4'-carboxamidophenyl)imidazole or 2 - (4' - cyanophenyl) imidazole in place of 2-phenyl imidazole, there is obtained 2-(4'-carboxamidophenyl)-4-nitroimidazole or 2-(4'-cyanophenyl)-4-nitroimidazole, respectively.

When the above process is carried out using 2-(4'-biphenyl)imidazole or 2-(4'-tolyl)imidazole in place of 2-phenyl imidazole, there is obtained 2-(4'-biphenyl)-4-nitroimidazole or 2-(4'-tolyl)-4-nitroimidazole, respectively.

EXAMPLE 45

1-methyl-2-phenyl-5-nitroimidazole 143 mg. (.76 mmol) of 2-phenyl-4-nitroimidazole and 99 mg. (.79 mmol) of methyl sulfate are heated together at 120° C. for 30 minutes. The reaction mixture is cooled and dissolved by shaking with a mixture of 3 ml. of dilute aqueous sodium hydroxide and 3 ml. of chloroform. The chloroform phase is dried over sodium sulfate and evaporated to dryness yielding crystalline 1-methyl-2-phenyl-5-nitroimidazole. After recrystallization from ethyl acetate, this material melts at 157–160° C. After further recrystallization and sublimation, the melting point is 160–161° C.

When the above process is carried out using 2-(4'-tolyl)-4-nitroimidazole in place of 2-phenyl-4-nitroimidazole, there is obtained 1-methyl-2-(4'-tolyl)-5-nitroimidazole; M.P. 138–140° C.

When the above process is carried out using β-chloroethyl sulfate in place of methyl sulfate, there is obtained 1-(2'-chloroethyl)-2-phenyl-5-nitroimidazole.

The substitution of ethyl sulfate for methyl sulfate in the above reaction affords 1-ethyl-2-phenyl-5-nitroimidazole as the product.

When the above process is carried out using

2-[4'-(2''-chloroethylenephenyl)]-4-nitroimidazole,
2-(4'-piperidinocarbonylphenyl)-4-nitroimidazole, or
2-(4'-N-methylcarbamoylphenyl)-4-nitroimidazole in place of 2-phenyl-4-nitroimidazole, there is obtained 1-methyl-2-[4'-(2''-chloroethylene phenyl)]-5-nitroimidazole,
1-methyl-2-(4'-piperidinocarbonylphenyl)-5-nitroimidazole, or
1-methyl-2-(4'-N-methylcarbamoylphenyl)-5-nitroimidazole, respectively.

When the above processes are carried out using methyl toluene sulfonate in place of methyl sulfate, the corresponding 1-methyl-2-aryl-5-nitroimidazole again results.

When di(β-chloroethyl)sulfate or β-chloroethyl toluene sulfonate is used in place of methyl sulfate in the above processes, the corresponding 1-(2'-chloroethyl)-2-aryl-5-nitroimidazoles are obtained.

EXAMPLE 46

2-(2'-naphthyl)-4-nitroimidazoles

A solution of 46.4 gm. β-naphthonitrile (.303 mol) in 80 ml. of absolute alcohol is saturated with dry hydrogen chloride and the solution is left at 5° C. for 22 hours. After slow diltuion with 500 ml. of ether, the crystalline precipitate, ethyl-2-naphthimidate hydrochloride, is filtered off, washed with ether and air dried.

53.7 gm. (.228 mol) ethyl-2-naphthimidate hydrochloride is treated overnight with 30.3 gm. (.228 mol) of aminoacetaldehyde diethyl acetal in 200 ml. of methanol. The methanol is evaporated in vacuo and the syrupy residue is treated with 80 ml. concentrated sulfuric acid while cooled on ice. The dark acid solution is poured with stirring into a slight excess of dilute ice-cooled sodium hydroxide. The dark oil which separates is isolated by decantation and extracted three times with boiling ethyl acetate and then with boiling acetone. Evaporation of the combined extracts in vacuo leaves 24 gm. of a viscous syrup. The syrup is dissolved in 300 ml. acetone, the solution is diluted with 600 ml. ether and the resulting solution filtered through 300 gm. of basic aluminum oxide prepared in acetone-ether solvent. The aluminum oxide is washed with a further 1.5 liters of solvent and the eluate is evaporated in vacuo to give a mixture of oil and crystals. Ether washing and filtering gives pale yellow crystals of 2-(2'-naphthyl)imidazole which melt at 205–208° C. A further crop is obtained by re-extracting the original crude dark oil with ethyl acetate and treating the extracts as above.

1.00 gm. of 2-(2'-naphthyl)imidazole (5.15 mmol) is added to a solution of .38 ml. concentrated nitric acid in 3.5 ml. acetic anhydride (prepared with ice-cooling). The crystalline nitrate salt precipitates out almost immediately. The mixture is heated on the steam bath for about 5 minutes and is then cooled and treated with 40 ml. 2.5 N sodium hydroxide with further cooling. The solution is extracted with ethyl acetate and this extract is back-extracted 7 times with dilute sodium hydroxide solution. The combined basic extracts are made slightly acidic with dilute hydrochloric acid and are cooled in ice giving crystalline 2-(2'-naphthyl)-4-nitroimidazole.

When the above process is carried out using 2-(4'-acetylaminophenyl)-imidazole,
2-(4'-benzoylaminophenyl)imidazole,
2-[4'-(4''-chlorobenzoylaminophenyl)]imidazole,
2-[4'-(4''-nitrobenzoylaminophenyl)]imidazole,
2-[4'-(4''-ethylbenzoylaminophenyl)]imidazole, or
2-(4'-formylaminophenyl)imidazole in place of 2-naphthyl-4-nitroimidazole, there is obtained 2-(4'-acetylaminophenyl)-4-nitroimidazole,
2-(4'-benzoylaminophenyl)-4-nitroimidazole,
2-[4'-(4''-chlorobenzoylaminophenyl)]-4-nitroimidazole,
2-[4'-(4''-nitrobenzoylaminophenyl)]-4-nitroimidazole,
2-[4'-(4''-ethylbenzoylaminophenyl)]-4-nitroimidazole, or 2-(4'-formylaminophenyl)-4-nitroimidazole, respectively.

EXAMPLE 47

1-methyl-2-(2'-naphthyl)-5-nitroimidazole

A solution of 349 gm. (1.36 mmol) of 2-(2'-naphthyl)-4-nitroimidazole hydrate in 10 ml. ethylene glycol dimethyl ether is treated with a 250% excess of diazomethane in 10 ml. of ether with cooling in ice. The solvents are evaporated at atmosphere pressure and in vacuo. The brown crystalline residue is extracted three times with boiling ether and the cooled combined extracts are filtered through 5.0 gm. of basic aluminum oxide. After washing the aluminum oxide with further ether, the eluate is evaporated in vacuo to leave a pale yellow crystalline residue of 1-methyl-2-(2'-naphthyl)-5-nitroimidazole. This is recrystallized from methanol to give a product melting at 158–160° C.

When the above process is carried out using 2-(4'-benzoylaminophenyl)-4-nitroimidazole,
2-[4'-(4''-chlorobenzoylaminophenyl)]-4-nitroimidazole,
2-[4'-(4''-nitrobenzoylaminophenyl)]-4-nitroimidazole,
2-[4'-(4''-ethylbenzoylaminophenyl)]-4-nitroimidazole,
2-(2'-cyanoaminophenyl)-4-nitroimidazole,
2-(4'-formylaminophenyl)-4-nitroimidazole, 2-(4'-pseudothioureidophenyl)-4-nitroimidazole, or
2-(4'-methylpseudothioureidophenyl)-4-nitroimidazole in place of 2-(2'-naphthyl)-4-nitroimidazole, there is obtained 1-methyl-2-(4'-benzoylaminophenyl)-5-nitroimidazole,
1-methyl-2-[4'-(4''-chlorobenzoylaminophenyl)]-5-nitroimidazole,
1-methyl-2-[4'-(4''-nitrobenzoylaminophenyl)]-5-nitroimidazole,
1-methyl-2-[4'-(4''-ethylbenzoylaminophenyl)]-5-nitroimidazole,
1-methyl-2-(2'-cyanoaminophenyl)-5-nitroimidazole,
1-methyl-2-(4'-formylaminophenyl)-5-nitroimidazole,
1-methyl-2-(4'-pseudothioureidophenyl)-5-nitroimidazole, or 1-methyl-2(4'-methylseudothioureidophenyl)-5-nitroimidazole, respectively.

EXAMPLE 48

1-(2'-hydroxyethyl)-2-phenyl-5-nitroimidazole

A mixture of 1.9 g. (0.01 mole) of 2-phenyl-4-nitroimidazole and 2.8 ml. (approximately 0.01 mole) of β-ethoxyethyl tosylate is heated at 170–175° C. for several hours. The reaction mixture is dissolved in 100 ml. of chloroform and this solution is extracted several times with 4 N ammonium hydroxide until the aqueous extracts are basic to litmus paper. The chloroform is diluted with two volumes of ether and the solution is passed through a column of alumina to remove the dark impurities that are present. The eluate is concentrated to dryness leaving a residue of 1-β-ethoxyethyl-2-phenyl-5-nitroimidazole.

The 1-β-ethoxyethyl-2-phenyl-5-nitroimidazole is heated with 5 volumes of concentrated sulfuric acid on the steam bath for a short time. The mixture is cooled and diluted with water. It is reheated and the solution decolorized with charcoal. The filtrate is cooled and neutralized with sodium hydroxide and 1-(2'-hydroxyethyl)-2-phenyl-5-nitroimidazole crystallizes from solution.

When the above process is carried out using 2-(2'-nitrophenyl)-4-nitroimidazole,
2-(3'-nitrophenyl)-4-nitroimidazole,
2-(4'-nitrophenyl)-4-nitroimidazole, or
2-(2',4'-dinitrophenyl)-4-nitroimidazole in place of 2-phenyl-4-nitroimidazole, there is obtained 1-(2'-hydroxyethyl)-2-(2'-nitrophenyl)-5-nitroimidazole,
1-(2'-hydroxyethyl)-2-(3'-nitrophenyl)-5-nitroimidazole,
1-(2'-hydroxyethyl)-2-(4'-nitrophenyl)-5-nitroimidazole, or 1-(2'-hydroxyethyl)-2-(2',4'-dinitrophenyl)-4-nitroimidazole, respectively.

When the above process is carried out using 2-(2'-fluorophenyl)-4-nitroimidazole or 2-(2'-nitrophenyl)-4-nitroimidazole in place of 2-phenyl-4-nitroimidazole, there is obtained 1 - (2' - hydroxyethyl)-2-(2'-fluorophenyl)-5-nitroimidazole or 1-(2'-hydroxyethyl)-2-(2'-nitrophenyl)-5-nitroimidazole, respectively.

When the above process is carried out using 2-(4'-biphenylyl)-4-nitroimidazole or 2-(4'-tolyl)-4-nitroimidazole in place of 2-phenyl-4-nitroimidazole, there is obtained 1 - (2 - hydroxyethyl)-2-(4'-biphenyl)-5-nitroimidazole or 1-(2'-hydroxyethyl)-2-(4'-tolyl)-5-nitroimidazole, respectively.

EXAMPLE 49

1-(2'-hydroxyethyl)-2-phenyl-4-nitroimidazole

A solution of 950 mg. (0.005 mole) of 4-nitro-2-phenylimidazole in 10 ml. of water containing 650 mg. of potassium carbonate is stirred at 50° C. Ethylene oxide is passed in slowly into the solution from a gas burette until 0.015 mole has been absorbed by the reaction mixture. 1-(2'-hydroxyethyl)-2-phenyl-4-nitroimidazole separates from solution and is filtered, washed and dried.

When the above process is carried out using 2-(2'-nitrophenyl) - 4 - nitroimidazole, 2-(3'-nitrophenyl)-4-nitroimidazole, 2-(4'-nitrophenyl)-4-nitroimidazole or 2-(2',4'-dinitrophenyl)-4-nitroimidazole in place of 4-nitro-2-phenylimidazole, there is obtained 1-(2'-hydroxyethyl)-2-(2'-nitrophenyl)-5-nitroimidazole,
1-(2'-hydroxyethyl)-2-(3'-nitrophenyl)-5-nitroimidazole,
1-(2'-hydroxyethyl)-2-(4'-nitrophenyl)-5-nitroimidazole, or
1-(2'-hydroxyethyl)-2-(2',4'-dinitrophenyl)-5-nitroimidazole, respectively.

When the above process is carried out using 2-(4'-carboxamidophenyl)-4-nitroimidazole or 2-(4'-cyanophenyl)-4-nitroimidazole in place of 4-nitro-2-phenylimidazole, there is obtained 1-(2'-hydroxyethyl)-2-(4'-carboxamidophenyl)-5-nitroimidazole or 1-(2'-hydroxyethyl)-2-(4'-cyanophenyl)-5-nitroimidazole, respectively.

When the above process is carried out using 2-(4'-biphenylyl)-4-nitroimidazole or 2-(4'-tolyl)-4-nitroimidazole in place of 4-nitro-2-phenylimidazole, there is obtained 1-(2' - hydroxyethyl)-2-(4'-biphenylyl)-5-nitroimidazole or 1-(2'-hydroxyethyl)-2-(4'-tolyl)-5-nitroimidazole, respectively.

EXAMPLE 50

1-ethoxycarbonylmethyl-2-phenyl-4-nitroimidazole

A solution of 950 mg. (0.005 mole) of 2-phenyl-4-nitroimidazole in 15 m. of dry diethyleneglycol dimethyl ether, containing 250 mg. of copper powder as a catalyst, is stirred at 115° C., and a solution of 570 mg. (0.005 mole) of ethyl diazoacetate in 5 ml. of diethyleneglycol dimethyl ether is added over a period of about 10 minutes. Nitrogen is evolved from the reaction mixture. The reaction mixture is dissolved in about 100 ml. of ethyl acetate, and the solution is extracted with dilute sodium hydroxide. The ethyl acetate extract is washed with water, dried, and concentrated leaving a gummy residue.

Chromatography of this gum on a silica gel column yields 1 - ethoxycarbonylmethyl-2-phenyl-4-nitroimidazole which, after recrystallization from alcohol, melts at 139–141° C.

EXAMPLE 51

1-ethoxycarbonylmethyl-2-phenyl-4-nitroimidazole

A solution of 100 mg. (0.00053 mole) of 2-phenyl-4-nitroimidazole in 3 ml. of 1,2 dimethoxyethane is treated with 25 mg. (0.0006 mole) of sodium hydride (52.5% in petrolatum). When the evolution of hydrogen has ceased, 0.06 ml. (0.00054 mole) of ethyl bromoacetate is added and the mixture is refluxed for 2–4 hours. The mixture is cooled, diluted with water, and extracted several times with chloroform. The chloroform extract is dried and concentrated leaving an oil which readily crystallizes. It is recrystallized from a mixture of ethyl acetate and ether, yielding 1-ethoxycarbonylmethyl-2-phenyl-4-nitroimidazole, M.P. 141–142° C.

EXAMPLE 52

1-ethoxycarbonylmethyl-2-phenyl-5-nitroimidazole

A solution of 950 mg. (0.005 mole) of 2-phenyl-4-nitroimidazole in 15 ml. of 1,2-dimethoxyethane, containing 250 mg. of copper powder as a catalyst, is stirred at reflux temperature, and a solution of 570 mg. (0.005 mole)

of ethyl diazoacetate in 5 ml. of dimethoxyethane is added over a period of 5–10 minutes. A slow evolution of nitrogen takes place. The reaction mixture is poured into ice water and this mixture is extracted with ethyl acetate. The extract is washed with dilute alkali, dried, and concentrated leaving a brown, gummy residue.

Chromatography of this residue on silica gel gives 1-ethoxycarbonylmethyl - 2 - phenyl - 5 - nitroimidazole, which, after crystallization from a 1:1 alcohol-water mixture, melts at 69–71° C.

EXAMPLE 53

1-carboxymethyl-2-phenyl-4-nitroimidazole

A mixture of 275 mg. (0.001 mole) of 1-ethoxycarbonylmethyl-2-phenyl-4-nitroimidazole and 2 ml. of a methanol solution of potassium hydroxide (1 N with respect to potassium hydroxide) in 10 ml. of methanol is allowed to stand overnight at room temperature. The solution is diluted with 4 volumes of ether, and the potassium salt of 1-carboxymethyl-2-phenyl-4-nitroimidazole precipitates. On acidification of an aqueous solution of this salt, the free 1-carboxymethyl-2-phenyl-4-nitroimidazole is obtained; M.P. 275–280° C.

EXAMPLE 54

1-carboxymethyl-2-phenyl-4-nitroimidazole

A solution of 33 mg. of 1-ethoxycarbonylmethyl-2-phenyl-4-nitroimidazole in 0.4 ml. of concentraed sulfuric acid is heated on the steam bath for 2 hours. The mixture is cooled and diluted with 2 ml. of water, whereupon 1-carboxymethyl-2-phenyl-4-nitroimidazole is obtained.

EXAMPLE 55

1-carboxymethyl-2-phenyl-5-nitroimidazole

A mixture of 275 mg. (0.001 mole)) of 1-ethoxycarbonylmethyl-2-phenyl-5-nitroimidazole and 2 ml. of a methanolic solution of potassium hydroxide (1 N with respect to the potassium hydroxide) in 10 ml. of methanol is allowed to stand overnight at room temperature. On dilution of the mixture with 4 volumes of ether, the potassium salt of 1-carboxymethyl-2-phenyl-5-nitroimidazole precipitates. On acidification of an aqueous solution of this potassium salt, there is obtained the free 1-carboxymethyl-2-phenyl-5-nitroimidazole.

EXAMPLE 56

1-carboxamidomethyl-2-phenyl-4-nitroimidazole

A mixture of 500 mg. of 1-carboxymethyl-2-phenyl-4-nitroimidazole and 5 ml. of oxalyl chloride is heated at reflux until solution is obtained. The excess oxalyl chloride is removed completely in vacuo. The residue is dissolved in 50 ml. of benzene, and dry ammonia is passed into the solution. The benzene is removed by evaporation and the residue slurried with water. Filtration yields 1 - carboxamidomethyl-2-phenyl-4-nitroimidazole.

EXAMPLE 57

1-carboxamidomethyl-2-phenyl-5-nitroimidazole

A mixture of 0.5 g. of 1-carboxymethyl-2-phenyl-5-nitroimidazole and 5 ml. of oxalyl chloride is heated at reflux temperature until solution is obtained. Excess oxalyl chloride is removed in vacuo. The residue is dissolved in 50 ml. of benzene, and dry ammonia is passed into the solution. The benzene is removed by evaporation and the residue slurried with water. Filtration yields 1-carboxamidomethyl-2-phenyl-5-nitroimidazole.

EXAMPLE 58

1-methyl-2-phenyl-4-nitroimidazole

A solution of 1.9 g. (0.01 mole) of 2-phenyl-4-nitroimidazole in 100 ml. of dry 1,2-dimethoxyethane is treated with 0.72 g. (0.015 mole) of sodium hydride (50% emulsion in petrolatum) and then with 1.24 ml. (0.013 mole) of methyl sulfate. The mixture is heated at reflux temperature for several hours. It is concentrated to a small volume at reduced pressure, and is diluted carefully with several volumes of ice water. This mixture is extracted with chloroform, which extract is dried and concentrated. The residue is washed with hexane to remove petrolatum, and the solid residue consists of essentially pure 1-methyl-2-phenyl-4-nitroimidazole.

When the above process is carried out using 2-(3'-methylthiophenyl)-4-nitroimidazole,
2-(4'-cyanothiophenyl)-4-nitroimidazole,
2-(4'-diethylsulfonamidophenyl)-4-nitroimidazole,
2-(4'-morpholinosulfonylphenyl)-4-nitroimidazole, or
2-(4'-ethylsulfoxyphenyl)-4-nitroimidazole in place of 2-phenyl-4-nitroimidazole, there is obtained 1-methyl-2-(3'-methylthiophenyl)-5-nitroimidazole,
1-methyl-2-(4'-cyanothiophenyl)-5-nitroimidazole,
1-methyl-2-(4'-diethylsulfonamidophenyl)-5-nitroimidazole,
1-methyl-2-(4'-morpholinosulfonylphenyl)-5-nitroimidazole, or
1-methyl-2-(4'-ethylsulfoxylphenyl)-5-nitroimidazole, respectively.

EXAMPLE 59

2-(2'-nitrophenyl)-4-nitroimidazole

To 250 ml. of ethanol and 33 ml. of 30% glyoxal is added 15.1 gm. of o-nitrobenzaldehyde. The mixture is stirred rapidly and 600 ml. of ammonium hydroxide is added with stirring. The stirring is conducted for 72 hours at room temperature and the ethanol is then evaporated in vacuo. The mixture is then extracted with two 1-liter portions of chloroform. The chloroform extracts are combined and extracted with three 250 ml. portions of 2.5 N hydrochloric acid. The acid extracts are made alkaline with 11.6 N sodium hydroxide and are then extracted with chloroform. The chloroform extract is dried, filtered and evaporated to dryness giving 2-(2'-nitrophenyl)-imidazole; M.P. 191–192° C.

375 mg. of 2-(2'-nitrophenyl)-imidazole is added in small portions to 0.1 ml. of nitric acid (specific gravity 1.5) in 5 ml. of 30% fuming sulfuric acid. The reaction mixture is stirred for 25 minutes in an ice bath and heated over steam for 20 minutes. After cooling the reaction mixture is poured over crushed ice and the crystalline material which forms is filtered and washed with water. Recrystallization from ethyl acetate gives 2-(2'-nitrophenyl)-4-nitroimidazole; M.P. 242–243° C.

When the above process is carried out using 2-(4'-piperidinothiocarbamoylphenyl)-imidazole or 2-(4'-carboxamidophenyl)-imidazole in place of 2-(2'-nitrophenyl)-imidazole, there is obtained 2-(4'-piperidinothiocarbamoylphenyl) - 4 - nitroimidazole or 2-(4'-carboxamidophenyl)-4-nitroimidazole, respectively.

EXAMPLE 60

1-methyl-2-(2'-nitrophenyl)-5-nitroimidazole

To 2.13 ml. of dimethylsulfate is added 5.0 gm. of 2-(2'-nitrophenyl)-4-nitroimidazole. The mixture is heated for two hours at a temperature of 150° C. The reaction mixture is cooled and added to a mixture of 1.25 N sodium hydroxide and chloroform. The resulting solution is extracted with five 300 ml. portions of chloroform and the chloroform is then removed by evaporation in vacuo. The residue is recrystallized from acetone-ether and gives 1-methyl-2-(2'-nitrophenyl)-5-nitroimidazole; M.P. 143–145° C.

When the above process is carried out using 2-(4'-piperidinothiocarbonylphenyl) - 4 - nitroimidazole, 1-[4'-(2'-furylphenyl)] - 4 - nitroimidazole, 2-(4'-carboxamidophenyl)-4-nitroimidazole or 2-(4'-ureidophenyl)-4-nitroimidazole in place of 2-(2'-nitrophenyl)-4-nitroimidazole, there is obtained 1-methyl-2-(4'-piperidinothiocarbonylphenyl)-5-nitroimidazole, 1 - methyl-2-[4'-(2'-furylphenyl)]-5-nitroimidazole, 1 - methyl-2-(4'-carboxamidophenyl)-5-nitroimidazole, or 1-methyl-2-(4'-ureidophenyl)-5-nitroimidazole, respectively.

EXAMPLE 61

2-(3',5'-dinitrophenyl)-4-nitroimidazole

To 250 ml. of hot absolute ethanol is added 10 gm. of 3,5-dinitrobenzonitrile. The resulting solution is cooled in an ice bath and saturated with hydrogen chloride. The reaction mixture is maintained at 5° C. for 24 hours and is then diluted with ether until a volume of 1 liter is obtained. The reaction mixture is then filtered, and the precipitate is washed with ether and air-dried giving ethyl 3,5 - dinitrophenyl carboximidate hydrochloride; M.P. 283–285° C.

12 gm. of ethyl 3,5-dinitrophenyl carboximidate hydrochloride is dissolved in 25 ml. of methanol. To this is added 5.8 gm. of amino acetaldehyde diethyl acetal in 10 ml. of methanol. The resulting mixture is allowed to stand at room temperature for two hours and is then evaporated in vacuo leaving an oily residue. The residue is treated with 20 ml. of cold concentrated sulfuric acid with stirring and the reaction mixture is poured over ice and 11.7 N sodium hydroxide. The resulting alkaline solution is extracted with chloroform and the extracts are combined and evaporated. The residue is dissolved in ethyl acetate and evaporated to a residue. Hexane is then added and on standing crystals form which when recrystallized from 1,2-dimethoxy ethane give 2-(3',5'-dinitrophenyl)-imidazole; M.P. 240–242° C.

A 1 gm. sample of 2-(3',5'-dinitrophenyl)-imidazole is dissolved in 10 ml. of acetic anhydride which contains 0.27 ml. of concentrated nitric acid. The reaction mixture is heated over steam until the reaction subsides. The acetic anhydride is removed by evaporation in vacuo. The remaining crystalline material is dissolved in ethyl acetate and washed with dilute sodium bicarbonate and water. The solution is then dried over magnesium sulfate, filtered, and the ethyl acetate is evaporated in vacuo. The product, 2-(3',5'-dinitrophenyl)-4-nitroimidazole is recrystallized from 1,2-dimethoxy ethane; M.P. 285–290° C.

When the above process is carried out using 2-(3'-methylthiophenyl)-imidazole,
2-(4'-cyanothiophenyl)-imidazole,
2-(4'-cyanophenyl)-imidazole,
2-(2',4'-dinitrophenyl)-imidazole,
2-(4'-methoxythiocarbonylphenyl)-imidazole,
2-(4'-acetylphenyl)-imidazole,
2-(4'-diethylsulfonamidophenyl)-imidazole, or
2-(4'-morpholinosulfonylphenyl)-imidazole,
in-place of
2-(3',5'-dinitrophenyl)-imidazole,
there is obtained
2-(3'-methylthiophenyl)-4-nitroimidazole,
2-(4'-cyanothiophenyl)-4-nitroimidazole,
2-(4'-cyanophenyl)-4-nitroimidazole,
2-(2',4'-dinitrophenyl)-4-nitroimidazole,
2-(4'-methoxythiocarbonylphenyl)-4-nitroimidazole,
2-(4'-acetylphenyl)-4-nitroimidazole,
2-(4'-diethylsulfonamidophenyl)-4-nitroimidazole, or
2-(4'-morpholinosulfonylphenyl)-4-nitroimidazole,
respectively.

EXAMPLE 62

1-methyl-2-(3',5'-dinitrophenyl)-5-nitroimidazole 5 gm. of 2-(3',5'-dinitrophenyl)-4-nitroimidazole is dissolved in 100 ml. of 1,2-dimethoxy ethane and cooled in an ice bath. An excess of ethereal diazomethane is added and the resulting mixture is allowed to stand at room temperature overnight. The reaction mixture is then evaporated in vacuo and the residue is dissolved in acetone. The resulting solution is treated with charcoal, evaporated and the residue is triturated with hexane. The crystalline product is recrystallized from hexane giving 1 - methyl-2-(3',5'-dinitrophenyl)-5-nitroimidazole; M.P. 195–198° C.

When the above process is carried out and 2-(3'-methylthiophenyl)-4-nitroimidazole,
2-(4'-cyanothiophenyl)-4-nitroimidazole,
2-(4'-methylthiocarbamoylthiophenyl)-4-nitroimidazole,
2-(4'-thioncarbamoylthiophenyl)-4-nitroimidazole,
2-(4'-methoxythiocarbonylphenyl)-4-nitroimidazole,
2-(4'-carboxamidophenyl)-4-nitroimidazole,
2-(4'-dimethylsulfonylaminophenyl)-4-nitroimidazole,
2-(4'-diethylsulfonylaminophenyl)-4-nitroimidazole,
2-(4'-morpholinosulfonylphenyl)-4-nitroimidazole,
2-(4'-phenylsulfonylaminophenyl)-4-nitroimidazole,
2-[4'-(4''-chlorophenylsulfonylamino)phenyl]-4-nitroimidazole,
2-[4'-(4''-nitrophenylsulfonylamino)phenyl]-4-nitroimidazole, or
2-[4'-(4''-ethylphenylsulfonylamino)phenyl]-4-nitroimidazole
is used in place of
2-(3',5'-dinitrophenyl)-4-nitroimidazole,
there is obtained
1-methyl-2-(3'-methylthiophenyl)-5-nitroimidazole,
1-methyl-2-(4'-cyanothiophenyl)-5-nitroimidazole,
1-methyl-2-(4'-thionmethylcarbamoylthiophenyl)-5-nitroimidazole,
1-methyl-2-(4'-thioncarbamoylthiophenyl)-5-nitroimidazole,
1-methyl-2-(4'-methoxythiocarbonylphenyl)-5-nitroimidazole,
1-methyl-2-(4'-carboxamidophenyl)-5-nitroimidazole,
1-methyl-2-(4'-dimethylsulfonylaminophenyl)-5-nitroimidazole,
1-methyl-2-(4'-diethylsulfonylaminophenyl)-5-nitroimidazole,
1-methyl-2-(4'-morpholinosulfonylphenyl)-5-nitroimidazole,
1-methyl-2-(4'-phenylsulfonylaminophenyl)-5-nitroimidazole,
1-methyl-2-[4'-(4''-chlorophenylsulfonylamino)phenyl]-5-nitroimidazole,
1-methyl-2-[4'-(4''-nitrophenylsulfonylamino)phenyl]-5-nitroimidazole, or
1-methyl-2-[4'-(4''-ethylphenylsulfonylamino)phenyl]-5-nitroimidazole,
respectively.

EXAMPLE 63

1-methyl-2-(2',4'-dinitrophenyl)-5-nitroimidazole 2,4-dinitrobenzaldehyde (30.8 gm. is dissolved in 300 cc. of absolute ethanol. Upon addition of 75 cc. of 30% glyoxal solution and 75 cc. of concentrated ammonium hydroxide solution, the temperature slowly rises to 64° C. After 4 hours, the reaction mixture is diluted with chloroform. The organic layer is separated, washed with water, dried over magnesium sulfate and concentrated to a dark oily residue. The residue is then extracted with boiling benzene. The benzene extracts are then passed over a column of 120 gm. of alumina. Elution is continued until byproduct is passed through the column. The desired product, 2-(2',4'-dinitrophenyl)-imidazole is obtained by eluting the alumina column further with acetone. After recrystallization from acetone-petroleum ether, the product displays a melting point of 237–239° C.

2.16 gm. of 2-(2',4'-dinitrophenyl)-imidazole is dissolved in a mixture of 3 cc. of concentrated nitric acid and 3 cc. fuming sulfuric acid with cooling. The mixture is heated on the steam bath for 30 minutes, cooled and diluted with water. The resulting aqueous solution is extracted with ethyl acetate and the extracts are washed with water and concentrated to a residue. The residue is recrystallized from ethyl acetate to give 2-(2',4'-dinitrophenyl)-4-nitroimidazole; M.P. 215–223° C.

When the above process is carried out and 2-(4'-ethylthiophenyl) - imidazole, 2 - (4' - diethylsulfonamidophenyl) - imidazole, 2 - (4' - morpholinosulfonylphenyl)-imidazole, or 2 - (4' - formylphenyl) - imidazole is used in place of 2 - (2',4' - dinitrophenyl) - imidazole, there is obtained 2-(4'-ethylthiophenyl)-4-nitroimidazole, 2-(4'-diethylsulfonamidophenyl) - 4 - nitroimidazole, 2 - (4'-morpholinosulfonylphenyl) - 4 - nitroimidazole or 2-(4'-formylphenyl)-4-nitroimidazole, respectively.

When the process of Example 62 is employed using 2 - (2',4' - dinitrophenyl) - 4 - nitroimidazole in place of 2-(3',5' - dinitrophenyl) - 4 - nitroimidazole, the former is converted to 1 - methyl - 2-(2',4'-dinitrophenyl-5-nitroimidazole.

EXAMPLE 64

1-methyl-2-(2'-nitrophenyl)-4-nitroimidazole

A solution of 234 mg. (0.001 mole) of 2-(2'-nitrophenyl) - 4 - nitroimidazole in 10 ml. of dry 1,2-dimethoxyethane is treated with 72 mg. (0.001 mole) of sodium hydride (50% emulsion in petrolatum). When the evolution of hydrogen has ceased, 0.125 ml. (0.0013 mole) of methyl sulfate is added, and the mixture is heated at reflux for several hours. It is concentrated to a small volume at reduced pressure, and the residue is diluted with several volumes of water. This residue is extracted several times with petroleum benzin to remove the petrolatum and then with chloroform to remove the 1 - methyl - 2-(2'-nitrophenyl)-4-nitroimidazole, which is obtained as a solid on evaporation of the chloroform.

When the above process is carried out and 2-(4'-thiocarbamoylphenyl)-4-nitroimidazole,
2-(4'-N-methylthiocarbamoylphenyl)-4-nitroimidazole,
2-(4'-piperidinothiocarbonylphenyl)-4-nitroimidazole.
2-(4'-aminophenyl)-4-nitroimidazole,
2-(3'-aminophenyl)-4-nitroimidazole,
2-(2'-aminophenyl)-4-nitroimidazole,
2-(4'-ureidophenyl)-4-nitroimidazole,
2-(4'-fluoroethylcarbonylaminophenyl)-4-nitroimidazole,
2-(4'-N-ethylaminocarbonylmethylaminophenyl)-4-nitroimidazole, or
2-(4'-aminocarbonylethylaminophenyl)-4-nitroimidazole is used in place of 2-(2'-nitrophenyl)-4-nitroimidazole, there is obtained 1-methyl-2-(4'-thiocarbamoylphenyl)-4-nitroimidazole,
1-methyl-2-(4'-N-methylthiocarbamoylphenyl)-4-nitroimidazole,
1-methyl-2-(4'-piperidinothiocarbonylphenyl)-4-nitroimidazole,
1-methyl-2-(4'-aminophenyl)-4-nitroimidazole,
1-methyl-2-(3'-aminophenyl)-4-nitroimidazole,
1-methyl-2-(2'-aminophenyl)-4-nitroimidazole,
1-methyl-2-(4'-ureidophenyl)-4-nitroimidazole,
1-methyl-2-(4'-fluoroethylcarbonylaminophenyl)-4-nitroimidazole,
1-methyl-2-(4'-N-ethylaminocarbonylmethylaminophenyl)-4-nitroimidazole, or
1-methyl-2-(4'-aminocarbonylethylaminophenyl)-4-nitroimidazole, respectively.

EXAMPLE 65

1-methyl-2-(3'-nitrophenyl)-4-nitroimidazole

A solution of 234 mg. (0.001 mole) of 2-(3'-nitrophenyl)-4-nitroimidazole in 10 ml. of 1,2-dimethoxyethane is treated with 72 mg. (0.0015 mole) of sodium hydride (50% emulsion in petrolatum). When the evolution of hydrogen has ceased, 0.125 ml. (0.0013 mole) of methylsulfate is added, and the mixture is heated at reflux temperature for several hours. It is concentrated at reduced pressure to a smaller volume, and the residue is diluted with several volumes of cold water. This mixture is washed several times with petroleum benzin to remove the petrolatum and then several times with chloroform to extract the product. On evaporation of the chloroform, 1 - methyl - 2 - (3'-nitrophenyl)-4-nitroimidazole is obtained as a solid residue.

When the above process is carried out and 2-(4'-piperidinocarbonylethylamino)-4-nitroimidazole,
2-(4'-guanidinophenyl)-4-nitroimidazole,
2-(3'-ethylaminophenyl)-4-nitroimidazole,
2-(4'-dimethylaminophenyl)-4-nitroimidazole,
2-(4'-acetylaminophenyl)-4-nitroimidazole,
2-(4'-benzoylaminophenyl)-4-nitroimidazole,
2-[4'-(4''-nitrobenzoylaminophenyl)]-4-nitroimidazole,
2-[4'-(4''-ethylbenzoylaminophenyl)]-4-nitroimidazole,
2-(2'-cyanoaminophenyl)-4-nitroimidazole, or
2-(4'-formylaminophenyl)-4-nitroimidazole is used in place of 2-(3'-nitrophenyl)-4-nitroimidazole, there is obtained 1-methyl-2-(4'-piperidinocarbonylethylamino)-4-nitroimidazole,
1-methyl-2-(4'-guanidinophenyl)-4-nitroimidazole,
1-methyl-2-(3'-ethylaminophenyl)-4-nitroimidazole,
1-methyl-2-(4'-dimethylaminophenyl)-4-nitroimidazole,
1-methyl-2-(4-acetylaminophenyl)-4-nitroimidazole,
1-methyl-2-(4'-benzoylaminophenyl)-4-nitroimidazole,
1-methyl-2-[4'-(4''-nitrobenzoylaminophenyl)]-4-nitroimidazole,
1-methyl-2-[4'-(4''-ethylbenzoylaminophenyl)]-4-nitroimidazole,
1-methyl-2-(2'-cyanoaminophenyl)-4-nitroimidazole, or
1-methyl-2-(4'-formylaminophenyl)-4-nitroimidazole, respectively.

EXAMPLE 66

1-methyl-2-(4'-nitrophenyl)-4-nitroimidazole

A solution of 234 mg. (0.001 mole) of 2-(4'-nitrophenyl)-4-nitroimidazole in 10 ml. of dry 1,2-dimethoxyethane is treated with 72 mg. (0.0015 mole) of sodium hydride (50% emulsion in petrolatum). When the evolution of hydrogen has ceased, 0.125 ml. (0.0013 mole) of methyl sulfate is added, and the mixture is heated at reflux for several hours. It is concentrated to a smaller volume at reduced pressure, and the residue is diluted with several volumes of water. This mixture is extracted three times with chloroform, which extract is dried and concentrated. The residue, after extraction with hexane to remove the petrolatum, consists of 1-methyl-2-(4'-nitrophenyl)-4-nitroimidazole.

When 2-(2'-nitrophenyl)-4 - nitroimidazole, 2 - (3'-nitrophenyl) - 4 - nitroimidazole or 2 - (2',4'-dinitrophenyl) - 4 - nitroimidazole is used in the above process in place of 2 - (4' - nitrophenyl) - 4 - nitroimidazole, 1-methyl - 2 - (2' - nitrophenyl) - 4 - nitroimidazole, 1-methyl - 2 - (3' - nitrophenyl) - 4 - nitroimidazole or 1-methyl-2 - (2',4' - dinitrophenyl) - 4 - nitroimidazole, respectively, is obtained.

When the above process is carried out using 2-(2'-naphthyl)-4-nitroimidazole,
2-(2'-5',6',7',8'-tetrahydronaphthyl)-4-nitroimidazole,
2-(5'-indanyl)-4-nitroimidazole,
2-(6'-quinolinyl)-4-nitroimidazole, or
2-(6'-quinoxalinyl)-4-nitroimidazole in place of 2-(4'-nitrophenyl)-4-nitroimidazole,
there is obtained
1-methyl-2-(2'-naphthyl)-4-nitroimidazole, 1-methyl-2-(2'-5',6',7',8'-tetrahydronaphthyl)-4-nitroimidazole,
1-methyl-2-(5'-indanyl)-4-nitroimidazole,
1-methyl-2-(6'-quinolinyl)-4-nitroimidazole, or
1-methyl-2-(6'-quinoxalinyl)-4-nitroimidazole,
respectively.

When the above process is carried out and
2-(3'-fluoro-2'-naphtyl)-4-nitroimidazole,
2-(4'-biphenylyl)-4-nitroimidazole,
2-[4'-(1-carbamoylhydrazin-2-yl-methylenephenyl)]-4-nitroimidazole,
2-[4'-(1-thioncarbamoylhydrazin-2-yl-methylenephenyl)]-nitroimidazole,
2-[4'-(1-carbamoyl-N-methylhydrazin-2-ylmethylenephenyl)]-4-nitroimidazole,
2-(4'-N-methylthiocarbamoylphenyl)-4-nitroimidazole,
2-(4'-dimethylcarboxamidophenyl)-4-nitroimidazole,
2-(4'-piperidinocarbonylphenyl)-4-nitroimidazole,
2-(4'-tolyl)-4-nitroimidazole,
2-(4'-acetylaminomethylphenyl)-4-nitroimidazole,
2-(4'-benzoylaminomethylphenyl)-4-nitroimidazole,
2-[4'-(2''-fluorobenzoylaminomethylphenyl)]-4-nitroimidazole,
2-[4'-(2''-nitrobenzoylaminomethylphenyl)]-4-nitroimidazole, or
2-[4'-(4''-tolylaminomethylphenyl)]-4-nitroimidazole
is used in place of
2-(4'-nitrophenyl)-4-nitroimidazole,
there is obtained
1-methyl-2-(4'-fluoro-2'-naphthyl)-4-nitroimidazole,
1-methyl-2-(4'-biphenylyl)-4-nitroimidazole,
1-methyl-2-[4'-(1'''-carbamoylhydrazin-2'''-yl-methylenephenyl)]-4-nitroimidazole,
1-methyl-2-[4'-(1'''-thioncarbamoylhydrazin-2'''-yl-methylenephenyl)]-4-nitroimidazole,
1-methyl-2-[4'-(1'''-carbamoyl-1'''-methylhydrazin-2'''-yl-methylenephenyl)]-4-nitroimidazole,
1-methyl-2-(4'-N-methylthiocarbamoylphenyl)-4-nitroimidazole,
1-methyl-2-(4'-dimethylcarboxamidophenyl)-4-nitroimidazole,
1-methyl-2-(4'-piperidinocarbonylphenyl)-4-nitroimidazole,
1-methyl-2-(4'-tolyl)-4-nitroimidazole,
1-methyl-2-(4'-acetylaminomethylphenyl)-4-nitroimidazole,
1-methyl-2-(4'-benzoylaminomethylphenyl)-4-nitroimidazole,
1-methyl-2-[4'-(2''-fluorobenzoylaminomethyl)phenyl]-4-nitroimidazole,
1-methyl-2-[4'-nitrobenzoylaminomethyl)-phenyl]-4-nitroimidazole, or
1-methyl-2-[4'-(4''-tolylaminomethylphenyl)]-4-nitroimidazole,
respectively.

EXAMPLE 67

1-(2'-hydroxyethyl)-2-(4'-nitrophenyl)-4-nitroimidazole

A solution of 234 mg. (0.001 mole) of 2-(4'-nitrophenyl)-4-nitroimidazole and 130 mg. of potassium carbonate in 5 ml. of water is stirred at 50° C., and ethylene oxide is passed in slowly from a gas burette until 0.003 mole has been absorbed by the reaction mixture. The 1-(2'-hydroxyethyl) - 2-(4'-nitrophenyl)-4-nitroimidazole crystallizes from solution.

When 2-(2'-nitrophenyl)-4-nitroimidazole, 2-(3'-nitrophenyl)-4-nitroimidazole or 2-(2',4'-dinitrophenyl)-4-nitroimidazole is used in place of 2-(4'-nitrophenyl)-4-nitroimidazole in the above process, 1-(2'-hydroxyethyl-2-(2'-nitrophenyl)-4-nitroimidazole, 1-(2'-hydroxyethyl)-2-(3'-nitrophenyl)-4-nitroimidazole or 1-(2'-hydroxyethyl)-2-(2',4' - dinitrophenyl)-4-nitroimidazole, respectively, is obtained.

When the above process is carried out using
2-(2'-naphthyl)-4-nitroimidazole,
2-(2'-5',6',7',8'-tetrahydronaphthyl)-4-nitroimidazole,
2-(5'-indanyl)-4-nitroimidazole,
2-(6'-quinolinyl)-4-nitroimidazole,
2-(6'-quinoxalinyl)-4-nitroimidazole, or
2-(3'-fluoro-2'-naphthyl)-4-nitroimidazole in place of
2-(4'-nitrophenyl)-4-nitroimidazole,
there is obtained
1-(2'-hydroxyethyl)-2-(2'-naphthyl)-4-nitroimidazole,
1-(2'-hydroxyethyl)-2-(2'-5',6',7',8'-tetrahydronaphthyl)-4-nitroimidazole,
1-(2'-hydroxyethyl)-2-(5'-indanyl)-4-nitroimidazole,
1-(2'-hydroxyethyl)-2-(6'-quinolinyl)-4-nitroimidazole,
1-(2'-hydroxyethyl)-2(6'-quinoxalinyl)-4-nitroimidazole, or
1-(2'-hydroxyethyl)-2-(3'-fluoro-2'-naphthyl)-4-nitroimidazole,
respectively.

When the above process is carried out and
2-[4'-(1-carbamoylhydrazin-2-yl-methylenephenyl)]-4-nitroimidazole,
2-[4'-(1-thioncarbamoylhydrazin-2-yl-methylenephenyl)]-4-nitroimidazole,
2-[4'-(1-carbamoyl-N-methylhydrazin-2-yl-methylenephenyl)]-4-nitroimidazole,
2-(4'-dimethylcarboxamidophenyl)-4-nitroimidazole,
2-(4'-piperidinocarbonylphenyl)-4-nitroimidazole,
2-(4'-acetylaminomethylphenyl)-4-nitroimidazole,
2-(4'-benzoylaminomethylphenyl)-4-nitroimidazole,
2-[4'-(2''-fluorobenzoylaminomethylphenyl)]-4-nitroimidazole,
2-[4'-(2''-nitrobenzoylaminomethylphenyl)]-4-nitroimidazole, or
2-[4'-(4''-tolylaminomethylphenyl)]-4-nitroimidazole
is used in place of
2-(4'-nitrophenyl)-4-nitroimidazole,
there is obtained
1-(2'-hydroxyethyl)-2-[4'-(1-carbamoylhydrazin-2-yl-methylenephenyl)]-4-nitroimidazole,
1-(2'-hydroxyethyl)-2-[4'-(1-thioncarbamoylhydrazin-2-yl-methylenephenyl)]-4-nitroimidazole,
1-(2'-hydroxyethyl)-2-[4'-(1-carbamoyl-N-methylhydrazin-2-yl-methylenephenyl)]-4-nitroimidazole,
1-(2'-hydroxyethyl)-2-(4'-dimethylcarboxamidophenyl)-4-nitroimidazole,
1-(2'-hydroxyethyl)-2-(4'-piperidinocarbonylphenyl)-4-nitroimidazole,
1-(2'-hydroxyethyl)-2-(4'-acetylaminomethylphenyl)-4-nitroimidazole,
1-(2'-hydroxyethyl)-2-(4'-benzoylaminomethylphenyl)-4-nitroimidazole,
1-(2'-hydroxyethyl)-2-[4'-(2''-fluorobenzoylaminomethylphenyl)]-4-nitroimidazole,
1-(2'-hydroxyethyl)-2-[4'-(2''-nitrobenzoylaminomethylphenyl)]-4-nitroimidazole, or
1-(2'-hydroxyethyl)-2-[4'(4''-tolylaminomethylphenyl)]-4-nitroimidazole,
respectively.

EXAMPLE 68

1-(2'-hydroxyethyl)-2-(4'-nitrophenyl)-5-nitroimidazole

A mixture of 2.34 g. (0.01 mole) of 2-(4'-nitrophenyl)-4-nitroimidazole and 2.8 ml. (approx. 0.01 mole) of β-ethoxyethyl tosylate is heated at about 150°–200° C. for several hours. The cooled reaction mixture is dissolved in 100 ml. of chloroform, and the solution is extracted several times with 4 N ammonium hydroxide. The chloroform layer is diluted with an equal volume of ether and is filtered through a layer of alumina to remove the dark color that is present. The eluate is concentrated to dryness leaving a residue of 1-(2'-ethoxyethyl)-2-(4'-nitrophenyl)-5-nitroimidazole.

The residue is heated with 4–5 volumes of concentrated sulfuric acid on the steam bath for a short time. The mixture is cooled, diluted with water, reheated with charcoal to decolorize the solution and is cooled and neutralized with concentrated sodium hydroxide solution. The 1-(2'-hydroxyethyl)-2-(4' - nitrophenyl)-5-nitroimidazole precipitates from solution.

EXAMPLE 69

1-(2'-hydroxyethyl)-2-(3'-nitrophenyl)-4-nitroimidazole

A solution of 234 mg. (0.001 mole) of 2-(3'-nitrophenyl)-4-nitroimidazole and 130 mg. of potassium carbonate in 5 ml. of water is stirred at about 50° C., and ethylene oxide is passed in slowly from a gas burette until 0.003 mole of the gas has been absorbed by the reaction mixture. The 1-(2'-hydroxyethyl)-2-(3'-nitrophenyl)-4-nitroimidazole crystallizes from solution.

When the above process is carried out and 2-(3'-methylthiophenyl)-4-nitroimidazole,
2-(4'-cyanothiophenyl)-4-nitroimidazole,
2-(4'-methylthioncarbamoylthiophenyl)-4-nitroimidazole,
2-(4'-thioncarbamoylthiophenyl)-4-nitroimidazole,
2-(4'-methoxythiocarbonylthiophenyl)-4-nitroimidazole,
2-(4'-diethylsulfonamidophenyl)-4-nitroimidazole,
2-(4'-morpholinosulfonylphenyl)-4-nitroimidazole, or
2-(4'-ethylsulfoxylphenyl)-4-nitroimidazole is used in place of 2-(3'-nitrophenyl)-4-nitroimidazole, there is obtained 1-(2'-hydroxyethyl)-2-(3'-methylthiophenyl)-4-nitroimidazole,
1-(2'-hydroxyethyl)-2-(4'-cyanothiophenyl)-4-nitroimidazole,
1-(2'-hydroxyethyl)-2-(4'-methylthioncarbamoylthiophenyl)-4-nitroimidazole,
1-(2'-hydroxyethyl)-2-(4'-thioncarbamoylthiophenyl)-4-nitroimidazole,
1-(2'-hydroxyethyl)-2-(4'-methoxythiocarbonylthiophenyl)-4-nitroimidazole,
1-(2'-hydroxyethyl)-2-(4'-diethylsulfonamidophenyl)-4-nitroimidazole,
1-(2'-hydroxyethyl)-2-(4'-morpholinosulfonylphenyl)-4-nitroimidazole, or
1-(2'-hydroxyethyl)-2-(4'-ethylsulfoxylphenyl)-4-nitroimidazole, respectively.

EXAMPLE 70

1-(2'-hydroxyethyl)-2-(3'-nitrophenyl)-5-nitroimidazole

A mixture of 2.34 g. (0.01 mole) of 2-(3'-nitrophenyl)-4-nitroimidazole and 2.8 ml. (approximately 0.01 mole) of β-ethoxyethyl tosylate is heated at 150–200° C. for several hours. The cooled reaction mixture is dissolved in 100 ml. of chloroform and the solution is washed several times with 4 N ammonium hydroxide. The chloroform layer is diluted with about 1–2 volumes of ether, and is filtered through a layer of alumina to remove dark-colored impurities. The eluate is concentrated to dryness leaving a residue of 1-(2'-ethoxyethyl)-2-(3'-nitrophenyl)-5-nitroimidazole.

The residue is heated with 4 to 5 volumes of concentrated sulfuric acid on the steam bath for a short time. The mixture is cooled, diluted with water, reheated, and filtered with a little decolorizing charcoal. On neutralization of the filtrate with concentrated sodium hydroxide solution, 1-(2'-hydroxyethyl)-2-(3' - nitrophenyl)-5-nitroimidazole is obtained as a precipitate.

When the above process is carried out and 2-(3'-methylthiophenyl)-4-nitroimidazole,
2-(4'-diethylsulfonamidophenyl)-4-nitroimidazole,
2-(4'-morpholinosulfonylphenyl)-4-nitroimidazole, or
2-(4'-ethylsulfoxylphenyl)-4-nitroimidazole is used in place of 2-(3'-nitrophenyl)-4-nitroimidazole, there is obtained 1-(2'-hydroxyethyl)-2-(3'-methylthiophenyl)-5-nitroimidazole,
1-(2'-hydroxyethyl)-2-(4'-diethylsulfonamidophenyl)-5-nitroimidazole,
1-(2'-hydroxyethyl)-2-(4'-morpholinosulfonylphenyl)-5-nitroimidazole, or
1-(2'-hydroxyethyl)-2-(4'-ethylsulfoxylphenyl)-5-nitroimidazole, respectively.

EXAMPLE 71

1-(2'-hydroxyethyl)-2-(2'-nitrophenyl)-4-nitroimidazole

A solution of 234 mg. (0.001 mole) of 2-(2'-nitrophenyl)-4-nitroimidazole and 130 mg. of potassium carbonate in 5 ml. of water is stirred at 50° C. and ethylene oxide is passed in slowly from a gas burette until 0.003 mole of the gas has been absorbed by the reaction mixture. The 1-(2'-hydroxyethyl)-2-(2'-nitrophenyl)-4-nitroimidazole crystallizes from solution.

When the above process is carried out and 2-(4'-fluoroethoxyphenyl)-4-nitroimidazole,
2-(4'-piperidinocarbonylethylamino)-4-nitroimidazole, or
2-(4'-thiocarbamoylmethoxyphenyl)-4-nithoimidazole, is used in place of 2-(2'-nitrophenyl)-4-nitroimidazole, there is obtained 1-(2'-hydroxyethyl)-2-4'-fluoroethoxyphenyl)-4-nitroimidazole,
1-(2'-hydroxyethyl)-2-(4'-piperidinocarbonylethylamino)-4-nitroimidazole, or
1-(2'-hydroxyethyl)-2-(4'-thiocarbamoylmethoxyphenyl)-4-nitroimidazole, respectively.

When the above process is carried out using 2-(4'-cyanomethylphenyl)-4-nitroimidazole,
2-(4'-carboxamidomethylphenyl)-4-nitroimidazole,
2-(4'-N-methylcarboxamidomethylphenyl)-4-nitroimidazole,
2-phenyl-4-nitroimidazole,
2-(4'-methoxyiminoformylphenyl)-4-nitroimidazole,
2-(4'-methoxyformylphenyl)-4-nitroimidazole, or
2-(4'-formylphenyl)-4-nitroimidazole in place of
2-(2'-nitrophenyl)-4-nitroimidazole, there is obtained 1-(2'-hydroxyethyl)-2-(4'-cyanomethylphenyl)-4-nitroimidazole,
1-(2'-hydroxyethyl)-2-(4'-carboxamidomethylphenyl)-4-nitroimidazole,
1-(2'-hydroxyethyl)-2-(4'-N-methylcarboxamidomethylphenyl)-4-nitroimidazole,
1-(2'-hydroxyethyl)-2-phenyl-4-nitroimidazole,
1-(2'-hydroxyethyl)-2-(4'-methoxyiminoformylphenyl)-4-nitroimidazole,
1-(2'-hydroxyethyl)-2-(4'-methoxyformylphenyl)-4-nitroimidazole, or
1-(2'-hydroxyethyl)-2-(4'-formylphenyl)-4-nitroimidazole, respectively.

EXAMPLE 72

1-(2'-hydroxyethyl)-2-(2'-nitrophenyl)-5-nitroimidazole

A mixture of 2.34 g. (0.01 mole) of 2-(2'-nitrophenyl)-4-nitroimidazole and 2.8 ml. (approx. 0.01 mole) of β-ethoxyethyl tosylate is heated at 150–200° C. for several hours. The cooled reaction mixture is dissolved in about 100 ml. of chloroform and the solution is washed several times with 4 N ammonium hydroxide. The chloroform layer is diluted with an equal volume of ether and is filtered through a layer of alumina to remove dark-colored impurities. The eluate is concentrated to dryness leaving a residue of 1-(2'-ethoxyphenyl)-2-(2'-nitrophenyl)-5-nitroimidazole.

The residue is heated with 4–5 volumes of concentrated sulfuric acid on the steam bath for a short time. The mixture is cooled, diluted with water, reheated, filtered with charcoal and adjusted to pH 7.5 by the addition of concentrated sodium hydroxide addition, wherefrom 1-(2'-hydroxyethyl)-2-(2'-nitrophenyl) - 5 - nitroimidazole precipitates from solution.

When the above process is carried out and 2-(4'-fluoroethoxyphenyl)-4-nitroimidazole is used in place of 2-(2'-nitrophenyl)-4-nitroimidazole, there is obtained 1-(2'-hydroxyethyl)-2-(4'-fluoroethoxyphenyl)-5-nitroimidazole.

When the above process is carried out using 2-(4'-formylphenyl)-4-nitroimidazole in place of 2-(2'-nitrophenyl)-4-nitroimidazole, there is obtained 1-(2'-hydroxyethyl)-2-(4'-formylphenyl)-5-nitroimidazole.

EXAMPLE 73

1-methyl-2-(3'-nitrophenyl)-5-nitroimidazole

A 3.0 gm. (14.08 mmol) sample of 1-methyl-2-phenyl-5-nitroimidazole is added in one portion to a cold solution composed of 10 ml. concentrated sulfuric acid and 0.66 ml. of concentrated nitric acid. The reaction mixture is warmed on the steam cone for about 30 minutes. After the reaction is complete, the reaction mixture is cooled in an ice bath and poured over 250 ml. cracked ice. The resulting acidic solution is then made alkaline with 11.6 N sodium hydroxide. The product, 1-methyl-2-(3'-nitrophenyl)-5-nitroimidazole, is filtered off and washed with water. Recrystallization from ether-acetone yields 1-methyl-2-(3' - nitrophenyl)-5-nitroimidazole; M.P. 125–126° C.

When the above process is carried out and 1-methyl-2-(4'-fluorophenyl)-5-nitroimidazole,
1-methyl-2-(4'-chlorophenyl)-5-nitroimidazole,
1-methyl-2-(4' - carboxamidophenyl)-5-nitroimidazole, or
1-(2'-hydroxyethyl)-2-(4'-fluorophenyl)-5-nitroimidazole is used in place of 1-methyl-2-phenyl-5-nitroimidazole, there is obtained 1-methyl-2-(3'-nitro-4'-fluorophenyl)-5-nitroimidazole,
1-methyl-2-(3'-nitro-4'-chlorophenyl)-5-nitroimidazole,
1-methyl-2-(3'-nitro-4'-carboxamidophenyl)-5-nitroimidazole, or
1-(2'-hydroxyethyl)-2-(3'-nitro-4'-fluorophenyl)-5-nitroimidazole, respectively.

EXAMPLE 74

1-methyl-2-(4'-nitrophenyl)-5-nitroimidazole

To a solution of 115 cc. of fuming nitric acid and 720 cc. of fuming sulfuric acid is added 150 gm. of 2-phenyl imidazole. The reaction mixture is cooled, stirred, and then heated on the steam bath for one-half hour and poured over ice. The solid product, 2-(4'-nitrophenyl)-4-nitroimidazole, is filtered off, washed with ethyl acetate and recrystallized from dimethylformamide; M.P. 290–291° C.

56 gm. of 2-(4'-nitrophenyl)-5-nitroimidazole is heated to 120–130° C. for one hour with 33.6 cc. of dimethyl sulfate. The resulting dark, glassy material is agitated while hot with a water-ammonium hydroxide mixture and is then cooled and extracted with chloroform to obtain a dark, semi-solid product. After recrystallization from acetone-water, 1-methyl-2-(4'-nitrophenyl) - 5 - nitroimidazole melting at 135°–136° C. is obtained.

When the above process is carried out and methyl-p-toluene sulfonate, ethyl-p-toluene sulfonate, ethyl sulfate or isopropyl sulfate is used in place of dimethyl sulfate, there is obtained 1-methyl-2-(4'-nitrophenyl)-5-nitroimidazole, 1-ethyl-2-(4'-nitrophenyl)-5-nitroimidazole, 1-ethyl-2-(4'-nitrophenyl)-5-nitroimidazole or 1-isopropyl-2-(4'-nitrophenyl)-5-nitroimidazole, respectively.

EXAMPLE 75

1-methyl-2-(3'-aminophenyl)-4-nitroimidazole

A solution of 22 g. (0.1 mole) of 2-(3'-nitrophenyl)-4-nitroimidazole in 220 ml. of ethanol and 110 ml. of concentrated ammonia water is saturated at room temperature with hydrogen sulfide (time about ½ hour). It is refluxed about ½ hour. The solution is again cooled, 10 ml. of concentrated ammonia water is added, and again the solution is saturated with hydrogen sulfide. This total sequence is carried out a total of three times. The alcohol is removed at reduced pressure, and the residue is acidified with dilute hydrochloric acid. The mixture is filtered from precipitated sulfur, the filtrate is again made alkaline, and the dark-colored precipitate of 2 - (3' - aminophenyl)-4-nitroimidazole is collected.

A solution of 15 g. of the above product in a mixture of 150 ml. of glacial acetic acid and 75 ml. of acetic anhydride is refluxed 5 hours. The solution is concentrated to about 50 ml. at reduced pressure, and the residue is poured into 500 ml. of cold water. After about 2 hours, the precipitate of 2-(3'-acetamidophenyl)-4-nitroimidazole is filtered, washed, and dried.

A solution of 12.3 g. (0.05 mole) of 2-(3'-acetamidophenyl)-4-nitroimidazole in 500 ml. of 1,2 - dimethoxyethane is treated with 3.6 g. (0.075 mole) of a 50% emulsion of sodium hydride in petrolatum. When the evolution of hydrogen has ceased, 6.3 g. (0.065 mole) of methyl sulfate is added, and the solution is heated at reflux overnight. The mixture is concentrated at reduced pressure and the residue is diluted with several volumes of water. This mixture is extracted with ethyl acetate, which extract is dried, filtered through a layer of alumina to remove some color, and concentrated to dryness leaving a residue of 1-methyl-2-(3'-acetamidophenyl)-4-nitroimidazole. Hydrolysis provides 1 - methyl-2-(3'-aminophenyl)-4-nitroimidazole.

When diethylsulfate is used in the above process in place of methylsulfate, 1-ethyl - 2 - (3'-aminophenyl)-4-nitroimidazole is obtained.

EXAMPLE 76

1-(2'-hydroxyethyl)-2-(3'-aminophenyl)-4-nitroimidazole

A mixture of 24.6 mg. (0.001 mole) of 2-(3'-acetamidophenyl)-4-nitroimidazole and 130 mg. of potassium carbonate in 5 ml. of water is stirred at 50° C. while ethylene oxide is passed in. The addition is continued until 0.003 mole of the gas has been absorbed by the reaction mixture. The product, 1-(2'-hydroxyethyl)-2-(3'-acetamidophenyl)-4-nitroimidazole, crystallizes from solution and is filtered, washed, and dried.

A solution of 290 mg. (0.001 mole) of 1-(2'-hydroxyethyl) - 2 - (3'-acetamidophenyl)-4-nitroimidazole in 6 N hydrochloric acid is heated on the steam bath for 3–4 hours. It is cooled, diluted with water, neutralized to about pH 7.5, whereupon 1 - (2' - hydroxyethyl) - 2-(3'-aminophenyl)-4-nitroimidazole precipitates.

When the above process is carried out and 1,3-propylene oxide is used in place of ethylene oxide, there is obtained 1 - (3' - hydroxypropyl)-2-(3'-aminophenyl)-4-nitroimidazole.

When the above process is carried out and 2-(4'-phosphondiamidophenyl)-4-nitroimidazole,
2-(4'-thiocarbamoylphenyl)-4-nitroimidazole,
2-(4'-N-methylthiocarbonylphenyl)-4-nitroimidazole,
2-(4'-piperidinothiocarbonylphenyl)-4-nitroimidazole,
2-(4'-amidinophenyl)-4-nitroimidazole,
2-(4'-n-propylamidinophenyl)-4-nitroimidazole,
2-(4'-morpholinoiminocarbonylphenyl)-4-nitroimidazole, 2-(4'-aminophenyl)-4-nitroimidazole,
2-(3'-aminophenyl)-4-nitroimidazole,
2-(2'-aminophenyl)-4-nitroimidazole,
2-(4'-ureidophenyl)-4-nitroimidazole, or
2-(4'-fluoroethylcarbonylaminophenyl)-4-nitroimidazole is used in place of 2-(3'-acetamidophenyl)-4-nitroimidazole, there is obtained 1-(2'-hydroxyethyl)-2-(4'-phosphondiamidophenyl)-4-nitroimidazole,
1-(2'-hydroxyethyl)-2-(4'-thiocarbamoylphenyl)-4-nitroimidazole,
1-(2'-hydroxyethyl)-2-(4'-N-methylthiocarbamoylphenyl)-4-nitroimidazole,
1-(2'-hydroxyethyl)-2-(4'-piperidinothiocarbonylphenyl)-4-nitroimidazole,
1-(2'-hydroxyethyl)-2-(4'-amidinophenyl)-4-nitroimidazole,
1-(2'-hydroxyethyl)-2-(4'-n-propylamidinophenyl)-4-nitroimidazole,
1-(2'-hydroxyethyl)-2-(4'-morpholinoiminocarbonylphenyl)-4-nitroimidazole,
1-(2'-hydroxyethyl)-2-(4'-aminophenyl)-4-nitroimidazole,
1-(2'-hydroxyethyl)-2-(3'-aminophenyl)-4-nitroimidazole,
1-(2'-hydroxyethyl)-2-(2'-aminophenyl)-4-nitroimidazole,
1-(2'-hydroxyethyl)-2-(4'-ureidophenyl)-4-nitroimidazole, or
1-(2'-hydroxyethyl)-2-(4'-fluoroethylcarbonylaminophenyl)-4-nitroimidazole, respectively.

EXAMPLE 77

1-(2'-hydroxyethyl)-2-(3'-aminophenyl)-5-nitroimidazole

A mixture of 2.46 g. (0.01 mole) of 2-(3'-acetamidophenyl)-4-nitroimidazole and 2.8 ml. (approx. 0.01 mole) of β-ethoxyethyl tosylate is heated at about 150–200° C. for several hours. The reaction mixture is cooled and is dissolved in chloroform, which solution is washed 4 times with 4 N ammonium hydroxide. The chloroform phase is diluted with 1–2 volumes of ether, and the solution is filtered through a layer of alumina to remove the dark-colored impurities that are present. The filtrate is concentrated to dryness leaving a residue of 1-(2'-ethoxyethyl)-2-(3'-acetamidophenyl)-5-nitroimidazole.

This residue is heated with 4–5 volumes of concentrated sulfuric acid for a short time on a steam bath. The mixture is cooled, diluted with twice its volume of water, reheated on the steam bath for 3 hours, and treated with decolorizing charcoal. The clarified filtrate is neutralized with sodium hydroxide and yields 1-(2'-hydroxyethyl)-2-(3'-aminophenyl)-5-nitroimidazole.

EXAMPLE 78

1-methyl-2-(4'-acetamidophenyl)-4-nitroimidazole

A solution of 246 mg. (0.001 mole) of 2-(4'-acetamidophenyl)-4-nitroimidazole in 25 ml. of 1,2-dimethoxyethane is treated with 72 mg. (0.0015 mole) of sodium hydride (50% suspension in petrolatum), which has been washed several times with N-hexane to remove the petrolatum. When the evolution of hydrogen has ceased, 0.125 ml. of methyl sulfate is added and the mixture is heated at reflux temperature for four hours. It is concentrated at reduced pressure to a small volume. The residue is diluted with several volumes of water and the mixture is extracted three times with ethyl acetate, which extract is dried and concentrated leaving a residue of 1-methyl-2-(4'-acetamidophenyl)-4-nitroimidazole.

When the above process is carried out and 2-(4'-carboxamidophenyl)-4-nitroimidazole is used in place of 2-(4'-acetamidophenyl)-4-nitroimidazole, there is obtained 1-methyl-2-(4'-carboxamidophenyl)-4-nitroimidazole.

When the above process is carried out and 2-phenyl-4-nitroimidazole is used in place of 2-(4'-acetamidophenyl)-4-nitroimidazole, there is obtained 1-methyl-2-phenyl-4-nitroimidazole.

When the above process is carried out and 2-(4'-tolyl)-4-nitroimidazole,
2-(3'-aminomethylphenyl)-4-nitroimidazole,
2-(4'-N-methylaminomethylphenyl)-4-nitroimidazole,
2-(4'-ethoxymethylphenyl)-4-nitroimidazole, or
2-(2'-hydroxymethylphenyl)-4-nitroimidazole is used in place of 2-(4'-acetamidophenyl)-4-nitroimidazole, there is obtained 1-methyl-2-(4'-tolyl)-4-nitroimidazole,
1-methyl-2-(3'-aminomethylphenyl)-4-nitroimidazole,
1-methyl-2-(4'-N-methylaminomethylphenyl)-4-nitroimidazole,
1-methyl-2-(4'-ethoxymethylphenyl)-4-nitroimidazole, or
1-methyl-2-(2'-hydroxymethylphenyl)-4-nitroimidazole, respectively.

EXAMPLE 79

1-methyl-2-(4'-aminophenyl)-4-nitroimidazole

A solution of 195 mg. of 1-methyl-2-(4'-acetamidophenyl)-4-nitroimidazole in 5 ml. of 6 N hydrochloric acid is heated on the steam bath for several hours. It is cooled, diluted with several volumes of water and is extracted three times with chloroform to remove any impurities. The aqueous phase is neutralized to pH 7.5 by the addition of concentrated ammonium hydroxide, whereupon 1-methyl-2-(4'-aminophenyl)-4-nitroimidazole precipitates from solution.

EXAMPLE 80

1-(2'-hydroxyethyl)-2-(4'-acetamidophenyl)-4-nitroimidazole

A solution of 246 mg. (0.001 mole) of 2-(4'-acetamidophenyl)-4-nitroimidazole and 130 mg. of potassium carbonate in 5 ml. of water is stirred at about 50° C. and ethylene oxide is passed in from a gas burette until 0.003 mole of the gas has been absorbed by the reaction mixture. The 1-(2'-hydroxyethyl)-2-(4'-acetamidophenyl)-4-nitroimidazole precipitates.

When the above process is carried out and

2-[4'-(2-oxo-oxazolidin-3-yl-iminomethylphenyl)]-4-nitroimidazole,
2-(4'-carbamoyloxymethylphenyl)-4-nitroimidazole,
2-(4'-thioncarbamoyloxymethylphenyl)-4-nitroimidazole,
2-(4'-N-morpholinocarbonyloxymethylphenyl)-4-nitroimidazole,
2-(4'-N,N-dimethylcarbamoyloxymethylphenyl)-4-nitroimidazole,
2-(4'-dimethylcarboxamidophenyl)-4-nitroimidazole, or
2-(4'-piperidinocarbonylphenyl)-4-nitroimidazole are used in place of 2-(4'-acetamidophenyl)-4-nitroimidazole, there is obtained 1-(2'-hydroxyethyl)-2-[4'-(2-oxo-oxazolidin-3-yl-iminomethylphenyl)]-4-nitroimidazole,
1-(2'-hydroxyethyl)-2-(4'-carbamoyloxymethylphenyl)-4-nitroimidazole,
1-(2'-hydroxyethyl)-2-(4'-thioncarbamoyloxymethylphenyl)-4-nitroimidazole,
1-(2'-hydroxyethyl)-2-(4'-N-morpholinocarbonyloxymethylphenyl)-4-nitroimidazole,
1-(2'-hydroxyethyl)-2-(4'-dimethylcarboxamidophenyl)-4-nitroimidazole, or 1-(2'-hydroxyethyl)-2-(4'-piperidinocarbonylphenyl)-4-nitroimidazole, respectively.

EXAMPLE 81

1-(2'-hydroxyethyl)-2-(4'-aminophenyl)-4-nitroimidazole

A solution of 290 mg. (0.001 mole) of 1-(2'-hydroxyethyl)-2-(4'-acetamidophenyl)-4-nitroimidazole in 5 ml. of 6 N hydrochloric acid is heated on the steam bath for several hours. It is then cooled, diluted with several volumes of water and is neutralized to pH 7.5 by the addition of concentrated ammonium hydroxide, whereupon the 1-(2'-hydroxyethyl)-2-(4'-aminophenyl)-4 - nitroimidazole precipitates from solution.

EXAMPLE 82

1-(2'-hydroxyethyl)-2-(4'-aminophenyl)-5-nitroimidazole

A mixture of 2.46 g. (0.01 mole) of 2-(4'-acetamidophenyl)-4-nitroimidazole and 2.8 ml. (approx. 0.01 mole) of β-ethoxyethyl tosylate is heated at 150–200° C. for several hours. The cooled reaction mixture is dissolved in about 100 ml. of chloroform or ethyl acetate, and the solution is washed several times with 4 N ammonium hydroxide. The chloroform phase is concentrated to dryness leaving a residue of 1-(2'-ethoxyethyl)-2-(4'-acetamidophenyl)-5-nitroimidazole, which is then purified by chromatography on alumina.

This residue is heated on the steam bath for a short time with 5 volumes of concentrated sulfuric acid. The reaction mixture is cooled, diluted with two volumes of water, and the heating is continued for an additional three hours. It is again cooled, diluted with more water, and extracted with chloroform to remove any impurities. The solution is adjusted to pH 7.5 by the addition of concentrated ammonium hydroxide and the 1-(2'-hydroxyethyl)-2-(4'-aminophenyl)-5-nitroimidazole is obtained as a precipitate.

When the above process is carried out and 2-(3'-acetylphenyl)-4-nitroimidazole,
2-(2'-hydroxymethylphenyl)-4-nitroimidazole,
2-(2'-naphthyl)-4-nitroimidazole,
2-(2',5',6',7',8'-tetrahydronaphthyl)-4-nitroimidazole,
2-(5'-indanyl)-4-nitroimidazole, or
2-(3'-fluoro-2'-naphthyl)-4-nitroimidazole are used in place of 2-(4'-acetamidophenyl)-4-nitroimidazole, there is obtained 1-(2'-hydroxyethyl)-2-(3'-acetylphenyl)-5-nitroimidazole,
1-(2'-hydroxyethyl)-2-(2'-hydroxymethylphenyl)-5-nitroimidazole,
1-(2'-hydroxyethyl)-2-(2'-naphthyl)-5-nitroimidazole,
1-(2'-hydroxyethyl)-2-(2',5',6',7',8'-tetrahydronaphthyl)-5-nitroimidazole,
1-(2'-hydroxyethyl)-2-(5'-indanyl)-5-nitroimidazole, or
1-(2'-hydroxyethyl)-2-(3'-fluoro-2'-naphthyl)-5-nitroimidazole, respectively.

EXAMPLE 83

2-(4'-acetylaminophenyl)-4-nitroimidazole

Into a solution of 62 gm. of 2-(4'-nitrophenyl)-4-nitroimidazole in a mixture of 420 ml. ethanol and 210 ml. of of concentrated ammonia is bubbled a stream of hydrogen sulfide for ½ hour. The solution is refluxed ½ hour, treated with 27 ml. concentrated ammonia, and hydrogen sulfide is again bubbled through for ½ hour. After a second ½ hour reflux the ammonia-hydrogen sulfide addition and reflux procedure is repeated. Ethanol is removed in vacuo, water is added, and the mixture is acidified with hydrochloric acid. The insoluble sulfur is filtered off and the filtrate is extracted with ethyl acetate. After neutralization with sodium hydroxide, the aqueous phase is filtered to give crude, dark 2-(4'-aminophenyl)-4-nitroimidazole.

32.3 gm. of the crude reduction product is heated 1¾ hours on the steam bath with a large excess of acetic anhydride. The mixture is cooled and the dark precipitate of 2-(4'-acetylaminophenyl)-4-nitroimidazole is filtered off and washed with acetone.

EXAMPLE 84

1-methyl-2-(4'-aminophenyl)-5-nitroimidazole 37.3 gm. of 2-(4'-acetylaminophenyl)-4-nitroimidazole is heated for 15 minutes with 18.1 ml. methyl sulfate. After cooling, the reaction mixture is treated with concentrated ammonia solution and the insoluble material is filtered off. The precipitate is then extracted with methanol. The methanol solution is evaporated to dryness and the residue extracted with acetone. The acetone solution is filtered through a 600 gm. column of alumina using additional acetone to wash the column. Evaporation of the eluate to dryness leaves a residue of 1-methyl-2-(4'-acetylaminophenyl)-5-nitroimidazole; M.P. 246–247° C.

When the above process is carried out and methyl p-toluenesulfonate is used in place of methyl sulfate, 1-methyl-2-(4'-acetylaminophenyl)-5-nitroimidazole is obtained.

8.3 gm. of 1-methyl-2-(4'-acetylaminophenyl)-5-nitroimidazole is hydrolyzed at 100° C. with 6 N hydrochloric acid. The cooled hydrolyzate is neutralized with sodium hydroxide and the resulting precipitate is recrystallized from acetone to give 1-methyl-2-(4'-aminophenyl)-5-nitroimidazole melting at 205–215° C. Final purification is effected by alumina chromatography using benzene to introduce the material in the column and ether-chloroform (1:1) to elute the product. The analytical sample melts at 222–223° C.

When the above process is carried out and 2-(4'-fluoroethylcarbonylaminophenyl)-4-nitroimidazole,
2-(2'-nitrophenyl)-4-nitroimidazole,
2-(3'-nitrophenyl)-4-nitroimidazole,
2-(4'-nitrophenyl)-4-nitroimidazole, or
2-(2',4'-dinitrophenyl)-4-nitroimidazole are used in place of 2-(4'-acetylaminophenyl)-4-nitroimidazole, there is obtained 1-methyl-2-(4'-fluoroethylcarbonylaminophenyl)-5-nitroimidazole,
1-methyl-2-(2'-nitrophenyl)-5-nitroimidazole,
1-methyl-2-(3'-nitrophenyl)-5-nitroimidazole,
1-methyl-2-(4'-nitrophenyl)-5-nitroimidazole, or
1-methyl-2-(2',4'-dinitrophenyl)-5-nitroimidazole, respectively.

When the above process is carried out and 2-(2',4',5'-trimethylphenyl)-4-nitroimidazole,
2-(3',5'-dichloro-4'-nitrophenyl)-4-nitroimidazole,
2-(2',4'-dimethoxy-5'-nitrophenyl)-4-nitroimidazole, or
2-(2'-bromo-3',5'-dichlorophenyl)-4-nitroimidazole are used in place of 2-(4'-acetylaminophenyl)-4-nitroimidazole, there is obtained 1-methyl-2-(2',4',5'-trimethylphenyl)-5-nitroimidazole,
1-methyl-2-(3',5'-dichloro-4'-nitrophenyl)-5-nitroimidazole,
1-methyl-2-(2',4'-dimethoxy-5'-nitrophenyl)-5-nitroimidazole, or
1-methyl-2-(2'-bromo-3',5'-dichlorophenyl)-5-nitroimidazole, respectively.

The tri-substituted phenyl starting compounds are prepared from the corresponding known and readily available benzonitrile by the known methods also described herein.

EXAMPLE 85

2-(2'-aminophenyl)-4-nitroimidazole

A 50 mg. sample of 2-(2'-acetylaminophenyl)-4-nitroimidazole is heated on the steam cone in 2 ml. of 5 N hydrochloric acid for two hours. After a period of time, precipitate beings to form. Upon cooling, additional precipitate forms and centrifugation and decantation give 2-(2'-aminophenyl)-4-nitroimidazole; M.P. 230–233° C.

EXAMPLE 86

2-(2'-acetamidophenyl)-4-nitroimidazole 200 mg. of 2-(2'-nitrophenyl)-4-nitroimidazole is dissolved in 1 ml. of ammonium hydroxide and 2 ml. of ethanol. Hydrogen sulfide is bubbled into the solution with stirring for about three hours. Every hour 1 ml. of ammonium hydroxide is added. After three hours, the solution is warmed to 85° C. on the steam cone and is then evaporated in vacuo to dryness. The contents of the flask are washed with a stream of nitrogen. There is then added 20 ml. of a mixture of acetic anhydride acetic acid and the mixture is heated on the steam cone for 45 minutes. After heating, the reaction mixture is cooled and the resulting solids are filtered. The filtrate is evaporated to dryness in vacuo on a steam bath. The remaining salts are dissolved in sodium hydroxide and the resulting mixture is filtered. The basic solution is extracted with three 100 ml. portions of chloroform. The aqueous alkaline solution is then acidified with glacial acetic acid and extracted with five 100 ml. portions of ethyl acetane. The ethyl acetate extracts are backwashed three times with water and evaporated to dryness in vacuo. The product is crude 2-(2'-acetylaminophenyl)-4-nitroimidazole. Recrystallization from acetone ether affords pure product; M.P. 284–285° C.

EXAMPLE 87

1-methyl-2-(2'-acetylaminophenyl)-5-nitroimidazole 2 gm. of 2-(2'-acetylaminophenyl)-4-nitroimidazole is treated with .81 ml. of dimethyl sulfate at 150° C. After cooling, dilute aqueous sodium hydroxide and chloroform are added to the reaction mixture. The chloroform phase is then evaporated to dryness giving 1-methyl-2-(2'-acetylaminophenyl)-5-nitroimidazole; melting point after recrystallization from acetone-ether, 233–235° C. When the above process is carried out and 2-(3'-methylthiophenyl)-4-nitroimidazole or 2-(4'-methoxythiocarbonyl)-4-nitroimidazole are used in place of 2-(2'-acetylaminophenyl)-4-nitroimidazole, there is obtained 1-methyl-2-(3'-methylthiophenyl)-5-nitroimidazole or 1-methyl-2-(4'-methoxythiocarbonylphenyl)-5-nitroimidazole, respectively.

EXAMPLE 88

1-methyl-2-(4'-cyanophenyl)-4-nitroimidazole

A solution of 218 mg. (0.001 mole) of 1-methyl-2-(4'-aminophenyl)-4-nitroimidazole in 3.0 ml. (0.003 equivalent) of 1 N sulfuric acid is stirred in an ice bath, and 70 mg. (0.001 mole) of sodium nitrite in 1 ml. of water is slowly added. After several hours, the cold solution of the diazonium sulfate is added to a mixture of 120 mg. (0.0025 mole) of sodium cyanide and 100 mg. (0.0012 mole) of copper (I) cyanide in 5 ml. of water at 60–80° C. A dark-brown precipitate forms, which is filtered and washed. It is dissolved in 8–10 ml. of dimethylformamide, and the mixture is centrifuged to remove a large amount of dark brown insoluble material. The clear liquor is diluted with 5–10 volumes of water and precipitates 1-methyl-2-(4'-cyanophenyl)-4-nitroimidazole.

When the above process is carried out and 1-ethyl-2-(4'-aminophenyl)-4-nitroimidazole is used in place of 1-methyl-2-(4'-aminophenyl), there is obtained 1-ethyl-2-(4'-cyanophenyl)-4-nitroimidazole.

EXAMPLE 89

1-methyl-2-(4'-cyanophenyl)-4-nitroimidazole

A mixture of 247 mg. (0.001 mole) of 1-methyl-2-(4'-carboxamidophenyl)-4-nitroimidazole and 25 ml. of thionyl chloride is refluxed overnight. The excess thionyl chloride is removed at reduced pressure, and the residue, 1-methyl - 2 - (4'-cyanophenyl)-4-nitroimidazole, is recrystallized from a mixture of benzene and ether.

When the above process is carried out and 1-ethyl-2-(4'-carboxamidophenyl)-4-nitroimidazole is used in place of 1-methyl-2-(4'-carboxamidophenyl) - 4 - nitroimidazole, there is obtained 1-ethyl-2-(4'-cyanophenyl)-5-nitroimidazole.

EXAMPLE 90

1-methyl-2-(4'-cyanophenyl)-5-nitroimidazole

A solution of 218 mg. (0.001 mole) of 1-methyl -2-(4'-aminophenyl-5-nitroimidazole in 1.5 ml. (0.003 equivalent) of 2 N sulfuric acid and 1.5 ml. of water is stirred in an ice bath, and 70 mg. (0.001 mole) of sodium nitrate in 1 ml. of water is slowly added. After several hours, the cold solution of the diazonium sulfate is added to a mixture of 120 mg. (0.0025 mole) of sodium cyanide and 100 mg. (0.0012 mole) of copper (I) cyanide in 5 ml. of water at 60–70° C. A dark brown precipitate forms which is filtered, washed, and dried. It is dissolved in about 8–10 ml. of dimethylformamide, and the solution is centrifuged to remove a large amount of insoluble material. The clear liquor is diluted with 5–6 volumes of water and a precipitate of 1-methyl-2-(4'-cyanophenyl)-5-nitroimidazole; M.P. 175–178° C. is obtained.

EXAMPLE 91

1-methyl-2-(4'-cyanophenyl)-5-nitroimidazole

A mixture of 247 mg. (0.001 mole) of 1-methyl-2-(4'-carboxamidophenyl)-5-nitroimidazole and 25 ml. of thionyl chloride is refluxed overnight. The excess thionyl chloride is removed at reduced pressure, the final traces being removed by flushing with benzene. The residue is recrystallized from a mixture of benzene and ether, giving 1-methyl-2-(4'-cyanophenyl)-5-nitroimidazole.

EXAMPLE 92

1-(2'-hydroxyethyl)-2,(4'-cyanophenyl)-4-nitroimidazole

A solution of 248 mg. (0.001 mole) of 1-(2'-hydroxyethyl)-2-(4'-aminophenyl)-4-nitroimidazole in 3.0 ml. (0.003 equivalent) of 1 N sulfuric acid is diazotized at 0° C. with 70 mg. (0.001 mole) of sodium nitrite. The cold solution of diazonium sulfate is added to a solution of 120 mg. (0.0025 mole) of sodium cyanide in 5 ml. of water at 60–80° C. The mixture is diluted with water, neutralized by the addition of sodium hydroxide, and is extracted several times with ethyl acetate. The extract is dried and concentrated leaving a residue of 1-(2'-hydroxyethyl)-2,(4'-cyanophenyl)-4-nitroimidazole.

When the above process is carried out and 1-(3'-hydroxypropyl)-2-(4'-aminophenyl) - 4 - nitroimidazole is used in place of 1-(2'-hydroxyethyl)-2-(4'-cyanophenyl)-4-nitroimidazole, there is obtained 1-(3'-hydroxypropyl)-2-(4'-cyanophenyl)-4-nitroimidazole.

EXAMPLE 93

1-(2'-hydroxyethyl)-2(4'-cyanophenyl)-5-nitroimidazole

A solution of 248 mg. (0.001 mole) of 1-(2'-hydroxyethyl)-2-(4'-aminophenyl)-5-nitroimidazole in 3.0 ml. (0.003 equivalent) of 1-N sulfuric acid is diazotized at 0° C. with 70 mg. (0.001 mole) of sodium nitrite. The cold solution of the diazonium sulfate is added to a solution of 120 mg. (0.0025 mole) of sodium cyanide in 5 ml. of water at 60–80° C. The mixture is cooled, diluted with several volumes of water, neutralized by the addition of sodium hydroxide, and is extracted several times with ethyl acetate. The extract is dried and concentrated leaving a residue of 1-(2'-hydroxyethyl)-2-(4'-cyanophenyl)-5-nitroimidazole.

EXAMPLE 94

1-methyl-2-(4'-thiocarbamoylphenyl)-5-nitroimidazole 1-methyl-2-(4'-cyanophenyl)-5-nitroimidazole (2.28 g.) and thioacetamide (1.5 g.) are added to a solution of dimethylformamide (30 ml.) which is saturated with hydrogen chloride at 70° C. The mixture is heated at 100° C. for 2 hours. The reaction mixture is then poured onto 100 ml. of water containing 20 g. of sodium acetate. The resulting product, 1-methyl-2-(4'-thiocarbamoylphenyl)-5-nitroimidazole, is filtered and washed with water.

EXAMPLE 95

1-methyl-2-[4'-(4''-hydroxyphenyldiazo)phenyl]-5-nitroimidazole

A hydrochloric acid solution of (1-methyl-5-nitroimidazol-2-yl)phenyldiazonium chloride (.1 mole) at 0° C. is added to solution of phenol (9.4 g.) at 0° C. in 100 ml. of 2 N sodium hydroxide solution. After the completion of the reaction, the solution is allowed to warm to room temperature, is filtered and treated with dilute hydrochloric acid to pH 5–6. The highly colored 1-methyl-2-[4'-(4''-hydroxyphenyldiazo)phenyl] - 5 - nitroimidazole precipitates and is recovered by filtration. It is then washed with water and recrystallized from ethanol.

When dimethylaminobenzene is used in the above process in place of phenol, there is obtained 1-methyl-2-[4'-(4''-dimethylaminophenyldiazo)phenyl] - 5 - nitroimidazole.

When the above process is carried out and p-(5-nitroimidazole-2-yl)phenyldiazonium chloride is used in place of (1-methyl-5-nitroimidazol-2-yl)phenyldiazonium chloride, there is obtained 2-[4'-(4''-hydroxyphenyldiazo)phenyl]-5-nitroimidazole.

EXAMPLE 96

1-methyl-2-(4'-phenylaminodiazophenyl)-5-nitroimidazole

Dilute hydrochloric acid containing p-(1-methyl-5-nitroimidazol-2-yl)phenyldiazonium chloride (0.1 mole) is treated with 12.9 g. of aniline hydrochloride in water and then with a concentrated solution containing five times its weight of sodium acetate. The 1-methyl-2-(4'-phenylaminodiazophenyl)-5-nitroimidazole separates. After one-half hour it is filtered, washed with water, dried, and recrystallized from ethyl acetate.

When the above process is carried out using p-chloro aniline in place of aniline, there is obtained 1-methyl-2-[4'-(4''-chlorophenylaminodiazophenyl)] - 5 - nitroimidazole.

EXAMPLE 97

1-methyl-2-(4'-chloroethenylphenyl)-5-nitroimidazole

To p - (1-methyl-5-nitroimidazol-2-yl)phenyldiazonium chloride (.1 mole) in 125 ml. of 2 N hydrochloric acid at 0° C. is added dropwise a solution of acetylene in acetone containing 0.25 mole of cupric chloride and .2 mole of sodium acetate. It is agitated at room temperature until gas evolution ceases. The product is isolated from the neutralized solution by extraction with ethyl acetate. After washing, drying and concentration, the crystalline 1-methyl-2-(4' - chloroethenylphenyl)-5-nitroimidazole is obtained.

EXAMPLE 98

1-methyl-2-[4'-(2''-furyl)phenyl]-5-nitroimidazole p - (1-methyl-5-nitroimidazol - 2 - yl)phenyldiazonium chloride (.5 mole) in 500 ml. of 2 N hydrochloric acid solution is added to 100 g. of furan and vigorously stirred at 5–10° C. while a solution of sodium acetate (160 g. of trihydrate in 400 ml. of water) is added over one-half hour. After 5 hours, the temperature is allowed to rise to room temperature and stirring is continued for 48 hours. After removal of the excess furan by distillation, 1-methyl-2-[4'-(2''-furyl)phenyl]-5-nitroimidazole is purified by crystallization from ethyl acetate.

When the above process is carried out and thiophene is used in place of furan, there is obtained 1-methyl-2-[4'-(2''-thienyl)phenyl]-5-nitroimidazole.

EXAMPLE 99

1-methyl-2-(4-formamidophenyl)-5-nitroimidazole

A solution of 2.18 g. (0.01 mole) of 1-methyl-2-(4'-aminophenyl)-5-nitroimidazole in 5.0 g. of 90% formic acid is heated overnight on the steam bath. The mixture is cooled and diluted with 20 ml. of water, whereupon 1-methyl - 2 - (4-formamidophenyl)-5-nitroimidazole separates.

EXAMPLE 100

1-methyl-2-(4'-ureidophenyl)-5-nitroimidazole

A mixture of 2.18 g. (0.01 mole) of 1-methyl-2-(4'-aminophenyl)-5-nitroimidazole, 0.89 g. (0.011 mole) of potassium cyanate, and 50 ml. of glacial acetic acid is heated overnight on the steam bath. The reaction mixture is allowed to cool and is poured into about ½ liter of water. The precipitate of 1-methyl-2-(4'-ureidophenyl)-5-nitroimidazole is filtered, and dried.

EXAMPLE 101

1-methyl-2-(4'-dichloroacetamidophenyl)-5-nitroimidazole

A solution of 218 mg. (0.001 mole) of 1-methyl-2-(4'-aminophenyl)-5-nitroimidazole in 3 ml. of dry pyridine is chilled in an ice bath, and 148 mg. (0.001 mole) of dichloroacetyl chloride is added gradually with good stirring. The reaction mixture is kept at 0° C. overnight and is poured into an excess of crushed ice and water. The 1-methyl-2-(4'-dichloroacetamidophenyl) - 5 - nitroimidazole is obtained by extraction with chloroform or with ethyl acetate, which extract is washed with a little dilute hydrochloric acid to remove any dissolved pyridine, dried, and concentrated.

When the above process is carried out and trifluoroacetylchloride is used in place of dichloroacetyl chloride, there is obtained 1-methyl-2-(4'-trifluoroacetamidophenyl)-5-nitroimidazole.

EXAMPLE 102

1-methyl-2-(4'-dimethylaminophenyl)-5-nitroimidazole

A mixture of 218 mg. (0.001 mole) of 1-methyl-2-(4'-aminophenyl)-5-nitroimidazole, 255 mg. (0.005 mole) of 90% formic acid, and 0.23 ml. (0.003 mole) of 37% formaldehyde solution is heated at 90–100° C. An evolution of carbon dioxide begins soon, and the flask is removed from the heating bath to control the evolution of the gas. The mixture is then heated at ca. 90–100° C. overnight. It is cooled, diluted with water, and an excess of 4 N ammonium hydroxide is added. The precipitate is removed by extraction with chloroform or ethyl acetate, which extract is dried and concentrated leaving a residue of 1-methyl-2-(4'-dimethylaminophenyl)-5-nitroimidazole.

EXAMPLE 103

1-methyl-2-(4'-diethylaminophenyl)-5-nitroimidazole 1-methyl-2-(4'-aminophenyl)-5-nitroimidazole (2.18 g., 0.01 mole) and triethyl phosphate (1.22 g., 0.067 mole) are intimately mixed and then heated at 150–160° C. for 3 hours. After cooling, there is added to the mixture 20 ml. 1 N sodium hydroxide solution and 500 ml. of chloroform. The chloroform extract, after washing with water (3 x 20 ml.) is evaporated to leave a residue which is purified by chromatography on alumina. Using about 5:1 ratio of alumina, the 1 methyl-2-(4'-diethylaminophenyl)-5-nitroimidazole is eluted with chloroform.

When the above process is carried out and trimethylphosphate is used in place of triethylphosphate, there is obtained 1-methyl-2-(4' - dimethylaminophenyl)-5-nitroimidazole.

EXAMPLE 104

1-methyl-2-(4'-N'-ethylaminophenyl)-5-nitroimidazole

A mixture of 1-methyl - 2 - (4'-benzenesulfonylaminophenyl)-5-nitroimidazole (3.72 g., 0.01 mole), sodium hydroxide (0.4 g., 0.01 mole), 50% ethanol (200 ml.) and diethyl sulfate (1.54 g.) is heated on a steam bath for 1 hour. After removal of the ethanol by evaporation, and the addition of 20 ml. 1 N sodium hydroxide, the product, 1-methyl-[2-(4'-N'-ethyl - N' - benzenesulfonylaminophenyl)]-5-nitroimidazole is obtained by filtration. Recrystallization from ethanol affords substantially pure material. The above product is dissolved in 40 ml. of concentrated sulfuric acid and the mixture is allowed to stand at room temperature for ½ hour. Water (240 ml.) is added and the mixture heated to the boiling point. After filtration, the solution is cooled in an ice-bath and made alkaline with 12 N sodium hydroxide solution. The mixture is extracted with three 200 ml. portions of chloroform. After evaporation of the chloroform, the residue is chromatographed on an alumina column. The desired 1-methyl-2-(4'-N'-ethylaminophenyl)-5-nitroimidazole is eluted with chloroform.

When dimethylsulfate is used in place of diethylsulfate in the above procedure, there is obtained 1-methyl-2-(4'-N'-methylaminophenyl)-5-nitroimidazole.

When the procedures of Examples 83–85 and 88–89 are carried out and the 2-aryl imidazole starting material is replaced by a 2-aryl imidazole substituted at the 1-position with a hydrogen, methyl, ethyl, carboxymethyl, carboxyethyl, carboxamidomethyl, carboxamidoethyl, methoxycarbonylmethyl, ethoxycarbonylethyl, benzyl, nitrophenylethyl, chlorophenylmethyl, bromophenylmethyl, anilinomethyl, carboxamidophenylmethyl, acetylaminophenylmethyl, cyanomethyl, cyanoethyl, formylmethyl, methylthioethyl, methylsulfonylethyl, ethylsulfinyl-n-propyl, chloroethyl, n-bromopropyl, hydroxyethyl, n-hydroxypropyl, methoxyethyl, allyl, vinyl, aminoethyl, N-methylaminoethyl, carbamoyloxyethyl, morpholinocarbonyloxyethyl, n-propan-2-ol or n-butan-2-one radical, there is obtained the corresponding 1-substituted 2-aryl imidazole.

EXAMPLE 105

1-methyl-2-(4'-cyanamidophenyl)-5-nitroimidazole

A solution of 1.09 g. (0.005 mole) of 1-methyl-2-(4'-aminophenyl)-5-nitroimidazole and 0.51 g. (0.005 mole) of triethylamine in a mixture of 100 ml. of ethyl acetate and 10 ml. of dimethylformamide is stirred at 0° C. and 310 mg. (0.005 mole) of cyanogen chloride is slowly distilled into the mixture which is allowed to stand overnight. The triethylamine hydrochloride is removed by extraction with water, and the dried ethyl acetate solution is concentrated to dryness leaving a residue of 1-methyl-2-(4'-cyanamidophenyl)-5-nitroimidazole.

EXAMPLE 106

1-methyl-2-(4'-carboxamidomethylaminophenyl)-5-nitroimidazole

A mixture of 436 mg. (0.002 mole) of 1-methyl-2-(4'-aminophenyl)-5-nitroimidazole and 188 mg. (0.002 mole) of chloroacetamide in 3 ml. of dry dimethylformamide is allowed to stand overnight at room temperature. It is poured into an excess of cold water containing a slight excess of ammonia, and the mixture is extracted several times with ethyl acetate. The extract is dried, concentrated to a small volume, and charged on a column of silica gel, from which 1-methyl-2-(4'-carboxamidomethylaminophenyl)-5-nitroimidazole is obtained by chromatography.

When the above process is carried out and N-chloroacetylmorpholine or N-ethylchloroacetamide is used in place of chloroacetamide, there is obtained 1-methyl-2-(4' - morpholinocarbonylmethylaminophenyl) - 5 - nitroimidazole or 1-methyl-2-(4'-N-ethylcarboxamidomethylaminophenyl)-5-nitroimidazole, respectively.

EXAMPLE 107

1-methyl-2-(4'-guanidinophenyl)-5-nitroimidazole

A mixture of 218 mg. (0.001 mole) of 1-methyl-2-(4'-aminophenyl)-5-nitroimidazole, 278 mg. (0.001 mole) of methylisothiourea sulfate, and 5 ml. of ethanol, is refluxed overnight. The 1-methyl-2-(4'-guanidinophenyl)-5-nitroimidazole sulfate which crystallizes from solution is filtered, washed, and dried. Treatment of an aqueous solution of the sulfate with picric acid yields a picrate. Neutralization of the aqueous solution of the sulfate with dilute sodium hydroxide yields the free base.

When the above process is carried out and 2-(4'-aminophenyl)-4-nitroimidazole is used in place of 1-methyl-2-(4' - aminophenyl)-5-nitroimidazole, there is obtained 2-(4'-guanidinophenyl)-4-nitroimidazole.

EXAMPLE 108

1-methyl-2-(4'-guanidinophenyl)-5-nitroimidazole

A solution of 218 mg. (0.001 mole) of 1-methyl-2-(4'-aminophenyl)-5-nitroimidazole in 9 ml. of water and 1 ml. (0.001 mole) of 1 N hydrochloric acid is heated to boiling and 84 mg. (0.001 mole) of cyanamide in 1–2 ml. of water is slowly added. After the solution is refluxed for several hours, it is cooled and neutralized with dilute sodium hydroxide. The product, 1-methyl-2-(4'-guanidinophenyl)-5-nitroimidazole, is obtained by extraction of the mixture with ethyl acetate, drying the extract, and concentrating it to dryness at reduced pressure.

EXAMPLE 109

1-methyl-2-(4'-biguanidophenyl)-5-nitroimidazole

A solution of 218 mg. (0.001 mole) of 1-methyl-2-(4'-aminophenyl)-5-nitroimidazole and 84 mg. (0.001 mole) of dicyandiamide in 9 ml. of water and 1 ml. (0.001 mole) of 1 N hydrochloric acid is heated at reflux for several hours. The mixture is cooled and the biguanide salt crystallizes from solution. The free base, 1-methyl-2-(4'-biguanidophenyl)-5-nitroimidazole, is obtained by neutralization of an aqueous solution of the salt with sodium hydroxide.

EXAMPLE 110

1-methyl-2-(4'-amidinophenyl)-5-nitroimidazole hydrochloride

To 250 ml. of hot absolute ethanol is added 12 gm. of 1-methyl-2-(4'-cyanophenyl)-5-nitroimidazole. The resulting solution is cooled in an ice bath and saturated with hydrogen chloride. The reaction mixture is maintained at 5° C. for 24 hours and is then diluted with ether and air-dried giving the hydrochloride salt of 1-methyl-2-(4'-ethoxyiminocarbonylphenyl)-5-nitroimidazole.

A mixture of 2.74 gm. (10 mmol) of 1-methyl-2-(4'-ethoxyiminocarbonylphenyl)-5-nitroimidazole and .54 gm. (10 mmol) of ammonium chloride in 25 ml. of methanol is refluxed for 6 hours, cooled, and the solvent removed in vacuo. The residue is crystallized from alcohol to give substantially pure 1-methyl-2-(4'-amidinophenyl)-5-nitroimidazole hydrochloride.

When the above process is carried out using methyl ammonium chloride, dimethyl ammonium chloride, piperidine hydrochloride, morpholine hydrochloride or pyrrolidine hydrochloride in place of ammonium chloride, there is obtained 1-N-dimethyl-2-(4'-amidinophenyl)-5-nitroimidazole hydrochloride, 1-N,N-trimethyl-2-(4'-amidinophenyl)-5-nitroimidazole hydrochloride, 1-methyl-2-

(4'-morpholinoiminocarbonylphenyl) - 5 - nitroimidazole hydrochloride or 1-methyl-2-(4'-pyrrolidinoiminocarbonyl)-5-nitroimidazole hydrochloride, respectively.

When the above process is carried out using ethylenediamine, N-methylethylenediamine or 1,3-diaminopropane in place of ammonium chloride, there is obtained 1-methyl-2-(p-2'-imidazolin-2-yl)phenyl - 5 - nitroimidazole hydrochloride, 1-methyl - 2 - (p-1'-methyl-2'-imidazolin-2'-yl)phenyl-5-nitroimidazole hydrochloride or 1-methyl-2 - (p - 1',4',5',6' -t etrahydropyrimidin-2'-yl)phenyl-5-nitroimidazole hydrochloride, respectively

EXAMPLE 111

1-methyl-2-(4'-phosphonylphenyl)-5-nitroimidazole 1-methyl - 2 - (4'-aminophenyl)-5-nitroimidazole (1.09 gm., .005 mole) is dissolved in 6–7 ml. of fluoroboric acid and treated in the cold with 0.4 gm. of sodium nitrite in 2–3 ml. of water. The crystalline p-(1-methyl-2-nitroimidazol-2-yl)phenylazo borofluoride is filtered, washed with a little cold fluoroboric acid, ethanol, and dried; M.P. 125° C. (dec.), violently.

The product (.8 gm.) in 4 ml. of ethyl acetate is treated with 0.346 gm. of phosphorus trichloride in the presence of cuprous bromide as a catalyst. It is refluxed for ¾ hour and allowed to stand overnight. It is hydrolyzed with water and extracted with ethyl acetate which, upon evaporation, provides 1-methyl-2-(4'-phosphonylphenyl)-5-nitroimidazole.

EXAMPLE 112

1-methyl-2-(4'-phosphondiamidophenyl)-5-nitroimidazole

A mixture of 2 gm. of p-(1-methyl-5-nitroimidazol-2-yl)diazo borofluoride, 1.5 gm. of phosphorus trichloride and 12 ml. of ethyl acetate is reacted as in Example 111, and then is hydrolyzed cautiously with an excess of ammonium hydroxide. Evaporation of the solvent yields solid 1-methyl - 2 - (4'-phosphondiamidophenyl)-5-nitroimidazole which is filtered and dried.

EXAMPLE 113

1-methyl-2-(4'-ethoxythiocarbonylthiophenyl)-5-nitroimidazole 1-methyl-2-(4'-aminophenyl)-5-nitroimidazole (21.8 g., 0.1 mole) is dissolved in 20 g. of concentrated hydrochloric acid and 20 g. of cracked ice. To the mixture is added a cold solution of 7.5 g. of sodium nitrite in 17 ml. of water, the temperature being maintained at 0–4° C.

In a flask equipped with a thermometer, dropping funnel and a stirrer is placed 20 g. of potassium ethyl xanthate in 25 ml. of water. To this solution at 40–45° C. is slowly added the cold diazonium solution. After 30 minutes at room temperature, the solution is cooled to 4° C. and neutralized with sodium hydroxide solution. The product, 1-methyl-2-(4'-ethoxythiocarbonylthiophenyl)-5-nitroimidazole is extracted with ethyl acetate and the extract washed with water until the washings are neutral.

EXAMPLE 114

1-methyl-2-(4'-mercaptophenyl)-5-nitroimidazole

An ethyl acetate solution (neutral containing 3 g. of 1-methyl-2-(4'-ethoxythiocarbonylthiophenyl) - 5 - nitroimidazole is dried and concentrated and the residue is dissolved in 20 ml. of hot ethanol. To the hot solution is added 25 g. of solid potassium hydroxide and the solution is refluxed for 8 hours under nitrogen. The alcohol is removed by concentration, the product is dissolved in water and this solution is neutralized to pH 7 with sulfuric acid. The product, 1-methyl-2-(4'-mercaptophenyl)-5-nitroimidazole, is extracted with ethyl acetate which is well washed with water. Concentration provides the relatively pure product.

EXAMPLE 115

1-methyl-2-(4'-ethylthiophenyl)-5-nitroimidazole 1-methyl-2-(4'-mercaptophenyl)-5-nitroimidazole (23.5 g., .1 mole) is dissolved in 200 ml. of 1 N sodium hydroxide solution. To this solution at room temperature is added (.1 mole) of ethyl sulfate in 200 ml. of ethanol. The solution is refluxed until a neutral pH is obtained. The ethanol is removed by concentration and the residue slurried with water and neutralized with ammonium hydroxide to yield 1-methyl-2-(4'-ethylthiophenyl)-5-nitroimidazole.

When the above process is carried out and methyl sulfate is used in place of ethyl sulfate, there is obtained 1-methyl-2-(4'-methylthiophenyl)-5-nitroimidazole.

EXAMPLE 116

1-methyl-2-(4'-ethylsulfoxylphenyl)-5-nitroimidazole

1 - methyl-2-(4'-ethylthiophenyl)-5-nitroimidazole (2.6 g., 0.01 mole) is dissolved in 50 ml. of acetic acid, cooled, and treated slowly with one equivalent weight of 30% hydrogen peroxide. The reaction is allowed to continue in the cold until a negative starch iodide test for peroxide is obtained. The solution is concentrated and the residue is recrystallized from ethyl acetate yielding 1-methyl-2-(4'-ethylsulfoxylphenyl)-5-nitroimidazole.

EXAMPLE 117

1-methyl-2-(4'-ethylsulfonylphenyl)-5-nitroimidazole

1 - methyl-2-(4'-mercaptophenyl)-5-nitroimidazole (2.6 g., 0.01 mole) in 50 ml. of glacial acetic acid is treated with 2½ molecular equivalents of 30% hydrogen peroxide. After standing for 5 days at room temperature, the excess peroxide is destroyed by addition of 5% palladium on charcoal catalyst. This is stirred until a starch iodide test for peroxide is negative. The catalyst is filtered off and the solution is concentrated. The residue is crystallized from ethyl acetate to yield 1-methyl-2-(4'-ethylsulfonylphenyl)-5-nitroimidazole.

EXAMPLE 118

1-methyl-2-(4'-sulfonylphenyl)-5-nitroimidazole 1-methyl-2-(4'-mercaptophenyl) - 5 - nitroimidazole (3 g.) is dissolved in 5 times its weight of glacial acetic acid and is treated gradually wiht 6 g. of bromine. After the reaction appears complete, the solution is concentrated to yield a crystalline residue. This material is added cautiously to dilute sodium hydroxide solution and stirred until solution is complete. The concentrated aqueous solution is made strongly acidic (pH-1-2) with sulfuric acid, thereby crystallizing 1-methyl-2-(4'-sulfonylphenyl)-5-nitroimidazole.

When the above process is carried out and 1-ethyl-2-(4'-mercaptophenyl)-5-nitroimidazole,
1-methyl-2-(4'-mercaptophenyl)-4-nitroimidazole, or
1-(2'-hydroxyethyl)-2-(4'-mercaptophenyl)-4-nitroimidazole is used in place of
1-methyl-2-(4'-mercaptophenyl)-5-nitroimidazole,
there is obtained
1-ethyl-2-(4'-sulfonylphenyl)-5-nitroimidazole,
1-methyl-2-(4'-sulfonylphenyl)-4-nitroimidazole, or
1-(2'-hydroxyethyl)-2-(4'-sulfonylphenyl)-5-nitroimidazole, respectively.

EXAMPLE 119

1-methyl-2-(4'-cyanothiophenyl)-5-nitroimidazole

A solution of 21.8 g. (0.1 mole) of 1-methyl-2-p-aminophenyl-5-nitroimidazole in 33 g. of concentrated sulfuric acid diluted with 70 ml. of water is cooled to 0° C. and diazolized by the addition of 7.6 g. of sodium nitrite in water. The diazonium solution is stirred and mixed with an ice-cold solution of potassium thiocyanate and a paste of cuprous thiocyanate. This paste is prepared by adding 12 g. of potassium thiocyanate to a solution of 27 g. of copper sulfate containing 50 g. of ferrous sulfate. After about 3 hours the solution is neutralized with sodium hydroxide solution and the product extracted with ethyl acetate. Evaporation of the extract yields 1-methyl-2-(4'-cyanothiophenyl)-5-nitroimidazole.

EXAMPLE 120

1-methyl-2-(4'-dimethylthioncarbamylthiophenyl)-5-nitroimidazole

A 20% aqueous solution containing .1 mole of dimethylamine maintained at 10° C., is stirred during the slow addition of 0.11 mole of carbon disulfide. To this solution is added slowly 40 ml. of 10% sodium hydroxide solution and the solution is allowed to warm to room temperature. Excess carbon disulfide is removed and washed well with water to provide relatively pure sodium dithiocarbamate solution.

1 - methyl-2-(4'-aminophenyl)-5-nitroimidazole (21.8 g., 0.1 mole) is dissolved in 71 ml. of 10% hydrochloric acid. It is diluted to 15° C. ml. with water and treated at 0–5° C. with a 2% excess of sodium nitrite in 30 ml. of water. This cold solution is added dropwise to the sodium dithiocarbamate solution described above while maintaining the reaction mixture at room temperature. The solution is allowed to stand 12–16 hours. The crystalline 1-methyl-2-(4'-dimethylthioncarbamylthiophenyl) - 5 - nitroimidazole is filtered off, washed with ether and recrystallized from ethanol.

When the above process is carried out and diethylamine or morpholine is used in place of dimethylamine, there is obtained 1-methyl-2-(4'-dimetylthioncarbamylthiophenyl)-5-nitroimidazole or 1 - methyl-2-(4'-morpholinothioncarbonylthiophenyl) - 5 - nitroimidazole, respectively.

EXAMPLE 121

1-methyl-2-(4'-thioncarbamoylthiophenyl)-5-nitroimidazole

To a solution of 1-methyl-2-(4'-mercaptophenyl)-5-nitroimidazole (2.35 g., 0.01 mole) and thiophosgene (1.15 g., 0.01 mole) in chloroform (200 ml.) is added slowly 10 ml. of 1 N NaOH solution under a nitrogen atmosphere. After stirring for two hours, the chloroform solution is extracted with water (4 x 20 ml.) and then dried over anhydrous sodium sulfate.

Chloroform (100 ml.) containing 0.35 g. ammonia is added to the above chloroform extract and the mixture allowed to stand at room temperature for four hours. After evaporation of the chloroform mixture to dryness, the residue is stirred in water (20 ml.) and the mixture filtered. The crude 1-methyl-2-(4'-thioncarbamoylthiophenyl)-5-nitroimidazole is recrystallized from ethanol.

When dimethylamine, or pyrrolidine is used in place of ammonia in the above process, there is obtained 1-methyl-2-(4'-dimethylthioncarbamoylthiophenyl) - 5 - nitroimidazole, or 1-methyl - 2 - (4' - pyrroldinothioncarbonylthiophenyl)-5-nitroimidazole, respectively.

EXAMPLE 122

1-methyl-2-(4'-methylthioncarbamoylthiophenyl)-5-nitroimidazole

1 - methyl-2-(4'-mercaptophenyl) - 5 - nitroimidazole (2.35 g., 0.01 mole), methyl isothiocyanate (0.73 g., 0.01 mole) and triethylamine (1.01 g., 0.01 mole) in 1,2-dimethoxyethane (100 ml.) are heated at reflux under a nitrogen atmosphere for eight hours. The solvent is removed by evaporation and the residue stirred with 100 ml. of water containing 0.36 g. of hydrogen chloride. On filtration, 1 - methyl-2-(4'-methylthioncarbamoylthiophenyl)-5-nitroimidazole is obtained.

When the above process is carried out, and ethylisothiocyanate is used in place of methylisothiocyanate, there is obtained 1-methyl-2-(4'-ethylthioncarbamoylthiophenyl)-5-nitroimidazole.

EXAMPLE 123

1-methyl-2-(4'-benzenesulfonamidophenyl)-5-nitroimidazole

A solution of 2.18 g. (0.01 mole) of 1-methyl-2-(4'-aminophenyl)-5-nitroimidazole in 10 ml. of dry pyridine is treated with 1.77 g. (0.01 mole) of benzenesulfonyl chloride at 0° C. The solution is allowed to warm up to room temperature and is then allowed to stand overnight. It is poured into 200 ml. of ice water, and the precipitated 1 - methyl-2-(4'-benzenesulfonamidophenyl) - 5 - nitroimidazole is filtered, washed, and dried. It may be further purified by recrystallization from alcohol.

When the above process is carried out and 1-isopropyl-2-(4'-aminophenyl)-5-nitroimidazole or 1 - methyl-2-(4'-aminophenyl)-4-nitroimidazole is used in place of 1-methyl-2-(4'-aminophenyl)-5-nitroimidazole, there is obtained 1-isopropyl-2-(4'-benzenesulfonamidophenyl) - 5 - nitroimidazole, or 1-methyl-2-(4'-benzenesulfonamidophenyl)-4-nitroimidazole, respectively.

EXAMPLE 124

1-methyl-2-(3'-sulfonamidophenyl)-5-nitroimidazole

A 3.0 gm. (10.6 mmol) sample of 1-methyl-2-phenyl-5-nitroimidazole is added in small portions to 25 ml. of chlorosulfonic acid. The reaction mixture is then heated on the steam cone for 70 hours.

The excess chlorosulfonic acid is removed by distillation at reduced pressure. The remaining oil, contaminated with chlorosulfonic acid, is added dropwise with stirring to a slurry of ammonium hydroxide and ice. The resulting solution is extracted with ethyl acetate. The ethyl acetate extracts are dried and evaporated to dryness. The crystalline material is recrystallized from acetone ether to give 1 - methyl-2-(3'-sulfonamidophenyl) - 5 - nitroimidazole; M.P. 205–206° C.

EXAMPLE 125

N',N'-dimethyl-2-(4'-sulfonamidophenyl)-4-nitroimidazole 15 gm. of 2-phenyl imidazole is treated with 50 ml. of chlorosulfonic acid on a steam cone overnight. The excess chlorosulfonic acid is evaporated in vacuo. The residue is then cooled and added dropwise to a cooled solution of aqueous dimethylamine with stirring. The solid product, N', N'-dimethyl-2-(4'-sulfonamidophenyl)-imidazole, is filtered off, washed with water and recrystallized from chloroform-petroleum ether; M.P. 180–185° C. Recrystallization from chloroform-petroleum ether gives a product a melting point of 187–188° C.

7.2 gm. of the imidazole product is dissolved in 50 ml. of acetic anhydride containing 1.5 ml. of concentrated nitric acid. The reaction mixture is warmed on the steam cone and evaporated in vacuo to remove the acetic anhydride. The resulting mixture is made alkaline, treated with charcoal, recrystallized and filtered. Recrystallization from 1,2-dimethoxy ethane gives N',N'-dimethyl-2-(4'-sulfonamidophenyl) - 3 - nitroimidazole; M.P. 236–238° C.

When the acetic acid is used in place of acetic anhydride in the above nitration process, N',N'-dimethyl-2-(4'-sulfonamidophenyl)-4-nitroimidazole again results.

EXAMPLE 126

1,N',N'-trimethyl-2-(4'-sulfonamidophenyl)-5-nitroimidazole 3 gm. of N',N'-dimethyl-2-(4'-sulfonamidophenyl)-4-nitroimidazole is treated in 1,2-dimethoxy ethane with small portions of ethereal diazomethane and the reaction mixture is evaporated to dryness. The residue is dissolved in 1,2-dimethoxy ethane and the solution is again evaporated to dryness. Recrystallization from 1,2-dimethoxy ethane gives 1,N',N'-trimethyl-2-(4'-sulfonamidophenyl)-5-nitroimidazole; M.P. 203–205° C.

When the above process is carried out and 2-(4'-thiocarbamoylphenyl)-4-nitrimidazole,
2-(4'-N-methylthiocarbamoylphenyl)-4-nitroimidazole,
2-(4'-piperidinocarbonylphenyl)-4-nitroimidazole, 2-(4'-aminocarbonylethylaminophenyl)-4-nitroimidazole,
2-(4'-N-ethyl-aminocarbonylmethylaminophenyl)-4-nitroimidazole,
2-(4'-piperidinocarbonylethylamino)-4-nitroimidazole,
2-(4'-ureidophenyl)-4-nitroimidazole,
2-(4'-fluoroethylcarbonylaminophenyl)-4-nitroimidazole,
2-(5'-quinoxalinyl)-4-nitroimidazole,
2-(3'-fluorophenyl)-4-nitroimidazole,
2-(2',4'-difluorophenyl)-4-nitroimidazole, or
2-(2',3',4'-trichlorophenyl)-4-nitroimidazole is used in place of N',N'-dimethyl-2-(4'-sulfonamidophenyl)-4-nitroimidazole, there is obtained 1-methyl-2-(4'-thiocarbamoylphenyl)-5-nitroimidazole,
1-methyl-2-(4'-N-methylthiocarbamoylphenyl)-5-nitroimidazole,
1-methyl-2-(4'-piperidinocarbonylphenyl)-5-nitroimidazole,
1-methyl-2-(4'-aminocarbonylethylaminophenyl)-5-nitroimidazole,
1-methyl-2-(4'-N-ethylaminocarbonylmethylaminophenyl)-5-nitroimidazole,
1-methyl-2-(4'-piperidinocarbonylethylamino)-5-nitroimidazole,
1-methyl-2-(4'-ureidophenyl)-5-nitroimidazole,
1-methyl-2-(4'-fluoroethylcarbonylaminophenyl)-5-nitroimidazole,
1-methyl-2-($5_2$-quinoxalinyl)-5-nitroimidazozle,
1-methyl-2-(3'-fluorophenyl)-5-nitroimidazole,
1-methyl-2(2',4'-difluorophenyl)-5-nitroimidazole, or
1-methyl-2-(2',3'-4'-trichlorophenyl)-5-nitroimidazole,
respectively.

When the above process is carried out and 2-(2',4',5'-trimethylphenyl)-4-nitroimidazole,
2-(3',5'-dichloro-4-nitrophenyl)-4-nitroimidazole,
2-(3',5'-dichloro-4-aminophenyl)-4-nitroimidazole or
2-(2',4'-dimethoxy-5-nitrophenyl)-4-nitroimidazole is used in place of N',N'-dimethyl-2-(4'-sulfonamidophenyl)-4-nitroimidazole, there is obtained 1-methyl-2-(2',4',5'-trimethylphenyl)-5-nitroimidazole,
1-methyl-2-(3',5'-dichloro-4-nitrophenyl)-5-nitroimidazole,
1-methyl-2-(3',5'-dichloro-4-aminophenyl-5-nitroimidazole, or
1-methyl-2-(2',4'-dimethoxy-5-nitrophenyl)-5-nitroimidazole, respectively.

EXAMPLE 127

1-methyl-2-(3'-N,N-dimethylsulfonamidophenyl)-4-nitroimidazole

A mixture of 2.0 g. (0.01 mole) of 1-methyl-2-phenyl-4-nitroimidazole and 25 ml. of chlorosulfonic acid is treated at 100° C. for 3 days. The mixture is poured into an excess of crushed ice containing 200 ml. of 40% aqueous dimethylamine. The 1-methyl-2-(3'-N,N-dimethylsulfonamidophenyl)-4-nitroimidazole separates as a solid, and is filtered, washed, and dried.

EXAMPLE 128

1-methyl-2-(3'-N-methylsulfonamidophenyl)-5-nitroimidazole

Two grams (0.01 mole) of 1-methyl-2-phenyl-5-nitroimidazole and 25 ml. of chlorosulfonic acid are admixed and the mixture heated at 100° C. for 3 days. The reaction mixture is then poured into an excess of crushed ice containing 200 ml. of 40% aqueous methylamine. The precipitate is filtered and is recrystallized from isopropyl alcohol yielding 1.1 g. of 1-methyl-2-(3-N-methylsulfonamidophenyl)-5-nitroimidazole.

When piperazine is used in the above process in place of methylamine, there is obtained 1-methyl-2-(3'-piperazinosulfonamidophenyl)-5-nitroimidazole.

EXAMPLE 129

1-(2'-hydroxyethyl)-2-(3'-N,N-dimethylsulfonamidophenyl)-4-nitroimidazole

A solution of 2.5 g. of 1-(2'-hydroxyethyl)-2-(3'-aminophenyl)-4-nitroimidazole in 5 ml. of concentrated hydrochloric acid is cooled to 0° C. and is diazotized with a solution of 0.76 g. (0.011 mole) of sodium nitrite in 1 ml. of water. The solution of the diazonium salt is added dropwise to 10 ml. of glacial acetic acid containing 3 g. of sulfur dioxide and 0.5 g. of copper (II) chloride, which has been dissolved in a minimum of water. The temperature of the reaction mixture is maintained at 30–40° C. by external cooling. After a few minutes, the mixture is poured into a well-stirred mixture of 100 ml. of ice water and 100 ml. of chloroform. Potassium bicarbonate is added until the aqueous phase is about pH 3 and the layers are separated. The aqueous phase is extracted again with chloroform. The chloroform extract is washed once with cold water, and is dried and concentrated leaving a residue of 1-(2-hydroxyethyl)-2-(3'-chlorosulfonylphenyl)-4-nitroimidazole.

The above sulfonyl chloride is dissolved in 50 ml. of benzene, and dimethylamine is passed in at room temperature until an excess is present. The entire mixture is concentrated to a small volume and is charged on a column of acid-washed alumina, from which 1-methyl-2-(3'-N,N-dimethylsulfonamidophenyl)-4-nitroimidazole is obtained by chromatography.

EXAMPLE 130

1-(2'-hydroxyethyl)-2-(3'-sulfonamidophenyl)-4-nitroimidazole

A solution of 332 mg. (0.001 mole) of 1-(2'-hydroxyethyl)-2-(3'-chlorosulfonylphenyl) - 4 - nitroimidazole in 20 ml. of benzene at room temperature is treated with dry ammonia until a slight excess is present. The solvent is evaporated and the residue slurried with water to give 1 - (2' - hydroxyethyl)-2-(3'-sulfonamidophenyl)-4-nitroimidazole.

When the above process is carried out and dimethylamine is used in place of ammonia, 1-(2'-hydroxyethyl)-2 - (3' - N,N - dimethylsulfonamidophenyl) - 4 - nitroimidazole is obtained.

EXAMPLE 131

1-(2'-hydroxyethyl)-2-(4'-N',N'-dimethylsulfonamidophenyl)-5-nitroimidazole

A solution of 2.5 g. 1-(2'-hydroxyethyl)-2-(4'-aminophenyl)-5-nitroimidazole in 5 ml. of concentrated hydrochloric acid is cooled to 0° C. and is diazotized with a solution of 0.76 g. (0.011 mole) of sodium nitrite in 1 ml. of water. The solution of the diazonium salt is added dropwise to 10 ml. of glacial acetic acid containing 3 g. of sulfur dioxide and 0.5 g. of copper (II) chloride, which has been dissolved in a minimal amount of water. The temperature of the reaction mixture is maintained at 30–40° C. by judicious external cooling. After a few minutes, the mixture is poured into a well-stirred mixture of 100 ml. of ice water and 100 ml. of chloroform. Potassium bicarbonate is added until the aqueous phase is about pH 3. The layers are separated and the aqueous phase is once more extracted with chloroform. The chloroform extract is washed once with a little cold water and is concentrated to dryness at reduced pressure leaving a residue of 1 - (2' - hydroxyethyl)-2-(4'-chlorosulfonylphenyl)-5-nitroimidazole. A solution 1.0 g. (0.003 mole) of this chloride in 20 ml. of benzene is treated at room temperature with dry dimethylamine until a slight excess is present. The entire mixture is charged on a column of acid-washed alumina, from which 1-(2'-hydroxyethyl)-2-(4'-N',N'-dimethylsulfonamidophenyl) - 5 - nitroimidazole is obtained by chromatography.

EXAMPLE 132

1-(2'-hydroxyethyl)-2-(4'-sulfonamidophenyl)-5-nitroimidazole

A mixture of 332 mg. (0.001 mole) of 1-(2'-hydroxyethyl) - 2 - (4' - chlorosulfonylphenyl)-5-nitroimidazole in 20 ml. of benzene is treated with dry ammonia until a slight excess is present. The solvent is evaporated and the residue slurried with water to give 1-(2'-hydroxyethyl)-2-(4'-sulfonamidophenyl)-5-nitroimidazole.

EXAMPLE 133

1-methyl-2-(3'-N',N'-dimethylsulfonamidophenyl)-4-nitroimidazole

A mixture of 2.0 g. (0.01 mole) of 1-methyl-2-phenyl-4-nitroimidazole and 20 ml. of chlorosulfuric acid is heated for four days at 100° C. The reaction mixture is cooled and poured into an excess of crushed ice containing about 75 g. of dimethylamine. The 1-methyl-2-(3'-N',N'-dimethylsulfonamidophenyl) - 4 - nitroimidazole separates as a solid.

When the above process is carried out and 2-phenyl-4-nitroimidazole or 1-ethyl-2-phenyl-5-nitroimidazole is used in place of 1-methyl-2-phenyl-4-nitroimidazole, there is obtained 2-(3'-N',N'-dimethylsulfonamidophenyl) - 4-nitroimidazole or 1 - ethyl - 2 - (3'-N',N'-dimethylsulfonamidophenyl)-5-nitroimidazole.

EXAMPLE 134

1-methyl-2-(3'-sulfonamidophenyl)-4-nitroimidazole

A mixture of 2.0 g. (0.01 mole) of 1-methyl-2-phenyl-4-nitroimidazole and 25 ml. of chlorosulfuric acid is heated for four days at 100° C. The reaction mixture is cooled and poured into an excess of crushed ice and concentrated ammonium hydroxide. The solution is washed with chloroform to remove impurities and is then extracted three times with ethyl acetate, which extract is dried and concentrated yielding 1-methyl-2-(3'-sulfonamidophenyl)-4-nitroimidazole.

EXAMPLE 135

1 - methyl - 2 - (4'-N',N'-dimethylsulfonamidophenyl)-4-nitroimidazole and 1-(2'-hydroxyethyl)-2-(4'-N',N'-dimethylsulfonamidophenyl)-4-nitroimidazole A solution of 264 mg. (0.001 mole) of 2-(4'-N',N'-dimethylsulfonamidophenyl)-4-nitroimidazole in 20 ml. of dry 1,2-dimethoxyethane is treated with 7 mg. (0.0015 mole) of sodium hydride—50% emulsion in petrolatum, which has been washed with petroleum benzin to remove the petrolatum. When the evolution of hydrogen has ceased, 0.125 ml. (0.0013 mole) of methyl sulfate is added, and the mixture is heated at reflux for several hours. It is concentrated at reduced pressure to a smaller volume, and the residue is diluted with several volumes of water. This mixture is extracted several times with ethylacetate, which extract is dried and concentrated leaving a residue of 1-methyl-2-(4'-N',N'-dimethylsulfonamidophenyl)-4-nitroimidazole.

A solution of 264 mg. (0.001 mole) of 2-(4'-N',N'-dimethylsulfonamidophenyl) - 4 - nitroimidazole and 130 mg. of potassium carbonate in 10 ml. of water is stirred at about 50° C., and ethylene oxide is passed in slowly from a gas burette until 0.003 mole of the gas has been absorbed by the reaction mixture. The 1-(2'-hydroxyethyl) - 2 - (4' - N',N' - dimethylsulfonamidophenyl)-4-nitroimidazole crystallizes from solution.

EXAMPLE 136

1-methyl-2-(4'-hydroxyphenyl)-5-nitroimidazole 5.00 gm. of 1-methyl-2-(4'-aminophenyl)-5-nitroimidazole in 50 ml. 10% sulfuric acid is treated with 1.725 gm. sodium nitrite in a minimal volume of water while cooled in an ice bath. The solution is then warmed on the steam bath for an hour, cooled and carefully neutralized with 2.5 N sodium hydroxide. The resulting precipitate, 1-methyl-2-(4'-hydroxyphenyl)-5-nitroimidazole, is filtered off, washed with water and air dried; M.P. 221–224° C.

When the above process is carried out and 2-(4'-aminophenyl)-4-nitroimidazole is used in place of 1-methyl-2-(4'-aminophenyl)-5-nitroimidazole, there is obtained 2-(4'-hydroxyphenyl)-4-nitroimidazole.

EXAMPLE 137

1-methyl-2-(4'-methoxyphenyl)-5-nitroimidazole 507 mg. of 1 - methyl-2-(4'-hydroxyphenyl)-5-nitroimidazole in 50 ml. of methanol is treated with a large excess of ethereal diazomethane while maintained at about 0° C. After standing in the cold overnight, a few drops of acetic acid are added to destroy excess diazomethane. The solvents are removed in vacuo. Water is added to the residue and sufficient .1 N sodium hydroxide is added to make the mixture basic. The insoluble precipitate of 1-methyl-2-(4'-methoxyphenyl)-5-nitroimidazole is filtered off, washed with water and air dried. It displays a melting point of 109–110° C. after being filtered through acid-washed alumina using 1:1 ether-petroleum ether as eluent and recrystallized from ether.

When the above process is carried out using 1-methyl-2-(4' - mercaptophenyl) - 5-nitroimidazole in place of 1-methyl - 2-(4'-hydroxyphenyl)-5-nitroimidazole, there is obtained 1 - methyl-2-(4'-methylthiophenyl)-5-nitroimidazole.

When the above process is carried out and 2-chloro-1-diazo ethane is used in place of diazomethane there is obtained 1 - methyl-2-(4'-chloroethoxyphenyl)-5-nitroimidazole.

EXAMPLE 138

1-methyl-2-(4'-cyanatophenyl)-5-nitroimidazole

To a mixture of 1-methyl-2-(4'-hydroxyphenyl)-5-nitroimidazole (2.19 g.) and cyanogen chloride (0.62 g.) in 20 ml. acetone at 0° C. is added dropwise triethylamine (1.02 g.). After one-half hour the reaction mixture is filtered and the filtrate poured onto 100 g. of crushed ice. The product is filtered and washed with water to obtain substantially pure 1 - methyl-2-(4'-cyanatophenyl)-5-nitroimidazole.

EXAMPLE 139

1-methyl-2-(4'-phenylpseudoureidophenyl)-5-nitroimidazole

A mixture of 1-methyl-2-(4'-cyantophenyl)-5-nitroimidazole (2.44 g.) and aniline (0.93 g.) in 1,2-dimethoxyethane (50 ml.) is heated on a steam bath for 8 hours. Evaporation of the solvent yields 1-methyl-2-(4'-phenylpseudoureidophenyl)-5-nitroimidazole.

When the above process is carired out and p-fluoroaniline or m-nitroaniline is used in place of aniline, there is obtained 1 - methyl-2-[4'-(4''-fluorophenylpseudouridophenyl)] - 5-nitroimidazole or 1-methyl-2-[4'-(3''-nitrophenylpseudoureidophenyl)]-5-nitroimidazole, respectively.

EXAMPLE 140

1-methyl-2-(4'-hydroxypseudoureidophenyl)-5-nitroimidazole

A mixture of 1 - methyl-2-(4'-cyanatophenyl)-5-nitroimidazole (2.44 g.), hydroxylamine (0.6 g.), and 1,2-dimethoxyethane (100 ml.) is allowed to stand at 0° C. for one week. Evaporation of the solvent, followed by recrystallization from ethanol gives 1 - methyl-2-(4'-hydroxypesudoureidophenyl)-5-nitroimidazole.

EXAMPLE 141

1-methyl-2-(4'-methylcarbamoyloxyphenyl)-5-nitroimidazole

An aqueous solution of .1 mole of the sodium salt of 1-methyl-2-(4'-hydroxyphenyl)-5-nitroimidazole is stirred in an ice bath with 1 molecular equivalent of methylisocyanate until the odor of methylisocyanate disappears. The precipitated 1 - methyl - 2-(4'-methylcarbamoyloxyphenyl) - 5-nitroimidazole is filtered, washed well with water and dried.

EXAMPLE 142

1-methyl-2-(4'-methylcarbamoyloxyphenyl)-5-nitroimidazole

.1 mole of the sodium salt of 1-methyl-2-(4'-hydroxyphenyl)-5-nitroimidazole is dissolved in dry pyridine and treated at 0° C. with 1 mole equivalent of methylisocyanate. After 1 hour, the pyridine is removed by concentration. The product, 1-methyl-2-(4'-methylcarbamoyloxyphenyl)-5-nitroimidazole, is washed with water and dried.

When the above process is carried out and ethylisocyanate is used in place of methylisocyanate, there is obtained 1 - methyl-2-(4'-ethylcarbamoyloxyphenyl)-5-nitroimidazole.

EXAMPLE 143

1-methyl-2-(4'-carbamoylmethoxyphenyl)-5-nitroimidazole

1 - methyl-2-(4'-hydroxyphenyl)-5-nitroimidazole (.1 mole) is dissolved in .1 mole of sodium hydroxide solution and the solution added to .1 mole of chloroacetamide. The solution is stirred at 40–50° C. until neutral. 1-methyl-2-(4'-carbamoylmethoxyphenyl)-5-nitroimidazole precipitates and is filtered, washed with water to remove sodium chloride and dried.

EXAMPLE 144

1-methyl-2-(4'-carbamoylmethoxyphenyl)-5-nitroimidazole

The sodium salt of 1-methyl-2-(4'-hydroxyphenyl)-5-nitroimidazole is refluxed in ethanol with 1 mole equivalent of chloroacetamide for 3 hours. The sodium chloride is filtered and the product, 1 - methyl - 2(4'-carbamoylmethoxyphenyl)-5-nitroimidazole, is recovered by concentrating the solution until crystallization occurs.

When the above process is carried out and N-methylchloroacetamide is used in place of chloroacetamide, there is obtained 1-methyl-2-(4'-N'-methylcarbamoylmethoxyphenyl)-5-nitroimidazole.

EXAMPLE 145

2-(5',6',7',8'-tetrahydronaphth-2'-yl)-4-nitroimidazole

A solution of 47 g. (0.3 mole) of 2-(5',6',7',8'-tetrahydro)naphthonitrile in about 75 ml. of dry ethanol is cooled in an ice-salt mixture, and dry hydrogen chloride is added until the solution is saturated. The reaction mixture is kept in the refrigerator for several days, during which time a solid mass of ethyl 2-(5',6',7',8'-tetrahydro)naphthimidate hydrochloride forms. The solid is broken up, washed with ether and is dried.

A mixture of 47.9 g. (0.2 mole) of the above imino ester hydrochloride and 26.6 g. (0.2 mole) of aminoacetaldehyde diethylacetal in 400 ml. of methanol is allowed to stand overnight. The methanol is removed at reduced pressure leaving a syrupy residue that resists crystallization.

This syrup is cooled in an ice bath and 60 g. of cold concentrated sulfuric acid is added gradually. The reaction mixture is allowed to warm to room temperature and is poured into a mixture of crushed ice and water which contains a slight excess of sodium hydroxide. The mixture is washed with chloroform, which extract is dried and concentrated. The residue is extracted with benzene. The extract is reconcentrated to a small volume, and the residue is slowly diluted with a little hexane. A precipitate of 2-(5',6',7',8'-tetrahydronaphth-2'-yl)-imidazole forms.

A mixture of 30 ml. of acetic anhydride and 1.4 ml. (0.022 mole) of concentrated nitric acid is stirred by hand while 4.0 g. (0.02 mole) of 2-(5',6',7',8'-tetrahydronaphth-2'-yl)-imidazole is added in several portions. The mixture is heated on the steam bath for a few minutes. A vigorous reaction takes place, but it soon subsides spontaneously. The mixture is poured into about 500 ml. of ice and water and a precipitate of 2-(5',6',7',8'-tetrahydronaphth-2'-yl)-4-nitroimidazole forms.

When acetic acid or propionic acid is used in place of acetic anhydride in the above process, 2-(5',6',7',8'-tetrahydronaphth-2'-yl)-4-nitroimidazole is again obtained.

When the above process is carried out and 2-(2'-nitrophenyl)imidazole, 2 - (3' - nitrophenyl)imidazole, 2-(4'-nitrophenyl)imidazole, or 2 - (2',4' - dinitrophenyl)imidazole is used in place of 2-(5',6',7',8'-tetrahydronaphth-2'-yl)imidazole, there is obtained 2-(2'-nitrophenyl)-4-nitroimidazole, 2 - (3'-nitrophenyl)-4-nitroimidazole, 2-(4'-nitrophenyl)-4-nitroimidazole, or 2-(2',4'-dinitrophenyl)-4-nitroimidazole, respectively.

When the above process is carried out using 2-(4'-formylphenyl)imidazole or 2 - (4' - carboxyphenyl)imidazole in place of 2-(5',6',7',8'-tetrahydronaphth-2'-yl) imidazole, there is obtained 2-(4'-formylphenyl)-4-nitroimidazole or 2-(4'-carboxyphenyl)-4-nitroimidazole, respectively.

EXAMPLE 146

1-methyl-2-(5',6',7',8'-tetrahydronaphth-2'-yl)-5-nitroimidazole

A mixture of 243 mg. (0.001 mole) of 2-(5',6',7',8'-tetrahydronaphth-2'-yl)) - 4 4- nitroimidazole and 0.1 ml. (0.001 mole) of methyl sulfate is heated at about 140° C. for about one hour, during which time a viscous liquid is formed. This reaction mixture is dissolved in chloroform, and the solution is washed with an excess of dilute ammonia water. The chloroform phase is dried and concentrated to dryness leaving a solid residue which is purified by chromatography on alumina to obtain 1-methyl-2-(5',6',7',8'-tetrahydronaphth-2'-yl)-5-nitroimidazole.

When the above process is carried out and 2-(2'-nitrophenyl)-4-nitroimidazole, 2-(3'-nitrophenyl) - 4 - nitroimidazole, 2-(4'-nitrophenyl)-4-nitroimidazole, or 2-(2',4'-dinitrophenyl)-4-nitroimidazole is used in place of 2-(5',6',7',8' - tetrahydronaphth-2'-yl) - 4 - nitroimidazole, there is obtained 1-methyl-2-(2'-nitrophenyl)-5-nitroimidazole, 1 - methyl-2-(3'-nitrophenyl)-5-nitroimidazole, 1-methyl-2-(4'-nitrophenyl)-5-nitroimidazole, or 1-methyl-2-(2',4'-dinitrophenyl)-5-nitroimidazole, respectively.

When the above process is carried out using 2-(4'-formylphenyl)-4-nitroimidazole, 2 - (4'-methoxyphenyl)-4-nitroimidazole or 2 - (4' - methoxycarbonylphenyl)-4-nitroimidazole in place of 2-(5',6',7',8'-tetrahydronaphth-2'-yl)-4-nitroimidazole, there is obtained 1-methyl-2-(4'-formylphenyl)-5-nitroimidazole, 1-methyl-2-(4'-methoxyphenyl)-5-nitroimidazole or 1 - methyl-2-(4'-methoxycarbonylphenyl)-5-nitroimidazole, respectively.

EXAMPLE 147

2-(5'-indanyl)-4-nitroimidazole

A solution of 33 g. (0.3 mole) of 5-indancarbonitrile in 75 ml. of dry ethanol is cooled in an ice-salt mixture and dry hydrogen chloride is passed in until the solution is saturated. The reaction mixture is kept in the refrigerator for several days, during which time the ethyl 5-indancarboximidate hydrochloride crystallizes as a solid mass. It is broken up, washed with alcohol, with ether and is dried.

A mixture of 37.8 g. (0.2 mole) of the ethyl 5-indancarboximidate hydrochloride and 26.6 g. (0.2 mole) of aminoacetaldehyde diethylacetal in 400 ml. of methanol is allowed to stand overnight. The methanol is removed at reduced pressure leaving a syrupy residue. This residue is cooled to 0° C. and 60 g. of cold concentrated sulfuric acid is added carefully. The reaction mixture is allowed to warm to room temperature and is poured into a mixture of crushed ice and water which contains a slight excess of sodium hydroxide. The mixture is shaken with chloroform, and the extract is dried and concentrated. The residue is extracted with warm benzene, and the benzene extract is concentrated to a small volume. On addition of a little hexane to the residue, a precipitate of 2-(5'-indanyl)imidazole forms.

A mixture of 30 ml. of acetic anhydride and 1.4 ml. (0.022 mole) of concentrated nitric acid is stirred by hand and 3.79 g. (0.02 mole) of 2-(5'-indanyl)imidazole is added in several portions. The mixture is heated on the steam bath for a few minutes, whereupon a vigorous reaction takes place. It quickly and spontaneously subsides. The reaction mixture is poured into 400–500 ml. of cold water and a precipitate of 2-(5'-indanyl)-4-nitroimidazole forms.

When the above process is carried out and 2-(4'-carboxymethylphenyl)imidazole is used in place of 2-(5'-indanyl)imidazole, there is obtained 2-(4'-carboxymethylphenyl)-4-nitroimidazole.

When the above process is carried out using 2-(4'-N-methylaminomethylphenyl)imidazole, 2 - (4'-morpholinomethylphenyl)imidazole or 2 - (4'-ethoxymethylphenyl) imidazole in place of 2-(5'-indanyl)-imidazole, there is obtained 2 - (4'-N-methylaminomethylphenyl)-4-nitroimidazole, 2 - (4'-morpholinomethylphenyl)-4-nitroimidazole, or 2 - (4'-ethoxymethylphenyl)-4-nitroimidazole, respectively.

EXAMPLE 148

1-methyl-2-(5'-indanyl)-5-nitroimidazole

A mixture of 458 mg. (0.001 mole) of 2-(5'-indanyl)-4-nitroimidazole and 0.2 ml. (0.002 mole) of methyl sulfate is heated at about 140° C. for a few minutes. A viscous liquid is formed which is dissolved in chloroform. This solution is washed with 4 N ammonium hydroxide and is then dried and concentrated leaving a residue, which is purified by chromatography on alumina giving 1-methyl-2-(5'-indanyl)-5-nitroimidazole.

When the above process is carried out and 2-(4'-cyanomethylphenyl) - 4 - nitroimidazole, 2-(4'-carboxamidomethylphenyl)-4-nitroimidazole, or 2-(4'-N-methylcarboxamidomethylphenyl)-4-nitroimidazole is used in place of 2-(5'-indanyl)-4-nitroimidazole, there is obtained 1-methyl-2-(4'-cyanomethylphenyl) - 5 - nitroimidazole, 1-methyl - 2 - (4' - carboxamidomethylphenyl)-5-nitroimidazole, or 1-methyl-2 - (4' - N-methylcarboxamidomethylphenyl)-5-imidazole, respectively.

When the above process is carried out using 2-(4'-ethoxymethylphenyl)-4-nitroimidazole in place of 2-(5'-indanyl)-4-nitroimidazole, there is obtained 1-methyl-2-(4'-ethoxymethylphenyl)-5-nitroimidazole.

EXAMPLE 149

2-(5'-quinolinyl)-4-nitroimidazole

A solution of 31 g. (0.2 mole) of 5-quinolinecarbonitrile in 100 ml. of dry ethanol is saturated with dry hydrogen chloride at 0° C. The reaction mixture is allowed to stand for 3 to 4 days in the refrigerator, and ethyl 5-quinolinecarboximidate hydrochloride crystallizes. It is filtered, washed with alcohol, with ether, and is dried.

A solution of 23.7 g. (0.1 mole) of ethyl 5-quinolinecarboximidate hydrochloride in 150 ml. of methanol is stirred in an ice bath, and 13.3 g. (0.1 mole) of aminoacetaldehyde diethylacetal in 100 ml. of methanol is added. The mixture is allowed to stand overnight at room temperature, and is concentrated at reduced pressure leaving a viscous, oily residue.

The residue is cooled in an ice bath and 30 g. of concentrated sulfuric acid is added carefully to it. The mixture is allowed to warm to room temperature and is poured into a mixture of crushed ice and water which contains a slight excess of alkali. The mixture is extracted with chloroform, which extract is dried and concentrated to a small volume. Hexane is added to the residue and 2-(5'-quinolinyl)imidazole separates.

A mixture of 30 ml. of acetic anhydride, 1.4 ml. (0.022 mole) of concentrated nitric acid, and 3.9 g. (0.02 mole) of 2-(5'-quinolinyl)imidazole is heated on the steam bath for a few minutes. A brief and vigorous reaction occurs, but it spontaneously subsides. The reaction mixture is poured into a large excess of cold water. Enough alkali is added to neutralize the acid, and 2-(5'-quinolinyl)-4-nitroimidazole separates.

When the above process is carried out and 2-(2'-hydroxymethylphenyl)imidazole,
2-[4'-(4''-tolylaminomethylphenyl)]imidazole,
2-[4'-(2''-nitrobenzoylaminomethylphenyl)]imidazole,
2-(4'-dimethylcarboxamidophenyl)imidazole,
2-(4'-piperidinocarbonylphenyl)imidazole,
2-(4'-tolyl)imidazole,
2-(4'-acetylaminomethylphenyl)imidazole,
2-(4'-benzoylaminomethylphenyl)imidazole or
2-[4'-(2''-fluorobenzoylaminomethylphenyl)]imidazole is used in place of 2-(5'-quinolinyl)imidazole, there is obtained 2-(2'-hydroxymethylphenyl)-4-nitroimidazole,
2-[4'-(4''-tolylaminomethylphenyl)]-4-nitroimidazole,
2-[4'-(2''-nitrobenzoylaminomethylphenyl)]-4-nitroimidazole,
2-(4'-dimethylcarboxamidophenyl)-4-nitroimidazole,
2-(4'-piperidinocarbonylphenyl)-4-nitroimidazole,
2-(4'-tolyl)-4-nitroimidazole,
2-(4'-acetylaminomethylphenyl)-4-nitroimidazole,
2-(4'-benzoylaminomethylphenyl)-4-nitroimidazole, or
2-[4'-(2''-fluorobenzoylaminomethylphenyl)]-4-nitroimidazole, respectively.

EXAMPLE 150

1-methyl-2-(5'-quinolinyl)-5-nitroimidazole

To a mixture of 480 mg. (0.002 mole) of 2-(5'-quinolinyl)-4-nitroimidazole in 30 ml. of 1,2-dimethoxy ethane cooled in an ice bath is added an excess of diazomethane in dimethoxyethane. After standing overnight, the mixture is evaporated to dryness. The residue is slurried with 100 ml. of chloroform and 10 ml. of 2.5 N sodium hydroxide. The chloroform layer is separated, washed with water and evaporated to yield 1-methyl-2-(5'-quinolinyl)-5-nitroimidazole.

EXAMPLE 151

2-(6'-quinoxalinyl)-4-nitroimidazole

A solution of 31 g. (0.2 mole) of quinoxaline-6-carbonitrile in 100 ml. of dry ethanol at 0° C. is saturated with dry hydrogen chloride. The reaction mixture is allowed to stand for about 3–4 days in the refrigerator, and ethyl-6-quinoxalinecarboximidate hydrochloride crystallizes. It is filtered, washed with alcohol, with ether, and is dried.

A solution of 23.8 g. (0.1 mole) of ethyl-2-quinoxalinecarboximidate hydrochloride in 150 ml. of methanol is stirred in an ice bath, and 13.3 g. (0.1 mole) of aminoacetaldehyde diethylacetal in 100 ml. of methanol is added. The mixture is allowed to stand overnight at room temperature and is concentrated at reduced pressure leaving a viscous residue.

This residue is cooled in an ice bath and 30 g. of concentrated sulfuric acid is added slowly. The mixture is allowed to warm to room temperature and is poured into a mixture of crushed ice and water which contains a slight excess of alkali. The mixture is extracted with chloroform, which extract is dried and concentrated. The residual liquid is diluted with hexane and 2-(6'-quinoxalinyl)imidazole separates as a solid.

A mixture of 30 ml. of acetic anhydride, 1.4 ml. (0.022 mole) of concentrated nitric acid and 3.9 g. (0.02 mole) of 2-(6'-quinoxalinyl)imidazole is heated on the steam bath for a few minutes, during which time a brief but vigorous reaction takes place. It subsides quickly and spontaneously. The reaction mixture is poured into a large excess of cold water and 2-(6'-quinoxalinyl)-4-nitroimidazole precipitates upon neutralization of the acid.

When the above process is carried out and 2-(4'-biphenylyl)imidazole, 2-(3'-acetylphenyl)imidazole, is used in place of 2-(6'-quinoxalinyl)imidazole, there is obtained 2-(4'-biphenylyl)-4-nitroimidazole, 2-(3'-acetylphenyl)-4-nitroimidazole, respectively.

EXAMPLE 152

1-methyl-2-(6'-quinoxalinyl)-5-nitroimidazole

To a mixture of 240 mg. (0.001 mole) of 2-(6'-quinoxalinyl)-4-nitroimidazole in 30 ml. of 1,2-dimethoxyethane cooled in an ice bath is added an excess of diazomethane in ether. After standing overnight, the mixture is evaporated to dryness. The residue is slurried with 100 ml. of chloroform and 10 ml. 2.5 N sodium hydroxide solution. The chloroform layer is separated, washed with water and evaporated to yield 1-methyl-2-(6'-quinoxalinyl)-5-nitroimidazole.

EXAMPLE 153

2-(6'-indenyl)-4-nitroimidazole

A solution of 25 g. of indene-6-carboxylic acid is heated at reflux with 250 ml. of thionyl chloride for several hours. The excess thionyl chloride is removed at reduced pressure, the last traces being removed by stripping with benzene. The residue is dissolved in 500 ml. of benzene and dry ammonia is passed in until precipitation of indene-6-carboxamide is complete. The dried, powdered amide is mixed with several volumes of phosphorus pentoxide and the mixture is heated at reduced pressure with a free flame. The indene-6-carbonitrile which distills is redistilled through a packed column at reduced pressure.

A solution of 14.1 g. (0.1 mole) of indene-6-carbonitrile in 50 ml. of absolute alcohol is chilled in an ice bath and the solution is saturated with gaseous hydrogen chloride. The mixture is allowed to stand for several days in the refrigerator, and ethyl indene-6-carboximidate hydrochloride crystallized from solution. It is filtered, washed with cold alcohol, with ether, and is air dried.

A cold solution of 6.7 g. (0.05 mole) of aminoacetaldehyde diethylacetal in 100 ml. of methanol is added over a period of 10–20 minutes to a cold solution of 11.2 g. (0.05 mole) of ethyl indene-6-carboximidate hydrochloride in 200 ml. of methanol. The reaction mixture is allowed to stand overnight at room temperature and the solvent is removed at reduced pressure. The residue is dissolved in about 250 ml. of acetone, the solution is filtered and is diluted with 2–3 volumes of ether, wherefrom the amidine product crystallized.

Ten grams of the above amidine is added slowly to 10 ml. of cold, concentrated sulfuric acid. The temperature of the reaction mixture is kept below 30° C. When all the amidine has been added, the reaction mixture is poured into an excess of crushed ice containing a slight excess of sodium hydroxide. The precipitate is filtered and washed with water. After dissolving in chloroform, the solution is washed with water, dried with sodium sulfate, and concentrated to dryness. The residue is diluted with a mixture of ether and hexane giving 2-(6'-indenyl)imidazole.

A mixture of 4.5 g. (0.025 mole) of 2-(6'-indenyl)imidazole, 300 ml. of acetic anhydride and 16 ml. of concentrated nitric acid is heated on the steam bath for a few minutes. The strong, vigorous reaction soon subsides and the reaction mixture is poured into about 2 l. of ice water. When the excess acetic anhydride has decomposed, the solid is filtered, washed with water, and is immediately recrystallized from methanol yielding 2-(6'-idenyl)-4-nitroimidazole.

EXAMPLE 154

1-methyl-2-(6'-indenyl)-5-nitroimidazole

A solution of 2.27 g. (0.01 mole) of 2-(6'-indenyl)-4-nitroimidazole in 1.26 g. (0.01 mole) of methyl sulfate is heated at 150–170° C. for a few hours. The reaction mixture is poured into 25 ml. of cold water, and the solution is adjusted to about pH 7 by the addition of ammonia water. The mixture is extracted 4 times with chloroform, which extract is dried and concentrated. The solid residue is redissolved in a little chloroform and the solution is charged on a column of acid-washed alumina from which 1-methyl-2-(6'-indenyl)-5-nitroimidazole is removed by elution with chloroform.

EXAMPLE 155

2-(8-chloronaphth-1-yl)-4-nitroimidazole

A solution of 18.8 g. (0.1 mole) of 8-chloronaphthalene-1-carbonitrile in 50 ml. of absolute alcohol at 0° C. is saturated with dry hydrogen chloride. The reaction mixture is allowed to stand in the refrigerator for several days and ethyl-8-chloronaphthalenecarboximidate hydrochloride crystallizes. It is filtered, washed with cold water, ether, and is air-dried.

A cold solution of 6.7 g. (0.05 mole) of aminoacetaldehyde diethyl acetal in 100 ml. of methanol is added gradually to a cold, stirred solution of 13.5 g. (0.05 mole) of ethyl-8-chloronaphthalenecarboximidate hydrochloride in 200 ml. of methanol. The reaction mixture is allowed to stand overnight at room temperature, and the solvent is removed at reduced pressure leaving an oily residue.

This oily residue is added carefully to 20 ml. of cold, concentrated sulfuric acid. The resulting solution is poured onto an excess of crushed ice containing an excess of sodium hydroxide. The mixture is extracted several times with chloroform, which extract is dried and concentrated to a small volume. The residue is diluted with hexane and 2-(8-chloronaphth-1-yl)-imidazole precipitates.

A mixture of 5.7 g. (0.025 mole) of 2-(8-chloronaphth-1-yl)imidazole, 300 ml. of acetic anhydride, and 16 ml. of concentrated nitric acid is heated on the steam bath for a few minutes until the vigorous reaction subsides. The reaction mixture is poured into about 1500 ml. of ice water and 2-(8-chloronaphth-1-yl)-4-nitroimidazole precipitates. It is filtered, washed, and dried.

When the above process is carried out and
2-(4'-chlorophenyl)imidazole,
2-(3'-fluorophenyl)imidazole,
2-(2',4'-difluorophenyl)imidazole,
2-(2',3',4'-trichlorophenyl)imidazole,
2-(4'-fluorophenyl)imidazole, or
2-phenylimidazole
is used in place of
2-(8-chloronaphth-1-yl)imidazole,
there is obtained
2-(4'-chlorophenyl)-4-nitroimidazole,
2-(3'-fluorophenyl)-4-nitroimidazole,
2-(2',4'-difluorophenyl)-4-nitroimidazole,
2-(2',3',4'-trichlorophenyl)-4-nitroimidazole,
2-(4'-fluorophenyl)-4-nitroimidazole or
2-phenyl-4-nitroimidazole,
respectively.

EXAMPLE 156

1-methyl-2-(8-chloronaphth-1-yl)-5-nitroimidazole

A solution of 2.74 g. (0.01 mole) of 2-(8-chloronaphth-1-yl)-4-nitroimidazole in 1.26 g. of methyl sulfate is heated at 150–170° C. for several hours. The reaction mixture is poured into about 25–30 ml. of cold water. The acid is neutralized by the addition of ammonium hydroxide, and the product is obtained by extraction of this water mixture with chloroform. The extract is dried and concentrated to a small volume. The residue is charged on a column of acid-washed alumina, from which 1-methyl-2-(8-chloronaphth-1 - yl) - 5 - nitroimidazole is eluted by chromatography with chloroform.

When the above process is carried out and
2-(4'-chlorophenyl)-4-nitroimidazole,
2-(3'-fluorophenyl)-4-nitroimidazole,
2-(2',4'-difluorophenyl)-4-nitroimidazole,
2-(2',3',4'-trichlorophenyl)-4-nitroimidazole,
2-(4'-fluorophenyl)-4-nitroimidazole, or
2-phenyl-4-nitroimidazole
is used in place of
2-(8-chloronaphth-1-yl)-4-nitroimidazole,
there is obtained
1-methyl-2-(4'-chlorophenyl)-5-nitroimidazole,
1-methyl-2-(3'-fluorophenyl)-5-nitroimidazole,
1-methyl-2-(2',4'-difluorophenyl)-5-nitroimidazole,
1-methyl-2-(2',3',4'-trichlorophenyl)-5-nitroimidazole,
1-methyl-2-(4'-fluorophenyl)-5-nitroimidazole or
1-methyl-2-phenyl-5-nitroimidazole, respectively.

When the above process is carried out and diethyl sulfate is used in place of methyl sulfate, 1-ethyl-2-(8'-chloronaphth-1-yl)-5-nitroimidazole is obtained.

EXAMPLE 157

2-(5-nitronaphth-2-yl)-4-nitroimidazole

A cold solution of 19.8 g. (0.1 mole) of 5-nitronaphthalene-2-carbonitrile in 50 ml. of absolute alcohol is saturated with dry hydrogen chloride. The mixture is allowed to stand for several days in the refrigerator, and ethyl - 5 - nitronaphthalenecarboximidate hydrochloride crystallizes from solution. It is filtered, washed with cold alcohol, with ether, and is dried in air.

A solution of 6.7 g. (0.05 mole) of aminoacetaldehyde diethylacetal in 100 ml. of cold methanol is added gradually to a cold, stirred solution of 14.0 g. (0.05 mole) of ethyl-5-nitronaphthalenecarboximidate hydrochloride in 200 ml. of methanol. The reaction mixture is allowed to stand overnight at room temperature and is then concentrated to dryness at reduced pressure. The oily residue is dissolved in about 200 ml. of acetone. On the addition of 500–600 ml. of ether, the amidine hydrochloride crystallizes.

To 10 ml. of cold, concentrated sulfuric acid, 9.2 g. (0.025 mole) of the above amidine hydrochloride is slowly added. The resulting solution is poured onto an excess of crushed ice containing a slight excess of sodium hydroxide. The solid that precipitates is filtered, washed with water, and dried. It is crystallized from chloroform-hexane and yields 2-(5'-nitronaphth-2-yl)-imidazole.

A mixture of 6.0 g. (0.025 mole) of 2-(5-nitronaphth-2-yl)imidazole, 300 ml. of acetic anhydride, and 16 ml. of concentrated nitric acid is heated on the steam bath for a few minutes. A vigorous, exothermic reaction occurs, but it soon spontaneously subsides. The reaction mixture is poured into about 1500 ml. of ice water, the acid partially neutralized, and the precipitate of 2-(4-nitronaphth-2-yl)-4-nitroimidazole is filtered, washed, and dried.

When the above process is carried out and acetic acid, propionic acid or propionic anhydride is used in place of acetic anhydride, 2-(5-nitronaphth-2-yl)-4-nitroimidazole again is obtained.

EXAMPLE 158

1-methyl-2-(5-nitroaphth-2-yl)-5-nitroimidazole

A solution of 2.84 g. (0.01 mole) of 2-(5-nitronaphth-2-yl)-4-nitroimidazole in 1.26 g. (0.01 mole) of methyl sulfate is heated at 100–150° C. for several hours. The reaction mixture is poured into about 25 ml. of cold water, and the acid is neutralized by the addition of ammonium hydroxide. The mixture is extracted four times with chloroform, which extract is dried and concentrated. The residue is dissolved in ethyl acetate and the solution is charged on a column of acid-washed alumina. Chromatography with ethyl acetate yields 1-methyl-2-(5-nitronaphth-2-yl)-5-nitroimidazole.

EXAMPLE 159

2-(5-cyanonaphth-1-yl)-4-nitromidazole

A solution of 17.8 g. (0.1 mole) of 1,5-naphthalene dicarbonitrile, 4.6 g. (0.1 mole) of ethanol, 20 ml. of dioxane, and 150 ml. of ether is chilled in an ice bath. Dry hydrogen chloride is passed in until 4.0 g. (0.11 mole) has been absorbed. The mixture is left in the refrigerator for several days, and ethyl-5-cyanonaphthalene carboximidate hydrochloride slowly crystallizes. It is filtered, washed with ether, and is air-dried.

A solution of 13 g. (0.05 mole) of ethyl-5-cyanonaphthalene carboximidate hydrochloride in 200 ml. of methanol is stirred in an ice bath and a solution of 6.7 g. (0.05 mole) of aminoacetaldehyde diethylacetal in 100 ml. of methanol is slowly added. The reaction mixture is allowed to stand overnight at reduced pressure and is concentrated to dryness at reduced pressure leaving an oily residue. This oil is added gradually to 20 ml. of cold, concentrated sulfuric acid. The resulting solution is poured onto an excess of crushed ice containing a slight excess of sodium hydroxide. A precipitate of 2-(5-carboxamidonaphth-1-yl)imidazole is formed which is filtered, washed, and dried.

A mixture of 11.8 g. (0.05 mole) of 2-(5-carboxamidonaphth-1-yl)imidazole, 200 ml. of dry benzene, and 10 g. (0.075 mole) of thionyl chloride is refluxed overnight. The mixture is concentrated to dryness at reduced pressure. The residue is dissolved in chloroform, and the solution is poured onto an excess of crushed ice. The aqueous phase is adjusted to ca. pH 7 by the addition of ammonium hydroxide. The layers are separated and the aqueous layer is again extracted with chloroform. The combined extracts are dried and concentrated leaving a residue of 2-(5-cyanonaphth-1-yl)imidazole.

A mixture of 5.5 g. (0.025 mole) of 2-(5-cyanonaphth-1-yl)imidazole, 300 ml. of acetic anhydride, and 16 ml. of concentrated nitric acid is heated on the steam bath for a few minutes. When the vigorous reaction has subsided, the mixture is poured into about 2 l. of crushed ice and water. The acid is neutralized by the addition of ammonia water, and the precipitate is removed by extraction with chloroform. The extract is dried and concentrated leaving a residue of 2-(5-cyanonaphth-1-yl)-4-nitroimidazole.

When the above process is carried out and 2-(3'-ethoxyphenyl)imidazole, 2-(4'-N-methylthiocarbamoylphenyl)imidazole or 2 - (4' - piperidinothiocarbonylphenyl)imidazole is used in place of 2-(5'-cyanonaphth-1-yl)imidazole, there is obtained 2-(3'-ethoxyphenyl)-4-nitroimidazole, 2 - (4' - N - methylthiocarbamoylphenyl)-4-nitroimidazole or 2-(4'-piperidinothiocarbonylphenyl)-4-nitroimidazole, respectively.

EXAMPLE 160

1-methyl-2-(5-cyanonaphth-1-yl)-5-nitroimidazole

A solution of 2.65 g. (0.01 mole) of 2-(5-cyanonaphth-1-yl)-4-nitroimidazole in 1.26 g. (0.01 mole) of methyl sulfate is heated at 100–150° C. for several hours. The reaction mixture is poured into 25–30 ml. of ice water, and the acid is neutralized by the addition of ammonium hydroxide. The mixture is extracted several times with chloroform, which extract is dried and concentrated. The residue is redissolved in a little ethyl acetate, and the solution is charged on a column of silica gel. Chromatography with ethyl acetate yields 1-methyl-2-(5-cyanonaphth-1-yl)-5-nitroimidazole.

When the above process is carried out and 2-(3'-ethoxyphenyl)-4-nitroimidazole, or 2-(4'-piperidinothiocarbonylphenyl)-4-nitroimidazole is used in place of 2-(5-cyanonaphth-1-yl)-4-nitroimidazole, there is obtained 1-methyl-2-(3'-ethoxyphenyl)-5-nitroimidazole or 1-methyl-2-(4' - piperidinothiocarbonylphenyl)-5-nitroimidazole, respectively.

EXAMPLE 161

1-(2'-hydroxyethyl)-2-(2'-naphthyl)-4-nitroimidazole

In 50 ml. of dry 1,2-dimethoxyethane is dissolved 1.1 g. of 2-(2'-naphthyl)-4-nitroimidazole. 0.16 g. of 52% sodium hydride is washed with ether and added in small portions to the solution. 2.5 ml. of β-ethoxyethyl tosylate is added to the solution and the reaction mixture is refluxed for 3 hours. The resulting solution is cooled and evaporated in vacuo to about 10 ml. The residue is diluted with 50 ml. of cold water, and the resulting suspension is extracted with three 150 ml. portions of chloroform. The chloroform extracts are washed with a small amount of water and dried over sodium sulfate. After filtering off the drying agent, the chloroform is evaporated in vacuo to afford 1-(2'-ethoxyethyl)-2-(2'-naphthyl)-4-nitroimidazole.

This residue is heated with 4–5 volumes of concentrated sulfuric acid for about 15 minutes on a steam bath. The mixture is cooled, diluted with 3 times its volume of water, and reheated on the steam bath for 3 hours. The mixture is then treated with decolorizing charcoal, and the clarified filtrate is neutralized with sodium hydroxide to afford 1 - (2' - hydroxyethyl)-2-(2'-naphthyl)-4-nitroimidazole.

When the above process is carried out and 2-(4'-chlorophenyl)-4-nitroimidazole,
2-phenyl-4-nitroimidazole,
2-(3'-fluorophenyl)-4-nitroimidazole,
2-(2',4'-difluorophenyl)-4-nitroimidazole,
2-(4'-fluorophenyl)-4-nitroimidazole,
2-(2'-nitrophenyl)-4-nitroimidazole,
2-(3'-nitrophenyl)-4-nitroimidazole,
2-(4'-nitrophenyl)-4-nitroimidazole,
2-(3'-acetylphenyl)-4-nitroimidazole,
2-(4'-ethylsulfoxylphenyl)-4-nitroimidazole,
2-(4'-tolyl)-4-nitroimidazole is used in place of 2-(2'-naphthyl)-4-nitroimidazole, there is obtained 1-(2'-hydroxyethyl)-2-(4'-chlorophenyl)-4-nitroimidazole,
1-(2'-hydroxyethyl)-2-phenyl-4-nitroimidazole,
1-(2'-hydroxyethyl)-2-(3'-fluorophenyl)-4-nitroimidazole,
1-(2'-hydroxyethyl)-2-(2',4'-difluorophenyl)-4-nitroimidazole,
1-(2'-hydroxyethyl)-2-(4'-fluorophenyl)-4-nitroimidazole,
1-(2'-hydroxyethyl)-2-(2'-nitrophenyl)-4-nitroimidazole,
1-(2'-hydroxyethyl)-2-(3'-nitrophenyl)-4-nitroimidazole,
1-(2'-hydroxyethyl)-2-(4'-nitrophenyl)-4-nitroimidazole,
1-(2'-hydroxyethyl)-2-(3'-acetylphenyl)-4-nitroimidazole,
1-(2'-hydroxyethyl)-2-(4'-ethylsulfoxylphenyl)-4-nitroimidazole, or
1-(2'-hydroxyethyl)-2-(4'-tolyl)-4-nitroimidazole, respectively.

EXAMPLE 162

1-methyl-2-(4'-acetylphenyl)-5-nitroimidazole

A solution is prepared from 1.3 g. of magnesium, 6 g. methylbromide and 200 ml. of diethylether. To the solution in an ice bath is added 5 g. of anhydrous cadmium chloride and 100 ml. diethyl ether. After stirring for one hour at about 15° C., a solution of 1-methyl-2-(4'-chlorocarbonylphenyl)-5-nitroimidazole (5.3 g.) in benzene (200 ml.) is added. The reaction mixture is stirred at room temperature for one hour and then gently refluxed for three hours. After the addition of powdered ice and 2% hydrochloric acid (100 ml.), the organic layer is separated and washed with water (50 ml.), dilute ammonia (2 x 20 ml. 4 N ammonium hydroxide) and water (2 x 50 ml.). After evaporation of the solvent under reduced pressure, the product, 1-methyl-2-(4'-acetylphenyl)-5-nitroimidazole is recrystallized from ethyl acetate-hexane.

When the above process is carried out and ethyl bromide is used in place of methyl bromide, there is obtained 1-methyl-2-(4'-propionylphenyl)-5-nitroimidazole.

When 1-ethyl-2-(4'-chlorocarbonylphenyl)-5-nitroimidazole, 1-(2'-acetoxyethyl)-2-(4' - chlorocarbonylphenyl)-5-nitroimidazole, or 1-methyl-2-(4'-chlorocarbonylphenyl)-4-nitroimidazole is used in the above process in place of 1-methyl-2-(4'-chlorocarbonylphenyl) - 5 - nitroimidazole, there is obtained 1-ethyl-2-(4'-acetylphenyl)-5-nitroimidazole, 1 - (2'-acetoxyethyl)-2-(4'-acetylphenyl)-5-nitroimidazole, or 1-methyl-2-(4'-acetylphenyl)-4-nitroimidazole, respectively.

EXAMPLE 163

1-methyl-2-(4'-tolyl)-4-nitroimidazole 15.0 g. (.0937 mole) of 2-(4'-tolyl)-2-imidazoline is heated with 4.0 g. of 25% palladium adsorbed on charcoal catalyst at 205–210° C. for one hour and then for an additional hour at 230° C. After cooling, the reaction is dissolved in 150 ml. of boiling ethanol and the resulting solution is filtered and concentrated to 80–100 ml. by boiling. Cooling gives 2-(4'-tolyl)imidazole, M.P. 217–222° C. A second crop of 2.2 g. is obtained by concentration of the mother liquors. An analytical sample is prepared by recrystallization and sublimation and melts at 222–235° C.

To 30 ml. of cold 30% fuming sulfuric acid is added 2.5 gm. of 2-(4'-tolyl)imidazole. Fuming nitric acid is added and the reaction mixture is heated on a steam cone for 15 minutes. The resulting material is poured over ice, filtered and washed with water and acetone to give 2-(4'-tolyl)-4-nitroimidazole.

A solution of 2.03 g. (0.01 mole) of 2-(4'-tolyl)-4-nitroimidazole in 100 ml. of 1,2-dimethoxyethane is treated with 0.72 g. (0.015 mole) of a sodium hydroxide emulsion in petrolatum (50% sodium hydride). When the evolution of hydrogen has ceased, 1.25 ml. (0.0013 mole) of methyl sulfate is added, and the mixture is heated at reflux temperature for several hours. It is concentrated to a smaller volume and the residue is diluted with several volumes of water. This residue is washed several times to remove the mineral oil, and then several times with chloroform to extract the product. 1-methyl-2-(4'-tolyl)-4-nitroimidazole is obtained as a solid on evaporation of the chloroform.

When the above process is carried out and 2-(4'-cyanomethylphenyl)-4-nitroimidazole, 2-(4'-carboxamidomethylphenyl)-4-nitroimidazole, or 2-(4'-N-methylcarboxamidomethylphenyl)-4-nitroimidazole is used in place of 2-(4'-tolyl)-4-nitroimidazole, there is obtained 1-methyl-2-(4'-cyanomethylphenyl)-4-nitroimidazole, 1-methyl-2-(4'-carboxamidomethylphenyl)-4-nitroimidazole or 1-methyl-2 - (4' - methylcarboxamidomethylphenyl)-4-nitroimidazole, respectively.

EXAMPLE 164

1-(2'-hydroxyethyl)-2-(4'-tolyl)-4-nitroimidazole

A solution of 203 mg. (0.001 mole) of 2-p-tolyl-4-nitroimidazole and 130 mg. of potassium carbonate in 5 ml. of water is stirred at about 50° C. and ethylene oxide is passed in from a gas burette slowly until 0.003 mole of the gas has been absorbed by the reaction mixture. The 1 - (2' - hydroxyethyl)-3-(4'-tolyl)-4-nitroimidazole crystallizes from solution.

When 2-(3'-ethoxyphenyl)-4-nitroimidazole is used in place of 2-p-tolyl-4-nitronmidazole in the above process, there is obtained 1-(2'-hydroxyethyl)-2-(3'-ethoxyphenyl)-4-nitroimidazole.

When the above process is carried out and 2-(4'-phenylaminodiazophenyl)-4-nitroimidazole,
2-[4'-(4''-chlorophenylaminodiazophenyl)]-4-nitroimidazole,
2-[4'-(4''-tolylaminodiazophenyl)]-4-nitroimidazole,
2-(4'-phenyldiazophenyl)-4-nitroimidazole, or
2-[4'-(4''-dimethylaminophenyldiazophenyl)]-4-nitroimidazole
is used in place of
2-p-tolyl-4-nitroimidazole,
there is obtained
1-(2'-hydroxyethyl)-2-(4'-phenylaminodiazophenyl)-4-nitroimidazole,
1-(2'-hydroxyethyl)-2-[(4'-(4''-chlorophenylaminodiazophenyl)]-4-nitroimidazole,
1-(2'-hydroxyethyl)-2-[4'-(4''-tolylaminodiazophenyl)]-4-nitroimidazole,
1-(2'-hydroxyethyl)-2-(4'-phenyldiazophenyl)-4-nitroimidazole, or
1-(2'-hydroxyethyl)-2-[4'-(4''-dimethylaminophenyldiazophenyl)]-4-nitroimidazole,
respectively.

EXAMPLE 165

1-(2'-hydroxyethyl)-2-(4'-tolyl)-5-nitroimidazole

A mixture of 2.03 g. (0.01 mole) of 2-p-tolyl-4-nitroimidazole and 2.8 ml. (approx. 0.01 mole) of β-ethoxyethyl tosylate is heated at 150–200° C. for several hours. The cooled reaction mixture is dissolved in 100 ml. of chloroform and the solution is washed with an excess of 4 N ammonium hydroxide. It is then diluted with about 1½–2 volumes of ether and is filtered through a layer of alumina to remove dark-colored impurities. On concentration of the eluate, 1-(2'-ethoxyethyl)p-tolyl-5-nitroimidazole is obtained.

The residue is heated with 4–5 volumes of concentrated sulfuric acid on the steam bath for a short time. The mixture is cooled, diluted with water, reheated for two hours, and filtered with decolorizing charcoal. The filtrate is adjusted to pH 7.5 by the addition of sodium hydroxide and 1-(2'-hydroxyethyl)-2-(4'-tolyl)-5-nitroimidazole precipitates from solution.

EXAMPLE 166

1-methyl-2-(4'-carboxamidophenyl)-4-nitroimidazole

A mixture of 247 mg. (0.001 mole) of 1-methyl-2-(4'-carboxyphenyl)-4-nitroimidazole and 5 ml. of oxalyl chloride is heated at reflux for several hours. The excess oxalyl chloride is removed at reduced pressure, and 6 ml. of liquid ammonia is added to the residue. The mixture is allowed to stand overnight during which time the excess ammonia evaporates. Water is added to the residue and 1-methyl-2-(4'-carboxamidophenyl)-4-nitroimidazole is collected.

When the above process is carried out and 2-(4'-carboxyphenyl)-4-nitroimidazole or 1-ethyl-2-(4'-carboxyphenyl)-5-nitroimidazole is used in place of 1-methyl-2-(4'-carboxyphenyl)-4-nitroimidazole, there is obtained 2-(4'-carboxamidophenyl)-4-nitroimidazole or 1-ethyl-2-(4'-carboxamidophenyl)-5-nitroimidazole, respectively.

EXAMPLE 167

1-(2'-hydroxyethyl)-2-(4'-carboxamidophenyl)-4-nitroimidazole

A solution of 233 mg. (0.001 mole) of 2-(4'-carboxamidophenyl)-4-nitroimidazole and 130 mg. of potassium carbonate in 5 ml. of water is stirred at about 50° C., and ethylene oxide is passed in slowly from a gas burette until 0.003 mole of the gas has been absorbed by the reaction mixture. The 1-(2'-hydroxyethyl)-2-(4'-carboxamidophenyl)-4-nitroimidazole crystallizes from solution.

When the above process is carried out and 2-(4'-morpholinomethylphenyl)-4-nitroimidazole,
2-(4'-ethoxymethylphenyl)-4-nitroimidazole,
2-(2'-hydroxymethylphenyl)-4-nitroimidazole,
2-(4'-phenoxycarbonyloxymethylphenyl)-4-nitroimidazole,
2-[4'-(4''-fluorophenoxycarbonyloxymethylphenyl)]-4-nitroimidazole,
2-[4'-(4''-nitrophenoxycarbonyloxymethylphenyl)]-4-nitroimidazole, or
2-[4'-(4''-n-propylphenoxycarbonyloxymethylphenyl)]-4-nitroimidazole
is used in place of
2-(4'-carboxamidophenyl)-4-nitroimidazole,
there is obtained
1-(2'-hydroxyethyl)-2-(4'-morpholinomethylphenyl)-4-nitroimidazole,
1-(2'-hydroxyethyl)-2-(4'-ethoxymethylphenyl)-4-nitroimidazole,
1-(2'-hydroxyethyl)-2-(2'-hydroxymethylphenyl)-4-nitroimidazole,
1-(2'-hydroxyethyl)-2-(4'-phenoxycarbonyloxymethylphenyl)-4-nitroimidazole,
1-(2'-hydroxyethyl)-2-[4'-(4''-fluorophenoxycarbonyloxymethylphenyl)]-4-nitroimidazole,
1-(2'-hydroxyethyl)-2-[4'-(4''-nitrophenoxycarbonyloxymethylphenyl)]-4-nitroimidazole, or
1-(2'-[4,-4''-n-propylphenoxycarbonyloxymethylphenyl)]-4-nitroimidazole,
respectively.

EXAMPLE 168

1-(2'-acetoxyethyl)-2-(4'-carboxamidophenyl)-5-nitroimidazole

A mixture of 2.77 g. (0.01 mole) of 1-(2'-hydroxyethyl)-2-(4'-carboxyphenyl)-5-nitroimidazole, 0.5 g. of sodium acetate, and 10 ml. of acetic anhydride is heated on the steam bath for a few hours. The mixture is poured into an excess of water. When the excess of acetic anhydride has decomposed, 1-(2'-acetoxyethyl)-2-(4'-carboxyphenyl)-5-nitroimidazole is removed by filtration.

A mixture of 320 mg. (0.001 mole) of 1-(2'-acetoxyethyl)-2-(4'-carboxyphenyl)-5-nitroimidazole and 5 ml. of oxalyl chloride is heated at reflux for a few hours. The excess of oxalyl chloride is removed completely and the residue is dissolved in liquid ammonia. The excess ammonia is allowed to evaporate overnight leaving a residue, 1-(2'-acetoxyethyl)-2-(4'-carboxamidophenyl)-5-nitroimidazole.

EXAMPLE 169

1-(2'-hydroxyethyl)-2-(4'-carboxamidophenyl)-5-nitroimidazole

A mixture of 320 mg. (0.001 mole) of p-1-β-acetoxyethyl-5-nitroimidazole-2-yl benzoic acid and 5 ml. of oxalyl chloride is heated at reflux for a few hours. The excess of oxalyl chloride is removed completely at reduced pressure and the residue is dissolved in an ice-cold solution of ammonia in methanol. It is allowed to warm to room temperature and is concentrated to dryness at reduced pressure leaving a residue of 1-(2'-hydroxyethyl)-2-(4'-carboxamidophenyl)-5-nitroimidazole.

EXAMPLE 170

2-(4-carboxyphenyl)-4-nitroimidazole

A mixture of 2.03 g. (0.01 mole) of 2-p-tolyl-4-nitroimidazole, 3.6 g. (0.012 mole) of sodium dichromate and 10 ml. of concentrated sulfuric acid in 50 ml. of water is stirred at room temperature. To this solution 50 ml. of concentrated sulfuric acid is added and the temperature of the reaction mixture is maintained between 75 and 80° C. Heating at 70–75° C. is continued for several hours. The reaction mixture is poured into an excess of crushed ice and water, and the resulting solution is neutralized to ca. pH 4–5 by the addition of dilute sodium hydroxide solution. The precipitate is filtered and dissolved in an aqueous solution of potassium bicarbonate. The solution is filtered from any insoluble material and the filtrate is adjusted to ca. pH 4–5 by the addition of glacial acetic acid, wherefrom 2-(4'-carboxyphenyl)-4-nitroimidazole precipitates.

EXAMPLE 171

2-(4'-carboxyphenyl)-4-nitroimidazole

A solution of 233 mg. (0.001 mole) of 2-(4'-carboxamidophenyl)-4-nitroimidazole in 2 ml. of concentrated hydrochloric acid is warmed on the steam bath for three hours. The solution is cooled, diluted with water and adjusted to about pH 4–5 by the addition of dilute sodium hydroxide wherefrom 2-(4'-carboxyphenyl)-4-nitroimidazole precipitates.

When the above process is carried out and 1-methyl-2-(4'-carboxamidophenyl)-5-nitroimidazole is used in place of 2-(4' - carboxamidophenyl)-4-nitroimidazole, there is obtained 1-methyl - 2 - (4'-carboxyphenyl)-5-nitroimidazole.

EXAMPLE 172

1-methyl-2-(4'-carboxyphenyl)-4-nitroimidazole

To a solution of 2.17 g. (0.01 mole) of 1-methyl-2-p-tolyl-4-nitroimidazole in 30 ml. of water and 10 ml. of concentrated sulfuric acid is added 3.6 g. (0.012 mole) of sodium dichromate in 20 ml. of water. The solution is stirred and 50 ml. of concentrated sulfuric acid is added and the temperature of the reaction mixture is maintained between 75 and 90° C. Heating is continued at 70–75° C. for an additional four hours. The reaction mixture is poured into an excess of ice-water and neutralized by the addition of 50% sodium hydroxide solution. The product which precipitates, 1-methyl-2-(4'-carboxyphenyl)-4-nitroimidazole, is purified by redissolving the isolated solid in an aqueous solution of potassium bicarbonate, filtering, and reprecipitating by the addition of glacial acetic acid.

EXAMPLE 173

1-(2'-hydroxyethyl)-2-(4'-carboxyphenyl)-4-nitroimidazole

A solution of 276 mg. (0.001 mole) of 1-(2'-hydroxyethyl)-2-(4'-carboxamidophenyl) - 4 - nitroimidazole in 4 ml. of 6 N hydrochloric acid is heated on the steam bath for a few hours. The reaction mixture is cooled, diluted with water and adjusted to about pH 4 by the addition of dilute sodium hydroxide, wherefrom 1-(2'-hydroxyethyl)-2-(4' - carboxyphenyl) - 4 - nitroimidazole crystallizes from solution.

EXAMPLE 174

1-(2'-hydroxyethyl)-2-(4'-carboxyphenyl)-5-nitroimidazole

A mixture of 2.75 g. (0.01 mole) of 1-(2'-ethoxyethyl)-2-(4'-tolyl)-5-nitroimidazole, 3.6 g. (0.012 mole) of sodium dichromate, 10 ml. of concentrated sulfuric acid, and 50 ml. of water is stirred and 50 ml. of concentrated sulfuric acid is added at such a rate that the temperature of the reaction mixture is maintained at 75–80° C. Heating at 70–80° C. is maintained for several hours. The reaction mixture is poured into an excess of crushed ice and water, and the resulting solution is neutralized to about pH 4 by the addition of sodium hydroxide. The precipitate is filtered, redissolved in an aqueous solution of potassium bicarbonate, and reacidified to yield 1-(4'-ethoxyethyl)-2-(4'-carboxyphenyl)-5-nitroimidazole.

This material is heated on the steam bath with 4–5 volumes of concentrated sulfuric acid for a short time. The mixture is cooled, diluted with water, reheated, and filtered with charcoal. Neutralization of the filtrate to about pH 4–5 by the addition of sodium hydroxide yields 1-(2'-hydroxyethyl)-2-(4'-carboxyphenyl)-5-nitroimidazole.

EXAMPLE 175

2-(4'-biphenylyl)-4-nitroimidazole

To a solution of .07 ml. (1.1 mmol) of concentrated nitric acid in 2.0 ml. of acetic anhydride is added 220 mg. (1.00 mmol) of 2-(4'-biphenylyl)-imidazole. After brief stirring to insure solution, the mixture is heated on the steam bath for 10 minutes. The resulting red solution is cooled and poured into excess aqueous sodium bicarbonate solution and allowed to stand for a day. The crude product is filtered off, dried, and purified by filtration through 2.0 gm. of acid-washed aluminum oxide in 1:1 acetone-ether solvent. The partially crystalline residue obtained upon evaporation of the eluate is recrystallized from methanol to give pale yellow crystals melting at 242–245° C. Two further recrystallizations from methanol give 2-(4'-biphenylyl)-4-nitroimidazole; M.P. 246.5–247.5° C.

When the above process is carried out and 2-(4''-nitro-4'-biphenylyl)imidazole,
2-(4''-chloro-4'-biphenylyl)imidazole,
2-(4''-cyano-4'-biphenylyl)imidazole,
2-(4''-carbonamido-4'-biphenylyl)imidazole, or
2-(4'-carboxamidophenyl)imidazole is used in place of 2-(4'-biphenylyl)imidazole, there is obtained 2-(4''-nitro-4'-biphenylyl)-4-nitroimidazole,
2-(4''-chloro-4'-biphenylyl)-4-nitroimidazole,
2-(4''-cyano-4'-biphenylyl)-4-nitroimidazole,
2-(4''-carboxamido-4'-biphenylyl)-4-nitroimidazole or
2-(4'-carboxamidophenyl)-4-nitroimidazole, respectively.

EXAMPLE 176

1-methyl-2-(4'-biphenylyl)-5-nitroimidazole

A mixture of .41 gm. (1.55 mmol) of 2-(4'-biphenylyl) - 4 - nitroimidazole and .15 ml. (196 mg. 1.55 mmol) of methyl sulfate is heated five minutes at 150–160° C. The resulting viscous oil is cooled and extracted with a mixture of chloroform and excess dilute sodium hydroxide solution. The reaction product dissolves leaving an orange suspension of orange sodium salt of unreacted starting material in the aqueous phase. The aqueous phase is re-extracted with chloroform and the combined organic phases are dried and evaporated in vacuo to give a crystalline solid. This is filtered through 3.0 gm. of alkaline aluminum oxide in 1:2 dichloromethane ether solvent to give a pale yellow purified product. Recrystallization from alcohol gives a product melting at 206–211° C. Sublimation at 190–200° C. and 1 mm. pressure gives 1-methyl-2-(4'-biphenylyl) - 5 - nitroimidazole melting at 208–210° C.

When in the above process in place of methyl sulfate there is used methyl toluene sulfonate or β-chloroethyl toluene sulfonate, there will result 1-methyl-2-(3'-biphenylyl)-5-nitroimidazole or 1-β-chloroethyl - 2 - (4' - biphenylyl)-5-nitroimidazole, respectively.

When the above process is carried out and 2-(4''-nitro-4'-biphenylyl)-4-nitroimidazole,
2-(4''-chloro-4'-biphenylyl)-4-nitroimidazole,
2-(4''-cyano-4'-biphenylyl)-4-nitroimidazole,
2-(4''-carboxamido-4''-biphenylyl)-4-nitroimidazole,
2-(4'-morpholinocarbamoylphenyl)-4-nitroimidazole,
2-(4'-carbamoyloxyphenyl)-4-nitroimidazole,
2-(3'-ethylcarbamoyloxyphenyl)-4-nitroimidazole, or
2-(4'-pyrrolidinocarbonyloxyphenyl)-4-nitroimidazole is used in place of 2-(4'-biphenylyl)-4-nitroimidazole, there is obtained 1-methyl-2-(4''-nitro-4'-biphenylyl)-4-nitroimidazole,
1-methyl-2-(4''-chloro-4'-biphenylyl)-4-nitroimidazole,
1-methyl-2-(4''-cyano-4'-biphenylyl)-4-nitroimidazole,
1-methyl-2-(4''-carboxamido-4''-biphenylyl)-4-nitroimidazole,
1-methyl-2-(4'-morpholinocarbonylphenyl)-5-nitroimidazole, 1-methyl-2-(4'-carbamoyloxyphenyl)-5-nitroimidazole,
1-methyl-2-(3'-ethylcarbamoyloxyphenyl)-5-nitroimidazole, or
1-methyl-2-(4'-pyrollidinocarbonyloxyphenyl)-5-nitroimidazole, respectively.

EXAMPLE 177

1-methyl-2-(4'-diacetoxymethylphenyl)-5-nitroimidazole

To a mixture of 18.3 g. of 1-methyl-2-(4'-tolyl)-5-nitroimidazole in 135 ml. of acetic acid and 156 ml. of acetic anhydride is added 20 ml. sulfuric acid. The reaction mixture is cooled in a mixture of methanol and ice. The mixture is allowed to warm to 0° C. for ½ hour. Chromium oxide (17.0 g.) is added over a period of 20 minutes and the resulting mixture is allowed to stand at 0° C. overnight with stirring. The mixture is quenched in 1000 ml. of ice water. The mixture is neutralized to about pH 5 with 50% sodium hydromide solution and extracted with 3 x 7.50 ml. of chloroform which is back-washed with 100 ml. of water. The extract is evaporated to dryness and dissolved in 2000 ml. of ether. After filtration and evaporation of most of the solvent, 1-methyl-2-(4'-diacetoxymethylphenyl)-5-nitroimidazole (16 g.) is obtained; M.P. 92–97° C.

When the above process is carried out and propionic acid and propionic anhydride are used in place of acetic acid and acetic anhydride, there is obtained 1-methyl-2-(4'-dipropionoxymethylphenyl)-5-nitroimidazole.

EXAMPLE 178

1-methyl-2-(4'-formylphenyl)-5-nitroimidazole 1-methyl - 2 - (4'-diacetoxymethylphenyl)-5-nitroimidazole (16.4 g.) is dissolved in 300 ml. of 1:1 ethanol-water mixture and 13.1 ml. of concentrated sulfuric acid. The mixture is refluxed for one hour, neutralized with potassium bicarbonate, filtered, and the solids extracted with acetone. The acetone is evaporated to yield 10.5 g. 1-methyl - 2 - (4'-formylphenyl)-5-nitroimidazole; M.P. 136–143° C.

EXAMPLE 179

1-methyl-2[4'-(2"-oxo-oxazolidin-3"-YL-iminomethyl)phenyl]-5-nitroimidazole

In 100 ml. of methanol and 9 ml. of 2.5 N hydrochloric acid is dissolved 3 g. (.013 m.) of 1-methyl-2-(4'-formylphenyl)-5-nitroimidazole. While heating on a steam bath, there is added a solution of 3-amino-2-oxo-oxazolidine (1.53 g.) in 80 ml. of hot water. The mixture is allowed to cool slowly to room temperature. The product, 1-methyl-2[4'-(2"-oxo-oxazolidin-3"-YL-iminomethyl)phenyl]-5-nitroimidazole, is then filtered (3.9 g.); M.P. 228–233° C.

EXAMPLE 180

1-methyl-2-(4-formylphenyl)-5-nitroimidazole semicarbazone 1-methyl-2-(4-formylphenyl) - 5 - nitroimidazole (0.23 g.) is dissolved in 8 ml. of hot ethanol. Semicarbazide hydrochloride (.112 g.) is added in 2 ml. of hot water. The mixture is heated for ten minutes. After cooling, 0.26 g. of 1-methyl-2-(4-formylphenyl)-5-nitroimidazole semicarbazone is obtained; M.P. 245–246° C.

When the above process is carried out and N[4]-methyl semicarbazide hydrochloride N[4],N[4]-diethylsemicarbazide hydrochloride or morpholinocarbonylhydrazine hydrochloride is used in place of semicarbazide hydrochloride, there is obtained 1-methyl-2-(4-formylphenyl)-5-nitroimidazole-N[4]-methyl semicarbazone, 1-methyl - 2 - (4-formylphenyl)-5-nitroimidazole-N[4],N[4]-diethyl semicarbazone, or 1-methyl-2-(4-formylphenyl)-5-nitroimidazole-N[4]-(3-oxa-1,5-pentylene)semicarbazone, respectively.

EXAMPLE 181

1-methyl-2-[4'-(1"-piperidinoiminomethyl)phenyl]-5-nitroimidazole

To a hot mixture of 310 mg. of 1-methyl-2-(4'-formylphenyl)-5-nitroimidazole and 250 mg. of 1-aminopiperidino in 4 ml. of ethanol there is added a catalytic amount (about one drop) of 2.5 N hydrochloric acid and the solution allowed to stand for two days at room temperature. During this time a crystalline orange precipitate forms. It is filtered off and washed with about 2 ml. of ethanol, and dried to give 1-methyl-2-[4'-(1"-piperidinoiminomethyl)-phenyl]-5-nitroimidazole.

EXAMPLE 182

1-methyl-2-(3'-formylphenyl)-5-nitroimidazole phenylhydrazone 850 mg. of 1-methyl-2-(3'-formylphenyl)-5-nitroimidazole is added to 10 ml. of ethanol and the mixture warmed to obtain solution. 750 mg. of phenylhydrazine and 4 drops of glacial acetic acid are added to the alcohol solution. The mixture is allowed to stand for 2–3 minutes during which time the phenylhydrazone crystallizes. The reaction mixture is chilled and the solid product removed by filtration and washed with cold ethanol. It is recrystallized from about 150 ml. of ethanol to give 1 - methyl-2-(3'-formylphenyl)-5-nitroimidazole phenylhydrazone.

When the above process is carried out and 2-hydrazino-pyrimidine nitrobenzoyl hydrazine or methyl hydrazine is used in place of phenylhydrazine, there is obtained 1-methyl-2-(3' - formylphenyl)-5-nitroimidazole-2-pyrimidinylhydrazone, 1 - methyl-2-(3'-formylphenyl)-5-nitroimidazole-nitrobenzoylhydrazone, or 1 - methyl - 2 - (3'-formylphenyl)-5-nitroimidazole-methylhydrazone, respectively.

EXAMPLE 183

1-methyl-[4'-[1"-(2"'-oxo-oxazolidin-3"'-YL-imino)ethyl]-phenyl]-5-nitroimidazole To a solution of 0.18 gm. of 1-methyl-2-acetylphenyl-5-nitroimidazole in a minimum volume of hot methanol there is added, with stirring, a solution of 0.11 gm. of 3-amino-2-oxazolidinone in the minimum volume of hot methanol and 1 ml. of 2.5 N hydrochloric acid. The reaction mixture is allowed to cool slowly to room temperature and is then chilled in an ice bath. 1-methyl-[4'-[1" - (2"'-oxo-oxazolidin-3"'-yl-imino)ethyl]phenyl]-5-nitroimidazole crystallizes and is filtered off. It is purified by recrystallization from 1:1 dimethylformamide-ethanol.

EXAMPLE 184

1-methyl-2-[4'-(2"-oxoimidazolidine-3"-YL-iminomethyl)-phenyl]-5-nitroimidazole

To a cold mixture of 90 mg. of 2-imidazolidone in 3 ml. of 2 N sulfuric acid there is added slowly with stirring 69 mg. of sodium nitrite in a minimum volume of water. The mixture is stirred for about 30 minutes in an ice bath and then 140 mg. of zinc dust is added in portions over a period of about 10 minutes. On completion of the zinc addition, the reaction mass is stirred in an ice bath for 10 minutes and at room temperature for 15 minutes. The unreacted zinc is removed by filtration and to the filtrate containing 3-amino-2-imidazolidinone there is added 140 mg. of 1-methyl-2-formylphenyl-5-nitroimidazole and 3 ml. of warm ethanol. A precipitate forms. The mixture is cooled and the solid removed by filtration, washed with cold ethanol and dried to give 1-methyl-2-[4'-2"-oxoimidazolidine-3"-yl-iminomethyl)phenyl] - 5 - nitroimidazole.

EXAMPLE 185

1-methyl-2-[4'-(2",5"-dioxoimidazolidine-3"-YL-iminonethyl)-phenyl]-5-nitroimidazole 150 mg. of ethyl hydrazinoacetate hydrochloride and 100 mg. of potassium cyanate are added to 1 ml. of water and the solution allowed to stand at room temperature for about 10 minutes. At the end of this time, 2 ml. of 6 N hydrochloric acid is added and the solution heated on a steam bath for 30 minutes. It is then cooled to about room temperature. To this solution containing 3-amino-2,5-imidazolidindione there is added 160 mg. of 1-methyl-2-formylphenyl-5-nitroimidazole in 2 ml. of ethanol. The resulting solution is heated on a steam bath for about 2 minutes and then cooled. 10 ml. of water is added and the mixture warmed to dissolve any solid material. The warm solution is cooled slowly, with scratching, to crystallize 1-methyl-2-[4'-(2",5"-dioxoimidazolidine - 3" - yliminomethyl)phenyl]-5-nitroimidazole which is then filtered, washed with water and dried.

EXAMPLE 186

1-methyl-2-formylphenyl-5-nitroimidazole oxime 120 mg. of 1-methyl-2-formylphenyl-5-nitroimidazole and 50 mg. of hydroxylamine hydrochloride are heated together on a steam bath for 3 minutes in 1.5 ml. of ethanol containing 1 drop of pyridine. About 0.3 ml. of water is added to the excess hydroxylamine hydrochloride in solution. Crystals form, and the suspension is cooled and filtered. The solid product is washed with ethanol and dried to give 1-methyl-2-formylphenyl-5-nitroimidazole oxime. It is recrystallized twice from ethanol to give substantially pure product.

EXAMPLE 187

1-methyl-2-formylphenyl-5-nitroimidazole methoxime 120 mg. of 1-methyl-2-formylphenyl-5-nitroimidazole is dissolved in 1 ml. of warm ethanol, and to this solution there is added with stirring 0.71 mmol of methoxyamine hydrochloride in 0.2 ml. of water. The mixture is stirred thoroughly and then allowed to stand for 10 minutes. It is cooled to room temperature and the insoluble 1-methyl-2-formylphenyl-5-nitroimidazole methoxime removed by filtration. It is recrystallized from acetone-water to give substantially pure material.

EXAMPLE 188

1-methyl-2-(4'-hydroxymethylphenyl)-5-nitroimidazole

To a solution of 1-methyl-2-(4'-formylphenyl)-5-nitroimidazole in 1600 ml. of ethanol is added 0.82 g. sodium borohydride in about 30 ml. of water. After four hours, acetic acid is added until the mixture is acidic. Following evaporation of the solvent, the residue is washed with water to give substantially pure 1-methyl-2-(4'-hydroxymethylphenyl)-5-nitroimidazole (4.6 g.); M.P. 163–166° C.

EXAMPLE 189

1-methyl-2-(4'-phenoxycarbonyloxymethylphenyl)-5-nitroimidazole 1-methyl-2-(4'-hydroxymethylphenyl) - 5 - nitroimidazole (4.65 g.) is dissolved in 35 ml. of dry pyridine and the resulting solution cooled on ice. Phenylchloroformate (3.44 g.) is added over a 12-minute period with stirring. The reaction mixture is stirred for an additional four hours and quenched in water to precipitate 6.7 g. of 1-methyl - 2 - (4'-phenoxycarbonyloxymethylphenyl)-5-nitroimidazole; M.P. 118–124° C.

When the above process is carried out and p-nitrophenylchloroformate or o-chlorophenylchloroformate is used in place of phenylchloroformate, there is obtained 1-methyl - 2 - [4'-(4"-nitrophenoxycarbonyloxymethylphenyl)]-5-nitroimidazole, or 1-methyl-2-[4'-(2"-chlorophenoxycarbonyloxymethylphenyl)] - 5 - nitroimidazole, respectively.

EXAMPLE 190

1-methyl-2-(4'-carbamoyloxymethylphenyl)-5-nitroimidazole

To liquid ammonia (100 ml.) is added 3.95 g. of 1-methyl - 2 - (4'-phenoxycarbonyloxymethylphenyl)-5-nitroimidazole. The ammonia is allowed to evaporate over a period of about two hours. The residue is washed with water and dried to obtain 2.8 g. of 1-methyl-2-(4'-carbamoyloxymethylphenyl)-5-nitroimidazole; M.P. 164–168° C.

When dimethylamine or piperazine are used in the above process in place of ammonia, there is obtained 1-methyl - 2 - (4'-N',N'-dimethylcarbamoyloxymethylphenyl)-5-nitroimidazole, or 1-methyl-2-(4'-piperazinocarbonyloxymethylphenyl)-5-nitroimidazole, respectively.

EXAMPLE 191

1-methyl-2-(4'-trifluoromethylphenyl)-5-nitroimidazole

A mixture of 2.5 g. (0.01 mole) of 1-methyl-2-(4'-carboxyphenyl)-5-nitroimidazole, 10 g. (0.09 mole) of sulfur tetrafluoride, and 13 ml. of liquid, anhydrous hydrogen fluoride is heated in a stainless steel autoclave at 100–140° C. overnight. The excess hydrogen fluoride is allowed to evaporate and the residue is dissolved in about 100 ml. of water. An equal volume of chloroform is added, and the mixture is treated with sodium carbonate until all the acid has been neutralized. The layers are separated and the aqueous phase is again extracted with chloroform. The combined organic extracts are washed once with sodium bicarbonate solution, dried, and concentrated leaving a gummy residue. The residue is redissolved in ethyl acetate and the solution is charged on a column of silica gel, from which 1-methyl-2-(4'-trifluoromethylphenyl)-5-nitroimidazole is obtained by chromatography.

EXAMPLE 192

2-(4'-trifluoromethylphenyl)-4-nitroimidazole

A solution of 17.1 g. (0.1 mole) of p-trifluoromethylbenzonitrile in 60 ml. of dry ethanol is chilled in an ice bath and is saturated with dry hydrogen chloride. The reaction mixture is allowed to stand for 2–3 days in the refrigerator, and ethyl-p-trifluoromethylbenzimidate hydrochloride separates. The solid is filtered, washed with alcohol, with ether, and is dried.

A solution of 12.7 g. (0.05 mole) of ethyl trifluoromethyl benzimidate hydrochloride in 60 ml. of methanol is stirred in an ice bath, and 6.7 g. (0.05 mole) of aminoacetaldehyde diethylacetal in 60 ml. of methanol is added. The reaction mixture is allowed to stand overnight at room temperature. The methanol is removed at reduced pressure leaving a syrupy residue. It may be used without purification.

The above syrup is cooled in an ice bath and 15 g. of cold, concentrated sulfuric acid is added gradually. The reaction mixture is allowed to warm to room temperature and is poured into a mixture of crushed ice and water which contains a slight excess of sodium hydroxide. The mixture is extracted with chloroform, and the extract is dried and concentrated to a small volume. Addition of hexane to the residue gives 2-(4'-trifluoromethylphenyl)-imidazole.

A mixture of 30 ml. of acetic anhydride and 1.4 ml. (0.022 mole) of concentrated nitric acid is stirred by hand and 2.1 g. (0.02 mole) of 2-(4'-trifluoromethylphenyl)imidazole is added in several portions. The mixture is heated on the steam bath for a few minutes, and a vigorous reaction occurs; it quickly and spontaneously subsides. The still hot mixture is poured into a large excess of crushed ice and 2-(4'-trifluoromethylphenyl)-4-nitroimidazole precipitates.

EXAMPLE 193

1-methyl-2-(4'-trifluoromethylphenyl)-5-nitroimidazole

A mixture of 514 mg. (0.002 mole) of 2-(4'-trifluoromethylphenyl)-4-nitroimidazole and 0.2 ml. (0.002 mole) of methyl sulfate is heated at about 140° C. for a few minutes. A viscous liquid forms which is dissolved in chloroform. The solution is washed with an excess of dilute ammonia water and is dried and concentrated. The dark-colored residue is dissolved in a minimal amount of ethyl acetate and this solution is charged on a column of alumina, from which 1-methyl - 2 - (4'-trifluoromethylphenyl)-5-nitroimidazole is obtained by chromatography.

When the above process is carried out using 2-(4'-morpholinosulfonylphenyl) - 4 - nitroimidazole or 2-(4'-ethylsulfoxyphenyl)-4-nitroimidazole in place of 2-(4'-trifluoromethylphenyl)-4-nitroimidazole, there is obtained 1 - methyl-2-(4'-morpholinosulfonylphenyl)-5-nitroimidazole or 1-methyl-2-(4'-ethylsulfoxyphenyl)-5-nitroimidazole, respectively.

When methyl benzenesulfonate, ethyl toluenesulfonate or methyl ethanesulfonate is used in the above process in place of methylsulfate, there is obtained 1-methyl-2-(4'-trifluoromethylphenyl) - 5 - nitroimidazole, 1-ethyl-2-(4'-trifluoromethylphenyl)-5-nitroimidazole, or 1 - methyl-2-(4'-trifluoromethylphenyl)-5-nitroimidazole, respectively.

EXAMPLE 194

1-methyl-2-(4'-trichloromethylphenyl)-5-nitroimidazole

A solution of 2.17 g. (0.01 mole) of 1-methyl-2-p-tolyl-5-nitroimidazole and N-chlorosuccinimide (3.72 g.) in trifluoroacetic acid (20 ml.) is refluxed for 3 hours. The solvent is evaporated and the residue diluted with methanol and the mixture evaporated to dryness. The residue is slurried with water and the pH adjusted to 4–5° C. The crude product, 1 - methyl-2-(4'-trichloromethylphenyl)-5-nitroimidazole, is filtered and purified by recrystallization from ethanol.

EXAMPLE 195

2-(4'-hydroxymethylphenyl)-4-nitroimidazole 1.5 gm. of 2 - (4'-hydroxymethylphenyl)imidazole is added to a solution of .6 ml. of concentrated nitric acid in 5.5 ml. of acetic anhydride. The mixture is heated on the steam bath for about 10 minutes and is then allowed to cool to room temperature. The reaction mixture is then added to 25 ml. of 4 N sulfuric acid and the resulting mixture is refluxed for one hour. The reaction mixture is then cooled and sodium bicarbonate is added until a pH of 3 is attained giving 2 - (4'-hydroxymethylphenyl)-4-nitroimidazole.

When 2 - (4'-ethylsulfoxylphenyl)imidazole or 2-(2'-sulfonylphenyl)imidazole is used in the above process in place of 2-(4'-hydroxymethylphenyl)imidazole, there is obtained 2-(4'-ethylsulfoxylphenyl)-4-nitroimidazole or 2-(2'-sulfonylphenyl)-4-nitroimidazole, respectively.

EXAMPLE 196

1-methyl-2-(4'-morpholinomethylphenyl)-5-nitroimidazole hydrochloride 1-methyl-2-(4' - hydroxymethylphenyl) - 5-nitroimidazole is dissolved in excess thionyl chloride and refluxed until gas evolution ceases. The thionyl chloride is removed by distillation leaving crystalline 1-methyl-2-(4'-chloromethylphenyl)-5-nitroimidazole. This material is suspended in chloroform, treated with an excess of morpholine and refluxed for two hours. The chloroform is removed, the residue is taken up in water and neutralized with sodium bicarbonate solution. The product is extracted with ethyl acetate. The ethyl acetate extract is dried over sodium sulfate and then treated with dry hydrogen chloride to yield the crystalline 1-methyl-2-(4'-morpholinomethylphenyl) - 5-nitroimidazole hydrochloride.

When methylamine is used in the above procedure in place of morpholine, there is obtained 1-methyl-2-(4'-N-methylaminomethylphenyl)-5-nitroimidazole.

EXAMPLE 197

2-(4'-carboxamidophenyl)-4-nitroimidazole 25 gm. of p-cyanobenzoic acid is refluxed with 100 ml. of thionyl chloride and 100 ml. of phenol for three hours. The solvents are removed in vacuo and the resulting acid chloride is added to aqueous ammonium hydroxide with stirring. The product, p-cyanobenzamide, has a melting point of 223–224° C.

The p-cyanobenzamide is dissolved in 2950 ml. of ethanol and this solution is saturated with hydrogen chloride. The reaction mixture is allowed to stand at room temperature for five days and ethyl p-carboxamido benzimidate hydrochloride is recovered.

The imino ether formed above suspended in 500 ml. of methyl alcohol and added to 6.5 gm. of amino acetaldehyde diethyl acetal in 50 ml. of methanol. The reaction mixture is allowed to stand at room temperature for 24 hours and is then evaporated to a small volume, diluted with ether and cooled. The resulting solids are filtered off, washed with ether and added in small portions to 10.6 ml. of cold concentrated sulfuric acid with stirring. This reaction mixture is poured over ice in dilute sodium hydroxide and filtered giving 2-(4'-carboxamidophenyl)imidazole; M.P. 310–315° C.

To 25 ml. of ice cold 30% fuming sulfuric acid is added with stirring 2.6 gm. of 2-(4'-carboxamidophenyl)-imidazole. Fuming nitric acid is added and the reaction mixture is heated on a steam cone for 10 minutes, poured over ice, filtered and washed with water and acetone successively giving 2-(4'-carboxamidophenyl)-4-nitroimidazole; M.P. 323–326° C.

When N',N'-dimethyl-2-(4' - carboxamidophenyl)imidazole or N'-methyl-2-(4'-carboxamidophenyl)imidazole is used in the above process in place of 2-(4'-carboxamidophenyl)imidazole, there is obtained N',N'-dimethyl-2-(4'-carboxamidophenyl)-4-nitroimidazole or N'-methyl-2-(4'-carboxamidophenyl) - 4-nitroimidazole, respectively.

When the above process is carried out and 2-(4'-biphenylyl)imidazole,
2-(3'-acetylphenyl)imidazole,
2-(4'-dimethylcarboxamidophenyl)imidazole,
2-(4'-piperidinocarbonylphenyl)imidazole,
2-(4'-tolyl)imidazole,
2-(4'-acetylaminomethylphenyl)imidazole,
2-(4'-benzoylaminomethylphenyl)imidazole,
2-[4'-(2''-fluorobenzoylaminomethylphenyl)]imidazole
2-[4'-(2''-nitrobenzoylaminomethylphenyl)]imidazole
2-(4'-morpholinomethylphenyl)imidazole,
2-(4'-methoxymethylphenyl)imidazole,
2-(2'-hydroxymethylphenyl)imidazole,
2-(4'-carboxymethylphenyl)imidazole,
2-(4'-carboxamidomethylphenyl)imidazole, or
2-(4'-N-methylcarboxamidomethylphenyl)imidazole is used in place of 2-(4'-carboxamidophenyl)imidazole, there is obtained 2-(4'-biphenylyl)-4-nitroimidazole,
2-(3'-acetylphenyl)-4-nitroimidazole,
2-(4'-dimethylcarboxamidophenyl)-4-nitroimidazole,
2-(4'-piperidinocarbonylphenyl)-4-nitroimidazole,
2-(4'-tolyl)-4-nitroimidazole,
2-(4'-acetylaminomethylphenyl)-4-nitroimidazole,
2-(4'-benzoylaminomethylphenyl)-4-nitroimidazole,
2-[4'-(2''-fluorobenzoylaminomethylphenyl)]-4-nitroimidazole,
2-[4'-(2''-nitrobenzoylaminomethylphenyl)]-4-nitroimidazole,
2-(4'-morpholinomethylphenyl)-4-nitroimidazole,
2-(4'-methoxymethylphenyl)-4-nitroimidazole,
2-(2'-hydroxymethylphenyl)-4-nitroimidazole,
2-(4'-carboxymethylphenyl)-4-nitroimidazole,
2-(4'-carboxamidomethylphenyl)-4-nitroimidazole, or
2-(4'-N-methylcarboxamidomethylphenyl)-4-nitroimidazole, respectively.

EXAMPLE 198

1-methyl-2-(4'-carboxamidophenyl)-5-nitroimidazole 500 mg. of 2-(4'-carboxamdiophenyl)-4-nitroimidazole is dissolved in 200 ml. of hot 1,2-dimethoxy ethane. The resulting mixture is filtered, cooled in the ice bath and treated with 36 ml. of an excess of ethereal diazomethane. The resulting mixture is allowed to stand for two hours in the ice bath and is then evaporated to a small volume. The mixture is then filtered and the solid product, 1-methyl-2-(4' - carboxamidophenyl)-5-nitroimidazole, is washed with ether and recrystallized from acetone-ether; M.P. 233–235° C.

When the above process is carried out and 2-(2'-nitrophenyl)-4-nitroimidazole,
2-(3'-nitrophenyl)-4-nitroimidazole,
2-(4'-nitrophenyl)-4-nitroimidazole, or
2-(2',4'-dinitrophenyl)-4-nitroimidazole is used in place of 2-(4'-carboxamidophenyl)-4-nitroimidazole, there is obtained 1-methyl-2-(2'-nitrophenyl)-5-nitroimidazole,
1-methyl-2-(3'-nitrophenyl)-5-nitroimidazole,
1-methyl-2-(4'-nitrophenyl)-5-nitroimidazole, or
1-methyl-2-(2',4'-dinitrophenyl)-5-nitroimidazole, respectively.

When the above process is carried out and

2-[4'-(2-oxo-oxazolidin-3-yl-iminomethylphenyl)]-4-nitroimidazole,
2-(4'-biphenylyl)-4-nitroimidazole,
2-(4'-carbamoyloxymethylphenyl)-4-nitroimidazole,
2-(4'-thioncarbamoyloxymethylphenyl)-4-nitroimidazole,
2-(4'-N-morpholinocarbonyloxymethylphenyl)-4-nitroimidazole,
2-(4'-N,N-dimethylcarbamoyloxymethylphenyl)-4-nitroimidazole,
2-[4'-(1-carbamoylhydrazin-2-yl-methylenephenyl)]-4-nitroimidazole,
2-[4'-(1-thioncarbamoylhydrazin-2-yl-methylenephenyl)]-4-nitroimidazole,
2-(3'-carboxyhydrazidophenyl)-4-nitroimidazole,
2-(4'-dimethylcarboxamidophenyl)-4-nitroimidazole,
2-(4'-piperidinocarbonylphenyl)-4-nitroimidazole,
2-(4'-tolyl)-4-nitroimidazole,
2-(4'-tolyl)-4-nitroimidazole,
2-(4'-acetylaminomethylphenyl)-4-nitroimidazole,
2-(4'-benzoylaminomethylphenyl)-4-nitroimidazole,
2-[4'-(2''-fluorobenzoylaminomethylphenyl)]-4-nitroimidazole,
2-[4'-(2''-nitrobenzoylaminomethylphenyl)]-4-nitroimidazole,
2-[4'-(4''-tolylaminomethylphenyl)]-4-nitroimidazole,
2-(3'-aminomethylphenyl)-4-nitroimidazole,
2-(4'-N-methylaminomethylphenyl)-4-nitroimidazole,
2-(4'-morpholinomethylphenyl)-4-nitroimidazole,
2-(4'-methoxymethylphenyl)-4-nitroimidazole,
2-(2'-hydroxymethylphenyl)-4-nitroimidazole,
2-(4'-phenoxycarbonyloxymethylphenyl)-4-nitroimidazole,
2-[4'-(4''-fluorophenoxycarbonyloxymethylphenyl)]-4-nitroimidazole,
2-[4'-(4''-nitrophenoxycarbonyloxymethylphenyl)]-4-nitroimidazole,
2-[4'-(4''-n-propylphenoxycarbonyloxymethylphenyl)]-4-nitroimdazole,
2-(4'-formylphenyl)-4-nitroimidazole,
2-(4'-methoxycarbonylphenyl)-4-nitroimidazole,
2-(4'-methoxyiminocarbonylphenyl)-4-nitroimidazole,
2-(4'-cyanomethylphenyl)-4-nitroimidazole,
2-(4'-carboxamidomethylphenyl)-4-nitroimidazole,
2-(4'-N-methylcarboxamidomethylphenyl)-4-nitroimidazole, or
2-[4'-(1-carbamoyl-1-methylhydrazin-2-yl-methylenephenyl)]-4-nitroimidazole, is used in place of 2-(4'-carboxamidophenyl)-4-nitroimidazole, there is obtained 1-methyl-2-[4'-(2-oxo-oxazolidin-3-yl-iminomethylphenyl)]-5-nitroimidazole,
1-methyl-2-(4'-biphenylyl)-5-nitroimidazole,
1-methyl-2-(4'-carbamoyloxymethylphenyl)-5-nitroimidazole,
1-methyl-2-(4'-thioncarbamoyloxymethylphenyl)-5-nitroimidazole,
1-methyl-2-(4'-N-morpholinocarbonyloxymethylphenyl)-5-nitroimidazole,
1-methyl-2-(4'-N,N-dimethylcarbamoyloxymethylphenyl)-5-nitroimidazole,
1-methyl-2-[4'-(1-carbamoylhydrazin-2-yl-methylenephenyl)]-5-nitroimidazole,
1-methyl-2-[4'-(1-thioncarbamoylhydrazin-2-yl-methylenephenyl)]-5-nitroimidazole,
1-methyl-2-(3-carboxyhydrazidophenyl)-5-nitroimidazole,
1-methyl-2-(4'-dimethylcarboxamidophenyl)-5-nitroimidazole,
1-methyl-2-(4'-piperidinocarbonylphenyl)-5-nitroimidazole,
1-methyl-2-(4'-tolyl)-5-nitroimidazole,
1-methyl-2-(4'-acetylaminomethylphenyl)-5-nitroimidazole,
1-methyl-2-[4'-(2''-fluorobenzoylaminomethylphenyl)]-5-nitroimidazole,
1-methyl-2-(4'-benzoylaminomethylphenyl)-5-nitroimidazole,
1-methyl-2-[4'-(2''-nitrobenzoylaminomethylphenyl)]-5-nitroimidazole,
1-methyl-2-[4'-(4''-tolylaminomethylphenyl)]-5-nitroimidazole,
1-methyl-2-(3'-aminomethylphenyl)-5-nitroimidazole,
1-methyl-2-(4'-N-methylaminoethylphenyl)-5-nitroimidazole,
1-methyl-2-(4'-morpholinomethylphenyl)-5-nitroimidazole,
1-methyl-2-(4'-methoxymethylphenyl)-5-nitroimidazole,
1-methyl-2-(2'-hydroxymethylphenyl)-5-nitroimidazole,
1-methyl-2-(4'-phenoxycarbonyloxymethylphenyl)-5-nitroimdazole,
1-methyl-2-[4'-(4''-fluorophenoxycarbonyloxymethylphenyl)]-5-nitroimidazole,
1-methyl-2-[4'-(4''-nitrophenoxycarbonyloxymethylphenyl)]-5-nitroimidazole,
1-methyl-2-[4'-(4''-n-propylphenoxycarbonyloxymethylphenyl)]-5-nitroimidazole,
1-methyl-2-(4'-formylphenyl)-5-nitroimidazole,
1-methyl-2-(4'-methoxycarbonylphenyl)-5-nitroimidazole,
1-methyl-2-(4'-methoxyiminocarbonylphenyl)-5-nitroimidazole,
1-methyl-2-(4'-cyanomethylphenyl)-5-nitroimidazole,
1-methyl-2-(4'-carboxamidomethylphenyl)-5-nitroimidazole,
2-(4'-N-methylcarboxamidomethylphenyl)-5-nitroimidazole, or
1-methyl-2-[4'-(1-carbamoyl-N-methylhydrazin-2-yl-methylenephenyl)]-5-nitroimidazole, respectively.

EXAMPLE 199

1-methyl-2-(4'-cyanophenyl)-5-nitroimidazole 232 mg. of 2-(4'-carboxamidophenyl)-4-nitroimidazole is dehydrated in vacuo at 251–258° C. for about 6 hours. The sublimate received as a result upon recrystallization from acetone-ether is 2-(4'-cyanophenyl)-4-nitroimidazole, which upon recrystallization from acetone-ether has a melting point of 324–329° C. Additional recrystallization from ethanol gives a product melting at 333–334° C.

The above nitroimidazole is converted to 1-methyl-2-(4'-cyanophenyl)-5-nitroimidazole when the procedure of Example 188 is followed using 2-(4'-cyanophenyl)-4-nitroimidazole in place of 2-(4'-carboxamidophenyl)-4-nitroimidazole.

EXAMPLE 200

1-methyl-2-(4'-carboxyphenyl)-5-nitroimidazole 2.0 gm. of 1-methyl-2-p-tolyl-5-nitroimidazole is dissolved in a solution of 25% sulfuric acid. 3.5 gm. of sodium dichromate dihydrate dissolved in 20 ml. water is added. The resulting suspension is stirred rapidly during the gradual addition of 50 ml. concentrated sulfuric acid. The reaction solution is then heated for four hours at 75–85° C. The reaction mixture is filtered hot and the filtrate cooled in an ice bath. The pH of the filtrate is adjusted to pH 5 with 11.7 N sodium hydroxide. The crude 1-methyl-2-(4'-carboxyphenyl)-5-nitroimidazole resulting is removed by filtration. The product is then washed well with water and extracted thoroughly with about an equal volume of aqueous sodium bicarbonate. Filtration of this extract affords 300 mg. recovered starting material. Acidification to pH 6 and filtration of the filtrate affords substantially pure 1-methyl-2-(4'-carboxyphenyl)-5-nitroimidazole; M.P. 255–260° C.

EXAMPLE 201

1-methyl-2-(4-hydroxymethylphenyl)-5-nitroimidazole

Into a suspension of 0.5 g. of 1-methyl-2-(4'-carboxyphenyl)-5-nitroimidazole in 5 ml. of di-($\beta$-methoxyethyl) ether is passed a slow stream of diborane until all of the starting material dissolves. The mixture is allowed to stand at room temperature for one hour, and the resulting mixture is then carefully diluted with 20 ml. of water. The mixture is then cooled on ice and the precipitate, 1-methyl - 2 - (4 - hydroxymethylphenyl)-5-nitroimidazole, is filtered off and washed with water.

EXAMPLE 202

1-methyl-2-(4'-carboxamidophenyl)-5-nitroimidazole 2.2 gm. of 1 - methyl - 2 - (4'-carboxyphenyl)-5-nitroimidazole is slowly added to 25 ml. thionyl chloride. The reaction mixture is refluxed for ½ hour. The thionyl chloride is evaporated in vacuo, and the flask is purged with benzene. The flask of crystalline material is chilled in a Dry Ice bath and 100 ml. of methanol saturated with ammonia is added. The reaction mixture is stirred, warmed to 40° C. and retained at that temperature for 30 minutes. The solvent is then evaporated in vacuo. The residue is dissolved in refluxing 1,2-dimethoxyethane and the mixture filtered to remove ammonium chloride. The solvent is evaporated and the solution is allowed to crystallize. Recrystallization from isopropanol affords substantially pure 1 - methyl - 2 - (4'-carboxamidophenyl)-5-nitroimidazole; M.P. 232–235° C.

When hydrazine, dimethylhydrazine, dimethylamine, or morpholine is used in place of ammonia in the above process, there is obtained 1-methyl-2-(4'-carboxhydrazidophenyl) - 5 - nitroimidazole, 1 - methyl-2-(4'-N²'',N²''-dimethylcarboxyhydrazidophenyl) - 5 - nitroimidazole, 1-methyl - 2 - (4' - N,N-dimethylcarboxamidophenyl)-5-nitroimidazole or 1 - methyl - 2 - (4'-morpholinocarbonylamidophenyl)-5-nitroimidazole, respectively.

EXAMPLE 203

1-methyl-2-(4'-cyanomethylphenyl)-5-nitroimidazole

A mixture of 2.5 g. (0.01 mole) of 1-methyl-2-(4'-chloromethylphenyl) - 5 - nitroimidazole and 30 ml. of Amberlite resin IRA–400 (which had ben converted to the cyanide cycle by washing it thoroughly with aqueous sodium cyanide solution), and 75 ml. of ethanol are stirred overnight at room temperature. The resin is then removed by filtration and washed well with alcohol. The filtrate is concentrated to dryness at reduced pressure. The residue is redissolved in a mixture of ethyl acetate and ether, and the solution is charged on a column of silica gel. Development of the column with ether yields 1-methyl-2-(4'-cyanomethylphenyl)-5-nitroimidazole.

When the above process is carried out and 1-methyl-2-(4'-chloroethylphenyl)-5-nitroimidazole is used in place of 1 - methyl-2-(4'-chloromethylphenyl)-5-nitroimidazole, there is obtained 1-methyl-2-(4'-cyanoethylphenyl)-5-nitroimidazole.

EXAMPLE 204

1-methyl-2-(4'-carboxamidomethylphenyl)-5-nitroimidazole

Six hundred mg. (0.0025 mole) of 1-methyl-2-(4'-cyanomethylphenyl)-5-nitroimidazole is added slowly to 12 ml. of cold, concentrated sulfuric acid. The resulting solution is allowed to stand overnight at room temperature and is poured into an excess of cold water. The product is obtained by neutralizing the solution with concentrated ammonium hydroxide.

EXAMPLE 205

1-methyl-2-(4'-carboxymethylphenyl-5-nitroimidazole

A solution of 260 mg. (0.001 mole) of 1-methyl-2-(4'-carboxamidomethylphenyl)-5-nitroimidazole in 5 ml. of 6 N hydrochloric acid is refluxed overnight. The product is obtained by cooling the mixture in an ice bath and adding 50% sodium hydroxide solution until the solution is about pH 4. When this carboxymethylphenyl compound in tetrahydrofuran is treated with diborane and the mixture is allowed to stand overnight, there is obtained 1-methyl-2-[4'-(2'-hydroxyethyl)phenyl]-5-nitroimidazole.

EXAMPLE 206

2-(3'-nitro-4'-methylphenyl)-4-nitroimidazole

To a mixture of 1.00 gm. (6.7 mmole) of 2-(p-tolyl)-imidazole and .64 ml. of fuming nitric acid (13.8 mmole) is added with stirring and ice cooling 3.2 ml. of 30% fuming sulfuric acid. The mixture is heated one hour on the steam bath, cooled and poured into ice water. The solid product is filtered off, washed with water and dissolved in 20 ml. water containing an excess of sodium hydroxide. The solution is cooled and the red-orange crystals of the sodium salt of 2-(3'-nitro-4'-methylphenyl)-4-nitroimidazole are filtered off. Acidification of a warm aqueous solution of this salt gives a yellow precipitate which is recrystallized from methanol. The resulting crystalline 2-(3'-nitro-4'-methylphenyl)-4-nitroimidazole melts at 207–209° C.

When the above process is carried out using 7.0 mmole of fuming nitric acid and 2-(4'-carboxyphenyl)-imidazole in place of 2-(p-tolyl)-imidazole, there is obtained 2-(4'-carboxyphenyl)-4-nitroimidazole.

When the above process is carried out and 2-(2'-nitrophenyl)-imidazole, 2-(3'-nitrophenyl)-imidazole, (2-(4'-nitrophenyl) - imidazole or 2 - (2',4' - dinitrophenyl)-imidazole is used in place of 2-(p-tolyl)-imidazole, there is obtained 2 - (2' - nitrophenyl)-4-nitroimidazole, 2-(3'-nitrophenyl)-4-nitroimidazole, 2-(4'-nitrophenyl)-4-nitroimidazole or 2-(2',4'-dinitrophenyl)-4-nitroimidazole, respectively.

When the above process is carried out using 7.0 mmole of fuming nitric acid and 2-(2',4'-difluorophenyl)-imidazole, 2 - (2',3',4' - trichlorophenyl)-imidazole or 2-(4'-fluorophenyl)-imidazole in place of 2-(p-tolyl)-imidazole, there is obtained 2 - (2',4' - difluorophenyl) - 4-nitroimidazole, 2 - (2',3',4' - trichlorophenyl)-4-nitroimidazole or 2-(4'-fluorophenyl)-4-nitroimidazole, respectively.

When the above process is carried out and 2-(5'-quinolinyl)-imidazole or 2-(5'-quinoxalinyl)-imidazole is used in place of 2-(p-tolyl)-imidazole, there is obtained 2-(5'- quinolinyl)-4-nitroimidazole or 2-(5'-quinoxalinyl)-4-nitroimidazole, respectively.

When the above process is carried out using 0.7 mmole of fuming nitric acid and 2-(4'-ethylsulfoxylphenyl)-imidazole or 2-(2'-sulfonylphenyl)-imidazole in place of 2-(p-tolyl)-imidazole, there is obtained 2-(4'-ethylsulfoxylphenyl)-4-nitroimidazole or 2-(2'-sulfonylphenyl)-4-nitroimidazole, respectively.

EXAMPLE 207

1-methyl-2-(3'-nitro-4'-methylphenyl)-5-nitroimidazole 1.15 gm. of 2-(3'-nitro-4'-methylphenyl)-4-nitroimidazole is heated for 35 minutes at 140° C. with 498 mg. of methyl sulfate. After cooling the mixture is dissolved by shaking with mixed chloroform and excess dilute sodium hydroxide. The chloroform phase is then evaporated to dryness. The crude crystalline residue is filtered through a 5.0 gm. column of basic alumina using 3:7 (v./v.) methylene chloride-ether as eluent. The residue from evaporation of the eluate is recrystallized from benzene-hexane to give 1-methyl-2-(3'-nitro-4'-methylphenyl)-5-nitroimidazole melting at 95-97° C.

When the above process is carried out and 2-(4'-methylsulfonamidophenyl)-4-nitroimidazole,
2-(4'-diethylsulfonamidophenyl)-4-nitroimidazole,
2-(4'-phenylsulfonamidophenyl)-4-nitroimidazole,
2-[4'-(4''-chlorophenylsulfonamido)phenyl]-4-nitroimidazole,
2-([4'-(4''-nitrophenylsulfonamido)phenyl]-4-nitroimidazole, or
2-[4'-(4''-ethylphenylsulfonamido)phenyl]-4-nitroimidazole is used in place of 2-(3'-nitro-4'-methylphenyl)-4-nitroimidazole, there is obtained 1-methyl-2-(4'-methylsulfonamidophenyl)-5-nitroimidazole,
1-methyl-2-(4'-diethylsulfonamidophenyl)-5-nitroimidazole,
1-methyl-2-(4'-phenylsulfonamidophenyl)-5-nitroimidazole,
1-methyl-2-[4'-(4''-chlorophenylsulfonamidophenyl)]-5-nitroimidazole,
1-methyl-2-[4'-(4''-nitrophenylsulfonamidophenyl)]-5-nitroimidazole, or
1-methyl-2-[4'-(4''-phenylsulfonamidophenyl)]-5-nitroimidazole, respectively.

When the above process is carried out and 2-(4'-biphenylyl)-4-nitroimidazole,
2-(3'-acetylphenyl-4-nitroimidazole,
2-(4'-N-morpholinocarbonyloxymethylphenyl)-4-nitroimidazole,
2-(4'-N,N-dimethylcarbamoyloxymethylphenyl)-4-nitroimidazole,
2-(4'-dimethylcarboxamidophenyl)-4-nitroimidazole,
2-(4'-piperidinocarbonylphenyl)-4-nitroimidazole,
2-(4'-acetylaminomethylphenyl)-4-nitroimidazole,
2-(4'-benzoylaminomethylphenyl)-4-nitroimidazole or
2-(4'-benzoylaminomethylphenyl)-4-nitroimidazole or nitroimidazole is used in place of 2-(3'-nitro-4'-methylphenyl)-4-nitroimidazole, there is obtained 1-methyl-2-(4'-biphenylyl)-5-nitroimidazole,
1-methyl-2-(3'-acetylphenyl)-5-nitroimidazole,
1-methyl-2-(4'-N-morpholinocarbonyloxymethylphenyl)-5-nitroimidazole,
1-methyl-2-(4'-N,N-dimethylcarbamoyloxymethylphenyl)-5-nitroimidazole,
1-methyl-2-(4'-dimethylcarboxamidophenyl)-5-nitroimidazole,
1-methyl-2-(4'-piperidinocarbonylphenyl)-5-nitroimidazole,
1-methyl-2-(4'-acetylaminomethylphenyl-5-nitroimidazole,
1-methyl-2-(4'-benzoylaminomethylphenyl)-5-nitroimidazole or
1-methyl-2-[4'-(2''-fluorobenzoylaminomethylphenyl)]-5-nitroimidazole, respectively.

When the above process is carried out using 2-(2'-hydroxymethylphenyl)-4-nitroimidazole or 2-[4'-(2''-nitrobenzoylaminomethylphenyl)]-4-nitroimidazole is used in place of 2-(3'-nitro-4'-methylphenyl)-4-nitroimidazole, there is obtained 1-methyl-2-(2'-hydroxymethylphenyl)-5-nitroimidazole or 1 - methyl - 2 - [4'-(2''-nitrobenzoylaminomethylphenyl)]-5-nitroimidazole, respectively.

EXAMPLE 208

1-methyl-2-(3'-sulfonamido-4'-methylphenyl)-5-nitroimidazole

A mixture of 2.2 g. (0.01 mole) of 1-methyl-2-(4-tolyl)-5-nitroimidazole and 25 ml. of chlorosulfonic acid is heated at 100° C. for 3-4 days. The mixture is poured into a large amount of crushed ice containing an excess of ammonia. The solution is washed with chloroform, which removes some impurities, and then with ethyl acetate, which extracts the 1-methyl-2-(3'-sulfonamido-4'-methylphenyl)-5-nitroimidazole. This material is obtained as a solid on evaporation of the solvent.

EXAMPLE 209

1-methyl-2-(2'-cyano-4'-nitrophenyl)-5-nitroimidazole

1 - methyl - 2 - (2'-carboxamido-4'-nitrophenyl-5-nitroimidazole (.02 mole) is refluxed in 100 ml. of thionyl chloride for 5 hours. The thionyl chloride is distilled off and the residue is treated with 25 ml. of ammonium hydroxide diluted with 3 parts of ice and water. This mixture is then extracted with ethyl acetate which is washed with water and dried. The ethyl acetate is then concentrated and the 1-methyl - 2 - (2'-cyano-4'-nitrophenyl)-5-nitroimidazole is crystallized from ethyl acetate and ether.

EXAMPLE 210

2-(2'-carboxamido-4'-nitrophenyl)-5-nitroimidazole 2-(2'-carboxy-4'-nitrophenyl) - 5 - nitroimidazole (.1 mole) is refluxed with 50 ml. of thionyl chloride until complete solution is effected. The thionyl chloride is removed by distillation and an excess of ammonium hydroxide (50 ml.) diluted with 2 parts of ice is added to the acid chloride residue. After complete solution is obtained, the excess ammonium hydroxide is removed under reduced pressure and the residue taken up in 50 ml. of water. Hydrochloric acid is added to adjust to pH 5-6. The crystallized 2-(2'-carboxamido-4'-nitrophenyl)-5-nitroimidazole is filtered off, washed with water and dried.

EXAMPLE 211

1-methyl-2-(2'-carboxamido-4'-nitrophenyl)-5-nitroimidazole 2-(2'-carboxamido-4'-nitrophenyl) - 5 - nitroimidazole (.075 mole) is suspended in 500 ml. of 1,2-dimethoxyethane. A dry ether solution containing .15 mole of diazomethane is then added to the suspension. The solution is stirred until all of the starting material is dissolved (5-6 hours). The excess diazomethane is removed in a stream of nitrogen and the dimethoxyethane is removed under reduced pressure. The resulting 1-methyl-2-(2'-carboxamido-4'-nitrophenyl)-5-nitroimidazole is recrystallized from ethyl acetate.

When the above process is carried out and 2-(2'-naphthyl) - 4 - nitroimidazole, 2 - (2' - 5',6',7',8' - tetrahydronaphthyl) - 4 - nitroimidazole, 2 - (5' - indanyl) - 4-nitroimidazole, 2 - (5' - quinolinyl) - 4 - nitroimidazole or 2 - (5' - quinoxalinyl) - 4 - nitroimidazole is used in place of 2 - (2' - carboxamido - 4' - nitrophenyl)-4-nitroimidazole, there is obtained 1 - methyl - 2 - (2' - naphthyl) - 5 - nitroimidazole, 1 - methyl - 2-(2'-5',6',7',8'-tetrahydronaphthyl) - 5 - nitroimidazole, 1 - methyl-2-(5'-indanyl) - 5 - nitroimidazole, 1 - methyl - 2 - (5'-quinolinyl) - 5 - nitroimidazole, or 1 - methyl - 2 - (5'-quinoxalinyl)-5-nitroimidazole, respectively.

When the above process is carried out and 2-(3'-carboxamidophenyl)-4-nitroimidazole,
2-[4'-(4''-fluorophenylaminodiazophenyl)]-4-nitroimidazole,
2-(4'-carboxamidophenyl)-4-nitroimidazole,
2-(4'-phenylaminodiazophenyl)-4-nitroimidazole,
2-[4'-(4''-chlorophenylaminodiazophenyl)-4-nitroimidazole,
2-[4'-(4''-tolylaminodiazophenyl)]-4-nitroimidazole,
2-(4'-phenyldiazophenyl)-4-nitroimidazole or
2-[4'-(4''-dimethylaminophenyldiazophenyl)]-4-nitroimidazole, is used in place of 2-(2'-carboxamido-4'-nitrophenyl)-4-nitroimidazole.

there is obtained 1-methyl-2-(3'-carboxamidophenyl)-5-nitroimidazole,
1-methyl-2-[4'-(4''-florophenylaminodiazophenyl)]-5-nitroimidazole,
1-methyl-2-(4'-carboxamidophenyl)-5-nitroimidazole,
1-methyl-2-(4'-phenylaminodiazophenyl)-5-nitroimidazole,
1-methyl-2-[4'-(4''-chlorophenylaminodiazophenyl)-5-nitroimidazole,
1-methyl-2-[4'-(4''-tolylaminodiazophenyl)]-5-nitroimidazole,
1-methyl-2-(4'-phenyldiazophenyl)-5-nitroimidazole or
1-methyl-2-[4'-(4''-dimethylaminophenyldiazophenyl)]-5-nitroimidazole, respectively.

When the above process is carried out and 2-(4'-ethylsulfoxylphenyl) - 4 - nitroimidazole, 2-(2'-fluorophenyl)-4 - nitroimidazole, 2 - (4'-fluorophenyl)-4-nitroimidazole or 2 - phenyl - 4 - nitroimidazole, is used in place of 2-(2'-carboxamido - 4' - nitrophenyl) - 4 - nitroimidazole, there is obtained 1 - methyl - 2 - (4' - ethylsulfoxylphenyl)-5-nitroimidazole, 1 - methyl - 2 - (2' - fluorophenyl) - 5-nitroimidazole, 1 - methyl - 2 - (4' - fluorophenyl)-5-nitroimidazole or 1 - methyl - 2 - phenyl - 5 - nitroimidazole, respectively.

EXAMPLE 212

2-(2'-carboxy-4'-nitrophenyl)-4-nitroimidazole 100 mg. (0.43 mmole) of 2-(2'-carboxyphenyl)-4-nitroimidazole is dissolved by gentle warming in 0.5 ml. of 30% fuming sulfuric acid. Fuming nitric acid (0.05 ml.—ca. .1 mm.) is added and the mixture is heated on a steam bath for about 75 minutes. The reaction mixture is cooled, diluted with ca. 3 ml. of water and concentrated sodium hydroxide is added until a pH of 2–3 is obtained. The crystalline precipitate which forms is filtered off with ice, cooled, washed with water and air dried. The resulting product is recrystallized from acetone-water to obtain 2 - (2' - carboxy - 4' - nitrophenyl)-4-nitroimidazole; M.P. 230–245° C. with evolution of gas.

EXAMPLE 213

2-(4'-ethylphenyl)-4-nitroimidazole

To 2-(4'-ethylphenyl)-imidazole (18.9 g.) in 100 ml. of chloroform, cooled in an ice bath, is added portionwise over about one hour 7.0 g. of nitronium fluoborate. The rate of addition is such that the temperature is maintained beow 20° C. The mixture is stirred at room temperature for an additional 4 hours, and then added to a mixture of 200 ml. of 0.5 N sodium hydroxide solution and 200 ml. of chloroform. The chloroform layer is separated and extracted with 2× 100 ml. of 0.5 N sodium hydroxide. The contained basic extracts are acidified with concentrated hydrochloric acid. The crude precipitate is recrystallized from dimethylformamide to give 2-(4'-ethylphenyl)-4-nitroimidazole.

When the above process is carried out and 2-phenyl-imidazole,
2-(2'-nitrophenyl)-imidazole,
2-(3'-nitrophenyl)-imidazole,
2-(2'-naphthyl)-imidazole,
2-(5'-indanyl)-imidazole,
2-(4'-biphenylyl)-imidazole,
2-(3'-acetylphenyl)-imidazole,
2-(2'-sulfonylphenyl)-imidazole,
2-(2'-hydroxymethylphenyl)-imidazole,
2-(3'-ethoxyphenyl)-imidazole, or
2-(4'-acetylaminophenyl)-imidazole is used in place of 2-(4'-ethylphenyl)-imidazole, there is obtained 2-phenyl-4-nitroimidazole,
2-(2'-nitrophenyl)-4-nitroimidazole,
2-(3'-nitrophenyl)-4-nitroimidazole,
2-(2'-naphthyl)-4-nitroimidazole,
2-(5'-indanyl)-4-nitroimidazole,
2-(4'-biphenylyl)-4-nitroimidazole,
2-(3'-acetylphenyl)-4-nitroimidazole,
2-(2'-sulfonylphenyl)-4-nitroimidazole,
2-(2'-hydroxymethylphenyl)-4-nitroimidazole,
2-(3'-ethoxyphenyl)-4-nitroimidazole, or
2-(4'-acetylaminophenyl)-4-nitroimidazole,
respectively.

When the above process is carried out and nitronium hexafluorophosphate, nitronium hexafluoroarsenate, nitronium hexafluorosilicate, nitronium hexafluoroantimonate, or nitronium hexaperchlorate is used in place of nitronium fluoborate, 2-(4'-ethylphenyl)-4-nitroimidazole is again obtained.

EXAMPLE 214

2-(4'-fluorophenyl)-4-nitroimidazole

To 2-(4'-fluorophenyl)-imidazole (16.2 g., .01 mole) in 100 ml. chloroform, cooled in an ice bath, is added portionwise over about one hour 7.0 g. nitronium fluoborate. The rate of addition is such that the temperature is maintained below 20° C. The mixture is stirred at room temperature for an additional 4 hours, and then added to a mixture of 200 ml. of 0.5 N sodium hydroxide solution and 200 ml. of chloroform. The chloroform layer is separated and extracted with 2× 100 ml. of 0.5 N sodium hydroxide. The combined basic extracts are made acidic with concentrated hydrochloric acid. The aqueous layer is decanted and the crude residue crystallized from acetone-ether to give 2-(4'-fluorophenyl)-4-nitroimidazole.

When the above process is carried out and 2-(3'-methylthiophenyl)-imidazole,
2-(4'-formylphenyl)-imidazole,
2-(4'-phenyldiazophenyl)-imidazole,
2-(4'-cyanomethylphenyl)-imidazole,
2-(4'-carboxymethylphenyl)-imidazole,
2-phenylimidazole,
2-(3'-fluoro-2'-naphthyl)-imidazole,
2-(2',4'-difluorophenyl)-imidazole, or 2-[4'-(4'''-nitrophenoxycarbonyloxymethylphenyl)]-imidazole is used in place of 2-(4'-fluorophenyl)-imidazole, there is obtained 2-(3'-methylthiophenyl)-4-nitroimidazole,
2-(4'-formylphenyl)-4-nitroimidazole,
2-(4'-phenyldiazophenyl)-4-nitroimidazole,
2-(4'-cyanomethylphenyl)-4-nitroimidazole,
2-(4'-carboxymethylphenyl)-4-nitroimidazole,
2-phenyl-4-nitroimidazole,
2-(3'-fluoro-2'-naphthyl)-4-nitroimidazole,
2-(2',4'-difluorophenyl)-4-nitroimidazole, or
2-[4'-(4'''-nitrophenoxycarbonyloxymethylphenyl)]-4-nitroimidazole,
respectively.

EXAMPLE 215

1-methyl-2-(4'-aminomethylphenyl)-5-nitroimidazole

Potassium phthalimide (18.5 g., 0.1 mole) is added to a solution of 25.2 g. (0.1 mole) of 4-(1'-methyl-5'-nitroimidazol-2'-yl)-benzyl chloride in 100 ml. of dimethylsulfoxide at room temperature. After stirring overnight at room temperature, the reaction mixture is diluted with 500 ml. of ice-water. The 1-methyl-2-(4'-phthalimidomethylphenyl)-5-nitroimidazole is removed by filtration.

A mixture of 1-methyl-2-(4'-phthalimidomethylphenyl)-5-nitroimidazole (3.62 g., 0.01 mole), hydrazine hydrate (10 ml.) and methanol (500 ml.) is stirred at room temperature under a nitrogen atmosphere for 36 hours. The solvent is removed by evaporation, and the residue stirred with 100 ml. 0.1 N hydrochloric acid. After ½ hour the mixture is filtered and the filtrate made basic with 12 N sodium hydroxide solution. The mixture is extracted with 5× 200 ml. portion of chloroform. The combined chloroform extracts are dried over anhydrous magnesium sulfate and evaporated to dryness. The residue is dissolved in methyl ethyl ketone (30 ml.) containing p-toluenesulfonic acid (3.4 g.). The di-p-toluenesulfonic acid salt of 1-methyl-2-(4'-aminomethylphenyl)-5-nitroimidazole is crystallized from the solution.

EXAMPLE 216

When the procedures of Examples 162, 166, 170–173, 177–191, 199–206, 208–210 and 212 are carried out and the 2-aryl imidazole starting material is replaced by a 2-aryl imidazole substituted at the 1-position with a hydrogen, methyl, ethyl, carboxymethyl, carboxyethyl, carboxamidomethyl, carboxamidoethyl, methoxycarbonylmethyl, ethoxycarbonylethyl, benzyl, nitrophenylethyl, chlorophenylmethyl, bromophenylmethyl, anilinomethyl, carboxamidophenylmethyl, acetylaminophenylmethyl, cyanomethyl, cyanoethyl, formylmethyl, methylthioethyl, methylsulfonylethyl, ethylsulfinyl-n-propyl, chloroethyl, n-bromopropyl, hydroxyethyl, n-hydroxypropyl, methoxyethyl, allyl, vinyl, aminoethyl, N-methylaminoethyl, carbamoyloxyethyl, morpholinocarbonyloxyethyl, n-propan-2-ol or n-butan-2-one radical, there is obtained the corresponding 1-substituted 2-aryl imidazole.

EXAMPLE 217

3-nitroimidazo-[2,1:a]-isoindole

A mixture of 70 gm. phthalonitrile, 100 ml. absolute ethanol and 200 ml. chloroform is saturated with dry hydrogen chloride while being stirred in an ice bath. The mixture is kept 14 days at 0° C. and is then filtered and the product, ethyl o-cyanobenzimidate hydrochloride is washed with chloroform. The mother liquors are diluted with ether until precipitation takes place and the precipitate is filtered off and added to the first crop.

136 gm. of crude ethyl o-cyanobenzimidate hydrochloride and 95 ml. amino acetaldehyde diethyl acetal is dissolved in 1 l. of methanol and the solution is allowed to stand at room temperature for one hour. The solvent is removed in vacuo and the syrupy residue is heated 1½ hours on the steam bath with 400 ml. concentrated sulfuric acid. The mixture is cooled, diluted with 2.5 l. water and extracted with chloroform. The acidic solution is made strongly basic by addition of a 5% excess of 34% sodium hydroxide. The solution is then extracted with chloroform. The chloroform extracts are discarded and the basic solution is brought to pH 5 with concentrated hydrochloric acid and evaporated to dryness in vacuo. The residual brown salts are heated at 210–220° C. for 3–4 hours at 1 mm. pressure in a sublimation apparatus. The resulting sublimate is dissolved in 200 ml. of warm 1.25 N hydrochloric acid. The solution is then cooled and the insoluble precipitate is filtered off. The filtrate is evaporated to dryness and the resulting salts are dissolved in 400 ml. of warm absolute ethanol. After cooling, a precipitate of ammonia chloride is filtered off and the filtrate boiled down to 150–200 ml. On cooling, a further crop of ammonium chloride is removed by filtration. A major portion of the ethanol is evaporated and the syrupy residue is diluted with 200 ml. of acetone to cause precipitation of 2-(2'-carboxyphenyl)-imidazole hydrochloride.

1.00 gm. of this product is dissolved in 3.0 ml. of 30% fuming sulfuric acid and .50 ml. fuming nitric acid (10.8 mmol) is added over about one minute below the surface of the solution. The mixture is heated on the steam bath for about 15 minutes and then cooled, diluted with 30 ml. water and treated with 10 ml. 11.7 N sodium hydroxide solution with further cooling at 0° C. The product is filtered off and recrystallized from acetone-water to give 2-(2'-carboxyphenyl)-4-nitroimidazole.

Into a suspension of .500 gm. (2.13 mmol) of 2-(2'-carboxyphenyl)-4-nitroimidazole in 5.0 ml. di(β-methoxyethyl) ether is passed a slow stream of diborane until all of the starting material dissolves. The mixture is allowed to stand at room temperature for one hour and the nearly solid mixture resulting is then diluted carefully with 20 ml. of water. The mixture is then cooled on ice and the precipitate, 2-(2'-hydroxymethylphenyl)-4-nitroimidazole, is filtered off and washed with water.

303 mg. (1.38 mmol) of 2-(2'-hydroxymethylphenyl)-4-nitroimidazole is treated with 1 ml. thionyl chloride. The excess of thionyl chloride is removed in vacuo and the residue is dissolved in 1 ml. of methanol. The solution is then diluted with 5 ml. water and the precipitated oil is extracted with two portions of chloroform. After drying over sodium sulfate and evaporation in vacuo a readily crystalline brown residue of 2-(2'-chloromethylphenyl)-4-nitroimidazole is obtained. This is purified by filtering over 4.0 gm. acid-washed alumina in ethyl acetate solvent.

1.21 gm. (5.10 mmol) of the above-obtained nitroimidazole is heated for 2–3 minutes at 152° C. The dark residue is then dissolved in a mixture of chloroform and excess dilute sodium hydroxide solution. The chloroform phase is combined with two further chloroform extracts and is evaporated to dryness. The brown residue is chromatographed over 6.0 gm. acid-washed alumina using a 1:1 volume ratio of methylene chloride and ether as eluent. The pale yellow band which is eluted after a brief period is collected in one fraction and the solvent is evaporated to dryness. Recrystallization from methylene chloride gives 3-nitroimidazo-[2,1:a]-isoindole; M.P. 212–214° C.

When 1,2-dicyano-4-fluorobenzene,
1,2-dicyano-4-carboxamidobenzene,
1,2-dicyano-4-sulfonamidobenzene,
1,2-dicyano-4-chlorobenzene,
3,4-dicyanobiphenyl,
1,2-dicyano-4-acetylbenzene,
1,2-dicyano-4-acetylaminomethylbenzene,
1,2-dicyano-N-methyl-4-carboxamidobenzene, 1,2-dicyano-N,N-dimethyl-4-carboxamidobenzene,
1,2-dicyano-N-methyl-4-sulfonamidobenzene,
1,2-dicyano-N,M-dimethyl-4-sulfonamidobenzene,
1,2-dicyano-N,N-dimethyl-4-aminomethylbenzene,
1,2-dicyano-4-morpholinomethylbenzene,
1,2-dicyano-4-pyrolidinomethylbenzene,
1,2-dicyano-4-piperadinomethylbenzene,
1,3-dicyano-4-hydroxymethylbenzene,
1,2-dicyano-4-methylsulfonylbenzene, or
1,2-dicyano-4-trifluoromethylbenzene is used in place of phthalonitrile in the above process, there is obtained 3-nitro-7(or 8)-fluoroimidazo-[2,1:a]-isoindole,
3-nitro-7(or 8)-formylimidazo-[2,1:a]-isoindole,
3-nitro-7(or 8)-carboxamidoimidazo-[2,1:a]-isoindole,
3-nitro-7(or 8)-sulfonamidoimidazo-[2,1:a]-isoindole,
3-nitro-7(or 8)-chloroimidazo-[2,1:a]-isoindole,
3-nitro-7(or 8)-phenylimidazo[2,1:a]-isoindole,
3-nitro-7(or 8)-acetylimidazo-[2,1:a]-isoindole,
3-nitro-7(or 8)-acetylaminomethylimidazo-[2,1:a]-isoindole,
3-nitro-7(or 8)-N-methylcarboxamidoimidazo-[2,1:a]-isoindole,
3-nitro-7(or 8)-N,N-dimethylcarboxamidoimidazo-[2,1:a]-isoindole,
3-nitro-7(or 8)-N-methylsulfonamidoimidazo-[2,1:a]-isoindole,
3-nitro-7(or 8)-N,N-dimethylsulfonamidoimidazo-[2,1:a]-isoindole,
3-nitro-7(or 8)-N-methylaminomethylimidazo-[2,1:a]-isoindole,
3-nitro-7(or 8)-N,N-dimethylaminomethylimidazo-[2,1:a]-isoindole,
3-nitro-7(or 8)-morpholinomethylimidazo-[2,1:a]-isoindole,
3-nitro-7(or 8)-pyrrolidinomethylimidazo-[2,1:a]-isoindole,
3-nitro-7(or 8)-piperadinomethylimidazo-[2,1:a]-isoindole,
3-nitro-7(or 8)-hydroxymethylimidazo-[2,1:a]-isoindole,
3-nitro-7( or 8)-methylsulfonylimidazo-[2,1:a]-isoindole, or
3-nitro-7(or 8)-trifluoromethylimidazo-[2,1:a]-isoindole.

When 3,4-dicyanotoluene is used in place of phthalonitrile in the process described in the first two paragraphs above, there will be obtained 2-(2'-carboxy-4'(or 5)-methylphenyl)-imidazole hydrochloride.

When the procedure of Example 184 is carried out and 2-(2'-carboxy-4'(or 5')-methylphenyl) imidazole is used in place of 2-(4'-trifluoromethylphenyl) imidazole, 2-(2'-carboxy-4'(or 5')-methylphenyl)-4-nitroimidazole is obtained.

When this nitroimidazole is used in place of 2-(2'-carboxyphenyl)-4-nitroimidazole in the process of the present example, there is obtained 3-nitro-7(or 8)-methylimidazo-[2,1:a]-isoindole.

EXAMPLE 218

3,7(or 8)-dinitroimidazo-[2,1:a]-isoindole

To a solution of 15.3 gm. (.0657 mole) of 2-(2'-carboxyphenyl)-4-nitroimidazole in 74 ml. 30% fuming sulfuric acid is added 7.5 ml. fuming nitric acid with stirring. After heating at 100° C. for 2¼ hours, the mixture is cooled and poured slowly with stirring into 600 ml. water. The mixture is cooled in ice and the crystalline precipitate which forms is filtered off and washed with water giving 2-(2'-carboxy-4(or 5)-nitrophenyl)-4-nitroimidazole.

The compound, 2-(2'-carboxy-4(or 5)-nitrophenyl)-4-nitroimidazole, is then treated in a manner similar to that method used when preparing 3-nitroimidazole-[2,1:a]-isoindole from 2-(2'-carboxyphenyl)-4-nitroimidazole (Example 208). The product obtained, 3,7(or 8)-dinitroimidazo-[2,1:a]-isoindole, melts with decomposition at 200–240° C.

EXAMPLE 219

3-nitro-5,6-dihydroimidazo-[2,1:a]-isoquinoline 500 mg. (2.1 mmol) of 2-(2'-chloromethylphenyl)-4-nitroimidazole is refluxed for 2 hours in 5 ml. methanol with 103 mg. (2.1 mmol) sodium cyanide. The methanol is removed in vacuo and the residue of crude 2-(2'-cyanomethylphenyl)-4-nitroimidazole is refluxed 4 hours with 5 ml. 25% sulfuric acid. The acid solution is cooled and treated slowly with 2.5 N aqueous sodium hydroxide while stirring and cooling in ice until the pH is about 2. The precipitated crude product, 2-(2'-carboxymethylphenyl)-4-nitroimidazole, is recrystallized from ethanol to give substantially pure material.

220 mg. 2-(2'-carboxymethylphenyl)-4-nitroimidazole is dissolved in 5 ml. 1,2-dimethoxyethane and treated with excess gaseous diborane over a period of 20 minutes. The diborane is generated by adding dropwise 7 ml. of 1 N sodium borohydride in 1,2-dimethoxy ethane to 2.3 ml. of boron trifluoride etherate in 5 ml. of 1,2-dimethoxy ethane. The reaction mixture is allowed to stand at room temperature for 1 hour and is diluted carefully with 20 ml. water and 1 ml. 2.5 N hydrochloric acid. The mixture is extracted three times with 25 ml. portions of ethyl acetate and the combined extracts are then dried over sodium sulfate and evaporated to dryness in vacuo. The residual crude 2-[2'-(β-hydroxyethyl)-phenyl]-4-nitroimidazole is recrystallized from ethanol-ether.

150 mg. 2-[2'-(β-hydroxyethyl)-phenyl]-4-nitroimidazole (.64 mmol) is refluxed for 4 hours with 2 ml. of thionyl chloride. The excess thionyl chloride is removed in vacuo and the residue is treated with 5 ml. of water. The resulting mixture is extracted with 3 ml. of chloroform three times and the combined extracts are dried and evaporated in vacuo leaving a residue of crude 2-[2'-(β-chloroethyl)-phenyl]-4-nitroimidazole. This is purified by passage over 1.5 gm. of acid washed alumina using 1:1 ethyl acetate-ether as solvent. The solvent is removed in vacuo and the residue is heated at 200° C. for 20 minutes giving 3-nitro-5,6-dihydroimidazo-[2,1:a]-isoquinoline.

When the above process is carried out and 2-(2'-chloromethyl-3'-fluorophenyl)-4-nitroimidazole,
2-(2'-chloromethyl-3',4'-dinitrophenyl)-4-nitroimidazole,
2-(2'-chloromethyl-3',4'-difluorophenyl)-4-nitroimidazole,
2-(2'-chloromethyl-1'-naphthyl)-4-nitroimidazole,
2-(2'-chloromethyl-5',6',7',8'-tetrahydronaphthyl)-4-nitroimidazole,
2-(5'-chloromethyl-4'-indanyl)-4-nitroimidazole,
2-(2'-chloromethyl-3'-fluoro-1'-naphthyl)-4-nitroimidazole,
2-(2'-chloromethyl-1'-biphenyl)-4-nitroimidazole, or
2-(2'-chloromethyl-4'-ethylsulfonylphenyl)-4-nitroimidazole is used in place of 2-(2'-chloromethylphenyl)-4-nitroimidazole, there is obtained 3-nitro-5,6-dihydro-7-fluoroimidazo-[2,1:a]-isoquinoline,
3-nitro-5,6-dihydro-7,8-dinitroimidazo[2,1:a]-isoquinoline,
3-nitro-5,6-dihydro-7,8-difluoro-imidazo[2,1:a]-isoquinoline,
3-nitro-5,6-dihydroimidazo-[2,1:a]-benz[H]-isoquinoline,
3-nitro-5,6,7,8,9,10,11,12-hexahydroimidazo-[2,1:a]-benz-[H]-isoquinoline, 3-nitro-5,6-dihydro-7-fluoroimidazo[2,1:a]-benz-[H]-isoquinoline, 3-nitro-5,6-dihydro-8-phenylimidazo-[2,1:a]-isoquinoline, or 3-nitro-5,6-dihydro-8-ethylsulfonylimidazo-[2,1:a]-isoquinoline, respectively.

EXAMPLE 220

2-nitroimidazo-[2,1:a]-isoindole

A solution of 224 mg. (0.001 mole) of 2-(2'-chloromethylphenyl)-4-nitroimidazole in 25 ml. of dry 1,2-dimethoxyethane is treated with 96 mg. (0.001 mole) of sodium tert. butoxide for several hours at room temperature. The reaction mixture is filtered from the sodium chloride, and is concentrated to dryness at reduced pressure. The residue is dissolved in about 10 ml. of chloroform, and the solution is washed with an excess of 4 N ammonium hydroxide. The chloroform layer is dried and concentrated, and the residue is redissolved in a mixture of methylene chloride and ether. This solution is charged on a column of alumina, from which 2-nitroimidazo-[2,1:a]-isoindole is obtained by chromatography.

When the above process is carried out and 2-(2'-chloromethyl-3'-ethoxyphenyl)-4-nitroimidazole, 2-(2'-chloromethyl)-4-nitroimidazole, 2-[2'-chloromethyl-4'-(4''-ethylbenzoylamino)phenyl]-4-nitroimidazole, 2-(2'-chloromethyl-3'-methylthiophenyl)-4-nitroimidazole, or 2-(2'-chloromethyl-4'-carboxamidophenyl)-4-nitroimidazole is used in place of 2-(2'-chloromethylphenyl)-4-nitroimidazole, there is obtained 2-nitro-6-ethoxyphenylimidazo-[2,1:a]-isoindole,
2-nitro-7-benzoylamino-imidazo-[2,1:a]-isoindole,
2-nitro-7-(4'-ethylbenzoylamino)-imidazo-[2,1:a]-isoindole,
2-nitro-6-methylthio-imidazo-[2,1:a]-isoindole, or
2-nitro-7'-carboxamido-imidazo-[2,1:a]-isoindole, respectively.

It should be understood that although this invention has been described with reference to particular embodiments thereof, changes and modifications may be made which are within its intended scope and it should be limited only by the language of the appended claims.

What is claimed is:

1. A composition useful in the treatment of trichomoniasis, which comprises a solid pharmaceutically acceptable carrier containing a trichomonicidally effective amount of a compound of the formula:

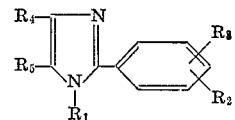

wherein one of $R_4$ and $R_5$ is nitro and the other is hydrogen; $R_1$ is loweralkyl or $(CH_2)_nOH$ wherein $n$ is 2, 3, or 4, and $R_3$ is hydrogen, halo, loweralkyl, halolower-alkyl, loweralkoxy, loweralkylthio, loweralkylsulfonyl, amino, loweralkylamino, diloweralkylamino, cyano, carboxamido, sulfonamido, loweralkylsulfonamido, loweralkylsulfonyl, or loweralkanoyl; and $R_2$ is hydrogen, halo, or nitro.

2. A composition according to claim 1 wherein the substituents are such that the compound is 1-methyl-2-(4'-fluorophenyl)-5-nitroimidazole.

3. A composition according to claim 1 wherein the substituents are such that the compound is 1-methyl-2-(2'-nitrophenyl)-5-nitroimidazole.

4. A composition according to claim 1 wherein the substituents are such that the compound is 1-methyl-2-(3'-nitrophenyl)-5-nitroimidazole.

5. A composition according to claim 1 wherein the substituents are such that the compound is 1-methyl-2-(4'-nitrophenyl)-5-nitroimidazole.

6. A composition according to claim 1 wherein the substituents are such that the compound is 1-methyl-2-(4'-chlorophenyl)-5-nitroimidazole.

7. A composition according to claim 1 wherein the substituents are such that the compound is 1-methyl-2-(4'-fluorophenyl)-4-nitroimidazole.

8. A composition according to claim 1 wherein the substituents are such that the compound is 1-methyl-2-(4'-cyanophenyl)-4-nitroimidazole.

9. A composition according to claim 1 wherein the substituents are such that the compound is 1-methyl-2-(4'-cyanophenyl)-5-nitroimidazole.

10. A composition according to claim 1 wherein the substituents are such that the compound is 1-methyl-2-(4'-carboxamidophenyl)-5-nitroimidazole.

11. A composition according to claim 1 wherein the substituents are such that the compound is 1-methyl-2-(3'-sulfonamidophenyl)-5-nitroimidazole.

12. A composition according to claim 1 wherein the substituents are such that the compound is 1-methyl-2-(3'-fluorophenyl)-5-nitroimidazole.

13. A composition according to claim 1 wherein the substituents are such that the compound is 1-(2'-hydroxyethyl)-2-(4'-fluorophenyl)-5-nitroimidazole.

References Cited

UNITED STATES PATENTS 3,341,548    9/1967    Hoffer _____ 424—273

SAM ROSEN, Primary Examiner